US012741422B2

(12) United States Patent
Coulier et al.

(10) Patent No.: US 12,741,422 B2
(45) Date of Patent: Sep. 22, 2026

(54) THREE-DIMENSIONAL PRINTING OF THREE-DIMENSIONAL OBJECTS

(71) Applicant: Velo3D, Inc., Campbell, CA (US)

(72) Inventors: Pieter Coulier, Palo Alto, CA (US); Tasso Lappas, Pasadena, CA (US); Benyamin Buller, Cupertino, CA (US); Gregory Ferguson Brown, San Jose, CA (US); Maritza Ruiz, Los Gatos, CA (US)

(73) Assignee: Velo3D, Inc., Campbell, CA (US)

( * ) Notice: Subject to any disclaimer, the term of this patent is extended or adjusted under 35 U.S.C. 154(b) by 320 days.

(21) Appl. No.: 18/238,494

(22) Filed: Aug. 27, 2023

(65) Prior Publication Data

US 2024/0083119 A1 Mar. 14, 2024

Related U.S. Application Data

(63) Continuation of application No. 18/195,484, filed on May 10, 2023, which is a continuation of application No. 18/099,479, filed on Jan. 20, 2023, now abandoned, which is a continuation of application No. 17/951,210, filed on Sep. 23, 2022, now abandoned, which is a continuation of application No. 17/841,788, filed on Jun. 16, 2022, now abandoned, which is a continuation of application No. 17/690,687, filed on Mar. 9, 2022, now abandoned, which is a continuation of application No. 17/534,742, filed on Nov. 24, 2021, now abandoned, (Continued)

(51) Int. Cl.

| | |
|---|---|
| *B29C 64/393* | (2017.01) |
| *B29C 64/153* | (2017.01) |
| *B33Y 10/00* | (2015.01) |
| *B33Y 30/00* | (2015.01) |
| *B33Y 50/02* | (2015.01) |

(52) U.S. Cl.

CPC .......... *B29C 64/393* (2017.08); *B29C 64/153* (2017.08); *B33Y 50/02* (2014.12); *B33Y 10/00* (2014.12); *B33Y 30/00* (2014.12)

(58) Field of Classification Search

CPC ........... G05B 2219/49246; G05B 2219/49023; B29C 64/393; B29C 64/153; B33Y 50/02; B33Y 10/00; B33Y 30/00; B22F 10/28; B22F 10/385; B22F 10/85

See application file for complete search history.

(56) References Cited

U.S. PATENT DOCUMENTS 6,066,285 A * 5/2000 Kumar .................. B33Y 30/00 264/603
2014/0271328 A1* 9/2014 Burris .................. B23K 26/034 419/53

(Continued)

*Primary Examiner* — Nicholas Klicos

(74) *Attorney, Agent, or Firm* — Bryan L. Baysinger; Maynard Nexsen PC

(57) ABSTRACT

The present disclosure provides three-dimensional (3D) printing methods, apparatuses, systems and/or software to form one or more 3D objects, some of which may be complex. In some embodiments, the one or more 3D objects comprise an overhang portion, such as a ledge or ceiling of a cavity. The methodologies may be used to form overhang portions with diminished deformation, defects and/or auxiliary support structures.

20 Claims, 35 Drawing Sheets

Related U.S. Application Data which is a continuation of application No. 17/401,644, filed on Aug. 13, 2021, now abandoned, which is a continuation of application No. 17/308,518, filed on May 5, 2021, now abandoned, which is a continuation of application No. 17/157,002, filed on Jan. 25, 2021, now abandoned, which is a continuation of application No. 17/063,318, filed on Oct. 5, 2020, now abandoned, which is a continuation of application No. PCT/US2019/024402, filed on Mar. 27, 2019.

(60) Provisional application No. 62/654,190, filed on Apr. 6, 2018.

(56) References Cited

U.S. PATENT DOCUMENTS

| | | | | |
|---|---|---|---|---|
| 2017/0252820 | A1* | 9/2017 | Myerberg | B22F 12/10 |
| 2018/0194056 | A1* | 7/2018 | van der Zalm | B33Y 40/00 |
| 2019/0070663 | A1* | 3/2019 | Corsmeier | B23K 26/342 |
| 2019/0240775 | A1* | 8/2019 | Graham | B22F 10/36 |

* cited by examiner 209
210
203
207
206
208
205

$W_0$
R
R 232
220
225
222
240
245
250
260
235
270
271
272
225
273
233
280
230

522
525
520
530
531
515 width
Length
height

B
590
$d_{BC}$
C
570
562
581
572
574
δ
$d_{AB}$
568
580
γ
560
A
Gravitational field 642
606
682
604
645
602
672
618
616
644
670
614
640
612
610

626
652
624
665
622
676
620
656
632
674
654
630
660
628

680
684
686
692
688
690

811
812
813
814
1
2
3
4
5
6
818
816
r
815
817

830
ω
β
836
$V_n$
A
832
Z

Z
840
γ
$V_n$
δ
B
842

1015
1010
1012
1014

1020
1025
1022
1024

1030
1035
1031
1032
1034

1040
1045
1042
1044
1041

1050
1055
1052
1054

1500
1502
1504
1506
1508
Controller(s)
Energy Source
Optical System
Target Surface
1510
1503
1505
Detector
1501
1512
1507
Simulator (optional)

1520
Input
1522
Output
1524
Voltage
Voltage
Time
Time 1600
1608
1606
h1
h2
h3
h4
h5
1602
1604
p1
p2
p3
p4
p5
α1
α2
α3
α4
α5
Z
s1
s2
s3
s4
s5

600
500
400
300
200
100
0
s
5
10
15
20
25
30
35
40
45
α

1704
1708
1705
1702
Z
1706
1707

1734
1720
1727
1730
1732
1728
1736
1738
1739
1724
1737
Z
1726
1723
1722

1754
1759
d
1748
1758
1756
1744
1740
1747
Z
1746

1772
1780
1770
1774
1775
1778
1768
X
Y
1777
Z
1766
1762

1802
1804
1800
L1
D1
d1

1812
1814
1810
L2
D2
d2

1822
1824
1820
D3
L3
d3

1832
1834
1830
D4
L4
d4

1842
1844
1840
L5
D5
L6
d5

1852
1854
1850
L7
D6
L8
d6

1862
1864
1860
L9
D7
L10
d7

1872
1874
1870
L11
D8
L12
d8

1882
1884
1880
D9
d9

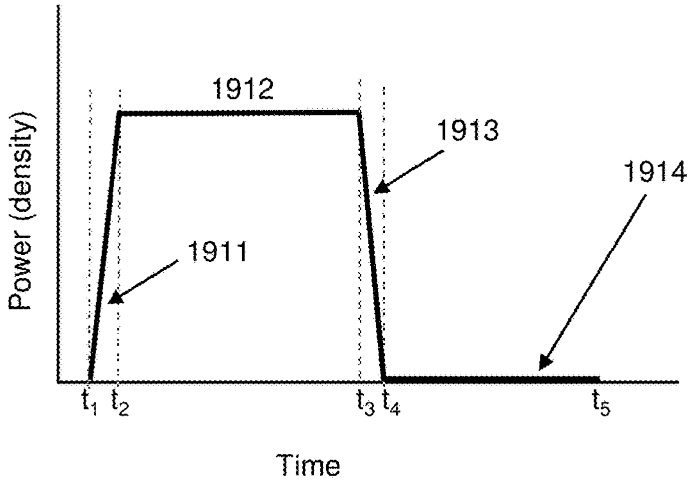
FIG. 19A
FIG. 19B
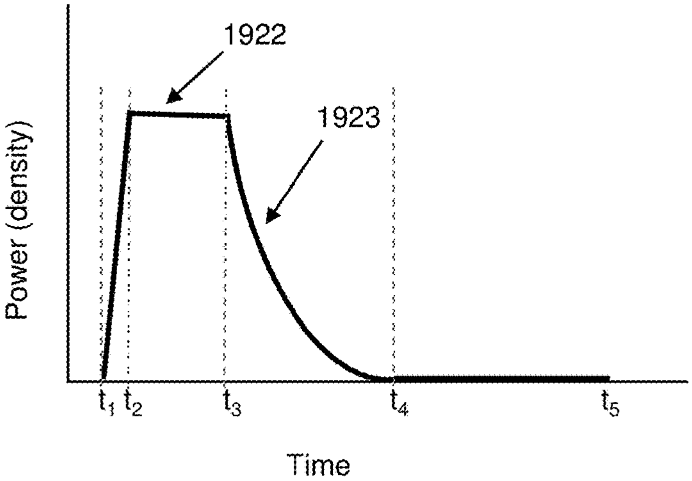
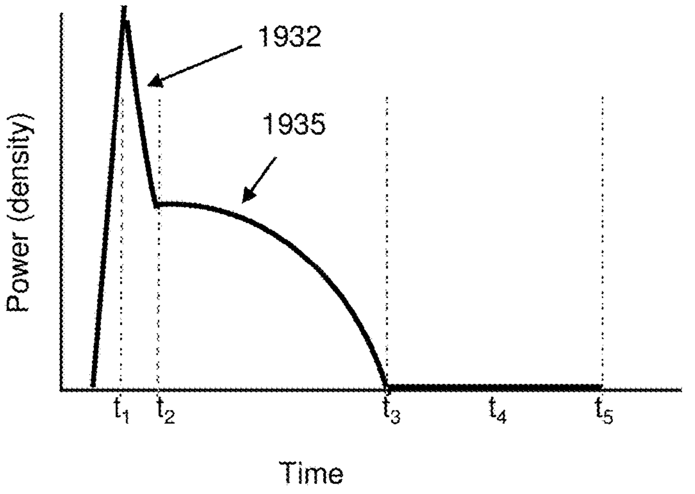
FIG. 19C
Power (density)
1912
1913
1914
1911
$t_1$ $t_2$ $t_3$ $t_4$ $t_5$
Time
Power (density)
1922
1923
$t_1$ $t_2$ $t_3$ $t_4$ $t_5$
Time
Power (density)
1932
1935
$t_1$ $t_2$ $t_3$ $t_4$ $t_5$
Time 2402
2400
2408
2406
2404

2412
2410
2414

2422
2423
2420
2424

2432
2430
2434
2435

2440
7.5 mm 2910
2912
β1
p1
p2
p3
p4
p5
h8
h7
h6
h5
h4
h3
h2
h1
2913
2911
Z
X
Y 2922
2920
β2
p1
p2
p3
p4
p5
h8
h7
h6
h5
h4
h3
h2
h1
2923
2921

2932
2930
β3
p1
p2
p3
p4
p5
h8
h7
h6
h5
h4
h3
h2
h1
2933
2931

3010
3012
β1
p1
p2
p3
p4
p5
h8
h7
h6
h5
h4
h3
h2
h1
3013
3011

3020
3022
3024
β2
p1
p2
p3
p4
p5
h8
h7
h6
h5
h4
h3
h2
h1
3023
3021

3211
3210

3222
3223
3221
3224
Y
X
Z 3232
3233
3231
3234

3242
3245
3243
3241
3244
Y
X
Z 3252
3251
3261
3253
Y
X
Z 3312
3311

3322
3323
3321
e
d
c
b
a
3325
3324

3332
3333
3331
b
a
3335
3334

3342
3343
3341
d
b
c
a
3345
3344

3352
3353
3351
d
e
b
c
a
3355
3354

3362
3363
3361
c
b
a
3365
3364

3372
3373
3371
c
e
b
d
a
3375
3374

3413
3414
3412
3415
Y
X
Z 3424
3425
3422
Y
X
Z 3433
3434
3432
3435
Y
X
Z 3444
3445
3442
Y
X
Z 3453
3454
3452
3455
Y
X
Z 3464
3462
3465

2.5 cm
3511
3512
3513
Y
Z
X
2.5 cm
3531
3532
Z
Y
X
3543
3544
3545
3546
3547
3548
3541
3542

THREE-DIMENSIONAL PRINTING OF THREE-DIMENSIONAL OBJECTS

CROSS-REFERENCE

This application is a continuation of U.S. patent application Ser. No. 18/195,484 filed May 10, 2023, which is a continuation of U.S. patent application Ser. No. 18/099,479 filed Jan. 20, 2023, which is a continuation of U.S. patent application Ser. No. 17/951,210 filed Sep. 23, 2022, which is a continuation of U.S. patent application Ser. No. 17/841,788 filed Jun. 16, 2022, which is a continuation of U.S. patent application Ser. No. 17/690,687 filed Mar. 9, 2022, which is a continuation of U.S. patent application Ser. No. 17/534,742 filed Nov. 24, 2021, which is a continuation of U.S. patent application Ser. No. 17/401,644 filed Aug. 13, 2021, which is a continuation of U.S. patent application Ser. No. 17/308,518 filed May 5, 2021, which is a continuation of U.S. patent application Ser. No. 17/157,002 filed Jan. 25, 2021, which is a continuation of U.S. patent application Ser. No. 17/063,318 filed Oct. 5, 2020, which is a continuation of International Application No. PCT/US2019/024402, filed Mar. 27, 2019, which claims benefit of prior filed U.S. Provisional Patent Application Ser. No. 62/654,190, filed on Apr. 6, 2018, titled “THREE-DIMENSIONAL PRINTING OF THREE-DIMENSIONAL OBJECTS,” each of which is entirely incorporated herein by reference.

BACKGROUND

Three-dimensional (3D) printing (e.g., additive manufacturing) is a process for making a three-dimensional (3D) object from a design. The design may be in the form of a data source such as an electronic data source or may be in the form of a hard copy. The data source may be an electronic 3D model. 3D printing may be accomplished through an additive process in which successive layers of material are laid down one on top of each other. This process may be controlled (e.g., computer controlled, manually controlled, or both). A 3D printer can be an industrial robot. In a typical additive 3D printing process, a first material-layer is formed, and thereafter, successive material-layers (or parts thereof) are added one by one, where each new material-layer is added on a pre-formed material-layer, until a fully-formed requested three-dimensional structure (3D object) is materialized.

In some cases, the 3D object bends, warps, rolls, curls, or otherwise deforms during the 3D printing process. Auxiliary supports may be inserted to circumvent the deformation. These auxiliary supports may be subsequently removed from the printed 3D object to produce the requested 3D object. However, removing the auxiliary supports may increase the cost and time required to manufacture the 3D object. At times, the auxiliary supports hinder (e.g., prevent) formation of cavities and/or ledges in the requested 3D object. The requirement for the presence of auxiliary supports may place constraints on the design of 3D objects, and/or on their respective materialization.

SUMMARY

Aspects described herein include methods, systems, apparatuses, controllers and/or non-transitory computer-readable media (e.g., software) for generating 3D objects. In some embodiments, the aspects facilitate the generation high quality complex 3D objects comprising high dimensional accuracy, low surface roughness, or high density. The complex 3D object may comprise overhangs (e.g., at angles about 45 degrees or less). The overhangs may have high dimensional accuracy, low (e.g., bottom) surface roughness (e.g., Sa) of about 5 micrometers or less), and/or low porosity (e.g., about 5% v/v or area porosity or less).

In an aspect, an apparatus for printing a three-dimensional object, comprises one or more controllers that is configured to: (a) direct a first energy source to generate a first energy beam to form an overhang segment on an edge of a hard material, which overhang segment laterally extends outward from the edge and comprises a convex portion having a radius of curvature; and (b) direct a second energy source to generate a second energy beam to increase the radius of curvature of the convex portion of the overhang segment by impinging one or more energy beams at: (i) the hard material, (ii) the overhang segment, or (iii) the hard material and the overhang segment.

In some embodiments, an exposed surface of the convex portion (I) opposes a gravitational vector, (II) opposes a platform that supports the three-dimensional object during printing, and/or (III) is impinged by the second energy beam. In some embodiments, directing the second energy beam in (b) comprises directing the second energy source to direct the second energy beam at a location that is closer to an internal portion of the three-dimensional object than the edge of the hard material. In some embodiments, the one or more controllers is configured to (c) direct a third energy source to generate a third energy beam to form an interior portion of the three-dimensional object, wherein the interior portion and the overhang segment are formed from the same layer of pre-transformed material. In some embodiments, the second energy source is different than the first energy source. In some embodiments, the second energy source is the same as the first energy source. In some embodiments, the one or more controllers is configured to direct the second energy source to generate the second energy beam to increase the radius of curvature in (b) by transforming at least part of the overhang segment to a transformed material. In some embodiments, transforming is by re-transforming a hard material. In some embodiments, the one or more controllers is configured to direct the first energy source to generate the first energy beam to form the overhang segment in (a) by transforming a pre-transformed material to a transformed material. In some embodiments, the one or more controllers is configured to direct the first energy source to generate the first energy beam to form the overhang segment in (a) by forming at least two melt pools that laterally extend from the edge. In some embodiments, the one or more controllers is configured to direct the second energy source to generate the second energy beam to increase the radius of curvature in (b) by relocating a center of mass of the overhang segment from a first position to a second position. In some embodiments, relocating the center of mass of the overhang segment comprises moving the center of mass toward an interior of the three-dimensional object. In some embodiments, relocating the center of mass of the overhang segment comprises moving the center of mass in a direction (e.g., substantially) parallel to a gravitational vector. In some embodiments, a first controller is configured to direct (a) and (b). In some embodiments, a first controller is configured to direct (a) and a second controller is configured to direct (b), wherein the first controller is different than the second controller. In some embodiments, the one or more controllers comprises a control scheme including an open loop control. In some embodiments, the one or more controllers comprises a control scheme including a closed loop control. In some embodiments, the closed loop control uses a signal obtained by at least one sensor. In some embodiments, the one or more controllers comprises a control scheme that is executed by the one or more controllers in real time during at least part of the printing. In some embodiments, the one or more controllers utilizes a simulation. In some embodiments, the simulation comprises thermal, mechanical, liquid phase, or gas phase simulation. In some embodiments, the simulation is of printing the three-dimensional object. In some embodiments, the simulation considers a material property, a geometry, and/or a physical behavior of at least a portion of the three-dimensional object (e.g., during its printing). In some embodiments, the simulation is updated and/or executed in real time. In some embodiments, "configured to" comprises "programed to." In some embodiments, the one or more controllers comprises an electrical circuit.

In another aspect, a method for printing a three-dimensional object, the method comprises: forming an overhang segment on an edge of a hard material, which overhang segment laterally extends outward from the edge and comprises a convex portion having an exposed surface, which convex portion has a radius of curvature; and increasing the radius of curvature of the convex portion of the overhang segment by impinging one or more energy beams at: (i) the hard material, (ii) the overhang segment, or (iii) the hard material and the overhang segment.

In some embodiments, the exposed surface of the convex portion (a) opposes a gravitational vector, (b) opposes a platform that supports the three-dimensional object during printing, and/or (c) is impinged by the one or more energy beams. In some embodiments, forming the overhang segment comprises forming at least one melt pool that laterally extends from the edge. In some embodiments, forming the overhang segment comprises forming at least two melt pools that laterally extend from the edge. In some embodiments, increasing the radius of curvature is by transforming at least part of the overhang segment to a transformed material. In some embodiments, transforming is by re-transforming a hardened material. In some embodiments, forming the overhang segment comprises transforming a pre-transformed material to a transformed material. In some embodiments, transforming comprises irradiating the pre-transformed material with an energy beam. In some embodiments, the overhang segment is a melt pool. In some embodiments, forming the overhang utilizes a first energy source, wherein increasing the radius of curvature of the convex portion of the overhang segment utilizes a second energy source. In some embodiments, the second energy source is different than the first energy source. In some embodiments, the second energy source is the same as the first energy source. In some embodiments, increasing the radius of curvature of the convex portion comprises relocating a center of mass of the overhang segment from a first position to a second position. In some embodiments, relocating the center of mass of the overhang segment comprises moving the center of mass toward an interior of the three-dimensional object. In some embodiments, relocating the center of mass of the overhang segment comprises moving the center of mass in a direction (e.g., substantially) parallel to a gravitational vector. In some embodiments, the method further comprises detecting at least one characteristic of a layer that is formed to print the three-dimensional object (e.g., during its formation). In some embodiments, the at least one characteristic comprises a temperature profile, a reflectivity profile, a specularity profile, or a height profile. In some embodiments, the method further comprises detecting a power of a first energy source and/or of a second energy source during the printing. In some embodiments, the method further comprises generating a power profile of a first energy source and/or a second energy source. In some embodiments, the method further comprises monitoring the power profile during the printing. In some embodiments, the monitoring is to detect and/or reduce an extent of defects in the three-dimensional object. In some embodiments, the method further comprises detecting a power density of a first energy beam and/or a second energy beam during the printing. In some embodiments, the method further comprises generating a power density profile of a first energy beam and/or a second energy beam. In some embodiments, the method further comprises monitoring the power density profile during the printing. In some embodiments, the monitoring is to detect and/or reduce an extent of defects in the three-dimensional object.

In another aspect, an apparatus for printing a three-dimensional object, comprises one or more controllers that is configured to: (a) direct a first energy source to generate a first energy beam to form an overhang segment on an edge of a hard material, which overhang segment laterally extends from the edge, wherein the overhang segment comprises a lateral surface and a top surface, the lateral surface that comprises a first terminal point corresponding to a farthest laterally extending point of the overhang segment from the edge, the top surface comprising a second terminal point corresponding to a farthest vertically extending point of the overhang segment from the edge in a direction opposite a gravitational vector; and (b) direct a second energy source to generate a second energy beam to reshape the overhang segment by impinging one or more energy beams at (i) the hard material, (ii) the overhang segment, or (iii) the hard material and the overhang segment, wherein the reshaping comprises moving (I) the second terminal point in a first direction that is (e.g., substantially) parallel to the gravitational vector, (II) the second terminal point in a second direction toward an interior of the three-dimensional object, and/or (III) the first terminal point in a third direction toward the interior of the three-dimensional object.

In some embodiments, the reshaping comprises moving (I) the second terminal point in the first direction that is (e.g., substantially) parallel to the gravitational vector. In some embodiments, the one or more controllers is configured to direct the first energy source to generate the first energy beam to form the overhang segment in (a) by transforming a pre-transformed material to a transformed material. In some embodiments, the one or more controllers is configured to direct the first energy source to generate the first energy beam to form the overhang segment in (a) by forming at least one melt pool that laterally extend from the edge. In some embodiments, the one or more controllers is configured to direct the first energy source to generate the first energy beam to form the overhang segment in (a) by forming at least two melt pools that laterally extend from the edge. In some embodiments, the one or more controllers is configured to direct the second energy source to generate the second energy beam to reshape the overhang segment in (b) by flattening the top surface of the overhang segment. In some embodiments, the one or more controllers is configured to direct the second energy source to generate the second energy beam to reshape the overhang segment in (b) by re-transforming a hardened material of the overhang segment. In some embodiments, the one or more controllers is configured to direct the first energy source to generate the first energy beam to form the overhang segment in (a) by forming a melt pool. In some embodiments, the one or more controllers is configured to direct the second energy source to generate the second energy beam to reshape the overhang segment in (b) by reshaping the melt pool. In some embodiments, forming the overhang segment comprises directing the first energy beam at a first location with respect to the edge, wherein reshaping the overhang segment comprises directing the second energy beam at a second location with respect the edge that is different than the first location. In some embodiments, the first energy beam is different than the second energy beam. In some embodiments, the first energy beam is the same as the second energy beam. In some embodiments, reshaping the overhang segment comprise forming a dimple on the top surface of the overhang segment. In some embodiments, reshaping the overhang segment comprise moving a center of mass of the overhang segment. In some embodiments, the center of mass is moved in (I) the first direction, (II) the second direction, (Ill) the third direction, or (IV) any combination of the first, second and third directions. In some embodiments, a first controller is configured to direct (a) and (b). In some embodiments, a first controller is configured to direct (a) and a second controller is configured to direct (b), wherein the first controller is different than the second controller. In some embodiments, the one or more controllers comprises a control scheme including an open loop control. In some embodiments, the one or more controllers comprises a control scheme including a closed loop control. In some embodiments, the closed loop control uses a signal obtained by at least one sensor. In some embodiments, the one or more controllers comprises a control scheme that is executed by the one or more controllers in real time during at least part of the printing. In some embodiments, the one or more controllers utilizes a simulation. In some embodiments, the simulation comprises thermal, mechanical, liquid phase, or gas phase simulation. In some embodiments, the simulation is of printing the three-dimensional object. In some embodiments, the simulation considers a material property, a geometry, and/or a physical behavior of at least a portion of the three-dimensional object (e.g., during its printing). In some embodiments, the simulation is updated and/or executed in real time. In some embodiments, "configured to" comprises "programed to." In some embodiments, the one or more controllers comprises an electrical circuit.

In another aspect, a method of printing a three-dimensional object, the method comprises: (I) forming an overhang segment on an edge of a hard material, which overhang segment laterally extends from the edge, wherein the overhang segment comprises a lateral surface and a top surface, the lateral surface that comprises a first terminal point corresponding to a farthest laterally extending point of the overhang segment from the edge, the top surface comprising a second terminal point corresponding to a farthest vertically extending point of the overhang segment from the edge in a direction opposite a gravitational vector; and (II) reshaping the overhang segment by impinging one or more energy beams at (i) the hard material, (ii) the overhang segment, or (iii) the hard material and the overhang segment, wherein the reshaping comprises moving (a) the second terminal point in a first direction that is (e.g., substantially) parallel to the gravitational vector, (b) the second terminal point in a second direction toward an interior of the three-dimensional object, and/or (c) the first terminal point in a third direction toward the interior of the three-dimensional object.

In some embodiments, the reshaping comprises moving (a) the second terminal point in the first direction that is (e.g., substantially) parallel to the gravitational vector. In some embodiments, reshaping the overhang segment comprises flattening the top surface of the overhang segment. In some embodiments, forming the overhang segment comprises transforming a pre-transformed material to a transformed material. In some embodiments, reshaping the overhang segment comprises re-transforming a hardened material of the overhang segment. In some embodiments, forming the overhang segment comprises forming a melt pool. In some embodiments, reshaping the overhang segment comprises reshaping the melt pool. In some embodiments, forming the overhang segment comprises directing a first energy beam at a first location with respect to the edge, wherein reshaping the overhang segment comprises directing a second energy beam at a second location with respect the edge that is different than the first location. In some embodiments, the first energy beam is different than the second energy beam. In some embodiments, the first energy beam is the same as the second energy beam. In some embodiments, reshaping the overhang segment comprise forming a dimple on the top surface of the overhang segment. In some embodiments, reshaping the overhang segment comprise moving a center of mass of the overhang segment. In some embodiments, the center of mass is moved in (I) the first direction, (II) the second direction, (Ill) the third direction, or (IV) any combination of the first, second and third directions. In some embodiments, the method further comprises detecting at least one characteristic of a layer that is formed to print the three-dimensional object (e.g., during its formation). In some embodiments, the at least one characteristic comprises a temperature profile, a reflectivity profile, a specularity profile, or a height profile. In some embodiments, the method further comprises detecting a power of a first energy source and/or of a second energy source during the printing. In some embodiments, the method further comprises generating a power profile of a first energy and/or a second energy source. In some embodiments, the method further comprises monitoring the power profile during the printing. In some embodiments, the monitoring is to detect and/or reduce an extent of defects in the three-dimensional object. In some embodiments, the method further comprises detecting a power density of the one or more energy beams during the printing. In some embodiments, the method further comprises generating a power density profile of the one or more energy beams. In some embodiments, the method further comprises monitoring the power density profile during the printing. In some embodiments, the monitoring is to detect and/or reduce an extent of defects in the three-dimensional object.

In another aspect, an apparatus for printing a three-dimensional object, comprises one or more controllers that is configured to: (a) direct a first energy source to generate a first energy beam to form an overhang segment on a hard material, which overhang segment and hard material are at least part of the three-dimensional object; and (b) direct a second energy source to generate a second energy beam to impinge at a location sufficiently proximate to the overhang segment to at least partially liquify the overhang segment, wherein impinging the second energy beam at the location causes a mass of (i) the overhang segment, (ii) the hard material, or (iii) the overhang segment and the hard material, to increase by at most about ten percent.

In some embodiments, the one or more controllers is configured to direct the second energy source to generate the second energy beam in (b) to create a surface tension gradient sufficient to redistribute the mass of (i) the overhang segment, (ii) the hard material, or (iii) the overhang segment and the hard material. In some embodiments, the one or more controllers is configured to direct the second energy source to generate the second energy beam to reshape the overhang segment in (b). In some embodiments, the one or more controllers is configured to direct the first energy source to generate the first energy beam to form the overhang segment on the hard material in (a) by forming at least one melt pool. In some embodiments, the one or more controllers is configured to direct the second energy source to generate the second energy beam in (b) to form a curved exposed surface of the overhang segment. In some embodiments, the one or more controllers is configured to direct the second energy source to imping the second energy beam at the location (b) after the overhang segment is at least partially hardened. In some embodiments, the one or more controllers is configured to direct the second energy source to generate the second energy beam in (b) to entrain (e.g., substantially) no pre-transformed material. In some embodiments, the one or more controllers is configured to direct the second energy source to generate the second energy beam in (b) to transform (e.g., substantially) no pre-transformed material. In some embodiments, the one or more controllers is configured to direct the second energy source to generate the second energy beam in (b) to impinge the location such that the mass of (i) the overhang segment, (ii) the hard material, or (iii) the overhang segment and the hard material, increases by at most about five percent. In some embodiments, an increase in the mass results from entrainment of a pre-transformed material into the overhang segment. In some embodiments, the one or more controllers is configured to direct the second energy source to generate the second energy beam in (b) to flatten the overhang segment. In some embodiments, the one or more controllers comprises a control scheme including an open loop control. In some embodiments, the one or more controllers comprises a control scheme including a closed loop control. In some embodiments, the closed loop control uses a signal obtained by at least one sensor. In some embodiments, the one or more controllers comprises a control scheme that is executed by the one or more controllers in real time during at least part of the printing. In some embodiments, the one or more controllers utilizes a simulation. In some embodiments, the simulation comprises thermal, mechanical, liquid phase, or gas phase simulation. In some embodiments, the simulation is of printing the three-dimensional object. In some embodiments, the simulation considers a material property, a geometry, and/or a physical behavior of at least a portion of the three-dimensional object (e.g., during its printing). In some embodiments, the simulation is updated and/or executed in real time. In some embodiments, "configured to" comprises "programed to." In some embodiments, the one or more controllers comprises an electrical circuit.

In another aspect, a method of printing a three-dimensional object, the method comprises: (I) forming an overhang segment on a hard material, which overhang segment laterally extends from the edge, which overhang segment and hard material are at least part of the three-dimensional object; and (II) impinging one or more energy beams at a location on (a) the overhang segment, (b) the hard material, or (c) the overhang segment and the hard material, wherein the location is sufficiently proximate to the overhang segment to at least partially liquify the overhang segment, wherein impinging the one or more energy beams at the location causes a mass of (i) the overhang segment, (ii) the hard material, or (iii) the overhang segment and the hard material, to increase by at most about ten percent.

In some embodiments, forming the overhang segment comprises forming a melt pool on the edge of a hard material, which melt pool laterally extends from the edge. In some embodiments, an increase in the mass results from entrainment of a pre-transformed material into the overhang segment. In some embodiments, impinging the one or more energy beams at the location creates a surface tension gradient sufficient to redistribute the mass of (i) the overhang segment, (ii) the hard material, or (iii) the overhang segment and the hard material. In some embodiments, a power density of the one or more energy beams at the location creates the surface tension gradient on the overhang segment. In some embodiments, the power density of the one or more energy beams at the location ranges from about 5 kilowatts per square millimeter ($kW/mm^2$) to about 500 $kW/mm^2$. In some embodiments, the surface tension gradient results in a reduction of radius of curvature of an exposed surface of the overhang segment. In some embodiments, the surface tension gradient results in planarizing an exposed surface portion of the overhang segment. In some embodiments, the exposed surface is a top surface of the overhang segment that opposes a direction of a gravity vector. In some embodiments, the overhang segment formed from a layer of pre-transformed material, wherein an interior layer portion is formed from the layer of pre-transformed material, and wherein the overhang segment is separated from an interior layer portion of the three-dimensional object by a gap, wherein the surface tension gradient causes the overhang segment to span the gap and wet a surface of the interior layer portion. In some embodiments, impinging the one or more energy beams at the location causes the overhang segment to redistribute a volume of its material in a direction toward an interior of the three-dimensional object. In some embodiments, the direction is away from the edge. In some embodiments, forming the overhang segment comprises causing the overhang segment to have a globular shape. In some embodiments, the one or more energy beams is a second energy beam, wherein the location is a second location, and wherein forming the overhang segment comprises impinging a first energy beam at a first location with respect to the edge of the hard material. In some embodiments, impinging the first energy beam at the first location creates a first surface tension gradient that results in the overhang segment having a globular shape. In some embodiments, the hard material is a portion of the three-dimensional object that was formed using a three-dimensional printing methodology. In some embodiments, the three-dimensional printing methodology comprises layer-wise formation of the hard material. In some embodiments, the method further comprises detecting at least one characteristic of a layer that is formed to print the three-dimensional object (e.g., during its formation). In some embodiments, the at least one characteristic comprises a temperature profile, a reflectivity profile, a specularity profile, or a height profile. In some embodiments, the method further comprises detecting a power of a first energy source and/or of a second energy source during the printing. In some embodiments, the method further comprises generating a power profile of a first energy and/or a second energy source. In some embodiments, the method further comprises monitoring the power profile during the printing. In some embodiments, the monitoring is to detect and/or reduce an extent of defects in the three-dimensional object. In some embodiments, the method further comprises detecting a power density of a first energy beam and/or a second energy beam during the printing. In some embodiments, the method further comprises generating a power density profile of a first energy beam and/or a second energy beam. In some embodiments, the method further comprises monitoring the power density profile during the printing. In some embodiments, the monitoring is to detect and/or reduce an extent of defects in the three-dimensional object.

In another aspect, an apparatus for printing a three-dimensional object, comprises one or more controllers that is configured to: (a) direct a processing system to collect a real-time sensed signal while forming a melt pool of the three-dimensional object, which real-time sensed signal is associated with a detectable change of the melt pool while in a liquid or partially liquid state over a time period; (b) direct the processing system to compare the real-time sensed signal with a target signal, which target signal is associated with target changes in the melt pool while in the liquid or partially liquid state over the time period; and (c) direct the processing system to modify at least one process variable considering a comparison of the real-time sensed signal with the target signal during the printing of the three-dimensional object.

In some embodiments, the one or more controllers is configured to direct the processing system to modify the at least one process variable during formation of the melt pool. In some embodiments, the processing system comprises one or more computers. In some embodiments, the target signal comprises a value or a function. In some embodiments, the function indicates a behavior of the real-time sensed signal over the time period. In some embodiments, the detectable change of the melt pool comprises entrainment of pre-transformed material into the melt pool. In some embodiments, the detectable change of the melt pool comprises transformation of pre-transformed material to transformed material as part of the melt pool. In some embodiments, the one or more controllers is configured to direct a first energy source to direct a first energy beam to form the melt pool. In some embodiments, the one or more controllers is configured to direct a second energy source to direct a second energy beam to reshape the melt pool. In some embodiments, the first energy source is the same as the second energy source. In some embodiments, the first energy source is different than the second energy source. In some embodiments, the first energy beam is the same as the second energy beam. In some embodiments, the first energy beam is different than the second energy beam. In some embodiments, the one or more controllers is configured to (i) direct a first energy source to direct a first energy beam to form the melt pool, and (ii) direct a second energy source to direct a second energy beam to reshape the melt pool. In some embodiments, forming the melt pool is associated with a first real-time sensed signal that is associated with a first detectable change of the melt pool, wherein reshaping the melt pool is associated with a second real-time sensed signal that is associated with a second detectable change of the melt pool. In some embodiments, the first real-time sensed signal is different than the second real-time sensed signal. In some embodiments, the first real-time sensed signal is (e.g., substantially) the same as the second real-time sensed signal. In some embodiments, the one or more controllers comprises a control scheme including an open loop control. In some embodiments, the one or more controllers comprises a control scheme including a closed loop control. In some embodiments, the closed loop control uses a signal obtained by at least one sensor. In some embodiments, the one or more controllers comprises a control scheme that is executed by the one or more controllers in real time during at least part of the printing. In some embodiments, the one or more controllers utilizes a simulation. In some embodiments, the simulation comprises thermal, mechanical, liquid phase, or gas phase simulation. In some embodiments, the simulation is of printing the three-dimensional object. In some embodiments, the simulation considers a material property, a geometry, and/or a physical behavior of at least a portion of the three-dimensional object (e.g., during its printing). In some embodiments, the simulation is updated and/or executed in real time. In some embodiments, "configured to" comprises "programed to." In some embodiments, the one or more controllers comprises an electrical circuit.

In another aspect, a method of printing a three-dimensional object, the method comprises: (i) collecting a real-time sensed signal while forming a melt pool of the three-dimensional object, which real-time sensed signal is associated with a detectable change of the melt pool while in a liquid or partially liquid state over a time period; (ii) comparing the real-time sensed signal with a target signal, which target signal is associated with target changes in the melt pool while in the liquid or partially liquid state over the time period; and (iii) modifying at least one process variable considering a comparison of the real-time sensed signal with the target signal during the printing of the three-dimensional object.

In some embodiments, the detectable change relates to a radius of curvature of an exposed surface of the melt pool. In some embodiments, the detectable change relates to a center of mass of the melt pool relative to a hard portion of the three-dimensional object. In some embodiments, the detectable change relates to a surface tension gradient at an interface between a surrounding gas and the melt pool while in the liquid or partially liquid state. In some embodiments, the detectable change relates to a temperature gradient of the melt pool while in the liquid or partially liquid state. In some embodiments, the detectable change relates to at least one characteristic of a layer that is formed to print the three-dimensional object (e.g., during its formation). In some embodiments, the at least one characteristic comprises a temperature profile, a reflectivity profile, a specularity profile, or a height profile. In some embodiments, the at least one process variable comprises: an energy beam power, an energy beam power density at an irradiation spot on the portion of the three-dimensional object, an energy beam cross section, an energy beam scan speed, an energy beam intermission time, an energy beam dwell time, an energy beam irradiation spot size at the portion of the three-dimensional object, an energy beam focal point with respect to the irradiation spot on the portion of the three-dimensional object, an energy beam path, a gas flow speed, a gas flow direction, a gas flow intermission time, an atmosphere pressure, a gas composition, an atmosphere temperature, a pre-transformed material layer height, a uniformity of the pre-transformed material layer, or a pre-transformed material removal rate. In some embodiments, the target signal and/or the real-time sensed signal relates to changes in thermal characteristics, reflectivity, specularity, color, and/or a presence of spatter of the melt pool while in a liquid or partially liquid state. In some embodiments, the changes are detectable changes. In some embodiments, the target signal and/or the real-time sensed signal relates to changes in a pressure, temperature, composition, gas flow speed, and/or gas flow turbulence of an atmosphere of a processing chamber that the printing occurs. In some embodiments, target signal and/or the real-time sensed signal relates to changes of reflectance and/or temperature of one or more components of a printer in which the printing occurs. In some embodiments, target signal and/or the real-time sensed signal relates to changes detected by a layer forming apparatus associated with a presence of a non-uniform surface of a material bed and/or defects in the material bed. In some embodiments, the method further comprises detecting one or more defects of the three-dimensional object using a comparison of the real-time sensed signal and the target signal.

In some embodiments, the one or more defects relate to a microstructure (e.g., porosity), cracks, dislocations, and/or a surface quality (e.g., roughness) of the three-dimensional object. In some embodiments, forming the melt pool comprises forming an overhang segment on an edge of a hard material, which overhang segment laterally extends from the edge. In some embodiments, the target signal and real-time sensed signal are thermal signals. In some embodiments, forming the melt pool comprises impinging an energy beam at a target surface, wherein the thermal signals comprise thermal radiation measurements from the target surface during the printing. In some embodiments, the method further comprises generating print instructions for printing the three-dimensional object, wherein the print instructions consider a geometry of the three-dimensional object. In some embodiments, the method further comprises generating print instructions for printing the three-dimensional object, wherein the print instructions consider a material of the three-dimensional object. In some embodiments, the method further comprises detecting at least one characteristic of a layer that is formed to print the three-dimensional object (e.g., during its formation). In some embodiments, the at least one characteristic comprises a temperature profile, a reflectivity profile, a specularity profile, or a height profile. In some embodiments, the method further comprises detecting a power of a first energy source and/or of a second energy source during the printing. In some embodiments, the method further comprises generating a power profile of a first energy and/or a second energy source. In some embodiments, the method further comprises monitoring the power profile during the printing. In some embodiments, the monitoring is to detect and/or reduce an extent of defects in the three-dimensional object. In some embodiments, the method further comprises detecting a power density of a first energy beam and/or a second energy beam during the printing. In some embodiments, the method further comprises generating a power density profile of a first energy beam and/or a second energy beam. In some embodiments, the method further comprises monitoring the power density profile during the printing. In some embodiments, the monitoring is to detect and/or reduce an extent of defects in the three-dimensional object.

In another aspect, an apparatus for printing a three-dimensional object, comprises one or more controllers that is programed to: (a) direct a processing system to collect a real-time sensed signal while printing the three-dimensional object, which real-time sensed signal is associated with detectable changes in a portion of the three-dimensional object over a time period; and (b) direct the processing system to compare the real-time sensed signal with a target signal, which target signal is associated with target changes in the portion of the three-dimensional object over the time period, wherein a difference between the real-time sensed signal and the target signal is associated with at least one difference in the three-dimensional object relative to a requested three-dimensional object.

In some embodiments, the at least one difference relates to at least one defect. In some embodiments, the at least one defect relates to a porosity, deformation, a crack, a dislocation, and/or a surface roughness of the three-dimensional object. In some embodiments, the one or more controllers is configured to direct the processing system to compare the real-time sensed signal with the target signal during printing of the three-dimensional object. In some embodiments, the one or more controllers is configured to direct the processing system to collect the real-time sensed signal while forming a melt pool. In some embodiments, the one or more controllers is configured to direct the processing system to compare the real-time sensed signal with a target signal while forming the melt pool. In some embodiments, the target signal and/or the real-time sensed signal relates to changes in thermal characteristics, reflectivity, specularity, color, and/or a presence of spatter of the three-dimensional object. In some embodiments, the one or more controllers is configured to (i) direct a first energy source to direct a first energy beam to form a melt pool, and (ii) direct a second energy source to direct a second energy beam to reshape the melt pool. In some embodiments, forming the melt pool is associated with a first real-time sensed signal that is associated with a first detectable change of the melt pool, wherein reshaping the melt pool is associated with a second real-time sensed signal that is associated with a second detectable change of the melt pool. In some embodiments, the first real-time sensed signal is different than the second real-time sensed signal. In some embodiments, the first real-time sensed signal is (e.g., substantially) the same as the second real-time sensed signal. In some embodiments, the one or more controllers is configured to form a signal map considering the real-time sensed signal. In some embodiments, the one or more controllers is configured to control formation of the three-dimensional object to compensate for a variation between the signal map versus a target signal map. In some embodiments, the one or more controllers comprises a control scheme including an open loop control. In some embodiments, the one or more controllers comprises a control scheme including a closed loop control. In some embodiments, the closed loop control uses a signal obtained by at least one sensor. In some embodiments, the one or more controllers comprises a control scheme that is executed by the one or more controllers in real time during at least part of the printing. In some embodiments, the one or more controllers utilizes a simulation. In some embodiments, the simulation comprises thermal, mechanical, liquid phase, or gas phase simulation. In some embodiments, the simulation is of printing the three-dimensional object. In some embodiments, the simulation considers a material property, a geometry, and/or a physical behavior of at least a portion of the three-dimensional object (e.g., during its printing). In some embodiments, the simulation is updated and/or executed in real time. In some embodiments, "configured to" comprises "programed to." In some embodiments, the one or more controllers comprises an electrical circuit.

In another aspect, a method of printing a three-dimensional object, the method comprises: collecting a real-time sensed signal while printing the three-dimensional object, which real-time sensed signal is associated with a detectable change in a portion of the three-dimensional object over a time period; and comparing the real-time sensed signal with a target signal, which target signal is associated with target changes in the portion of the three-dimensional object over the time period, wherein a difference between the real-time sensed signal and the target signal is associated with at least one difference in the three-dimensional object as compared to a requested three-dimensional object.

In some embodiments, the detectable change is associated with entrainment of pre-transformed material into a melt pool formed by the impinging an energy beam at a target surface. In some embodiments, the at least one difference relates to at least one defect of the three-dimensional object. In some embodiments, the detectable change is associated with transformation of pre-transformed material as part of a melt pool formed by the impinging an energy beam at a target surface. In some embodiments, the at least one difference relates to a microstructure (e.g., porosity) and/or a surface quality (e.g., roughness) of the three-dimensional object. In some embodiments, the method further comprises generating print instructions for printing the three-dimensional object, wherein the print instructions consider a geometry of the three-dimensional object. In some embodiments, the method further comprises generating print instructions for printing the three-dimensional object, wherein the print instructions consider a material of the three-dimensional object. In some embodiments, comparing the real-time sensed signal with the target signal is during printing of the three-dimensional object. In some embodiments, comparing the real-time sensed signal with the target signal is during formation of a melt pool of the three-dimensional object. In some embodiments, the one or more controllers is configured to form a signal map considering the real-time sensed signal. In some embodiments, the one or more controllers is configured to control formation of the three-dimensional object to compensate for a variation between the signal map versus a target signal map. In some embodiments, the method further comprises detecting at least one characteristic of a layer that is formed to print the three-dimensional object (e.g., during its formation). In some embodiments, the at least one characteristic comprises a temperature profile, a reflectivity profile, a specularity profile, or a height profile. In some embodiments, the method further comprises detecting a power of a first energy source and/or of a second energy source during the printing. In some embodiments, the method further comprises generating a power profile of a first energy and/or a second energy source. In some embodiments, the method further comprises monitoring the power profile during the printing. In some embodiments, the monitoring is to detect and/or reduce an extent of defects in the three-dimensional object. In some embodiments, the method further comprises detecting a power density of a first energy beam and/or a second energy beam during the printing. In some embodiments, the method further comprises generating a power density profile of a first energy beam and/or a second energy beam. In some embodiments, the method further comprises monitoring the power density profile during the printing. In some embodiments, the monitoring is to detect and/or reduce an extent of defects in the three-dimensional object.

In another aspect, a three-dimensional object comprises: a plurality of layers that define a layering plane and a stacking vector, wherein the layering plane is substantially parallel with respect to at least one of the plurality of layers, wherein the stacking vector is substantially orthogonal with respect to the layering plane; and an overhang having an exterior surface, wherein a vector normal to the exterior surface of the overhang from a point on the exterior surface is directed into the overhang and (i) is (e.g., substantially) parallel with respect to the stacking vector or (ii) forms an angle of at most about forty degrees with respect to the stacking vector, which exterior surface comprises a micro-texture comprising a series of convex curved surfaces that meet at valleys, wherein a distance between adjacent valleys of at least one of the convex curved surface is proportional to a height of a corresponding layer of the overhang.

In some embodiments, the micro-texture comprises a plurality of stacked crescent-shaped segments. In some embodiments, the micro-texture comprises a plurality of stacked melt pools. In some embodiments, the at least one of the plurality of layers has a (e.g., bottom) skin portion having a corresponding convex curved surface. In some embodiments, the at least one of the plurality of layers has a (e.g., bottom) skin portion having at least two corresponding convex curved surfaces. In some embodiments, the overhang corresponds to a ledge of the three-dimensional object. In some embodiments, the overhang corresponds to a bridge structure of the three-dimensional object. In some embodiments, the overhang corresponds to a cavity ceiling of the three-dimensional object. In some embodiments, the exterior surface is of a (e.g., bottom) skin portion of the overhang. In some embodiments, the angle is at most about thirty degrees with respect to the stacking vector.

In another aspect, a three-dimensional object comprises: a plurality of layers that define a layering plane and a stacking vector, wherein the layering plane is substantially parallel with respect to at least one of the plurality of layers, wherein the stacking vector is substantially orthogonal with respect to the layering plane; and an overhang having an exterior portion and an interior portion, the exterior portion having an exterior surface, wherein a vector normal to the exterior surface of the exterior portion from a point on the exterior surface is directed into the overhang and (i) is (e.g., substantially) parallel with respect to the stacking vector or (ii) forms an angle of at most about forty degrees with respect to the stacking vector, wherein the exterior portion has a first grain structure and the interior portion has a second grain structure different than the first grain structure.

In some embodiments, the first grain structure is associated with a first cooling rate and the second grain structure is associated with a second cooling rate different than the first cooling rate. In some embodiments, the first cooling rate is slower than the second cooling rate. In some embodiments, the first cooling rate is faster than the second cooling rate. In some embodiments, the exterior portion comprises a dimple portion having a third grain structure. In some embodiments, the third grain structure associated with a third cooling rate and the second grain structure is associated with a second cooling rate different than the third cooling rate. In some embodiments, the third cooling rate is faster than the second cooling rate. In some embodiments, the third cooling rate is slower than the second cooling rate. In some embodiments, the exterior portion comprises a plurality of stacked melt pools (e.g., substantially) aligned with the exterior surface. In some embodiments, the overhang corresponds to a ledge of the three-dimensional object. In some embodiments, the overhang corresponds to a bridge structure of the three-dimensional object. In some embodiments, the overhang corresponds to a cavity ceiling of the three-dimensional object. In some embodiments, the exterior surface is of a (e.g., bottom) skin portion of the overhang. In some embodiments, the angle is at most about thirty degrees with respect to the stacking vector.

In another aspect, a method for printing a three-dimensional object comprises: (a) forming a first portion of a ledge in a powder bed; (b) dispensing a powder layer as part of the powder bed having an exposed surface that is planar; (c) at a first time, generating a first melt pool in the powder layer, which first melt pool contacts the first portion of a ledge, which first portion of the ledge forms an angle of at most thirty degrees with respect to the exposed surface, which first melt pool extends beyond the first portion of the ledge in a first direction; (d) at a second time, generating a second melt pool in the powder layer, wherein the second melt pool contacts the first portion of the ledge and extends beyond the first portion of the ledge in the first direction, wherein the second melt pool is separated from the first melt pool by a gap, wherein the first melt pool and the second melt pool are part of a first single file of melt pools that extends in a second direction; and (e) at a third time, generating a third melt pool in the powder layer that contacts the first melt pool and the second melt pool, wherein the third melt pool contacts the first portion of the ledge and extends beyond the first portion of the ledge in the first direction to form a second portion of the ledge.

In another aspect, a method for printing a three-dimensional object comprises: (a) forming a first portion of a ledge in a material bed comprising pre-transformed material, which first portion of the ledge has an edge; (b) dispensing a pre-transformed material layer to supplement the material bed, which pre-transformed material layer has an exposed surface that is planar, which first portion of the ledge forms an angle of at most thirty degrees with respect to (I) the exposed surface and/or (II) a plane perpendicular to a gravitational vector; (c) at a first time, forming a first melt pool in the pre-transformed material layer, which first melt pool contacts the edge, which first melt pool extends beyond the first portion of the ledge in a first direction; (d) at a second time, forming a second melt pool in the pre-transformed material layer, wherein the second melt pool contacts the edge and extends beyond the first portion of the ledge in the first direction, wherein the second melt pool is separated from the first melt pool by a gap, wherein the first melt pool and the second melt pool are a portion of a single file of melt pools that extends along the edge in a second direction; and (e) at a third time, forming a third melt pool in the pre-transformed material layer, which third melt pool (i) contacts the first melt pool, (ii) contacts the second melt pool, (iii) contacts the edge, (iv) extends beyond the first portion of the ledge in the first direction, and (v) is at least a portion of the single file of melt pools, which single file of melt pools expands the first portion of the ledge to form a second portion of the ledge that is at least a portion of the three-dimensional object.

In some embodiments, the material bed is a powder bed. In some embodiments, the pre-transformed material is particulate material (e.g., powder). In some embodiments, contacts the first portion of the ledge comprises: connects to the first portion of the ledge. In some embodiments, the second portion of the ledge comprises the first portion of the ledge. In some embodiments, the exposed surface is a first exposed surface, and wherein after operation (c) and/or prior to operation (d): dispensing another pre-transformed material layer having a second exposed surface that is planar. In some embodiments, the second exposed surface is at a vertical location that is detectibly that of the first exposed surface. In some embodiments, the second portion of the ledge forms an angle of at most thirty degrees with respect to: (I) the second exposed surface and/or (II) a plane perpendicular to a gravitational vector. In some embodiments, the first portion of the ledge and/or the second portion of the ledge is devoid of auxiliary support structure. In some embodiments, the first melt pool, second melt pool, and/or third melt pool comprise fully molten pre-transformed material (e.g., are fully molten pre-transformed material). In some embodiments, the pre-transformed material comprises elemental metal, metal alloy, an allotrope of elemental carbon, a ceramic, a polymer, or a resin. In some embodiments, the pre-transformed material comprises elemental metal, metal alloy, an allotrope of elemental carbon, or a ceramic. In some embodiments, during formation, the first melt pool, second melt pool, and/or third melt pool is formed using an energy beam that is stationary or substantially stationary (e.g., during formation of a melt pool). In some embodiments, substantially stationary comprises a movement that extends to at most a fundamental length scale of a molten portion of the melt pool and/or a cross section of the energy beam on the exposed surface.

In another aspect, an apparatus for printing a three-dimensional object comprises at least one controller that is configured to: (a) operatively couple to an energy source, and to a layer dispenser; (b) direct the energy source to generate an energy beam that transforms pre-transformed material in a material bed to form a first portion of a ledge disposed in the material bed, which first portion of the ledge has an edge, which material bed comprises pre-transformed material; (c) direct the layer dispenser to dispense a pre-transformed material layer to supplement the material bed, which pre-transformed material layer has an exposed surface that is planar, which first portion of the ledge forms an angle of at most thirty degrees with respect to (I) the exposed surface and/or (II) a plane perpendicular to a gravitational vector; (d) at a first time, direct the energy source to generate the energy beam to transforms pre-transformed material in the material bed to form a first melt pool in the pre-transformed material layer, which first melt pool contacts the edge, which first melt pool extends beyond the first portion of the ledge in a first direction; (e) at a second time, direct the energy source to generate the energy beam to transforms pre-transformed material in the material bed to form a second melt pool in the pre-transformed material layer, wherein the second melt pool contacts the edge and extends beyond the first portion of the ledge in the first direction, wherein the second melt pool is separated from the first melt pool by a gap, wherein the first melt pool and the second melt pool are a portion of a single file of melt pools that extends along the edge in a second direction; and (f) at a third time, direct the energy source to generate the energy beam to transforms pre-transformed material in the material bed to form a third melt pool in the pre-transformed material layer, which third melt pool (i) contacts the first melt pool, (ii) contacts the second melt pool, (iii) contacts the edge, (iv) extends beyond the first portion of the ledge in the first direction, and (v) is at least a portion of the single file of melt pools, which single file of melt pools expands the first portion of the ledge to form a second portion of the ledge that is at least a portion of the three-dimensional object.

In some embodiments, the material bed is a powder bed. In some embodiments, the pre-transformed material is particulate material (e.g., powder). In some embodiments, contacts the first portion of the ledge comprises: connects to the first portion of the ledge. In some embodiments, the second portion of the ledge comprises the first portion of the ledge. In some embodiments, the exposed surface is a first exposed surface, and wherein the at least one controller is configured to, after operation (d) and/or prior to operation (e), direct the layer dispenser to dispense another pre-transformed material layer having a second exposed surface that is planar. In some embodiments, the at least one controller is configured to direct formation of the second exposed surface at a vertical location that is detectibly that of the first exposed surface. In some embodiments, the at least one controller is directed to form the second portion of the ledge at an angle of at most thirty degrees with respect to: (A) the exposed surface and/or (B) a plane perpendicular to the gravitational vector. In some embodiments, the at least one controller is directed to form the first portion of the ledge and/or the second portion of the ledge such that it is devoid of an auxiliary support structure. In some embodiments, the at least one controller is directed to form the first melt pool, second melt pool, and/or third melt pool such that they comprise fully molten powder. In some embodiments, the pre-transformed material comprises elemental metal, metal alloy, an allotrope of elemental carbon, a ceramic, a polymer, or a resin. In some embodiments, the pre-transformed material comprises elemental metal, metal alloy, an allotrope of elemental carbon, or a ceramic. In some embodiments, the at least one controller is configured to direct the energy source to generate the energy beam to form the first melt pool, second melt pool, and/or third melt pool such that the energy beam that is stationary or substantially stationary when forming the first melt pool, second melt pool, and/or third melt pool. In some embodiments, substantially stationary comprises a movement that extends to at most a fundamental length scale of a molten portion of the melt pool and/or a cross section of the energy beam on the exposed surface. In some embodiments, the at least one controller is configured to: (A) operatively couple to a scanner, and (B) direct the scanner to translate the energy beam along the material bed. In some embodiments, at least two of operations (b)-(f) are directed by the same controller. In some embodiments, at least two of operations (b)-(f) are directed by different controllers. In some embodiments, the at least one controller comprises a feedback control scheme. In some embodiments, the at least one controller is operatively coupled to at least one sensor. In some embodiments, the at least one sensor comprises an optical sensor. In some embodiments, the at least one sensor comprises a temperature sensor, electronic sensor, or positional sensor. In some embodiments, the electronic sensor comprises an amplitude, current, and/or power sensor. In some embodiments, the at least one controller comprises electrical circuitry.

In another aspect, a method for printing a three-dimensional object comprises: (a) forming a first portion of a ledge in a material bed that is supported by a platform, which material bed comprises pre-transformed material; (b) dispensing a pre-transformed material layer to supplement the material bed, which pre-transformed material layer has a first exposed surface that is planar; (c) extending the first portion of the ledge in a plane that is parallel to a reference plane, to form a second portion of the ledge that is parallel to the reference plane, which extending comprises: (i) forming two or more melt pools along a first edge of the first portion of the ledge to form a first single file of melt pools that contacts the first edge and extends beyond the first portion of the ledge to form a second portion of the ledge having a second edge; (ii) holding the platform stationary or substantially stationary; and (iii) dispensing pre-transformed material in the material bed to form a second exposed surface of the material bed, which second exposed surface is planar and has a vertical position that is identical or substantially identical to that of the first exposed surface; and (d) repeating (c) to extend the second portion of a ledge in a plane that is parallel to the reference plane, to form a third portion of the ledge that is parallel to the reference plane, which third portion of the ledge is at least a portion of the three-dimensional object, wherein the reference plane (A) is parallel to the first exposed surface, (B) is parallel to the second exposed surface, (C) is parallel to a plane perpendicular to a gravitational vector, (D) is a horizontal plane, and/or (E) is the platform.

In some embodiments, the material bed is a powder bed. In some embodiments, the pre-transformed material is particulate material (e.g., powder). In some embodiments, substantially stationary comprises a movement that is not detectable. In some embodiments, non-detectable is in the three-dimensional object. In some embodiments, the first portion of the ledge and/or the second portion of the ledge is devoid of an auxiliary support structure. In some embodiments, the first melt pool, second melt pool, and/or third melt pool comprise fully molten pre-transformed material. In some embodiments, the pre-transformed material comprises elemental metal, metal alloy, an allotrope of elemental carbon, a ceramic, a polymer, or a resin. In some embodiments, the pre-transformed material comprises elemental metal, metal alloy, an allotrope of elemental carbon, or a ceramic. In some embodiments, the melt pools in the first single file of melt pools contact each other. In some embodiments, the first single file of melt pools extends along the first edge in a first direction, and wherein the first single file of melt pools extends beyond the first portion of the ledge in a second direction. In some embodiments, repeating operation (c) to extend the second portion to form the third portion comprises forming two or more melt pools along the second edge of the second portion of the ledge to form a second single file of melt pools that contacts the second edge and extends beyond the second portion of the ledge to form a third portion of the ledge. In some embodiments, the first single file of melt pools contacts the second single file of melt pools. In some embodiments, the first single file of melt pools extends along the first edge in a first direction, and wherein the first single file of melt pools extends beyond the first portion of the ledge in a second direction. In some embodiments, the second single file of melt pools extends along the second edge in the first direction or in a direction opposite to the first direction, and wherein the second single file of melt pools extends beyond the second portion of the ledge in the second direction. In some embodiments, during formation, the two or more melt pools in the first single file of melt pools are each formed using an energy beam that is stationary or substantially stationary. In some embodiments, substantially stationary comprises a movement that extends to at most a fundamental length scale of a molten portion of the melt pool and/or a cross section of the energy beam on the exposed surface.

In another aspect, a method for printing a three-dimensional object comprises: (a) forming a first portion of a ledge in a powder bed disposed above a platform; (b) dispensing a powder layer in the powder bed, which powder layer having a first exposed surface that is planar; (c) extending the first portion of a ledge in a plane that is parallel to the first exposed surface to form a second portion of the ledge that is parallel to the first exposed surface, which extending comprises: (i) forming two or more melt pools along an edge of the first portion of the ledge to form a first single file of melt pools that contacts the first portion of the ledge and extends beyond the first portion of the ledge; (ii) holding a position of the platform stationary or substantially stationary; and (iii) dispensing the powder material in the powder bed to form a second exposed surface of the material bed that is planar and has a vertical position that is identical or substantially identical to that of the first exposed surface; and (d) repeating (c) to extend the second portion of a ledge in a plane that is parallel to the first exposed surface to form a third portion of the ledge that is parallel to the first exposed surface.

In another aspect, an apparatus for printing a three-dimensional object comprises at least one controller that is configured to: (a) operatively couple to an energy source, a layer dispenser, and an actuator; (b) directing the energy source to generate an energy beam that transforms pre-transformed material in a material bed to form a first portion of a ledge in the material bed that is supported by a platform, which material bed comprises pre-transformed material; (c) direct a layer dispenser to dispense a pre-transformed material layer to supplement the material bed, which pre-transformed material layer has a first exposed surface that is planar; (d) directing extension of the first portion of the ledge in a plane that is parallel to a reference plane, to form a second portion of the ledge that is parallel to the reference plane, which extending comprises: (i) directing the energy source to generate the energy beam that transforms pre-transformed material in the material bed to form two or more melt pools along a first edge of the first portion of the ledge to form a first single file of melt pools that contacts the first edge and extends beyond the first portion of the ledge to form a second portion of the ledge having a second edge; (ii) direct the actuator to hold the platform stationary or substantially stationary, or not direct the actuator to perform a vertical movement; and (iii) direct the layer dispenser to dispense pre-transformed material in the material bed to form a second exposed surface of the material bed, which second exposed surface is planar and has a vertical position that is identical or substantially identical to that of the first exposed surface; and (e) direct repeating (d) to extend the second portion of a ledge in a plane that is parallel to the reference plane, to form a third portion of the ledge that is parallel to the reference plane, which third portion of the ledge is at least a portion of the three-dimensional object, wherein the reference plane (A) is parallel to the first exposed surface, (B) is parallel to the second exposed surface, (C) is parallel to a plane perpendicular to a gravitational vector, (D) is a horizontal plane, and/or (E) is the platform.

In some embodiments, the material bed is a powder bed. In some embodiments, the pre-transformed material is particulate material (e.g., powder). In some embodiments, substantially stationary comprises a movement that is not detectable. In some embodiments, non-detectable is in the three-dimensional object. In some embodiments, the first portion of the ledge and/or the second portion of the ledge is devoid of an auxiliary support structure. In some embodiments, the at least one controller is configured to direct the energy source to generate the energy beam to form the first melt pool, the second melt pool, and/or the third melt pool such that they comprise fully molten powder. In some embodiments, the pre-transformed material comprises elemental metal, metal alloy, an allotrope of elemental carbon, a ceramic, a polymer, or a resin. In some embodiments, the pre-transformed material comprises elemental metal, metal alloy, an allotrope of elemental carbon, or a ceramic. In some embodiments, the at least one controller is configured to direct the energy source to generate the energy beam to form the melt pools in the first single file of melt pools such that the melt pools contact each other (e.g., sequentially). In some embodiments, the at least one controller is configured to direct the energy source to generate the energy beam to form the first single file of melt pools such that it (I) extends along the first edge in a first direction, and (II) extends beyond the first portion of the ledge in a second direction. In some embodiments, repeating operation (d) to extend the second portion to form the third portion comprises directing the energy source to generate the energy beam to transform pre-transformed material in the material bed to form two or more melt pools along the second edge of the second portion of the ledge to form a second single file of melt pools that contacts the second edge and extends beyond the second portion of the ledge to form a third portion of the ledge. In some embodiments, the at least one controller is configured to direct the energy source to generate the energy beam to form the first single file of melt pools such that it contacts the second single file of melt pools. In some embodiments, the at least one controller is configured to direct the energy source to generate the energy beam to form the first single file of melt pools such that it (I) extends along the first edge in a first direction, and (II) extends beyond the first portion of the ledge in a second direction. In some embodiments, the at least one controller is configured to direct the energy source to generate the energy beam to form the second single file of melt pools such that it (I) extends along the second edge in the first direction or in a direction opposite to the first direction, and (II) extends beyond the second portion of the ledge in the second direction. In some embodiments, the at least one controller is configured to direct the energy source to generate the energy beam to form the two or more melt pools in the first single file of melt pools using an energy beam that is stationary or substantially stationary when forming a melt pool. In some embodiments, substantially stationary comprises a movement that extends to at most a fundamental length scale of a molten portion of the melt pool and/or a cross section of the energy beam on the exposed surface. In some embodiments, the at least one controller is configured to (I) operatively couple to a scanner, and (II) direct the scanner to translate the energy beam along the material bed. In some embodiments, at least two of operations (b), (i), (ii), (iii), (d), and (e) are directed by the same controller. In some embodiments, at least two of operations (b), (i), (ii), (iii), (d), and (e) are directed by different controllers. In some embodiments, the at least one controller comprises a feedback control scheme. In some embodiments, the at least one controller is operatively coupled to at least one sensor. In some embodiments, the at least one sensor comprises an optical sensor. In some embodiments, the at least one sensor comprises a temperature sensor, electronic sensor, or positional sensor. In some embodiments, the electronic sensor comprises an amplitude, current, and/or power sensor. In some embodiments, the at least one controller comprises electrical circuitry.

In another aspect, a method for printing a three-dimensional object comprises: (a) at a first time, generating a first melt pool in a material bed, which material bed has an exposed surface that is planar; (b) at a second time, generating a second melt pool in the material bed that is separated from the first melt pool by a gap, wherein the first melt pool and the second melt pool are part of a first single file of melt pools; (c) at a third time, generating a third melt pool in the material bed that contacts the first melt pool and the second melt pool to close the gap, wherein the first melt pool, the second melt pool, and the third melt pool are at least a portion of the first single file of melt pools; and (d) repeat (a)-(c) to generate a second single file of melt pools that contacts the first single file of melt pools to form a ledge having an angle of at most thirty degrees with respect to the exposed surface.

In some embodiments, before operation (c) and/or after operation (b), dispense a layer of pre-transformed material having another exposed surface that is planar. In some embodiments, the single file comprises a row. In some embodiments, the single file comprises a straight line or a curved line. In some embodiments, the single file is formed along a (e.g., predetermined) path. In some embodiments, the single file if formed along a contour (e.g., rim) of the ledge.

In another aspect, a method for printing a three-dimensional object comprises: (a) in a material bed including a first exposed surface and pre-transformed material, forming two or more melt pools in a first direction along an edge of an initial three-dimensional object to form a first single file of melt pools that contacts the initial three-dimensional object and extends beyond the initial three-dimensional object in a second direction, wherein the initial three-dimensional object comprises one or more layers having a first average layer height, which material bed is disposed on a platform disposed in a first position, wherein the two or more melt pools are formed by transforming a portion of the pre-transformed material to a transformed material; (b) holding the first position of the platform stationary, or adjusting the first position of the platform to a height that is smaller than the first average layer height; (c) dispensing the pre-transformed material onto the material bed to form a second exposed surface of the material bed that is planar; and (d) forming two or more melt pools in the first direction on in a direction opposite to the first direction, to form a second single file of melt pools that contacts the first single file of melt pools and extends beyond the first single file of melt pools in the second direction to form a ledge that is devoid of ancillary supporting structure.

In another aspect, a method for printing a three-dimensional object comprises: (a) in a material bed including a first exposed surface and pre-transformed material, forming (i) two or more melt pools in a first direction along an edge of an initial three-dimensional object to form a first single file of melt pools that contacts the initial three-dimensional object and extends beyond the initial three-dimensional object in a second direction and (ii) a depression in the first exposed surface of the material bed that contacts the first single file of melt pools and extends along the first direction and in the second direction beyond the first single file of melt pools, wherein the initial three-dimensional object comprises one or more layers having a first average layer height, which material bed is disposed on a platform disposed in a first position, wherein the two or more melt pools are formed by transforming a portion of the pre-transformed material to a transformed material; (b) holding the first position of the platform stationary, or adjusting the first position of the platform to a height that is smaller than the first average layer height; (c) dispensing the pre-transformed material onto the material bed to replenish the depression and form a second exposed surface of the material bed that is planar; and (d) forming two or more melt pools in the first direction on in a direction opposite to the first direction, to form a second single file of melt pools that contacts the first single file of melt pools and extends beyond the first single file of melt pools in the second direction to form a ledge that is devoid of ancillary supporting structure. In some embodiments, the initial three-dimensional object is formed in a first three-dimensional printing methodology, and wherein the ledge is formed in a second three-dimensional printing methodology. In some embodiments, the first three-dimensional printing methodology comprise hatching. In some embodiments, the second three-dimensional printing methodology comprises tiling. In some embodiments, the initial three-dimensional object is formed in the same three-dimensional printing methodology that is used to form the ledge. In some embodiments, the ledge is a second portion of the ledge, and wherein the initial three-dimensional object is a first portion of the ledge, and wherein the second portion of the ledge extends the first portion of the ledge to form an extended ledge. In some embodiments, during printing, the first portion of the ledge, the second portion of the ledge, and/or the extended ledge is devoid of auxiliary support. In some embodiments, the pre-transformed material comprises viscous or solid material. In some embodiments, the pre-transformed material comprises solid material. In some embodiments, the pre-transformed material comprises a particulate material. In some embodiments, the method further comprises repeating operations (b), (c), and (d) to form an elongated ledge bottom skin. In some embodiments, a global vector is opposite to the direction of forming the one or more layers. In some embodiments, the ledge forms an angle with the global vector that is at most 45°, 30°, 20°, or 10° degrees (°). In some embodiments, the one or more melt pools are globular. In some embodiments, the one or more melt pools are elongated in a direction that is different from the first direction. In some embodiments, the one or more melt pools are elongated along the second direction. In some embodiments, the first exposed surface is planar. In some embodiments, the first single file of melt pools comprises a first melt pool, a second melt pool, and a third melt pool, and wherein the first melt pool is generated at a first time, followed by the third melt pool generated at a second time, and followed by the second melt pool generated at a third time, wherein the first melt pool contacts the second melt pool that contacts the third melt pool. In some embodiments, the first single file of melt pools comprises a first melt pool, a second melt pool, and a third melt pool, and wherein the first melt pool is generated at a first time, followed by the second melt pool generated at a second time, and followed by the third melt pool generated at a third time, wherein the first melt pool contacts the second melt pool that contacts the third melt pool. In some embodiments, a first melt pool and a second melt pool of the one or more melt pools in the first single file of melt pools are formed by irradiating a portion of the material bed by an energy beam that is stationary or substantially stationary, wherein the first melt pool contacts the second melt pool, wherein substantially stationary energy beam comprises a movement of the energy beam during formation of a melt pool in the first single file of melt pools, which movement is equal or smaller that a fundamental length scale of the melt pool that comprises molten material; and wherein the energy beam does not transform the pre-transformed material during a transformation intermission that takes occurs between formation of the first melt pool and formation the second melt pool. In some embodiments, the energy beam moves in a first velocity during formation of the melt pool and in a second velocity during the transformation intermission. In some embodiments, the second velocity is greater than the first velocity.

In another aspect, an apparatus for printing a three-dimensional object comprises at least one controller that is configured to: (A) operatively couple to an energy source, a platform, and a layer dispenser; (B) direct the energy source to generate an energy beam to impinge on a first exposed surface of a material bed comprising pre-transformed material to form (i) two or more melt pools in a first direction along an edge of an initial three-dimensional object to form a first single file of melt pools that contacts the initial three-dimensional object and extends beyond the initial three-dimensional object in a second direction and (ii) a depression in the first exposed surface of the material bed that contacts the first single file of melt pools and extends along the first direction and in the second direction beyond the first single file of melt pools, wherein the initial three-dimensional object comprises one or more layers having a first average layer height, which material bed is disposed on a platform disposed in a first position, wherein the two or more melt pools are formed by transforming a portion of the pre-transformed material to a transformed material; (C) direct holding the first position of the platform stationary, or adjust the first position of the platform to a height that is smaller than the first average layer height; (D) direct the layer dispenser to dispense the pre-transformed material onto the material bed to replenish the depression and form a second exposed surface of the material bed that is planar; and (E) direct the energy source to generate an energy beam to impinge on an exposed surface of a material bed that is planar, to forming two or more melt pools in the first direction on in a direction opposite to the first direction, to form a second single file of melt pools that contacts the first single file of melt pools and extends beyond the first single file of melt pools in the second direction to form a ledge that is devoid of ancillary supporting structure.

In another aspect, a method for printing a three-dimensional object comprises: (a) forming a first portion of a ledge in a powder bed, which first portion of the ledge has an edge; (b) dispensing a powder layer to supplement the powder bed, which powder layer has an exposed surface that is planar, which first portion of the ledge forms an angle of at most thirty degrees with respect to (I) the exposed surface and/or (II) a plane perpendicular to a gravitational vector; (c) at a first time, forming a first melt pool in the powder layer, which first melt pool contacts the edge, which first melt pool extends beyond the first portion of the ledge in a first direction; (d) at a second time, forming a second melt pool in the powder layer, wherein the second melt pool contacts the edge and extends beyond the first portion of the ledge in the first direction, wherein the second melt pool is separated from the first melt pool by a gap, wherein the first melt pool and the second melt pool are a portion of a single file of melt pools that extends along the edge in a second direction; and (e) at a third time, forming a third melt pool in the powder layer, which third melt pool (i) contacts the first melt pool, (ii) contacts the second melt pool, (iii) contacts the edge, (iv) extends beyond the first portion of the ledge in the first direction, and (v) is at least a portion of the single file of melt pools, which single file of melt pools expands the first portion of the ledge to form a second portion of the ledge that is at least a portion of the three-dimensional object.

In some embodiments, contacts the first portion of the ledge comprises: connects to the first portion of the ledge. In some embodiments, the second portion of the ledge comprises the first portion of the ledge. In some embodiments, the exposed surface is a first exposed surface, and wherein after operation (c) and/or prior to operation (d): dispensing another powder layer having a second exposed surface that is planar. In some embodiments, the second exposed surface is at a vertical location that is detectibly that of the first exposed surface. In some embodiments, the second portion of the ledge forms an angle of at most thirty degrees with respect to (A) the second exposed surface and/or (B) a plane perpendicular to a gravitational vector. In some embodiments, the first portion of the ledge and/or the second portion of the ledge is devoid of an auxiliary support structure. In some embodiments, the first melt pool, second melt pool, and/or third melt pool comprise fully molten powder. In some embodiments, the powder comprises elemental metal, metal alloy, an allotrope of elemental carbon, a ceramic, a polymer, or a resin. In some embodiments, the powder comprises elemental metal, metal alloy, an allotrope of elemental carbon, or a ceramic. In some embodiments, during formation, the first melt pool, second melt pool, and/or third melt pool is formed using an energy beam that is stationary or substantially stationary. In some embodiments, substantially stationary comprises a movement that extends to at most a fundamental length scale of a molten portion of the melt pool and/or a cross section of the energy beam on the exposed surface.

In another aspect, an apparatus for printing a three-dimensional object comprises at least one controller that is configured to: (a) operatively couple to an energy source, and to a layer dispenser; (b) directing the energy source to generate an energy beam that transforms powder in a powder bed to form a first portion of a ledge disposed in the powder bed, which first portion of the ledge has an edge; (c) directing the layer dispenser to dispense a powder layer to supplement the powder bed, which powder layer has an exposed surface that is planar, which first portion of the ledge forms an angle of at most thirty degrees with respect to (I) the exposed surface and/or (II) a plane perpendicular to a gravitational vector; (d) at a first time, direct the energy source to generate the energy beam to transforms powder in the powder bed to form a first melt pool in the powder layer, which first melt pool contacts the edge, which first melt pool extends beyond the first portion of the ledge in a first direction; (e) at a second time, direct the energy source to generate the energy beam to transforms powder in the powder bed to form a second melt pool in the powder layer, wherein the second melt pool contacts the edge and extends beyond the first portion of the ledge in the first direction, wherein the second melt pool is separated from the first melt pool by a gap, wherein the first melt pool and the second melt pool are a portion of a single file of melt pools that extends along the edge in a second direction; and (f) at a third time, direct the energy source to generate the energy beam to transforms powder in the powder bed to form a third melt pool in the powder layer, which third melt pool (i) contacts the first melt pool, (ii) contacts the second melt pool, (iii) contacts the edge, (iv) extends beyond the first portion of the ledge in the first direction, and (v) is at least a portion of the single file of melt pools, which single file of melt pools expands the first portion of the ledge to form a second portion of the ledge that is at least a portion of the three-dimensional object.

In some embodiments, contacts the first portion of the ledge comprises: connects to the first portion of the ledge. In some embodiments, the second portion of the ledge comprises the first portion of the ledge. In some embodiments, the exposed surface is a first exposed surface, and wherein the at least one controller is configured to, after operation (d) and/or prior to operation (e), direct the layer dispenser to dispense another powder layer having a second exposed surface that is planar. In some embodiments, the at least one controller is configured to direct formation of the second exposed surface at a vertical location that is detectibly that of the first exposed surface. In some embodiments, the at least one controller is directed to form the second portion of the ledge at an angle of at most thirty degrees with respect to (A) the exposed surface and/or (B) a plane perpendicular to the gravitational vector. In some embodiments, the at least one controller is directed to form the first portion of the ledge and/or the second portion of the ledge such that it is devoid of an auxiliary support structure. In some embodiments, the at least one controller is directed to form the first melt pool, second melt pool, and/or third melt pool such that they comprise fully molten powder. In some embodiments, the powder comprises elemental metal, metal alloy, an allotrope of elemental carbon, a ceramic, a polymer, or a resin. In some embodiments, the powder comprises elemental metal, metal alloy, an allotrope of elemental carbon, or a ceramic. In some embodiments, the at least one controller is configured to direct the energy source to generate the energy beam to form the first melt pool, second melt pool, and/or third melt pool such that the energy beam that is stationary or substantially stationary when forming the first melt pool, second melt pool, and/or third melt pool. In some embodiments substantially stationary comprises a movement that extends to at most a fundamental length scale of a molten portion of the melt pool and/or a cross section of the energy beam on the exposed surface. In some embodiments, the at least one controller is configured to (A) operatively couple to a scanner, and (B) direct the scanner to translate the energy beam along the powder bed. In some embodiments, at least two of operations (b)-(f) are directed by the same controller. In some embodiments, at least two of operations (b)-(f) are directed by different controllers. In some embodiments, the at least one controller comprises a feedback control scheme. In some embodiments, the at least one controller is operatively coupled to at least one sensor. In some embodiments, the at least one sensor comprises an optical sensor. In some embodiments, the at least one sensor comprises a temperature, electronic, or positional sensor. In some embodiments, the electronic sensor comprises an amplitude, current, and/or power sensor. In some embodiments, the at least one controller comprises electrical circuitry.

In another aspect, a method for printing a three-dimensional object comprises: (a) forming a first portion of a ledge in a powder bed that is supported by a platform; (b) dispensing a powder layer to supplement the powder bed, which powder layer has a first exposed surface that is planar; (c) extending the first portion of the ledge in a plane that is parallel to a reference plane, to form a second portion of the ledge that is parallel to the reference plane, which extending comprises: (i) forming two or more melt pools along a first edge of the first portion of the ledge to form a first single file of melt pools that contacts the first edge and extends beyond the first portion of the ledge to form a second portion of the ledge having a second edge; (ii) holding the platform stationary or substantially stationary; and (iii) dispensing powder material in the powder bed to form a second exposed surface of the powder bed, which second exposed surface is planar and has a vertical position that is identical or substantially identical to that of the first exposed surface; and (d) repeating (c) to extend the second portion of a ledge in a plane that is parallel to the reference plane, to form a third portion of the ledge that is parallel to the reference plane, which third portion of the ledge is at least a portion of the three-dimensional object, wherein the reference plane (A) is parallel to the first exposed surface, (B) is parallel to the second exposed surface, (C) is parallel to a plane perpendicular to a gravitational vector, (D) is a horizontal plane and/or (E) is the platform.

In some embodiments, substantially stationary comprises a movement that is not detectable. In some embodiments, non-detectable is in the three-dimensional object. In some embodiments, the first portion of the ledge and/or the second portion of the ledge is devoid of an auxiliary support structure. In some embodiments, the first melt pool, second melt pool, and/or third melt pool comprise fully molten powder. In some embodiments, the powder comprises elemental metal, metal alloy, an allotrope of elemental carbon, a ceramic, a polymer, or a resin. In some embodiments, the powder comprises elemental metal, metal alloy, an allotrope of elemental carbon, or a ceramic. In some embodiments, the melt pools in the first single file of melt pools contact each other. In some embodiments, the first single file of melt pools extends along the first edge in a first direction, and wherein the first single file of melt pools extends beyond the first portion of the ledge in a second direction. In some embodiments, repeating operation (c) to extend the second portion to form the third portion comprises forming two or more melt pools along the second edge of the second portion of the ledge to form a second single file of melt pools that contacts the second edge and extends beyond the second portion of the ledge to form a third portion of the ledge. In some embodiments, the first single file of melt pools contacts the second single file of melt pools. In some embodiments, the first single file of melt pools extends along the first edge in a first direction, and wherein the first single file of melt pools extends beyond the first portion of the ledge in a second direction. In some embodiments, the second single file of melt pools extends along the second edge in the first direction or in a direction opposite to the first direction, and wherein the second single file of melt pools extends beyond the second portion of the ledge in the second direction. In some embodiments, during formation, the two or more melt pools in the first single file of melt pools are each formed using an energy beam that is stationary or substantially stationary. In some embodiments, substantially stationary comprises a movement that extends to at most a fundamental length scale of a molten portion of the melt pool and/or a cross section of the energy beam on the exposed surface.

In another aspect, an apparatus for printing a three-dimensional object comprises at least one controller that is configured to: (a) operatively couple to an energy source, a layer dispenser, and an actuator; (b) directing the energy source to generate an energy beam that transforms powder in a powder bed to form a first portion of a ledge in the powder bed that is supported by a platform; (c) direct a layer dispenser to dispense a powder layer to supplement the powder bed, which powder layer has a first exposed surface that is planar; (d) directing extension of the first portion of the ledge in a plane that is parallel to a reference plane, to form a second portion of the ledge that is parallel to the reference plane, which extending comprises: (i) directing the energy source to generate the energy beam that transforms powder in the powder bed to form two or more melt pools along a first edge of the first portion of the ledge to form a first single file of melt pools that contacts the first edge and extends beyond the first portion of the ledge to form a second portion of the ledge having a second edge; (ii) direct the actuator to hold the platform stationary or substantially stationary, or not direct the actuator to perform a vertical movement; and (iii) direct the layer dispenser to dispense powder material in the powder bed to form a second exposed surface of the powder bed, which second exposed surface is planar and has a vertical position that is identical or substantially identical to that of the first exposed surface; and (e) direct repeating (d) to extend the second portion of a ledge in a plane that is parallel to the reference plane, to form a third portion of the ledge that is parallel to the reference plane, which third portion of the ledge is at least a portion of the three-dimensional object, wherein the reference plane (A) is parallel to the first exposed surface, (B) is parallel to the second exposed surface, (C) is parallel to a plane perpendicular to a gravitational vector, (D) is a horizontal plane and/or (E) is the platform.

In some embodiments, substantially stationary comprises a movement that is not detectable. In some embodiments, non-detectable is in the three-dimensional object. In some embodiments, the first portion of the ledge and/or the second portion of the ledge is devoid of an auxiliary support structure. In some embodiments, the at least one controller is configured to direct the energy source to generate the energy beam to form the first melt pool, second melt pool, and/or third melt pool such that they comprise fully molten powder. In some embodiments, the powder comprises elemental metal, metal alloy, an allotrope of elemental carbon, a ceramic, a polymer, or a resin. In some embodiments, the powder comprises elemental metal, metal alloy, an allotrope of elemental carbon, or a ceramic. In some embodiments, the at least one controller is configured to direct the energy source to generate the energy beam to form the melt pools in the first single file of melt pools such that the melt pools contact each other sequentially. In some embodiments, the at least one controller is configured to direct the energy source to generate the energy beam to form the first single file of melt pools such that it (I) extends along the first edge in a first direction, and (II) extends beyond the first portion of the ledge in a second direction. In some embodiments, direct repeating operation (d) to extend the second portion to form the third portion comprises directing the energy source to generate the energy beam to transform powder in the powder bed to form two or more melt pools along the second edge of the second portion of the ledge to form a second single file of melt pools such that it contacts the second edge and extends beyond the second portion of the ledge to form a third portion of the ledge. In some embodiments, the at least one controller is configured to direct the energy source to generate the energy beam to form the first single file of melt pools such that it contacts the second single file of melt pools. In some embodiments, the at least one controller is configured to direct the energy source to generate the energy beam to form the first single file of melt pools such that it (I) extends along the first edge in a first direction, and (II) extends beyond the first portion of the ledge in a second direction. In some embodiments, the at least one controller is configured to direct the energy source to generate the energy beam to form second single file of melt pools such that it (I) extends along the second edge in the first direction or in a direction opposite to the first direction, and (II) extends beyond the second portion of the ledge in the second direction. In some embodiments, the at least one controller is configured to direct the energy source to generate the energy beam to form the two or more melt pools in the first single file of melt pools using an energy beam that is stationary or substantially stationary when forming a melt pool. In some embodiments, substantially stationary comprises a movement that extends to at most a fundamental length scale of a molten portion of the melt pool and/or a cross section of the energy beam on the exposed surface. In some embodiments, the at least one controller is configured to (I) operatively couple to a scanner, and (II) direct the scanner to translate the energy beam along the powder bed. In some embodiments, at least two of operations (b), (i), (ii), (iii), (d), and (e) are directed by the same controller. In some embodiments, at least two of operations (b), (i), (ii), (iii), (d), and (e) are directed by different controllers. In some embodiments, the at least one controller comprises a feedback control scheme. In some embodiments, the at least one controller is operatively coupled to at least one sensor. In some embodiments, the at least one sensor comprises an optical sensor. In some embodiments, the at least one sensor comprises a temperature, electronic, or positional sensor. In some embodiments, the electronic sensor comprises an amplitude, current, and/or power sensor. In some embodiments, the at least one controller comprises electrical circuitry.

In another aspect, a method for printing a three-dimensional object comprises: (a) at a first time, generating a first melt pool in a material bed comprising an exposed surface that is planar; (b) at a second time, generating a second melt pool in the material bed that is separated from the first melt pool by a gap, wherein the first melt pool and the second melt pool as part of a first single file of melt pools; (c) at a third time, generating a third melt pool in the material bed that contacts the first melt pool and the second melt pool to close the gap, wherein the first melt pool, the second melt pool, and the third melt pool are at least a portion of the first single file of melt pools; and (d) repeat (a)-(c) to generate a second single file of melt pools that contacts the first single file of melt pools to form a ledge having an angle of at most thirty degrees with respect to the exposed surface. In some embodiments, before operation (c) and/or after operation (b), dispense a layer of pre-transformed material having another exposed surface that is planar. In some embodiments, the single file may be a row. In some embodiments, the single file may be a straight or curved line. In some embodiments, the single file may be generated along a (e.g., predetermined) path. In some embodiments, the single file may be generated along a contour (e.g., rim) of the ledge.

In another aspect, a method for printing a three-dimensional object comprises: (a) in a material bed including a first exposed surface and pre-transformed material, forming two or more melt pools in a first direction along an edge of an initial three-dimensional object to form a first single file of melt pools that contacts the initial three-dimensional object and extends beyond the initial three-dimensional object in a second direction, wherein the initial three-dimensional object comprises one or more layers having a first average layer height, which material bed is disposed on a platform disposed in a first position, wherein the two or more melt pools are formed by transforming a portion of the pre-transformed material to a transformed material; (b) holding the position of the platform stationary or substantially stationary; (c) dispensing the pre-transformed material in the material bed to form a second exposed surface of the material bed that is planar; and (d) forming two or more melt pools in the first direction on in a direction opposite to the first direction, to form a second single file of melt pools that contacts the first single file of melt pools and extends beyond the first single file of melt pools in the second direction to form a ledge that is devoid of ancillary supporting structure, wherein holding the position of the platform substantially stationary is such that no vertical translation is detected in the generated ledge between formation of the first single file of melt pools and second single file of melt pools. In some embodiments, the melt pools in the first single file of melt pools contact each other. In some embodiments, the second exposed surface is detectibly at a vertical position of the first exposed surface. In some embodiments, at least two melt pools in the second single file of melt pools contact each other.

In another aspect, a method for printing a three-dimensional object comprises: (a) in a material bed including a first exposed surface and pre-transformed material, forming two or more melt pools in a first direction along an edge of an initial three-dimensional object to form a first single file of melt pools that contacts the initial three-dimensional object and extends beyond the initial three-dimensional object in a second direction, wherein the initial three-dimensional object comprises one or more layers having a first average layer height, which material bed is disposed on a platform disposed in a first position, wherein the two or more melt pools are formed by transforming a portion of the pre-transformed material to a transformed material; (b) holding the first position of the platform stationary, or adjusting the first position of the platform to a height that is smaller than the first average layer height; (c) dispensing the pre-transformed material onto the material bed to form a second exposed surface of the material bed that is planar; and (d) forming two or more melt pools in the first direction on in a direction opposite to the first direction, to form a second single file of melt pools that contacts the first single file of melt pools and extends beyond the first single file of melt pools in the second direction to form a ledge that is devoid of ancillary supporting structure.

In another aspect, a method for printing a three-dimensional object comprises: (a) in a material bed including a first exposed surface and pre-transformed material, forming (i) two or more melt pools in a first direction along an edge of an initial three-dimensional object to form a first single file of melt pools that contacts the initial three-dimensional object and extends beyond the initial three-dimensional object in a second direction and (ii) a depression in the first exposed surface of the material bed that contacts the first single file of melt pools and extends along the first direction and in the second direction beyond the first single file of melt pools, wherein the initial three-dimensional object comprises one or more layers having a first average layer height, which material bed is disposed on a platform disposed in a first position, wherein the two or more melt pools are formed by transforming a portion of the pre-transformed material to a transformed material; (b) holding the first position of the platform stationary, or adjusting the first position of the platform to a height that is smaller than the first average layer height; (c) dispensing the pre-transformed material onto the material bed to replenish the depression and form a second exposed surface of the material bed that is planar; and (d) forming two or more melt pools in the first direction on in a direction opposite to the first direction, to form a second single file of melt pools that contacts the first single file of melt pools and extends beyond the first single file of melt pools in the second direction to form a ledge that is devoid of ancillary supporting structure.

In some embodiments, the initial three-dimensional object is formed in a first three-dimensional printing methodology, and wherein the ledge is formed in a second three-dimensional printing methodology. In some embodiments, the first three-dimensional printing methodology comprise hatching. In some embodiments, the second three-dimensional printing methodology comprises tiling. In some embodiments, the pre-transformed material is viscous or solid. In some embodiments, the pre-transformed material is solid. In some embodiments, the pre-transformed material is a particulate material. In some embodiments, the method further comprises repeating b, c, and d to form an elongated ledge bottom skin. In some embodiments, a global vector is opposite to the direction of forming the one or more layers. In some embodiments, the ledge forms an angle with the global vector that is at most 45°, 30°, 20°, or 10 degrees (°). In some embodiments, the one or more melt pools are globular. In some embodiments, the one or more melt pools are elongated in a direction that is different from the first direction. In some embodiments, the one or more melt pools are elongated along the second direction. In some embodiments, the first exposed surface is planar. In some embodiments, the first single file of melt pools comprises a first melt pool, a second melt pool, and a third melt pool, and wherein the first melt pool is generated at a first time, followed by the third melt pool generated at a second time, and followed by the second melt pool generated at a third time, wherein the first melt pool contacts the second melt pool that contacts the third melt pool. In some embodiments, the first single file of melt pools comprises a first melt pool, a second melt pool, and a third melt pool, and wherein the first melt pool is generated at a first time, followed by the second melt pool generated at a second time, and followed by the third melt pool generated at a third time, wherein the first melt pool contacts the second melt pool that contacts the third melt pool. In some embodiments, a first melt pool and a second melt pool of the one or more melt pools in the first single file of melt pools are formed by irradiating a portion of the material bed by an energy beam that is stationary or substantially stationary, wherein the first melt pool contacts the second melt pool, wherein substantially stationary energy beam comprises a movement of the energy beam during formation of a melt pool in the first single file of melt pools, which movement is equal or smaller that a fundamental length scale of the melt pool that comprises molten material; and wherein the energy beam does not transform the pre-transformed material during a transformation intermission that takes occurs between formation of the first melt pool and formation the second melt pool. In some embodiments, the energy beam moves in a first velocity during formation of the melt pool and in a second velocity during the transformation intermission. In some embodiments, the second velocity is greater than the first velocity.

In another aspect, an apparatus for printing a three-dimensional object comprises at least one controller that is configured to: (A) operatively couple to an energy source, a platform, and a layer dispenser; (B) execute operations comprising: (a) direct the energy source to generate an energy beam to impinge on a first exposed surface of a material bed comprising pre-transformed material to form (i) two or more melt pools in a first direction along an edge of an initial three-dimensional object to form a first single file of melt pools that contacts the initial three-dimensional object and extends beyond the initial three-dimensional object in a second direction and (ii) a depression in the first exposed surface of the material bed that contacts the first single file of melt pools and extends along the first direction and in the second direction beyond the first single file of melt pools, wherein the initial three-dimensional object comprises one or more layers having a first average layer height, which material bed is disposed on a platform disposed in a first position, wherein the two or more melt pools are formed by transforming a portion of the pre-transformed material to a transformed material; (b) direct holding the first position of the platform stationary, or adjust the first position of the platform to a height that is smaller than the first average layer height; (c) direct the layer dispenser to dispense the pre-transformed material onto the material bed to replenish the depression and form a second exposed surface of the material bed that is planar; and (d) direct the energy source to generate an energy beam to impinge on an exposed surface of a material bed that is planar, to forming two or more melt pools in the first direction on in a direction opposite to the first direction, to form a second single file of melt pools that contacts the first single file of melt pools and extends beyond the first single file of melt pools in the second direction to form a ledge that is devoid of ancillary supporting structure.

In another aspect, an apparatus for printing one or more 3D objects comprises a controller that is programmed to direct a mechanism used in a three-dimensional printing methodology to implement (e.g., effectuate) the method disclosed herein, wherein the controller is operatively coupled to the mechanism.

In another aspect, a computer software product, comprising a non-transitory computer-readable medium in which program instructions are stored, which instructions, when read by a computer, cause the computer to direct a mechanism used in the three-dimensional printing process to implement (e.g., effectuate) any of the method disclosed herein, wherein the non-transitory computer-readable medium is operatively coupled to the mechanism.

Another aspect of the present disclosure provides a non-transitory computer-readable medium comprising machine-executable code that, upon execution by one or more computer processors, implements any of the methods disclosed herein.

Another aspect of the present disclosure provides a computer system comprising one or more computer processors and a non-transitory computer-readable medium coupled thereto. The non-transitory computer-readable medium comprises machine-executable code that, upon execution by the one or more computer processors, implements any of the methods disclosed herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF DRAWINGS

The novel features of the invention are set forth with particularity in the appended claims. A better understanding of the features and advantages of the present invention may be obtained by reference to the following detailed description that sets forth illustrative embodiments, in which the principles of the invention are utilized, and the accompanying drawings or figures (referred to as “FIG.” and/or “FIGS.” herein), of which:

FIGS. 19A-19C schematically illustrate energy beam power density profiles over time;

Figure 1:
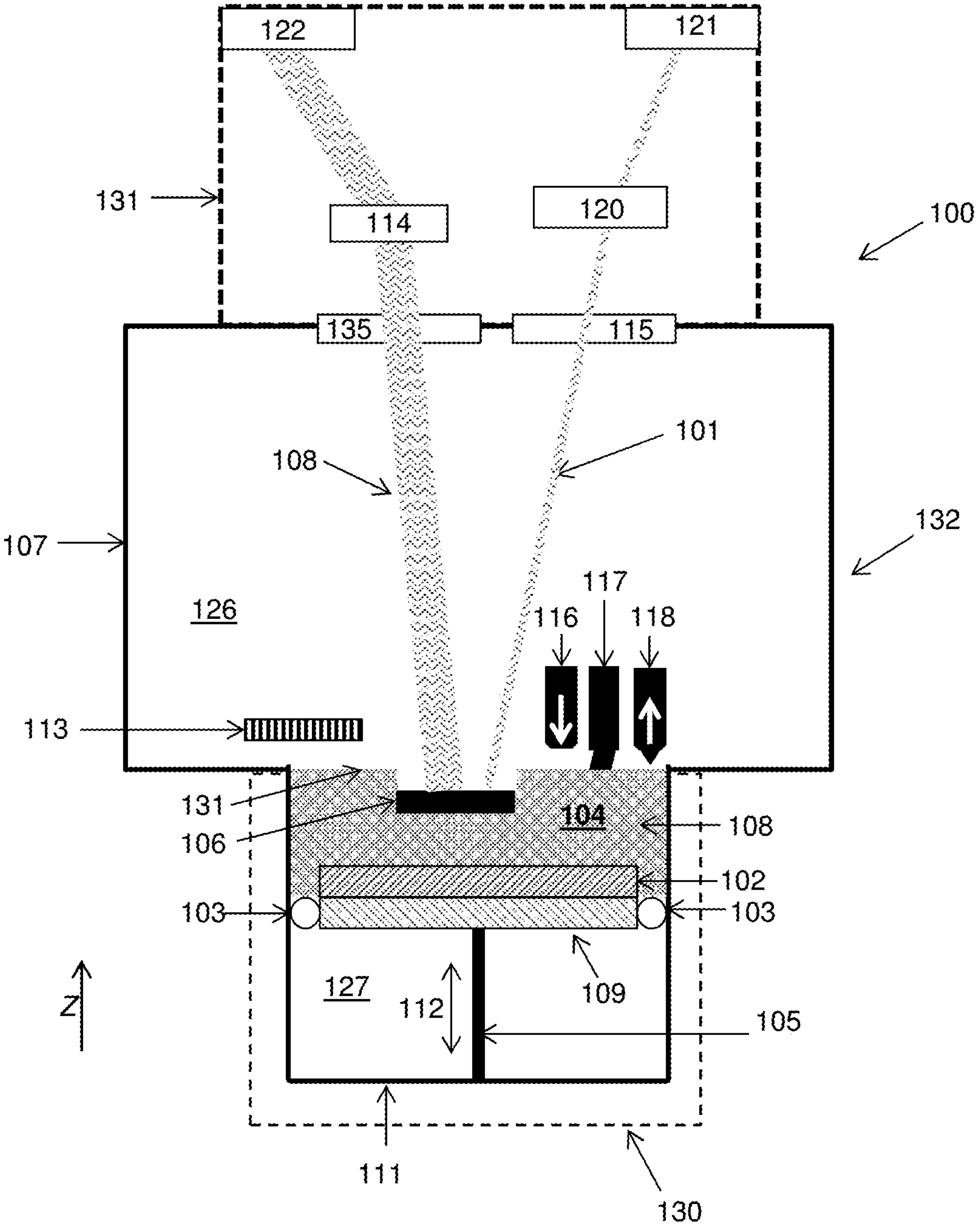
FIG. 1 shows a schematic cross-sectional view of a 3D printing system and apparatuses.

The figures and components therein may not be drawn to scale. Various components of the figures described herein may not be drawn to scale.

DETAILED DESCRIPTION

While various embodiments of the invention have been shown, and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein might be employed.

Some traditional methods of forming 3D objects with (e.g., shallow) overhangs require addition of auxiliary supports to facilitate generation of the overhang that has a requested shape. Usage of those traditional methods without auxiliary supports, may result in formation of an overhang shape that is unrequested and/or undesired. For example, the molten material may generate a deformed (e.g., warped) overhang. The present disclosure describes overhang formation methodologies with minimum usage of auxiliary supports (e.g., no auxiliary supports). Some of the methodologies reduce a sensitivity to a translational direction of a transforming energy beam with respect to the direction of the overhang that it is formed during the transformation. Some of the methodologies reduce a sensitivity to an angle formed by the transforming energy beam and an exposed surface of a transformed (e.g., at least partially molten) material (e.g., during formation of the overhang). The sensitivity may be manifested in the printed overhang. For example, the sensitivity may be manifested as a material (e.g., surface) quality of the object. In some cases, the methodologies disclosed herein reduce a discrepancy in surface roughness of different surface of the object (e.g., top and bottom of overhang), which may depend on a direction of the object's generation relative to the transforming energy beam.

The present disclosure relates to methods, systems, apparatuses, controllers and/or software for forming one or more objects (e.g., 3D objects). The one or more objects may be made of any material. In some cases, the one or more objects comprise metal (e.g., elemental metal and/or metal alloy). In some cases, the material of the 3D object (or a portion of the 3D object) is manipulated while in a first (e.g., more malleable) state to affect properties of the material when in a second (e.g., less malleable) state. For example, the material can be manipulated while in a liquid or in a partially liquid state. The at least partially liquid material may harden, e.g., to a solid or partially solid state. In some instances, energy (e.g., an energy beam) is applied to the object to transform the material from one state of matter to another. The manipulation may be for purposes of attaining certain properties (e.g., shape, size, material property, and/or surface quality) the 3D object. In some cases, the manipulation includes moving a location of (e.g., redistributing) the material while in a first (e.g., more malleable) state. The first state may comprise a liquid state. In some instances, the manipulation is controlled according to defined parameters. In some cases, the manipulation comprises use of modeling (e.g., via computer simulation). Techniques provided herein may be referred to as "liquid phase manipulation" (abbreviated as "LPM"). In some embodiments, LPM techniques involve "Micro-adaptive Metal Manufacturing," "Micro-generative Metal Manufacturing," "Micro-optimized Metal Manufacturing," or "Micro-modeled Metal Manufacturing" (abbreviated as "$M^3$").

Terms such as "a," "an" and "the" are not intended to refer to only a singular entity but include the general class of which a specific example may be used for illustration. The terminology herein is used to describe specific embodiments of the invention, but their usage does not delimit the invention.

When ranges are mentioned, the ranges are meant to be inclusive, unless otherwise specified. For example, a range between value 1 and value 2 is meant to be inclusive and include value 1 and value 2. The inclusive range will span any value from about value 1 to about value 2. The term "between" as used herein is meant to be inclusive unless otherwise specified. For example, between X and Y is understood herein to mean from X to Y. The term "adjacent" or "adjacent to," as used herein, includes "next to," "adjoining," "in contact with," and "in proximity to." In some instances, adjacent to may be "above" or "below." The term "operatively coupled" or "operatively connected" refers to a first mechanism that is coupled (or connected) to a second mechanism to allow an intended operation of the second and/or first mechanism. The term "configured to" refers to an object or apparatus that is (e.g., structurally) configured to bring about an intended result.

Reference is made herein a fundamental length scale (abbreviated as "FLS"). FLS can refer herein as to any suitable scale (e.g., dimension) of an object. For example, a FLS of an object may comprise a length, a width, a height, a diameter, a spherical equivalent diameter, or a diameter of a bounding sphere.

Three-dimensional printing (also referred to herein as "3D printing") refers to a process for generating a 3D object. For example, 3D printing may refer to sequential addition of material layer or joining of material layers (or parts of material layers) to form a 3D structure, in a controlled manner. The controlled manner may include automated control. In the 3D printing process, the deposited material can be transformed (e.g., fused, sintered, melted, bound, or otherwise connected) to subsequently harden and form at least a part of the 3D object. Fusing (e.g., sintering or melting), binding, or otherwise connecting the material is collectively referred to herein as transforming the material (e.g., from a powder material). Fusing the material may include melting or sintering the material. Binding can comprise chemical bonding. Chemical bonding can comprise covalent bonding. Examples of 3D printing include additive printing (e.g., layer by layer printing, or additive manufacturing). 3D printing may include layered manufacturing. 3D printing may include rapid prototyping. 3D printing may include solid freeform fabrication. 3D printing may include direct material deposition. The 3D printing may comprise subtractive printing.

In some embodiments, aspects of the present disclosure can be used with any of a number of types of additive manufacturing processes. Examples of suitable 3D printing methodologies may include extrusion, wire, granular, inkjet, liquid curing and laminar 3D printing. Wire 3D printing can comprise electron beam freeform fabrication (EBF3). Granular 3D printing can comprise direct metal laser sintering (DMLS), electron beam melting (EBM), selective laser melting (SLM), selective heat sintering (SHS), laser engineered net shaping (LENS), laser metal deposition (LMD), direct metal deposition (DMD), direct energy deposition (DED), selective laser sintering (SLS), laser powder forming (e.g., laser engineered net shaping (LENS)), shape deposition manufacturing (SDM), or fused deposition modeling (FDM). Inkjet 3D printing can comprise plaster-based 3D printing (PP). Liquid curing 3D printing can comprise stereo lithography (SLA). Laminar 3D printing can comprise laminated object manufacturing (LOM).

According some embodiments, one or more 3D printing methodologies are used to generate at least one 3D object (e.g., in a printing cycle). 3D printing methodologies may differ from methods traditionally used in semiconductor device fabrication (e.g., vapor deposition, etching, annealing, masking, or molecular beam epitaxy). In some instances, 3D printing may comprise one or more printing methodologies that are traditionally used in semiconductor device fabrication. 3D printing methodologies can differ from vapor deposition methods such as chemical vapor deposition, physical vapor deposition, or electrochemical deposition. In some instances, 3D printing may include vapor deposition methods.

In some embodiments, the methods, apparatuses, systems, controllers and/or software of the present disclosure are used to form 3D objects for various uses and applications. Such uses and applications can include, without limitation, electronics, components of electronics (e.g., casings), machines, parts of machines, tools, implants, prosthetics, fashion items, clothing, shoes, or jewelry. The implants may be directed (e.g., integrated) to a hard, a soft tissue, or to a combination of hard and soft tissues. In some cases, the implants are for a human body. The implants may form adhesion with hard and/or soft tissue. The machines may include a motor or motor part. The machines may include a vehicle. The machines may comprise aerospace related machines. The machines may comprise airborne machines. The vehicle may include an airplane, drone, car, train, bicycle, boat, or shuttle (e.g., space shuttle). The machine may include a satellite or a missile. The uses and applications may include 3D objects relating to the industries and/or products listed herein.

The present disclosure provides methods, systems, apparatuses, controllers and/or software for 3D printing of a requested 3D object from a pre-transformed (e.g., powder) material. The 3D object can be pre-ordered, pre-designed, pre-modeled, or designed in real time (i.e., during the process of 3D printing). The 3D printing method can be an additive method in which a first layer is printed, and thereafter a volume of a material is added to the first layer as separate sequential layer (or parts thereof). An additional sequential layer (or part thereof) can be added to the previous layer by transforming (e.g., fusing (e.g., melting)) a fraction of the pre-transformed material. The transformed (e.g., molten) material may harden to form at least a portion of the (hard) 3D object. The hardening (e.g., solidification) can be actively induced (e.g., by cooling) or can occur without intervention (e.g., naturally). Real time may be, for example, during at least a portion of the 3D printing, during the formation of a layer of transformed material, during the formation of a layer of hardened material, during formation of a portion of a 3D object, during formation of a melt pool, during formation of an entire 3D object, or any combination thereof.

In some embodiments, the 3D object(s) is/are formed using a 3D printing system (also referred to herein as "3D printer" or "printer"). FIG. 1 shows an example 3D printing system 100. The 3D printer may include an enclosure (e.g., FIG. 1, 132). The enclosure can include sub-enclosures. For example, the enclosure can include a processing chamber (e.g., FIG. 1, 107) and a build module (e.g., FIG. 1, 130). The sub-enclosures may be configured to be coupled and decoupled from one another. The build module can include a platform for supporting a material bed (e.g., FIG. 1, 104) during formation of the one or more 3D objects. The material bed can include a pre-transformed material (e.g., FIG. 1, 108) and/or a transformed material (e.g., FIG. 1, 106). In some embodiments, the platform includes a base (e.g., FIG. 1, 102) and/or a substrate (e.g., FIG. 1, 109). In some embodiments, an elevator shaft (e.g., FIG. 1, 105) is configured to move the platform (e.g., vertically). The substrate and/or base can have a circular, rectangular, square, or irregularly shaped cross-section. The platform can comprise a support surface that supports at least a portion of one or more 3D objects. The support surface may be a surface of the base. In some instances, one or more 3D objects are coupled with (e.g., build onto) the base during printing. In some embodiments, the support surface is (e.g., substantially) orthogonal (e.g., normal and/or perpendicular) to the gravitational field vector. In some embodiments, the one or more 3D objects are printed directly on the support surface of the platform (e.g., directly on the base). The base may also be referred to herein as the build plate. The enclosure and/or platform may comprise an elemental metal, metal alloy, ceramic, or an allotrope of elemental carbon. The enclosure wall may comprise a non-transparent (e.g., opaque) material. The platform may be separated from one or more walls (e.g., side walls) of the build module by a seal (e.g., FIG. 1, 103). The printing system and components for generating 3D object(s) may be any 3D printing system and components described in international patent application number PCT/US15/36802, filed Jun. 19, 2015, titled "APPARATUSES, SYSTEMS AND METHODS FOR THREE-DIMENSIONAL PRINTING;" international patent application number PCT/US16/66000, filed Dec. 9, 2016, titled "SKILLFUL THREE-DIMENSIONAL PRINTING;" international patent application number PCT/US17/60035, filed Nov. 3, 2017, titled "GAS FLOW IN THREE-DIMENSIONAL PRINTING;" and international patent application number PCT/US17/39422, filed Jun. 27, 2017, titled "THREE-DIMENSIONAL PRINTING AND THREE-DIMENSIONAL PRINTERS;" each of which is entirely incorporated herein by reference.

In some embodiments, the enclosure is configured to hold an atmosphere. In some cases, the build module is (e.g., removably) coupled to the processing chamber during at least a portion of the printing. In some embodiments, the enclosure is configured to allow an atmosphere (e.g., FIG. 1, 126) in the processing chamber to mix with an atmosphere (e.g., FIG. 1, 127) in the build module (e.g., during printing). In some embodiments, the enclosure is configured to separate the atmosphere in the processing chamber to mix with the atmosphere in the build module (e.g., during separation of the build module from the processing chamber). The one or more 3D objects may be exposed to the atmosphere in the processing chamber during printing (or a portion of the printing process). In some cases, the build module is configured to maintain an atmosphere separate from the processing chamber. The build module and/or processing chamber coupling mechanisms and atmosphere management may include those described in international patent application number PCT/US17/39422, filed Jun. 27, 2017, titled "THREE-DIMENSIONAL PRINTING AND THREE-DIMENSIONAL PRINTERS," which is entirely incorporated herein by reference. The atmosphere in the processing chamber and/or build module may be non-reactive with the pre-transformed material and/or transformed material (e.g., during their formation). A non-reactive atmosphere comprises an inert gas (e.g., noble gas, e.g., argon). The atmosphere may be at an ambient or above ambient pressure, during at least apportion of the 3D printing.

In some embodiments, the atmosphere in the processing chamber and/or build module comprises a gas. In some cases, the gas is (e.g., substantially) non-reactive (e.g., non-chemically reactive) with the material of the 3D object during printing. In some cases, the gas is an inert gas (e.g., argon, neon, helium and/or nitrogen). The gas can be a non-reactive gas (e.g., an inert gas). In some embodiments, the gas comprises a mixture of types of gases. In some cases, the atmosphere comprises argon, nitrogen, helium, neon, krypton, xenon, hydrogen, carbon monoxide and/or carbon dioxide.

In some cases, the pressure of the atmosphere in the processing chamber and/or build module is maintained. During printing (or a portion of the printing process) a pressure of the atmosphere in the processing chamber and/or build module may be an ambient pressure (e.g., neutral pressure). In some cases, the pressure of the atmosphere in the processing chamber and/or build module is a negative pressure (e.g., under vacuum). In some cases, the pressure of the atmosphere in the processing chamber and/or build module is a positive pressure (e.g., above ambient pressure). The pressure can be measured by a pressure gauge. The pressure can be measured at ambient temperature (e.g., R.T.), cryogenic temperature, or at the temperature of the melting point of the pre-transformed material. In some embodiments, the pressure in the atmosphere in the processing chamber and/or build module is at least about $10^{-7}$ Torr, $10^{-6}$ Torr, $10^{-5}$ Torr, $10^{-4}$ Torr, $10^{-3}$ Torr, $10^{-2}$ Torr, $10^{-1}$ Torr, 1 Torr, 10 Torr, 100 Torr, 1 bar, 2 bar, 3 bar, 4 bar, 5 bar, 10 bar, 20 bar, 30 bar, 40 bar, 50 bar, 100 bar, 200 bar, 300 bar, 400 bar, 500 bar, or 1000 bar. In some embodiments, the pressure of the atmosphere in the processing chamber and/or build module is at least about 100 Torr, 200 Torr, 300 Torr, 400 Torr, 500 Torr, 600 Torr, 700 Torr, 720 Torr, 740 Torr, 750 Torr, 760 Torr, 900 Torr, 1000 Torr, 1100 Torr, or 1200 Torr. The pressure of the atmosphere in the processing chamber and/or build module can be at most about $10^{-7}$ Torr, $10^{-6}$ Torr, $10^{-5}$ Torr, or $10^{-4}$ Torr, $10^{-3}$ Torr, $10^{-2}$ Torr, $10^{-1}$ Torr, 1 Torr, 10 Torr, 100 Torr, 200 Torr, 300 Torr, 400 Torr, 500 Torr, 600 Torr, 700 Torr, 720 Torr, 740 Torr, 750 Torr, 760 Torr, 900 Torr, 1000 Torr, 1100 Torr, or 1200 Torr. The pressure of the atmosphere in the processing chamber and/or build module can be at a range between any of the afore-mentioned pressure values (e.g., from about $10^{-7}$ Torr to about 1200 Torr, from about $10^{-7}$ Torr to about 1 Torr, from about 1 Torr to about 1200 Torr, or from about $10^{-2}$ Torr to about 10 Torr).

In some instances, the printer is configured to transform a pre-transformed material (e.g., FIG. 1, 108) to a transformed material (e.g., FIG. 1, 106). The transformed material may correspond to at least a portion of the one or more 3D objects. The material bed may comprise the pre-transformed material and the transformed material. The material bed may comprise multiple layers of pre-transformed and/or transformed material. The pre-transformed material may be in a granular form (e.g., powder). In some cases, the material bed has a (e.g., substantially) constant pressure gradient. In some cases, the material bed is free of pressure gradients. In some cases, a multiplicity of layers of pre-transformed material is sequentially deposited, and a top layer (or optionally at least two, or three top layers) is transformed, wherein the bottom layers remain loose (i.e., uncompact) and flowable (e.g., flowable powder material) at least during the printing. An optional thermal control unit (e.g., FIG. 1, 113) can be configured to maintain a local temperature (e.g., of the material bed or atmosphere). In some cases, the thermal control unit comprises a (e.g., passive or active) heating member. In some cases, the thermal control unit comprises a (e.g., passive or active) cooling member. The thermal control unit may comprise a thermostat. The thermal control unit can be provided inside of a region where the 3D object is formed or adjacent to (e.g., above) a region (e.g., within the processing chamber atmosphere) where the 3D object is formed. The thermal control unit can be provided outside of a region (e.g., within the processing chamber atmosphere) where the 3D object is formed (e.g., at a predetermined distance).

In some examples, a temperature of material bed is maintained and/or monitored. During the formation of the 3D object(s) (e.g., during formation of a layer of hardened material or a portion thereof), a remainder of the material (e.g., powder) bed that did not transform, may be at an ambient temperature. The ambient temperature may be an average or mean temperature of the remainder. During the formation of the 3D object(s) (e.g., during the formation of the layer of hardened material or a portion thereof), a remainder of the material bed that did not transform, may not be heated (e.g., actively heated). For example, the remainder may not be heated beyond an (e.g., average or mean) ambient temperature. For example, the average or mean temperature of the remainder may be an ambient temperature.

In some embodiments, the printer includes one or more layer dispensing mechanisms for dispensing the pre-transformed material. The layer dispensing mechanisms may be configured to dispense the pre-transformed material layer by layer. The layer dispensing mechanisms may level, distribute, spread, and/or remove the pre-transformed material in the material bed. The layer dispensing mechanism may be utilized to form the material bed. The layer dispensing mechanism may be utilized to form the layer of pre-transformed material (or a portion thereof). The layer dispensing mechanism may be utilized to level (e.g., planarize) the layer of pre-transformed material (or a portion thereof). The leveling may be to a predetermined height. The layer dispensing mechanism may comprise at least one, two or three of a (i) powder dispensing mechanism (e.g., FIG. 1, 116), (ii) powder leveling mechanism (e.g., FIG. 1, 117), and (iii) powder removal mechanism (e.g., FIG. 1, 118). The layer dispensing system may comprise a hopper. The layer dispensing system may comprise (e.g., may be) a recoater. The layer dispensing mechanism may be controlled by the controller (e.g., in real time). The layer dispensing mechanism and/or related components can be any of those disclosed in international patent application number PCT/US2016/066000, filed Dec. 9, 2016, titled "SKILLFUL THREE-DIMENSIONAL PRINTING;" and international patent application number PCT/US15/36802, filed on Jun. 19, 2015, titled "APPARATUSES, SYSTEMS AND METHODS FOR THREE-DIMENSIONAL PRINTING," each of which is entirely incorporated herein by reference.

In some examples, the printer includes one or more energy sources. The energy sources can be configured to generate one or more energy beams for transforming pre-transformed material and/or re-transforming transformed material. In some embodiments, the printer includes at least two energy sources (e.g., FIGS. 1, 121 and 122) configured to generate energy beams (e.g., FIGS. 1, 101 and 108). The energy beam(s) can be directed at a target surface. A target surface can include an exposed surface (e.g., FIG. 1, 131) of the material bed (e.g., FIG. 1, 104) and/or a surface of the platform (e.g., FIG. 1, 109). For example, the target surface can comprise an exposed surface of the pre-transformed material (e.g., FIG. 1, 108) (e.g., powder) and/or the transformed material (e.g., FIG. 1, 106). The energy beam(s) may have enough energy to transform (e.g., melt and/or sinter) the pre-transformed material (e.g., powder) and/or re-transform (e.g., re-melt and/or re-sinter) a previously transformed (e.g., hardened (e.g., solidified)) material of the material bed. The energy beam(s) may be directed by one or more optical elements (e.g., FIGS. 1, 114 and/or 120). In some cases, the optical element(s) comprise a galvanometer scanner (e.g., comprising one or more mirrors), a polygon, a mechanical stage (e.g., X-Y stage), a piezoelectric device, gimble, or any combination of thereof. The optical element(s) may direct the energy beam(s) through one or more optical windows (e.g., FIGS. 1, 115 and/or 135). In some cases, the energy source(s) comprise a laser, electron beam source, ion beam source, or any combination thereof. The energy source(s), energy beam(s), optical element(s) and optical window(s) can be any of those disclosed in U.S. patent application Ser. No. 15/435,128, filed on Feb. 16, 2017, titled "ACCURATE THREE-DIMENSIONAL PRINTING;" international patent application number PCT/US17/18191, filed on Feb. 16, 2017, titled "ACCURATE THREE-DIMENSIONAL PRINTING;" European patent application number EP17156707.6, filed on Feb. 17, 2017, titled "ACCURATE THREE-DIMENSIONAL PRINTING;" international patent application number PCT/US17/64474, filed Dec. 4, 2017, titled "OPTICS, DETECTORS, AND THREE-DIMENSIONAL PRINTING;" and international patent application number PCT/US18/12250, filed Jan. 3, 2018, titled "OPTICS IN THREE-DIMENSIONAL PRINTING," each of which is entirely incorporated herein by reference.

Figure 2A:
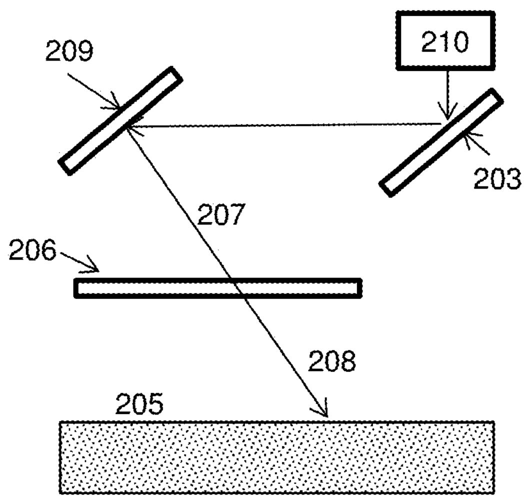
FIG. 2A schematically illustrates an optical setup.

In some embodiments, the printer includes an optical system. The optical system may be used to control the one or more energy beams. The energy beams may comprise a single mode beam (e.g., Gaussian beam) or a multi-mode beam. The optical system may be coupled with or separate from the enclosure. The optical system may be enclosed in an optical enclosure (e.g., FIG. 1, 132). FIG. 2A shows an example of an optical system in which an energy beam is projected from the energy source 210, and is deflected by two mirrors 203 and 209, and travels through an optical element 206 prior to reaching target 205 (e.g., an exposed surface of a material bed comprising a pre-transformed material and/or hardened or partially hardened material such as from a previous transformation operation). The optical system may comprise more than one optical element. In some cases, the optical element comprises an optical window (e.g., for transmitting the energy beam into the enclosure). In some embodiments, the optical element comprises a focus altering device, e.g., for altering (e.g., focusing or defocusing) an incoming energy beam (e.g., FIG. 2A, 207) to an outgoing energy beam (e.g., FIG. 2A, 108). The focus altering device may comprise a lens. In some embodiments, aspects of the optical system are controlled by one or more controllers of the printer. For example, one or more controllers may control one or more mirrors (e.g., of galvanometer scanners) that directs movement of the one or more energy beams in real time. Aspects of optical systems and their components are described in U.S. patent application Ser. No. 15/435,128, filed on Feb. 16, 2017, titled "ACCURATE THREE-DIMENSIONAL PRINTING;" international patent application number PCT/US17/18191, filed on Feb. 16, 2017, titled "ACCURATE THREE-DIMENSIONAL PRINTING;" European patent application number EP17156707.6, filed on Feb. 17, 2017, titled "ACCURATE THREE-DIMENSIONAL PRINTING;" international patent application number PCT/US17/64474, filed Dec. 4, 2017, titled "OPTICS, DETECTORS, AND THREE-DIMENSIONAL PRINTING;" and international patent application number PCT/US18/12250, filed Jan. 3, 2018, titled "OPTICS IN THREE-DIMENSIONAL PRINTING," each of which is entirely incorporated herein by reference.

Figure 2B:
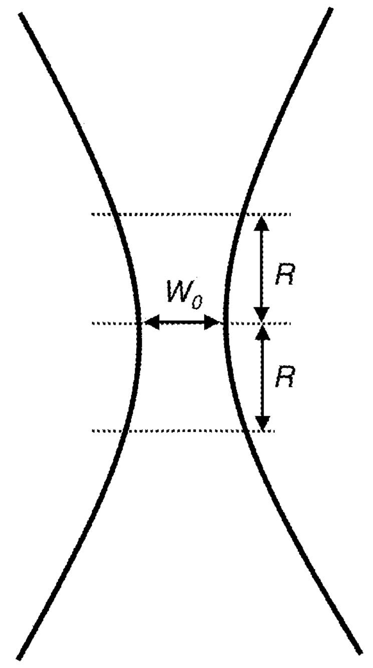
FIG. 2B schematically illustrate an energy beam.

In some cases, the optical system modifies a focus of the one or more energy beams at the target surface. In some embodiments, the energy beam is (e.g., substantially) focused at the target surface. In some embodiments, the energy beam is defocused at the target surface. An energy beam that is focused at the target surface may have a (e.g., substantially) minimum spot size at the target surface. An energy beam that is defocused at the target surface may have a spot size at the target surface that is (e.g., substantially) greater than the minimum spot size, for example, by a pre-determined amount. For example, a Gaussian energy beam that is defocused at the target surface can have spot size that is outside of a Rayleigh distance from the energy beams focus (also referred to herein as the beam waist). FIG. 2B shows an example profile of a Gaussian beam as a function of distance. The target surface of a focused energy beam may be within a Rayleigh distance (e.g., FIG. 2B, R) from the beam waist (e.g., FIG. 2B, $W_0$).

In some cases, one or more controllers control the operation of one or more components. For example, one or more controllers may control one or more aspects (e.g., movement and/or speed) of a layer forming apparatus. One or more controllers may control one or more aspects of an energy source (e.g., energy beam power, scan speed and/or scan path). One or more controllers may control one or more aspects of an energy beam optical system (e.g., energy beam scan path and/or energy beam focus). One or more controllers may control one or more operations of a gas flow system (e.g., gas flow speed and/or direction). In some embodiments, one or more controllers controls aspects of multiple components or systems. For example, a first controller can control aspects of the energy source(s), a second controller can control aspects of a layer forming apparatus(es), and a third controller can control aspects of a gas flow system. In some embodiments, one or more controller controls aspect of one component or system. For example, multiple controllers may control aspects of an optical system. For instance, a first controller can control the path of the one or more energy beams, a second controller may control scan speed of the one or more energy beams, and a third controller may control a focus of the one or more energy beams. As another example, multiple controllers may control aspects of an energy source. For instance, a first controller can control the power of one or more energy beams, a second controller may control pulsing (e.g., pulse versus continuous, or pulse rate) of the one or more energy beams, and a third controller may control a power profile over time (e.g., ramp up and down) one or more energy beams. At times, the first controller, second controller, and the third controller are the same controller. At times, at least two of the first controller, second controller, and the third controller are different controllers. Any combination of one or more controllers may control aspects of one or more components or systems of a printer. The one or more controllers may control the operations before, during, and/or after the printing, or a portion of the printing (irradiation operation).

Figure 2C:
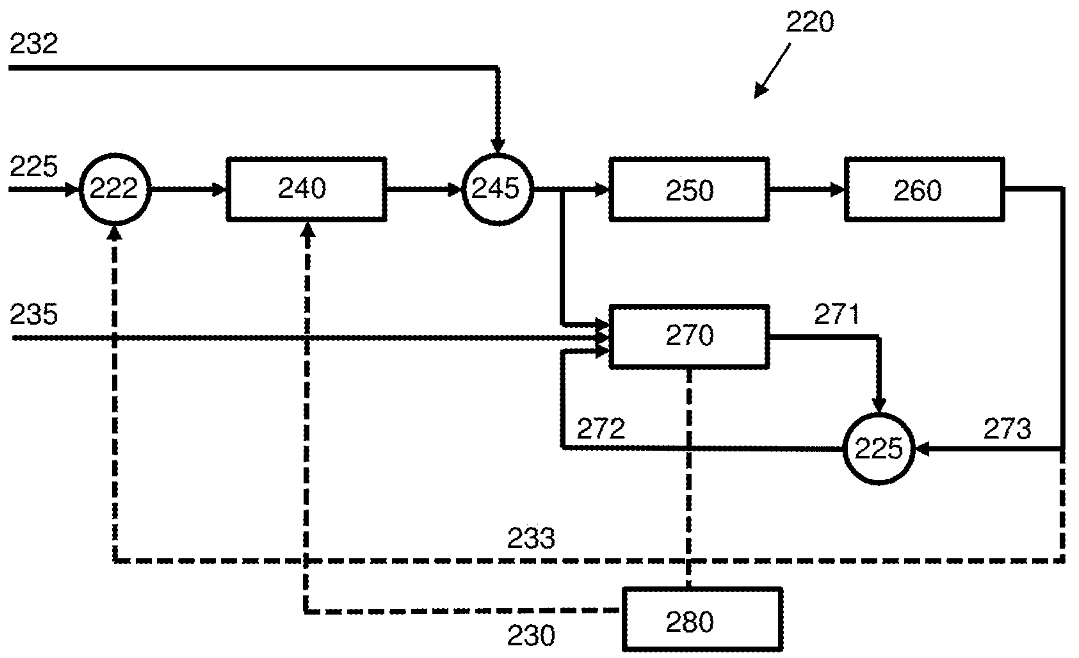
FIG. 2C schematically illustrates a controller.

In some instances, aspects of the printer are controlled by one or more controllers. The controller(s) can include (e.g., electrical) circuitry that is configured to generate output (e.g., voltage signals) for directing controlling one or more aspects of the apparatuses (or any parts thereof) described herein. FIG. 2C shows a schematic example of a (e.g., automatic) controller (e.g., a control system, or a controller) 220 that is programmed or otherwise configured to facilitate formation of one or more 3D objects. The controller (e.g., FIG. 2C, 220) can comprise a subordinate-controller 240 for controlling formation of at least one 3D object (e.g., FIG. 2C, 250), one or more sensors (e.g. temperature sensor) (e.g., FIG. 2C, 260), one or more control-models (e.g., FIG. 2C, 270) for the physical process of 3D printing. The controller may comprise one or more loop schemes (e.g., open loop, feed-forward loop and/or feedback loop). In the example of FIG. 2C, the controller optionally includes feedback control loops 230 and/or 233. The subordinate-controller may be an internal-controller. The subordinate-controller can be a second-controller as part of the first controller. The subordinate-controller can be a linear controller. The controller (e.g., FIG. 2C, 220) may be configured to control (e.g., in real time during at least a portion of the 3D printing) a controllable property comprising: (i) an energy beam power (e.g., delivered to the material bed), (ii) temperature at a position in the material bed (e.g., on the forming 3D object), (iii) energy beam speed, (iv) energy beam power density, (v) energy beam dwell time, (vi) energy beam irradiation spot (e.g., on the exposed surface of the material bed), (vii) energy beam focus (e.g., focus or defocus), or (viii) energy beam cross-section (e.g., beam waist). The controllable property may be a control variable. The control may be to maintain a target parameter (e.g., temperature) of one or more 3D objects being formed. The target parameter may vary in time (e.g., in real time) and/or in location. The location may comprise a location at the exposed surface of the material bed. The location may comprise a location at the top surface of the (e.g., forming) 3D object. The target parameter may correlate to the controllable property. The (e.g., input) target parameter may vary in time and/or location in the material bed (e.g., on the forming 3D object). The subordinate-controller may receive a pre-determined power per unit area (of the energy beam), temperature, and/or metrological (e.g., height) target value. For example, the subordinate-controller may receive a target parameter (e.g., FIG. 2C, 225) (e.g. temperature) to maintain at least one characteristic of the forming 3D object (e.g., dimension in a direction, and/or temperature). The controller can receive multiple (e.g., three) types of target inputs: (i) energy beam power (e.g., FIG. 2C, 232) (which may be user defined), (ii) temperature (e.g., FIG. 2C, 225), and (iii) geometry (e.g., FIG. 2C, 235). The geometry may comprise geometrical object pre-print correction. The geometric information may derive from the 3D object (or a correctively deviated (e.g., altered) model thereof). The geometry may comprise geometric information of a previously printed portion of the 3D object (e.g., comprising a local thickness below a given layer, local build angle, proximity to an edge on a given layer, or proximity to layer boundaries). The geometry may be an input to the controller (e.g., via an open loop control scheme). Some of the target values may be used to form 3D printing instructions for generating the 3D object (e.g., FIG. 2C, 250). The printing instructions may be dynamically adjusted in real time. The controller may monitor (e.g., continuously) one or more signals from one or more sensors (e.g., FIG. 2C, 260). For example, the controller may monitor the energy beam power, temperature of a position in the material bed, and/or metrology (e.g., height) of a position in the material bed. The position in the material bed may be of the forming 3D object. The monitor may be continuous or discontinuous. The monitor may be in real-time during the 3D printing. The monitor may be using the one or more sensors. The printing instructions may be dynamically adjusted in real time (e.g., using the signals from the one or more sensors). A variation between the target parameter and the sensed parameter may be used to estimate an error in the value of that parameter (e.g., FIG. 2C, 222). The variation (e.g., error) may be used by the subordinate-controller (e.g., FIG. 2C, 240) to adjust the printing instructions. The controller may control (e.g., continuously) one or more parameters (e.g., in real time). The controller may use historical data (e.g., for the parameters). The historical data may be of previously printed 3D objects, or of previously printed layers of the 3D object. The control-model may comprise free parameters which may be estimated using a characterization process. The characterization process may be before, during and/or after the 3D printing. The control-model may be wired to the controller. The control model can be configured into the controller (e.g., before and/or during the 3D printing). Configured may comprise built, constructed, designed, patterned, or arranged. The hardware of the controller may comprise the control-model. The control-model may be linear or non-linear. For example, the control-model may be non-linear. The control-model may comprise linear or non-linear modes.

In some cases, a control-model is configured to predict and/or estimate one or more physical parameters (e.g., FIG. 2C, 271) of the 3D object being formed (e.g., in real time). In some embodiments, the control-model is a reduced form of the 3D model of the desired 3D object. In some embodiments, the control-model is a simplified 3D model compared to the complete 3D model of the desired 3D object. The physical parameters may comprise shape. For example, the control-model may comprise the shape (e.g., geometry) of the 3D object. The control-model may be used to adjust the 3D printing. The control-model may comprise a simulation. The simulation may comprise an imitation of a real-world process (e.g., 3D printing) over time. The simulation may comprise finite element analysis. For example, the control-model may comprise a thermal and/or mechanical (e.g., elastic and/or plastic) simulation. For example, the control-model may comprise thermo-mechanical (e.g., thermo-elastic and/or thermo-plastic) simulation. The simulation may comprise the material(s) of the forming 3D object (e.g., material(s) in the material bed). For example, the simulation may comprise the material properties of the desired 3D object. The simulation and/or control-model may be adjusted (e.g., using the control loop) using one or more measured parameters. The simulation and/or control-model may be adjusted in real-time. The control-model may output an estimation of the parameter. The simulation and/or control-model may use an input from the one or more sensors (e.g., power, temperature, and/or metrology sensors). The control-model can comprise one or more free parameters. The one or more free parameters can be optimized in real time (e.g., using one or more sensor signals). The controller may comprise an internal-state-system that provides an estimate of an internal state of the 3D printer and/or 3D printing. The internal state can be derived from one or more measurements of the control variable and/or input parameters. The internal-state-system may be implemented using a computer. The internal-state-system may comprise a state-observer. The controller may comprise a state-observer. The control-model can be a state-observer-model. The controller may comprise a reconfigurable firm-ware (e.g., flash memory). The controller may comprise a microprocessor. The controller may comprise a (e.g., programmable and/or reconfigurable) circuit. The estimated parameter may be compared (e.g., FIG. 2C, 225) with the measured parameter (e.g., FIG. 2C, 273). The comparison may be used to alter (e.g., FIG. 2C, 272) the control-model. The control-model may dynamically be adjusted in real time. The simulation may be dynamically adjusted in real-time. The prediction of the parameter may be done offline (e.g. predetermined) and/or in real-time (e.g., during the 3D printing). The control-model may receive the sensed parameter(s) value(s). The control-model may use the sensed parameter(s) value(s) for a prediction and/or adjustment of at least one target parameter. For example, the control-model may use geometric information (e.g., FIG. 2C, 235) associated with the requested and/or forming 3D object. The control-model may set up a feedback control loop (e.g., FIG. 2C, 230) to adjust one or more target parameters to achieve convergence (e.g., with the desired 3D object). The feedback loop(s) control may comprise one or more comparisons with an input parameter (e.g., FIG. 2C, 222) and/or threshold value (e.g., FIG. 2C, 280). Real time may be during (i) formation of at least one 3D object, (ii) a layer within the 3D object, (iii) a dwell time of an energy beam along a path, (iv) a dwell time of an energy beam along a hatch line, and/or (v) a dwell time of an energy beam forming a melt pool. The one or more forming 3D objects can be generated (e.g., substantially)

simultaneously, or sequentially. The one or more 3D objects can be formed in a (e.g., single) material bed. The subordinate-controller (e.g., FIG. 2C, 240) may output one or more parameters as part of the 3D printing instructions. The output of the subordinate-controller may be based on one or more parameter input (e.g., of a different type). For example, the subordinate-controller may receive a temperature input and output a power parameter. The output parameter may be compared with the same type of parameter that was input. For example, the output power parameter, may be compared with (e.g., FIG. 2C, 245) a power input to generate the printing instructions for the portion of the 3D object. The comparison may be a dynamic comparison in real time. The comparison may be prior or subsequent to the 3D printing. The one or more controllers may be implemented in a processor hardware (e.g., GPU, CPU, or FPGA). The controller may have a band width of at least about 1 Kilo-Hertz (KHz), 5 KHz, 10 KHz, 20 KHz, 30 KHz, 30 KHz, 40 KHz, 50 KHz, 60 KHz, 70 KHz, or 80 KHz. The controller may have a band width between any of the afore-mentioned values (e.g., from about 1 KHz to about 80 KHz, from about 1 KHz to about 50 KHz, from about 10 KHz, to about 50 KHz, from about 30 KHz to about 60 KHz, or from about 50 KHz to about 80 KHz). Aspects of control systems and their components are described in international patent application number PCT/US16/59781, filed on Oct. 31, 2016, titled "ADEPT THREE-DIMENSIONAL PRINTING;" U.S. patent application Ser. No. 15/435,128, filed on Feb. 16, 2017, titled "ACCURATE THREE-DIMENSIONAL PRINTING;" international patent application number PCT/US17/18191, filed on Feb. 16, 2017, titled "ACCURATE THREE-DIMENSIONAL PRINTING;" and European patent application number EP17156707.6, filed on Feb. 17, 2017, titled "ACCURATE THREE-DIMENSIONAL PRINTING," each of which is entirely incorporated herein by reference.

In some embodiments, the material (e.g., pre-transformed material and/or transformed material) comprises a metal and/or a non-metal material. In some cases, the material (e.g., pre-transformed material and/or transformed material) comprises an elemental metal, metal alloy, ceramic, or an allotrope of elemental carbon. The allotrope of elemental carbon may comprise amorphous carbon, graphite, graphene, diamond, or fullerene. The fullerene may be selected from the group consisting of a spherical, elliptical, linear, and tubular fullerene. The fullerene may comprise a buckyball or a carbon nanotube. The ceramic material may comprise cement. The ceramic material may comprise alumina. The material may comprise sand, glass, or stone. In some embodiments, the material may be devoid of an organic material, for example, a polymer or a resin. In some embodiments, the material may exclude an organic material (e.g., polymer). At times, the material may comprise an organic material (e.g., a polymer or a resin). The pre-transformed material may comprise a particulate material. The pre-transformed material may comprise a liquid, solid, or semi-solid. Pre-transformed material as understood herein is a material before it has been transformed by an energy beam during the 3D printing process. The pre-transformed material may be a material that was, or was not, transformed prior to its use in the 3D printing process.

At times, the pre-transformed material comprises a particulate (e.g., granular) material. The particulate material may comprise powder. The particulate material may comprise a solid material. The particulate material may comprise one or more particles or clusters. The term "powder," as used herein, generally refers to a solid having fine particles (e.g., granulates). The "particulate material" may comprise powder material, or particles made of another material (e.g., liquid, or liquid containing vesicles). The material may comprise semi-solid material. A semi-solid material may be a gel. The particulate material may comprise liquid (e.g., in vesicles) or semi-solid particles (e.g., encapsulated in vesicles). Powders may be granular materials. The powder particles may comprise nanoparticles or microparticles. In some examples, a powder comprising particles having an average FLS (e.g., the diameter, spherical equivalent diameter, diameter of a bounding circle, or the largest of height, width and length) of at least about 5 nanometers (nm), 10 nm, 20 nm, 30 nm, 40 nm, 50 nm, 100 nm, 200 nm, 300 nm, 400 nm, 500 nm, 1 μm, 5 μm, 10 μm, 15 μm, 20 μm, 25 μm, 30 μm, 35 μm, 40 μm, 45 μm, 50 μm, 55 μm, 60 μm, 65 μm, 70 μm, 75 μm, 80 μm, or 100 μm. The particles may have an average FLS of at most about 100 μm, 80 μm, 75 μm, 70 μm, 65 μm, 60 μm, 55 μm, 50 μm, 45 μm, 40 μm, 35 μm, 30 μm, 25 μm, 20 μm, 15 μm, 10 μm, 5 μm, 1 μm, 500 nm, 400 nm, 300 nm, 200 nm, 100 nm, 50 nm, 40 nm, 30 nm, 20 nm, 10 nm, or 5 nm. In some cases, the particles may have an average FLS between any of the values of the average particle FLS listed above (e.g., from about 5 nm to about 100 μm, from about 1 μm to about 100 μm, from about 15 μm to about 45 μm, from about 5 μm to about 80 μm, from about 20 μm to about 80 μm, or from about 500 nm to about 50 μm).

The material bed can be of any size and/or volume. In some embodiments, the FLS (e.g., diameter, width, depth, and/or height) of the material bed can be at least about 50 millimeters (mm), 60 mm, 70 mm, 80 mm, 90 mm, 100 mm, 200 mm, 250 mm, 280 mm, 400 mm, 500 mm, 800 mm, 900 mm, 1 meter (m), 2 m or 5 m. The FLS of the material bed can be at most about 60 mm, 70 mm, 80 mm, 90 mm, 100 mm, 200 mm, 250 mm, 280 mm, 400 mm, 500 mm, 800 mm, 900 mm, 1 meter (m), 2 m or 5 m. The FLS of the material bed can be between any of the afore-mentioned values (e.g., from about 50 mm to about 5 m, from about 250 mm to about 500 mm, from about 280 mm to about 1 m, or from about 500 mm to about 5 m).

In some embodiments, at least a portion of a layer of pre-transformed material is transformed to a transformed material (e.g., using the one or more energy beams), e.g., that subsequently form at least a fraction of a hardened (e.g., solidified) 3D object. At times a layer of transformed and/or hardened material may comprise a cross section of a 3D object (e.g., a horizontal cross section). The layer may correspond to a cross section of a requested 3D object (e.g., a model). At times, a layer of transformed or hardened material may comprise a deviation from a cross section of a model of a 3D object. The deviation may include vertical or horizontal deviation. A pre-transformed material layer (or a portion thereof) can have a thickness (e.g., layer height) of at least about 10 micrometers (μm), 10 μm, 20 μm, 50 μm, 100 μm, 150 μm, 200 μm, 300 μm, 400 μm, 500 μm, 600 μm, 700 μm, 800 μm, 900 μm, or 1000 μm. A pre-transformed material layer (or a portion thereof) can have a thickness of at most about 1000 μm, 900 μm, 800 μm, 700 μm, 60 μm, 500 μm, 450 μm, 400 μm, 350 μm, 300 μm, 250 μm, 200 μm, 150 μm, 100 μm, 75 μm, 50 μm, 40 μm, 30 μm, or 20 μm. A pre-transformed material layer (or a portion thereof) may have any value in between the afore-mentioned layer thickness values (e.g., from about 1000 μm to about 10 μm, 800 μm to about 1 μm, from about 600 μm to about 20 μm, or from about 300 μm to about 30 μm).

In some embodiments, the material composition of at least two of a plurality of layers in the material bed is different. In some embodiments, the material composition of at least two of a plurality of layers in the material bed is (e.g., substantially) the same. The material composition of at least one layer within the material bed may differ from the material composition within at least one other layer in the material bed. The material composition of at least one layer within the 3D object may differ from the material composition within at least one other layer in the 3D object. The difference (e.g., variation) may comprise difference in grain (e.g., crystal) structure. The variation may comprise variation in grain orientation, material density, degree of compound segregation to grain boundaries, degree of element segregation to grain boundaries, material phase, metallurgical phase, material porosity, crystal phase, crystal structure, or material type. The microstructure of the printed object may comprise planar structure, cellular structure, columnar dendritic structure, or equiaxed dendritic structure.

At times, the pre-transformed material of at least one layer in the material bed differs in the FLS of its particles (e.g., powder particles) from the FLS of the pre-transformed material within at least one other layer in the material bed. A layer may comprise two or more material types at any combination. For example, two or more elemental metals, at least one elemental metal and at least one alloy; two or more metal alloys. All the layers of pre-transformed material deposited during the 3D printing process may be of the same (e.g., substantially the same) material composition. In some instances, a metal alloy is formed in situ during the process of transforming at least a portion of the material bed. In some instances, a metal alloy is not formed in situ during the process of transforming at least a portion of the material bed. In some instances, a metal alloy is formed prior to the process of transforming at least a portion of the material bed. In some instances, a first metal alloy is formed prior to the process of transforming at least a portion of the material bed and a second (e.g., requested) metal alloy is formed during the transforming of at least a portion of the material bed. In the case of a multiplicity (e.g., mixture) of pre-transformed materials, one pre-transformed material may be used as support (i.e., supportive powder), as an insulator, as a cooling member (e.g., heat sink), as a precursor in the requested alloy formation, or as any combination thereof.

In some instances, adjacent components in the material bed are separated from one another by one or more intervening layers. In an example, a first layer is adjacent to a second layer when the first layer is in direct contact with the second layer. In another example, a first layer is adjacent to a second layer when the first layer is separated from the second layer by at least one layer (e.g., a third layer). The intervening layer may be of any layer size.

At times, the pre-transformed material is requested and/or pre-determined for the 3D object. The pre-transformed material can be chosen such that the material is the requested and/or otherwise predetermined material for the 3D object. A layer of the 3D object may comprise a single type of material. For example, a layer of the 3D object may comprise a single metal alloy type. In some examples, a layer within the 3D object may comprise several types of material (e.g., an elemental metal and an alloy, several ally types, several alloy phases, or any combination thereof). In certain embodiments, each type of material comprises only a single member of that type. For example: a single member of metal alloy (e.g., Aluminum Copper alloy). In some cases, a layer of the 3D object comprises more than one type of material. In some cases, a layer of the 3D object comprises more than one member of a material type.

In some instances, the elemental metal comprises an alkali metal, an alkaline earth metal, a transition metal, a rare-earth element metal, or another metal. The alkali metal can be Lithium, Sodium, Potassium, Rubidium, Cesium, or Francium. The alkali earth metal can be Beryllium, Magnesium, Calcium, Strontium, Barium, or Radium. The transition metal can be Scandium, Titanium, Vanadium, Chromium, Manganese, Iron, Cobalt, Nickel, Copper, Zinc, Yttrium, Zirconium, Platinum, Gold, Rutherfordium, Dubnium, Seaborgium, Bohrium, Hassium, Meitnerium, Ununbium, Niobium, Iridium, Molybdenum, Technetium, Ruthenium, Rhodium, Palladium, Silver, Cadmium, Hafnium, Tantalum, Tungsten, Rhenium, or Osmium. The transition metal can be mercury. The rare-earth metal can be a lanthanide, or an actinide. The lanthanide metal can be Lanthanum, Cerium, Praseodymium, Neodymium, Promethium, Samarium, Europium, Gadolinium, Terbium, Dysprosium, Holmium, Erbium, Thulium, Ytterbium, or Lutetium. The actinide metal can be Actinium, Thorium, Protactinium, Uranium, Neptunium, Plutonium, Americium, Curium, Berkelium, Californium, Einsteinium, Fermium, Mendelevium, Nobelium, or Lawrencium. The other metal can be Aluminum, Gallium, Indium, Tin, Thallium, Lead, or Bismuth.

In some instances, the metal alloy comprises an iron-based alloy, nickel-based alloy, cobalt based allow, chrome based alloy, cobalt chrome based alloy, titanium based alloy, magnesium based alloy, copper based alloy, or any combination thereof. The alloy may comprise an oxidation or corrosion resistant alloy. The alloy may comprise a super alloy (e.g., Inconel). The super alloy may comprise Inconel 600, 617, 625, 690, 718, or X-750. The metal (e.g., alloy or elemental) may comprise an alloy used for applications in industries comprising aerospace (e.g., aerospace super alloys), jet engine, missile, automotive, marine, locomotive, satellite, defense, oil & gas, energy generation, semiconductor, fashion, construction, agriculture, printing, or medical. The metal (e.g., alloy or elemental) may comprise an alloy used for products comprising a device, (e.g., human and/or veterinary) medical device (e.g., implants (e.g., dental) and/or prosthetics), machinery, cell phone, semiconductor equipment, generators, turbine, stator, motor, rotor, impeller, engine, piston, electronics (e.g., circuits), electronic equipment, agriculture equipment, gear, transmission, communication equipment, computing equipment (e.g., laptop, cell phone, tablet computer), air conditioning, generators, furniture, musical equipment, art, jewelry, cooking equipment, or sport gear. The impeller may be a shrouded (e.g., covered) impeller that is produced as one piece (e.g., comprising blades and cover) during one 3D printing process. The 3D object may comprise a blade. The impeller may be used for pumps (e.g., turbo pumps). The impeller and/or blade may be any of the ones described in U.S. patent application Ser. No. 15/435,128, filed on Feb. 16, 2017, titled "ACCURATE THREE-DIMENSIONAL PRINTING;" international patent application number PCT/US17/18191, filed on Feb. 16, 2017, titled "ACCURATE THREE-DIMENSIONAL PRINTING;" and European patent application number EP17156707.6, filed on Feb. 17, 2017, titled "ACCURATE THREE-DIMENSIONAL PRINTING," each of which is entirely incorporated herein by reference.

In some instances, the alloy includes a superalloy. The alloy may include a high-performance alloy. The alloy may include an alloy exhibiting at least one of: excellent mechanical strength, resistance to thermal creep deformation, good surface stability, resistance to corrosion, and resistance to oxidation. The alloy may include a facecentered cubic austenitic crystal structure. The alloy may comprise Hastelloy, Inconel, Waspaloy, Rene alloy (e.g., Rene-80, Rene-77, Rene-220, or Rene-41), Haynes alloy, Incoloy, MP98T, TMS alloy, MTEK (e.g., MTEK grade MAR-M-247, MAR-M-509, MAR-M-R41, or MAR-M-X-45), or CMSX (e.g., CMSX-3, or CMSX-4). The alloy can be a single crystal alloy.

In some cases, the metal alloy comprises an iron alloy. In some instances, the iron alloy comprises Elinvar, Fernico, Ferroalloys, Invar, Iron hydride, Kovar, Spiegeleisen, Staballoy (stainless steel), or Steel. In some instances, the metal alloy is steel. The Ferroalloy may comprise Ferroboron, Ferrocerium, Ferrochrome, Ferromagnesium, Ferromanganese, Ferromolybdenum, Ferronickel, Ferrophosphorus, Ferrosilicon, Ferrotitanium, Ferrouranium, or Ferrovanadium. The iron alloy may comprise cast iron, or pig iron. The steel may comprise Bulat steel, Chromoly, Crucible steel, Damascus steel, Hadfield steel, High speed steel, HSLA steel, Maraging steel, Maraging steel (M300), Reynolds 531, Silicon steel, Spring steel, Stainless steel, Tool steel, Weathering steel, or Wootz steel. The high-speed steel may comprise Mushet steel. The stainless steel may comprise AL-6XN, Alloy 20, celestrium, marine grade stainless, Martensitic stainless steel, surgical stainless steel, or Zeron 100. The tool steel may comprise Silver steel. The steel may comprise stainless steel, Nickel steel, Nickel-chromium steel, Molybdenum steel, Chromium steel, Chromium-vanadium steel, Tungsten steel, Nickel-chromium-molybdenum steel, or Silicon-manganese steel. The steel may be comprised of any Society of Automotive Engineers (SAE) grade steel such as 440F, 410, 312, 430, 440A, 440B, 440C, 304, 305, 304L, 304L, 301, 304LN, 301LN, 2304, 316, 316L, 316LN, 316, 316LN, 316L, 316L, 316, 317L, 2205, 409, 904L, 321, 254SMO, 316Ti, 321H, or 304H. The steel may comprise stainless steel of at least one crystalline structure selected from the group consisting of austenitic, superaustenitic, ferritic, martensitic, duplex, and precipitation-hardening martensitic. Duplex stainless steel may be lean duplex, standard duplex, super duplex, or hyper duplex. The stainless steel may comprise surgical grade stainless steel (e.g., austenitic 316, martensitic 420, or martensitic 440). The austenitic 316 stainless steel may comprise 316L, or 316LVM. The steel may comprise 17-4 Precipitation Hardening steel (e.g., type 630, a chromium-copper precipitation hardening stainless steel, 17-4PH steel).

In some cases, the metal alloy comprises a titanium alloy. In some instances, the titanium alloy comprises alpha alloy, near alpha alloy, alpha and beta alloy, or beta alloy. The titanium alloy may comprise grade 1, 2, 2H, 3, 4, 5, 6, 7, 7H, 8, 9, 10, 11, 12, 13, 14, 15, 16, 16H, 17, 18, 19, 20, 21, 22, 23, 24, 25, 26, 26H, 27, 28, 29, 30, 31, 32, 33, 34, 35, 36, 37, 38, or higher. In some instances, the titanium base alloy comprises Ti-6Al-4V or Ti-6Al-7Nb.

In some cases, the metal alloy comprises a nickel alloy. In some instances, the nickel alloy comprises Alnico, Alumel, Chromel, Cupronickel, Ferronickel, German silver, Hastelloy, Inconel, Monel metal, Nichrome, Nickel-carbon, Nicrosil, Nisil, Nitinol, or Magnetically "soft" alloys. The magnetically "soft" alloys may comprise Mu-metal, Permalloy, Supermalloy, or Brass. The brass may comprise Nickel hydride, Stainless or Coin silver. The cobalt alloy may comprise Megallium, Stellite (e.g. Talonite), Ultimet, or Vitallium. The chromium alloy may comprise chromium hydroxide, or Nichrome.

In some cases, the metal alloy comprises an aluminum alloy. In some instances, the aluminum alloy comprises AA-8000, Al—Li (aluminum-lithium), Alnico, Duralumin, Hiduminium, Kryron Magnalium, Nambe, Scandium-aluminum, or Y alloy. The magnesium alloy may comprise Elektron, Magnox, or T—Mg—Al—Zn (Bergman phase) alloy.

In some cases, the metal alloy comprises a copper alloy. In some instances, the copper alloy comprises Arsenical copper, Beryllium copper, Billon, Brass, Bronze, Constantan, Copper hydride, Copper-tungsten, Corinthian bronze, Cunife, Cupronickel, Cymbal alloys, Devarda's alloy, Electrum, Hepatizon, Heusler alloy, Manganin, Molybdochalkos, Nickel silver, Nordic gold, Shakudo, or Tumbaga. The Brass may comprise Calamine brass, Chinese silver, Dutch metal, Gilding metal, Muntz metal, Pinchbeck, Prince's metal, or Tombac. The Bronze may comprise Aluminum bronze, Arsenical bronze, Bell metal, Florentine bronze, Guanin, Gunmetal, Glucydur, Phosphor bronze, Ormolu, or Speculum metal. The copper alloy may be a high-temperature copper alloy (e.g., GRCop-84).

In some instances, the metal alloys are Refractory Alloys. The refractory metals and alloys may be used for heat coils, heat exchangers, furnace components, or welding electrodes. The Refractory Alloys may comprise a high melting points, low coefficient of expansion, mechanically strong, low vapor pressure at elevated temperatures, high thermal conductivity, or high electrical conductivity.

In some examples, the material (e.g., pre-transformed and/or transformed material) comprises a material wherein its constituents (e.g., atoms or molecules) readily lose their outer shell electrons, resulting in a free-flowing cloud of electrons within their otherwise solid arrangement. In some examples the material is characterized in having high electrical conductivity, low electrical resistivity, high thermal conductivity, or high density (e.g., as measured at ambient temperature (e.g., R.T., or 20° C.)). The high electrical conductivity can be at least about $1*10^5$ Siemens per meter (S/m), $5*10^5$ S/m, $1*10^6$ S/m, $5*10^6$ S/m, $1*10^7$ S/m, $5*10^7$ S/m, or $1*10^8$ S/m. The symbol "*" designates the mathematical operation "times," or "multiplied by." The high electrical conductivity can be any value between the afore-mentioned electrical conductivity values (e.g., from about $1*10^5$ S/m to about $1*10^8$ S/m). The low electrical resistivity may be at most about $1*10^{-5}$ ohm times meter (frm), $5*10^{-6}$ frm, $1*10^{-6}$ frm, $5*10^{-7}$ frm, $1*10^{-7}$ frm, $5*10^{-8}$, or $1*10^{-8}$ frm. The low electrical resistivity can be any value between the afore-mentioned electrical resistivity values (e.g., from about $1\times10^{-5}$ frm to about $1\times10^{-8}$ frm). The high thermal conductivity may be at least about 20 Watts per meters times Kelvin (W/mK), 50 W/mK, 100 W/mK, 150 W/mK, 200 W/mK, 205 W/mK, 300 W/mK, 350 W/mK, 400 W/mK, 450 W/mK, 500 W/mK, 550 W/mK, 600 W/mK, 700 W/mK, 800 W/mK, 900 W/mK, or 1000 W/mK. The high thermal conductivity can be any value between the afore-mentioned thermal conductivity values (e.g., from about 20 W/mK to about 1000 W/mK). The high density may be at least about 1.5 grams per cubic centimeter (g/cm$^3$), 2 g/cm$^3$, 3 g/cm$^3$, 4 g/cm$^3$, 5 g/cm$^3$, 6 g/cm$^3$, 7 g/cm$^3$, 8 g/cm$^3$, 9 g/cm$^3$, 10 g/cm$^3$, 11 g/cm$^3$, 12 g/cm$^3$, 13 g/cm$^3$, 14 g/cm$^3$, 15 g/cm$^3$, 16 g/cm$^3$, 17 g/cm$^3$, 18 g/cm$^3$, 19 g/cm$^3$, 20 g/cm$^3$, or 25 g/cm$^3$. The high density can be any value between the afore-mentioned density values (e.g., from about 1 g/cm$^3$ to about 25 g/cm$^3$).

At times, the metallic material (e.g., elemental metal or metal alloy) comprises small amounts of non-metallic materials, such as, for example, oxygen, sulfur, or nitrogen. In some cases, the metallic material can comprise the non-metallic material in a trace amount. A trace amount can be at most about 100000 parts per million (ppm), 10000 ppm, 1000 ppm, 500 ppm, 400 ppm, 200 ppm, 100 ppm, 50 ppm, 10 ppm, 5 ppm, or 1 ppm (based on weight, w/w) of non-metallic material. A trace amount can comprise at least about 10 ppt, 100 ppt, 1 ppb, 5 ppb, 10 ppb, 50 ppb, 100 ppb, 200 ppb, 400 ppb, 500 ppb, 1000 ppb, 1 ppm, 10 ppm, 100 ppm, 500 ppm, 1000 ppm, or 10000 ppm (based on weight, w/w) of non-metallic material. A trace amount can be any value between the afore-mentioned trace amounts (e.g., from about 10 parts per trillion (ppt) to about 100000 ppm, from about 1 ppb to about 100000 ppm, from about 1 ppm to about 10000 ppm, or from about 1 ppb to about 1000 ppm).

In some cases, the transformation process causes the transformed material to have a certain microstructure. The microstructure can include a porosity, surface roughness, melt pool structure and/or grain (e.g., crystal (e.g., dendrite)) structure. The microstructure can depend, in part, on the type of material and/or the printing process conditions. In some embodiments, multiple transformation operations are performed. At times, the multiple transformations change the microstructure of the transformed material. For example, a first transformation operation may transform a pre-transformed material (e.g., powder) to a first transformed (e.g., hardened) material, and a second transformation operation may transform the first transformed (e.g., hardened) material to a second transformed (e.g., hardened) material. The first transformed material may have different or (e.g., substantially) the same microstructure as the second transformed material. The transformation processes described herein can cause any microstructure changes consistent with those described in international patent application number PCT/US15/36802, filed Jun. 19, 2015, titled "APPARATUSES, SYSTEMS AND METHODS FOR THREE-DIMENSIONAL PRINTING;" international patent application number PCT/US16/34454, filed May 26, 2016, titled "THREE-DIMENSIONAL OBJECTS FORMED BY THREE-DIMENSIONAL PRINTING;" U.S. patent application Ser. No. 15/435,128, filed on Feb. 16, 2017, titled "ACCURATE THREE-DIMENSIONAL PRINTING;" international patent application number PCT/US17/18191, filed on Feb. 16, 2017, titled "ACCURATE THREE-DIMENSIONAL PRINTING;" European patent application number EP17156707.6, filed on Feb. 17, 2017, titled "ACCURATE THREE-DIMENSIONAL PRINTING;" and international patent application number PCT/US18/20406, filed Mar. 1, 2018, titled "THREE-DIMENSIONAL PRINTING OF THREE DIMENSIONAL OBJECTS," each of which is entirely incorporated herein by reference.

At times, the transformed material is in a malleable state. Malleable may be relative to a hardened (e.g., solid) state. The transformed material in the malleable state may be in softer (e.g., compared to a post-printed state of the transformed material (e.g., when the transformed material exposed to room temperature after the printing)). In some cases, the malleable state is a liquid (e.g., molten) or partially liquid (e.g., semi-liquid) state. A partially liquid state can be a state that is partially liquid and partially solid and/or gaseous. A semi-liquid state can be a state that is mostly (e.g., at least about 50% by volume) in a liquid state. In some cases, a transformed material in a partially liquid state comprises regions that are in liquid state and other regions that are in solid state (e.g., solid particles and/or solid outer surface). In some cases, a transformed material in a partially liquid state comprises regions that are in liquid state and other regions that are in gaseous state (e.g., vaporized). The partially liquid state may comprise a sintered material. The partially liquid state may comprise a partially molten material. The transformed material may be temporarily in the malleable state. For example, energy can be applied to the pre-transformed material (e.g., via energy beam(s)) until the pre-transformed material transforms to the malleable (e.g., molten) state. When the energy is removed from the transformed material, residual energy (e.g., in the form of heat) may dissipate away from the transformed material (e.g., cooling). The residual energy may dissipate into the atmosphere in the processing chamber and/or the material bed. The cooling can cause the transformed material to harden to the hardened (e.g., solid) state.

In some embodiments, the 3D object is a large object. In some embodiments, the 3D object is a small object. In some instances, the fundamental length scale (e.g., the diameter, spherical equivalent diameter, diameter of a bounding circle, or largest of height, width and length; abbreviated herein as "FLS") of the printed 3D object can be at least about 50 micrometers (μm), 80 μm, 100 μm, 120 μm, 150 μm, 170 μm, 200 μm, 230 μm, 250 μm, 270 μm, 300 μm, 400 μm, 500 μm, 600 μm, 700 μm, 800 μm, 1 millimeter (mm), 1.5 mm, 2 mm, 5 mm, 1 centimeter (cm), 1.5 cm, 2 cm, 10 cm, 20 cm, 30 cm, 40 cm, 50 cm, 60 cm, 70 cm, 80 cm, 90 cm, 1 meter (m), 2 m, 3 m, 4 m, 5 m, 10 m, 50 m, 80 m, or 100 m. The FLS of the printed 3D object can be at most about 1000 m, 500 m, 100 m, 80 m, 50 m, 10 m, 5 m, 4 m, 3 m, 2 m, 1 m, 90 cm, 80 cm, 60 cm, 50 cm, 40 cm, 30 cm, 20 cm, 10 cm, or 5 cm. In some cases, the FLS of the printed 3D object may be in between any of the afore-mentioned FLSs (e.g., from about 50 μm to about 1000 m, from about 120 μm to about 1000 m, from about 120 μm to about 10 m, from about 200 μm to about 1 m, from about 1 cm to about 100 m, from about 1 cm to about 1 m, from about 1 m to about 100 m, or from about 150 μm to about 10 m). The FLS (e.g., horizontal FLS) of the layer of hardened material may have any value listed herein for the FLS of the 3D object.

In some cases, the 3D object has a complex geometry (also referred to herein as "complex 3D object"). A complex geometry may comprise surfaces that are oriented at angles with respect to each other. A complex geometry may comprise a ledge or a cavity. A complex geometry may comprise a curved surface. Printing 3D object (e.g., having simple or complex geometries) can cause the 3D object to deform. In some embodiments, the 3D object has a simple geometry, which simple geometry may be a plank or a box. Deformation can comprise (e.g., undesirable) changes in a shape of the 3D object (e.g., compared to a requested geometry). Deformation can include bending (e.g., warping, curving, arching, curling, and/or twisting), balling, cracking, dislocating, expanding, shrinking, or any combination thereof. In some instances, the printing process may cause the 3D object to have inconsistent and/or unrequested material properties. For example, the printing process may affect the density (e.g., porosity) of the 3D object. In some instances, the printing process introduces pores (e.g., voids) in and/or on the surface of the material of the 3D object, thereby affecting its density (e.g., porosity). In some cases, the printing process affects a surface quality of the 3D object. The surface quality may be inconsistent (e.g., uneven). For example, the printing process may form a rougher surface on a first portion of the 3D object and a smoother (e.g., having lower roughness) surface on a second portion of 3D object. The inconsistent surface quality may or may not be requested (e.g., within a (e.g., pre-determined) tolerance). In some cases, the inconsistent surface quality may be at least partially attributed to by an orientation and/or a build angle of the 3D object during printing. Some techniques of addressing challenges associated with forming 3D objects having certain (e.g., complex) geometries are described in international patent application number PCT/US16/34454, filed May 26, 2016, titled "THREE-DIMENSIONAL OBJECTS FORMED BY THREE-DIMENSIONAL PRINTING;" international patent application number PCT/US16/34857, filed May 27, 2016, titled "THREE-DIMENSIONAL PRINTING AND THREE-DIMENSIONAL OBJECTS FORMED USING THE SAME;" international patent application number PCT/US16/66000, filed Dec. 9, 2016, titled "SKILLFUL THREE-DIMENSIONAL PRINTING;" international patent application number PCT/US17/54043, filed Sep. 28, 2017, titled "THREE-DIMENSIONAL OBJECTS AND THEIR FORMATION;" and international patent application number PCT/US18/20406, filed Mar. 1, 2018, titled "THREE-DIMENSIONAL PRINTING OF THREE DIMENSIONAL OBJECTS," each of which is entirely incorporated herein by reference.

Figure 3A:
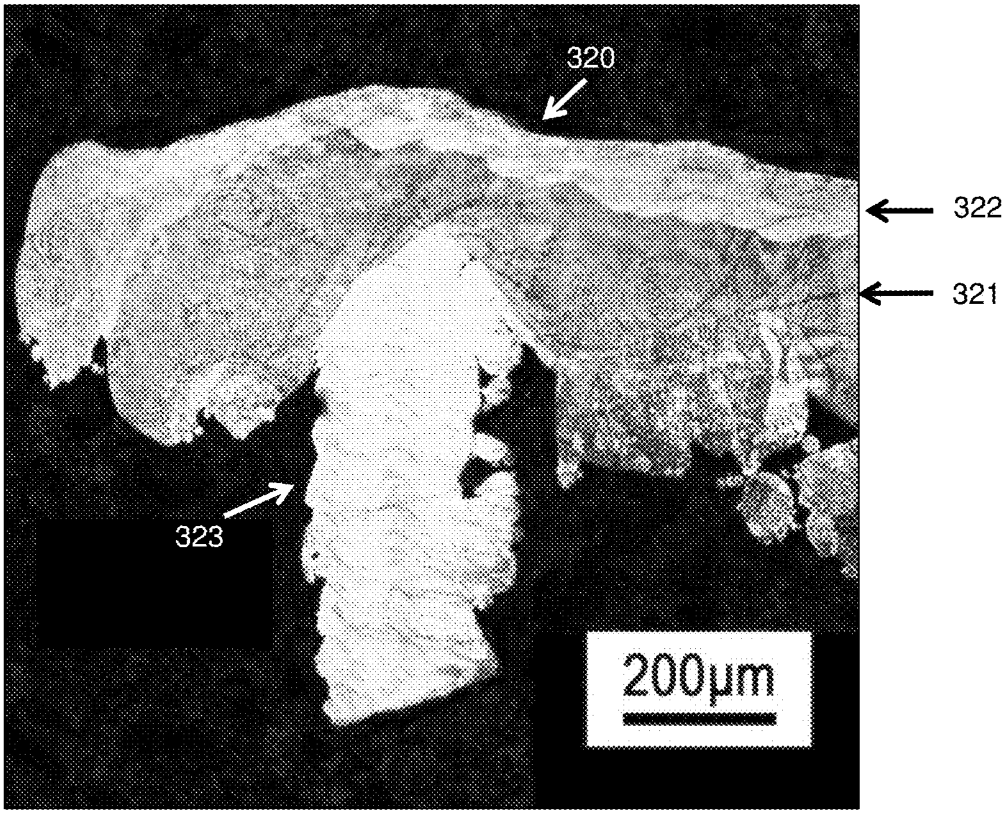
FIG. 3A shows a cross sectional view of a 3D object with a support member.
Figure 3B:
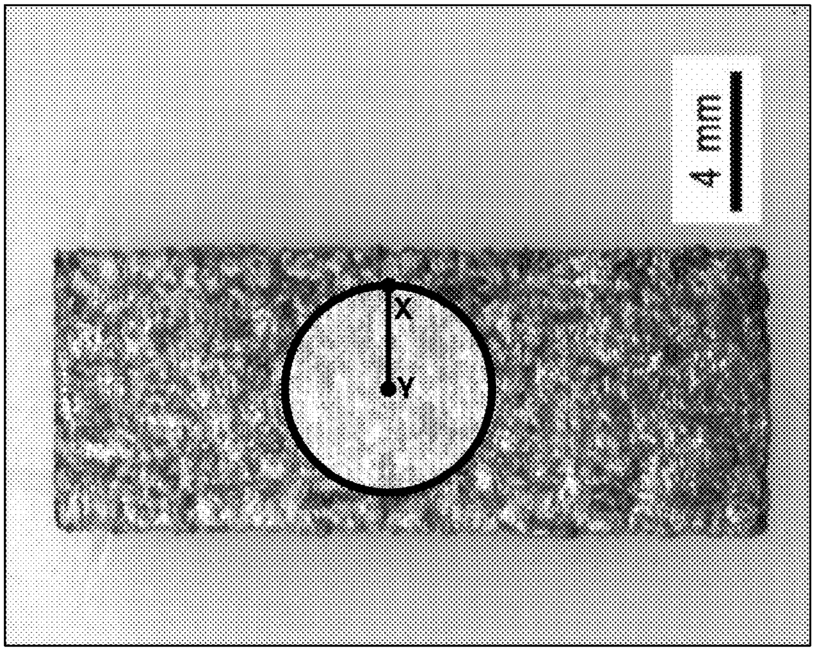
FIG. 3B schematically a horizontal view of a 3D object.
Figure 4A:
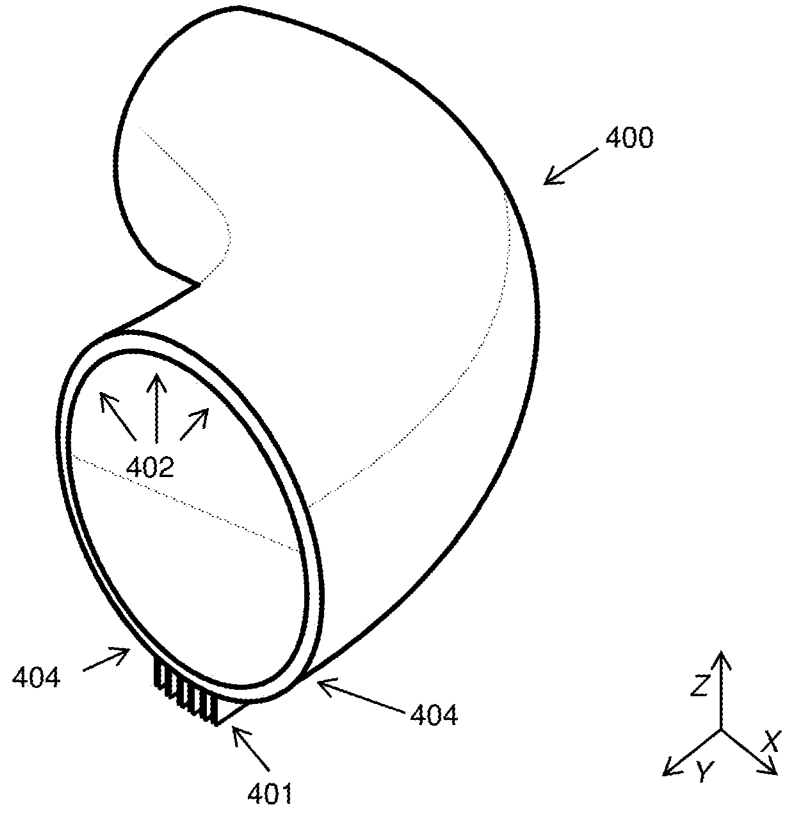
FIGS. 4A and 4B show perspective views of various 3D objects.
Figure 4B:
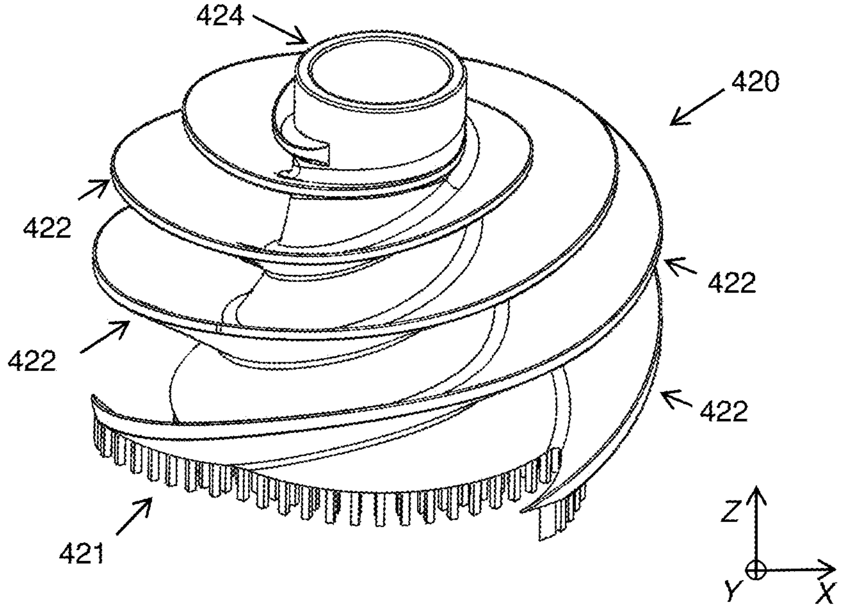

In some instances, the 3D object is supported by one or more supports (also referred to herein as "auxiliary supports") during printing. FIGS. 4A and 4B show examples of 3D objects having supports 401 and 421, respectively. The supports may (e.g., directly) couple the 3D object to the platform (e.g., to the base). The 3D object may have any number of supports. The supports may have any shape and size. In some examples, the supports comprise a rod, plate, wing, tube, shaft, pillar, or any combination thereof. In some cases, the supports support certain portions of the 3D object and does not support other portions of the 3D object. In some cases, the supports are (e.g., directly) coupled to a bottom surface the 3D object (e.g., relative to the platform). In some embodiments, the supports are anchored to the platform. In some examples, the supports are used to support portions of the 3D object having a certain (e.g., complex or simple) geometry. In some cases, the supports (or a portion thereof) are removed from the 3D object after printing. Removal can comprise machining (e.g., cutting, sawing and/or milling), polishing (e.g., sanding) and/or etching. Removal can comprise beam (e.g., laser) etching or chemical etching. In some cases, the supports (or a portion thereof) remain in and/or on the 3D object after printing. In some cases, the one or more supports leave respective one or more support marks on the 3D object that are indicative of a presence or removal of the one or more supports. FIG. 3A shows an example of a vertical cross section of a 3D object that includes a main portion 320 coupled with a support 323. In some cases, the main portion comprises multiple layers (e.g., 321 and 322) that were sequentially added (e.g., after formation of the support) during a printing operation. In some cases, the support causes one or more layers of the portion of the 3D object to deform during printing. Sometimes, the deformed layers form a detectable (e.g., visible) mark. The mark may be a region of discontinuity in the layer, such as a microstructure discontinuity and/or an abrupt microstructural variation (e.g., FIG. 3A). The discontinuity in the microstructure may be explained by an inclusion of a foreign object (e.g., the support). The microstructural variation may include (e.g., abruptly) altered melt pools and/or grain structure (e.g., crystals, e.g., dendrites) at or near the attachment point of the support. The microstructure variation may be due to differential thermal gradients due to the presence of the support. The microstructure variation may be due to a forced melt pool and/or layer geometry due to the presence of the support. The discontinuity may be at an external surface of the 3D object. The discontinuity may arise from inclusion of the support to the surface of the 3D object (e.g. and may be visible as a breakage of the support when removed from the 3D object (e.g., after printing). In some instances, the 3D object includes two or more support and/or support marks. If more than one support is used, the supports may be spaced apart by a (e.g., pre-determined) distance. FIG. 3B shows an example 3D object having points X and Y on a surface of the 3D object. In some embodiments, X is spaced apart from Y by a support spacing distance. For example, a sphere of radius XY that is centered at X may lack one or more supports (or one or more support marks).

In some embodiments, the 3D object includes one or more auxiliary features. The auxiliary feature(s) can be supported by the material (e.g., powder) bed. The term "auxiliary support," as used herein, generally refers to one or more features that are part of a printed 3D object, but are not part of the desired, intended, designed, ordered, modeled, or final 3D object. Auxiliary features (e.g., auxiliary supports) may provide structural support during and/or after the formation of the 3D object. Auxiliary support may enable the removal or energy from the 3D object that is being formed. Examples of auxiliary support comprise heat fin, wire, anchor, handle, pillar, column, frame, footing, scaffold, flange, projection, protrusion, mold, or other stabilization features that are not part of the requested 3D object. In some instances, the auxiliary support is a scaffold that encloses the 3D object or part thereof. The scaffold may comprise lightly sintered or lightly fused pre-transformed (e.g., powder) material. The 3D object can have auxiliary support that can be supported by the material bed (e.g., powder bed) and not touch the platform (e.g., base, substrate or enclosure bottom), and/or container accommodating the material bed. The 3D part (3D object) in a complete or partially formed state can be completely supported by the material bed (e.g., suspended anchorlessly in the material bed without contacting the platform and/or container accommodating the material bed). During formation, at least a portion of the 3D object (e.g., in a complete or partially formed state) can be completely supported by the material bed (e.g., without touching anything except the material bed). During formation, at least a portion of the 3D object (e.g., any portion thereof, e.g., a ledge or a cavity ceiling) can be suspended in the material bed without resting on any additional support structures. During formation, at least a portion of the 3D object (e.g., a nascent 3D object or a portion thereof) can freely float (e.g., anchorlessly) in the material bed. During formation, the 3D object may not be anchored (e.g., connected) to the platform and/or walls that define the material bed. During formation, at least a portion of the 3D object (e.g., the entire 3D object) may not touch (e.g., contact) the platform and/or walls that define the material bed. During formation, at least a portion of the 3D object be suspended (e.g., float) anchorlessly in the material bed. The scaffold may comprise a continuously sintered (e.g., lightly sintered) structure that is at most 1 millimeter (mm), 2 mm, 5 mm or 10 mm. The scaffold may comprise a continuously sintered structure that is at least 1 millimeter (mm), 2 mm, 5 mm or 10 mm. The scaffold may comprise a continuously sintered structure having dimensions between any of the afore-mentioned dimensions (e.g., from about 1 mm to about 10 mm, or from about 1 mm to about 5 mm). The supporting scaffold may engulf the 3D object. The supporting scaffold may float anchorlessly in the material bed. The scaffold may comprise a lightly sintered structure. In some examples, the 3D object may be printed without a supporting scaffold.

In some cases, the 3D object comprises an overhang structure. An overhang structure (also referred to herein as "overhang" or "overhang region") can refer to a portion of a 3D object that protrudes a distance from previously-transformed portion of the 3D object. The previously-transformed portion may be a portion of the 3D object that is hardened (e.g., solidified or partially solidified). The previously-transformed portion may be referred to herein as a "rigid portion." In some cases, at least a fraction of the previously-transformed portion is formed using a hatching energy beam, as described herein. An overhang structure may comprise (e.g., correspond to) a ceiling (e.g., cavity ceiling), bottom (e.g., cavity bottom), protrusion, ledge, blade, wing, hanging structure, undercut, projection, protuberance, balcony, wing, leaf, extension, shelf, jut, hook, or step of a 3D object. The overhang may be a ledge off an edge of a previously-transformed portion of the 3D object. The overhang may be free of supports during printing. For example, the overhang may be formed on (e.g., attached to) a previously-transformed portion of the 3D object. A non-supported overhang may be referred to as "free-floating" in that the overhang may "float" anchorlessly within pre-transformed material (e.g., powder) during printing. A non-supported overhang may be referred to as "non-anchored" in that the overhang may not be directly connected to the platform. The previously-transformed portion may comprise one or more supports (e.g., that are coupled with the platform). The overhand may be connected to another portion of the 3D object in one of its sides (e.g., and otherwise not anchored or connected). A surface (e.g., bottom surface) of an overhang may have a surface roughness at or below a prescribed roughness measurement (e.g., as described herein).

In some examples, an overhang corresponds to certain regions of a 3D object. FIG. 4A shows an example of a perspective view an object 400 having a toroid shape (including a support 401, which may be removed from the object, e.g., after the printing). An overhang can include (e.g., correspond to) a cavity ceiling (e.g., 402) and/or a cavity bottom (e.g., 404) of the object. The overhang (e.g., cavity ceiling and/or cavity bottom) may be free auxiliary supports during the printing. For example, the overhang may be supported by (e.g., coupled to) a previously transformed (e.g., hardened) material of the (e.g., requested) object, during the printing. FIG. 4B shows an example of a perspective view of an object 420 having an impeller shape (including a support 421, which may be removed from the 3D object, e.g., after its printing). An overhang can include (e.g., correspond to) a bottom portion (e.g., bottom surface) of a ledge (e.g., 322) (e.g., blade) of the object. The overhang (e.g., ledge or blade) may be free of auxiliary supports during its printing. For example, the overhang may be supported by previously-transformed (e.g., hardened) material of the object and/or the material bed (e.g., powder) during its printing. The overhang may be supported at only one of its sides (e.g., at the hub 424 of the impeller 420) during its printing. Printing process parameters, such as one or more characteristics of the energy beam(s) (e.g., power/energy, power density at the target surface, dwell time, scan speed, focus, and/or beam width), may be adjusted depending on whether the overhang being printed is at a shallow, steep or intermediate angle relative to the target surface, layering plane, and/or a direction perpendicular to the direction of build, in order to reduce (e.g., eliminate) deformation of the overhang and/or other portion of the object. For example, the one or more controllers of the printer may be configured to provide different instructions for printing different portions of the example object 400 of FIG. 4A and/or the example object 420 of FIG. 4B. In some cases, the one or more controllers are configured to provide (e.g., substantially) the same instructions for printing different portions of the example object 400 of FIG. 4A and/or the example object 420 of FIG. 4B.

Figure 5A:
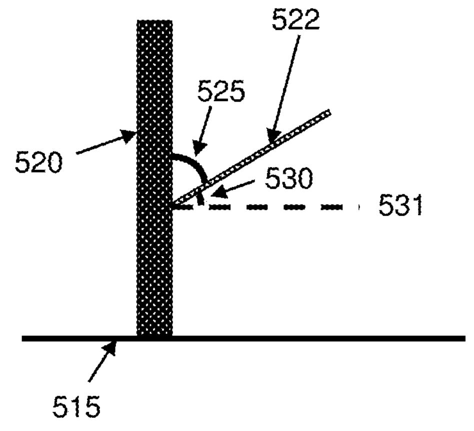
FIG. 5A schematically illustrates a vertical cross section of a 3D object.

In some embodiments, the overhang if formed on a previously-transformed portion (also referred to herein as rigid portion) of the object. FIG. 5A shows an example schematic depiction of an overhang 522 connected to a rigid portion 520. The rigid portion may be connected (e.g., anchored) to a platform (e.g., FIG. 5A, 515) (e.g., base of the platform). The overhang may be printed without auxiliary supports other than the connection to the one or more rigid portions (e.g., that are part of the 3D object). The overhang may be formed at an angle (e.g., FIG. 5A, 530) with respect to the build plane and/or platform (e.g., FIG. 5A, 515). The overhang and/or the rigid portion may be formed from the same or different pre-transformed material (e.g., powder). The overhang can form a first angle (e.g., FIG. 5A, 525) with respect to the rigid portion (e.g., FIG. 5A, 520). The overhang can form a second angle (e.g., FIG. 5A, 530) with respect to a plane (e.g., FIG. 5A, 531) that is (e.g., substantially) parallel with the support surface of the platform, to the layering plane, and/or a normal to the layering vector (e.g., were the layer refer to the layerwise deposition of the transformed material to form the 3D object). In some embodiments, a plane (e.g., FIG. 5A, 531) that is (e.g., substantially) parallel with the support surface of the platform corresponds to a layering plane.

Figure 5B:
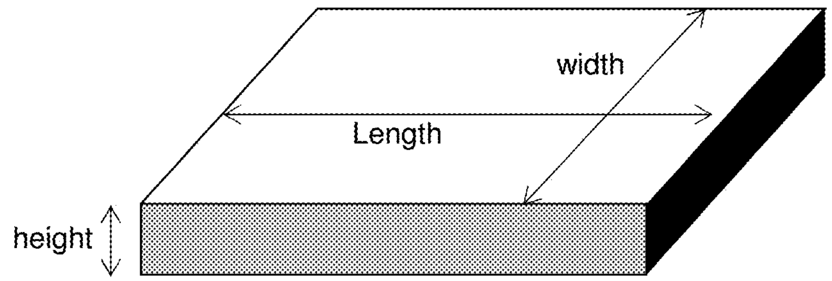
FIG. 5B schematically illustrates an example of a 3D plane.

In some embodiments, 3D printing methodologies are employed for printing at least one 3D object that is substantially two-dimensional, such as a wire or a planar object. The 3D object may comprise a plane like structure (referred to herein as "planar object," "three-dimensional plane," or "3D plane"). The 3D plane may have a relatively small thickness as opposed to a relatively large surface area. The 3D plane may have a relatively small height relative to its width and length. For example, the 3D plane may have a small height relative to a large horizontal plane. FIG. 5B shows an example of a 3D plane that is substantially planar (e.g., flat). The 3D plane may be planar, curved, or assume an amorphous 3D shape. The 3D plane may be a strip, a blade, or a ledge. The 3D plane may comprise a curvature. The 3D plane may be curved. The 3D plane may be planar (e.g., flat). The 3D plane may have a shape of a curving scarf. The term "3D plane" is understood herein to be a generic (e.g., curved) 3D surface. For example, the 3D plane may be a curved 3D surface. The one or more layers within the 3D object may be substantially planar (e.g., flat). The planarity of a surface or a boundary the layer may be (e.g., substantially) uniform. Substantially uniform may be relative to the intended purpose of the 3D object. The height of the layer at a position may be compared to an average layering plane. The layering plane can refer to a plane at which a layer of the 3D object is (e.g., substantially) oriented during printing. A boundary between two adjacent (printed) layers of hardened material of the 3D object may define a layering plane. The boundary may be apparent by, for example, one or more melt pool terminuses (e.g., bottom or top). A 3D object may include a plurality of layering planes (e.g., with each layering plane corresponding to each layer). In some embodiments, the layering planes are (e.g., substantially) parallel to one another. An average layering plane may be defined by a linear regression analysis (e.g., least squares planar fit of the top-most part of the surface of the layer of hardened material). An average layering plane may be a plane calculated by averaging the material height at each selected point on the top surface of the layer of hardened material. The selected points may be within a specified region of the 3D object. The deviation from any point at the surface of the planar layer of hardened material may be at most 20% 15%, 10%, 5%, 3%, 1%, or 0.5% of the height (e.g., thickness) of the layer of hardened material.

In some cases, the 3D object includes a skin. The skin can correspond to a portion of the 3D object that includes an exterior surface of the 3D object. The skin may be referred to herein as an "outer portion," or "exterior portion" of the 3D object. In some embodiments, the skin is a "bottom" skin, which can correspond to a skin on a bottom of overhang with respect to a platform surface during a printing operation. In some cases, the bottom skin of an overhang has a different surface quality than other portions of the 3D object. The surface quality can include a surface roughness, appearance, reflectivity, specularity, and/or shininess. Techniques for controlling a surface quality of a bottom skin of an overhang are described herein.

Figure 5C:
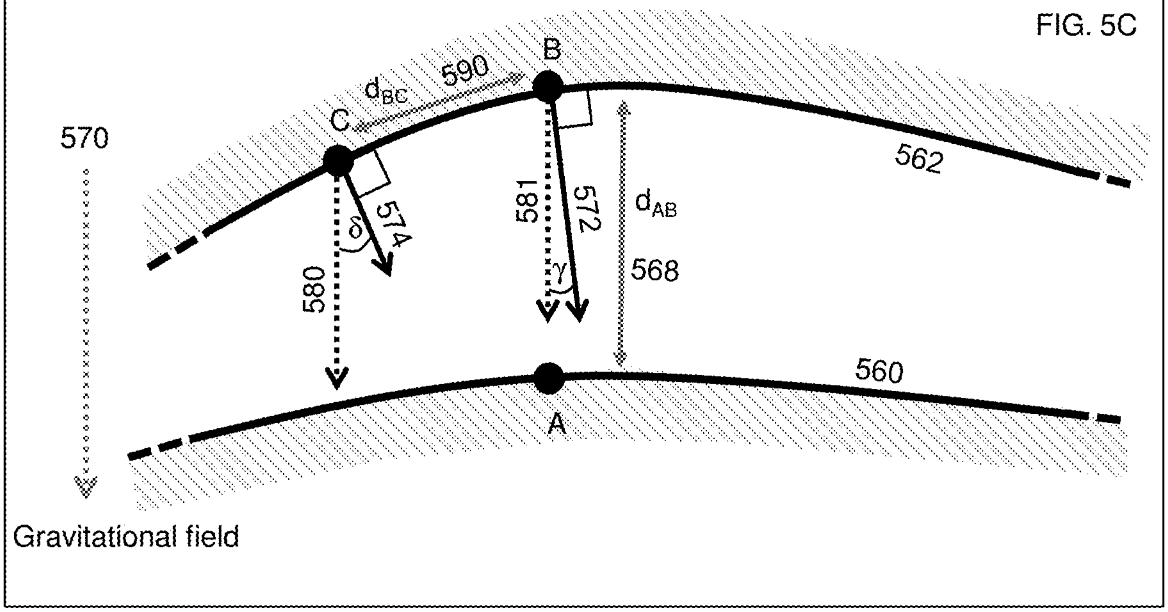
FIG. 5C schematically illustrates a vertical cross section in portion of a 3D object.

In some cases, the overhang is formed in the material bed in relation to the pre-transformed material (e.g., powder). FIG. 5C shows an example of a first (e.g., top) surface 560 and a second (e.g., bottom) surface 562. At least a portion of the first and second surfaces are separated by a gap. At least a portion of the first surface is separated by at least a portion of the second surface (e.g., to constitute a gap). The gap may be filled with pre-transformed or transformed (e.g., and subsequently hardened) material, e.g., during the formation of the 3D object. The gap can comprise pre-transformed material during the printing. The gap may comprise a gas after the printing. The second surface may be a bottom skin layer. FIG. 5C shows an example of a vertical gap distance 568 that separates the first surface 560 from the second surface 562. The vertical gap distance may be equal to the vertical distance of the gap as disclosed herein. A point A (e.g., in FIG. 5C) may reside on the top surface of the first portion. A point B (e.g., in FIG. 5C) may reside on the bottom surface of the second portion. The second portion may be a cavity ceiling or hanging structure (e.g., ledge or overhang) as part of the 3D object. The point B may reside above point A. The gap may be the (e.g., shortest) distance (e.g., vertical distance) between points A and B. FIG. 5C shows an example of the gap 568 that constitutes the shortest distance dAB between points A and B. There may be a first normal to the bottom surface of the second portion at point B. FIG. 5C shows an example of a first normal 572 to the surface 562 at point B. The angle between the first normal 572 and a direction of the gravitational acceleration vector 570 (e.g., direction of the gravitational field) may be any angle γ. A point C (e.g., in FIG. 5C) may reside on the bottom surface of the second portion. There may be a second normal to the bottom surface of the second portion at point C. FIG. 5C shows an example of the second normal 574 to the surface 562 at point C. The angle between the second normal 574 and the direction of the gravitational acceleration vector 570 may be any angle δ. Vectors 580, and 581 are parallel to the gravitational acceleration vector 570. The angles γ and δ may be the same or different. The angle between the first normal 572 and/or the second normal 574 to the direction of the gravitational acceleration vector 570 may be any angle. The angle between the first normal 572 and/or the second normal 574 with respect to the normal to the substrate (e.g., platform) may be any angle. The angle between the first normal 572 and/or the second normal 574 with respect to the normal to the substrate (e.g., platform) may be any angle disclosed herein for the angled structure. The angles γ and δ may be any angle. The angles γ and δ may be any of any angled structure (e.g., acute, or obtuse). For example, the angle between the first normal (e.g., FIG. 5C, 572) and the second normal (e.g., FIG. 5C, 574) may be at most about 45 degrees (°), 40°, 30°, 20°, 10°, 5°, 3°, 2°, 1°, or 0.5°. The shortest distance between points B and C may be any value of the auxiliary support feature spacing distance mentioned herein. For example, the shortest distance BC (e.g., dBc) may be at least about 0.1 millimeters (mm), 0.5 mm, 1 mm, 1.5 mm, 2 mm, 3 mm, 4 mm, 5 mm, 10 mm, 15 mm, 20 mm, 25 mm, 30 mm 35 mm, 40 mm, 50 mm, 100 mm, 200 mm, 300 mm, 400 mm, or 500 mm. As another example, the shortest distance BC may be at most about 500 mm, 400 mm, 300 mm, 200 mm, 100 mm, 50 mm, 40 mm, 35 mm, 30 mm, 25 mm, 20 mm, 15 mm, 10 mm, 5 mm, 4 mm, 3 mm, 2 mm, 1.5 mm, 1 mm, 0.5 mm, or 0.1 mm. FIG. 5C shows an example of the shortest distance BC (e.g., 590, dBc). The bottom skin layer may be the first surface and/or the second surface. The bottom skin layer may be the first formed layer of the 3D object. The bottom skin layer may be the first formed hanging layer in the 3D object (e.g., that is separated by a gap from a previously-transformed portion (e.g., previously-transformed layer) of the 3D object). The vertical distance of the gap may be at least about 30 μm, 35 μm, 40 μm, 50 μm, 60 μm, 70 μm, 80 μm, 90 μm, 100 μm, 150 μm, 200 μm, 0.05 mm, 0.1 mm, 0.25 mm, 0.5 mm, 1 mm, 2 mm, 3 mm, 4 mm, 5 mm, 6 mm, 7 mm, 8 mm, 9 mm, or 10 mm. The vertical distance of the gap may be at most about 0.05 mm, 0.1 mm, 0.25 mm, 0.5 mm, 1 mm, 2 mm, 3 mm, 4 mm, 5 mm, 6 mm, 7 mm, 8 mm, 9 mm, 10 mm, or 20 mm. The vertical distance of the gap may be any value between the afore-mentioned values (e.g., from about 30 μm to about 200 μm, from about 100 μm to about 200 μm, from about 30 μm to about 100 mm, from about 80 mm to about 150 mm, from about 0.05 mm to about 20 mm, from about 0.05 mm to about 0.5 mm, from about 0.2 mm to about 3 mm, from about 0.1 mm to about 10 mm, or from about 3 mm to about 20 mm).

Figure 6A:
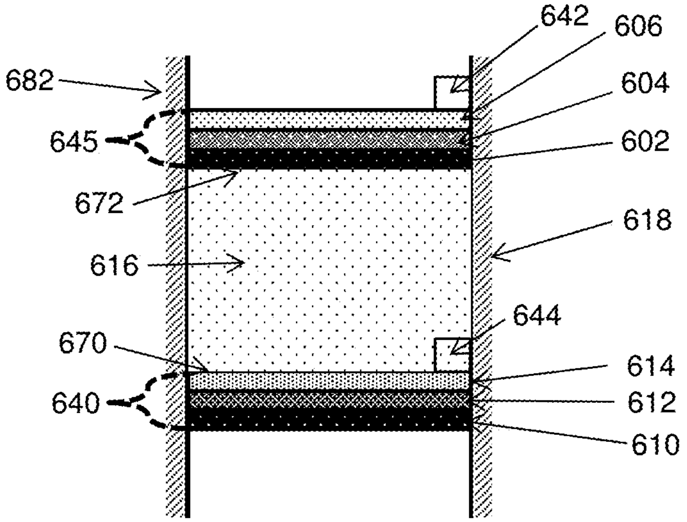
FIGS. 6A-6C schematically illustrate a vertical cross section in portion of a 3D object.
Figure 6B:
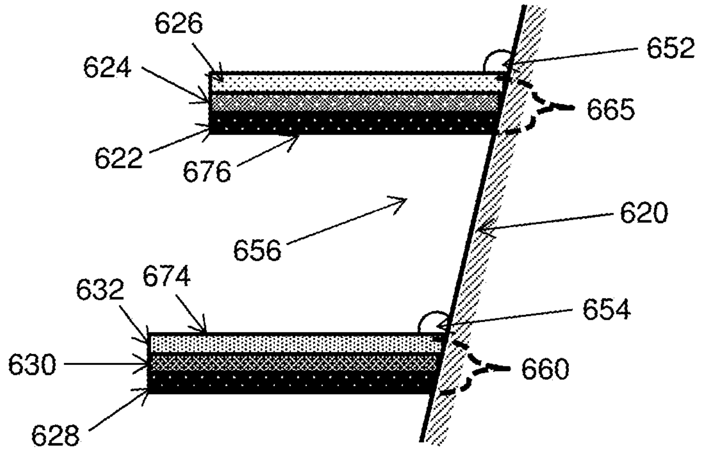
Figure 6C:
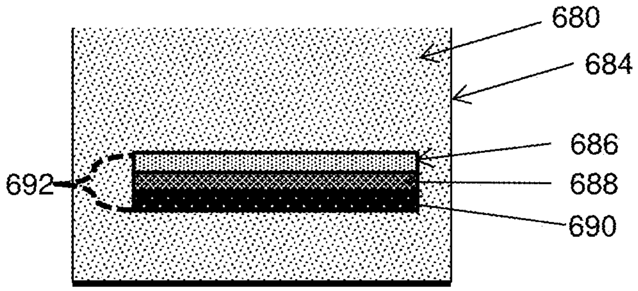

In some cases, a 3D object comprises a plurality of bottom skin layers (e.g., bottoms of turbine blades). A 3D object may comprise one or more structures such as cavities, gaps, wires, ledges, or 3D planes. A 3D plane may have a relatively small width compared to a relatively large surface area. A 3D plane may have a relatively small height relative to its width and length. For example, the 3D plane may have a small height relative to a large horizontal plane. The 3D plane may be planar, curved, or assume an amorphous 3D shape. The 3D plane may be a strip, a blade, or a ledge. The 3D plane may comprise a curvature. The 3D plane may be curved. The 3D plane may be planar (e.g., flat). The 3D plane may have a shape of a curving scarf. The term "3D plane" is understood herein to be a generic (e.g., curved) 3D surface. For example, the 3D plane may be a curved 3D surface. A structure within a forming 3D object may comprise a bottom skin layer (e.g., that is formed above a pre-transformed material without auxiliary support, or with spaced apart auxiliary supports). At times, at least two of the structures may have similar geometry. At times, at least two of the structures may have a different geometry. At times, the one of the structures may connect portions of the 3D object. At times, the structures may be separated by a gap. For example, multiple blades of a turbine may be (e.g., vertically) separated by a gap between a first blade portion and a second blade portion. For example, a first portion (e.g., a blade structure) of the 3D object (e.g., a turbine) may comprise a first bottom skin layer followed by one or more layers that form the first portion, and a second portion (e.g., a second blade structure) of the 3D object (e.g., a turbine) may comprise a second bottom skin layer followed by one or more layers that form the second portion of the 3D object. At times, the first portion and the second portion of the 3D object may be connected by a third portion (e.g., a ledge) to form the 3D object. FIGS. 6A-6B show vertical cross-sectional examples of a first portion and/or a second portion of a 3D object that are connected to one or more rigid portions. FIG. 6C shows an example of a first portion of a 3D object, which first portion comprises a bottom skin layer, that is not connected to a rigid portion, and that is suspended anchorlessly in the material bed (e.g., at least during its formation). FIG. 6A shows an example of a first portion 640 and a second portion 645 of a 3D object disposed at an angle perpendicular (e.g., 90 degrees, 642, 644) to at least one rigid portion of the 3D object (e.g., FIG. 6A, two rigid portions 618, and 682). FIG. 6B shows an example of a first portion 660 and a second portion 665 of a 3D object (e.g., two blades of a propeller) forming angles 652 and 654 that are not perpendicular to the rigid portion 620 of the 3D object. At times, the first portion and the second portion may not be connected to a portion of the 3D object (e.g., to a rigid portion). The first portion may comprise one or more layers (e.g. FIG. 6B, 610, 612, 614, 628, 630, and 632). The second portion may comprise one or more layers (e.g., FIG. 6B, 602, 604, 606, 622, 624, and 626). The layer may include pre-transformed material (e.g., particulate material). The layer may include transformed (e.g., hardened) material. The first layer for the first and/or second portions of the 3D object may be a bottom skin layer (e.g., 602, 610, 622, and 628). The bottom skin layer (e.g., 690, 628, 676, 610, and 602) may be a transformed material layer. At times, the bottom skin layer may be parallel to the target surface (e.g., exposed surface of the material bed). At times, the bottom skin layer may be at an angle (e.g., a shallow angle, steep angle, or an intermediate angle) relative to the target surface (e.g., an exposed surface of the material bed and/or the support surface of the platform) and/or a (e.g., average) layering plane of the object. The angle may be an acute angle. Shallow angle may be at most about 0°, 1°, 2°, 5°, 10°, 15°, 20°, 25°, 30°, or 35°. Shallow angle may be any angle between the afore-mentioned values (e.g., from about 0° to about 35°, from about 0° to about 10°, from about 10° to about 25°, or from about 25° to about 35°) relative to the target surface and/or a (e.g., average) layering plane of the object. Intermediate angle may be at least about 25°, 30°, 35°, 40°, 45°, 50°, 55°, or 60° relative to the target surface and/or a (e.g., average) layering plane of the object. Intermediate angle may be at most about 25°, 30°, 35°, 40°, 45°, 50°, 55°, or 60° relative to the target surface and/or a (e.g., average) layering plane of the object. Intermediate angle may be any angle between the afore-mentioned values (e.g., from about 25° to about 60°, from about 25° to about 35°, from about 35° to about 50°, or from about 50° to about 60°) relative to the target surface and/or a (e.g., average) layering plane of the object. Steep angle may be at least about 45°, 50°, 55°, 60°, 65°, 70°, 75°, 80°, 85°, or 90° relative to the target surface and/or a (e.g., average) layering plane of the object. Steep angle may be any angle between the afore-mentioned values (e.g., from about 45° to about 90°, from about 45° to about 60°, from about 60° to about 75°, or from about 75° to about 90°) relative to the target surface and/or a (e.g., average) layering plane of the object. The bottom skin layer may comprise a top surface and a bottom surface. The bottom skin layer may be a wire or a ledge or have a planar surface. At least a fraction of the first portion (e.g., the top surface of the top layer, 670) and a fraction of the second portion (e.g., FIG. 6A, the bottom surface of the bottom skin layer, 672) may be separated by pre-transformed material (e.g., FIG. 6A, 616), e.g., during their formation. At least a fraction of the first portion (e.g., FIG. 6B, the top surface of the top layer, 674) and a portion of the second portion (e.g., FIG. 6B, the bottom surface of the bottom skin layer, 676) may be separated by a gap (e.g., FIG. 6B, 656), e.g., during their formation. The gap may be filled with pre-transformed material and may be transformed (e.g., subsequently hardened) during the formation of the 3D object. FIG. 6C shows an example of a portion 692 of a 3D object, which portion comprises a bottom skin layer 690, that is not connected to a rigid portion. The portion of the 3D object may be formed in a material bed (e.g., FIG. 6C, 680) within an enclosure (e.g., FIG. 6C, 684). The portion of the 3D object may comprise one or more layers formed adjacent to (e.g., above) the bottom skin layer (e.g., FIG. 6C, 686 or 688). The bottom skin layer may be floating (e.g., suspended) anchorlessly within the material bed. The bottom skin layer and/or the one or more layers adjacent to the bottom skin layer may be unconnected to a rigid portion. The bottom skin layer may be formed using any 3D printing methodologies described herein.

In some instances, the overhang is coupled with (e.g., formed on) a previously-transformed portion of the 3D object. The previously-transformed portion corresponds to transformed material (e.g., by transforming pre-transformed material (e.g., powder)). In some cases, the previously-transformed portion is hardened (e.g., rigid). The previously-transformed may be referred to herein as a "rigid portion." In some cases, the previously-transformed portion is an interior portion (also referred to herein as a "core" or "internal portion") of a 3D object. The previously-transformed portion may be formed using any methodology described herein (e.g., hatching). The rigid portion may provide support for formation of an additional portion of the 3D object (e.g., an overhang). The rigid portion may or may not be a part of the requested 3D object. In some cases, the rigid portion may not yield (e.g., not substantially, e.g., not detectably yield), to a force exerted upon it by forming an overhang (or a portion of the overhang) thereon (e.g., gravity and/or forces due to: contraction and/or expansion of the material). The rigid portion may not deform (e.g., not substantially and/or not detectably deform), e.g., upon forming an additional rigid portion thereon (e.g., to thicken the overhang). The rigid portion may cause minimal defects (e.g., not substantially or not detectably form defects), e.g., upon forming the overhang and/or additional rigid portion thereon. Substantially may be relative to the intended purpose of the 3D object. In some embodiments, the rigid portion may have a geometry (e.g., thickness) great enough to resist stress (e.g., upon forming the overhang and/or additional rigid portion thereon). The rigid portion may have a thickness (e.g., height or depth, e.g., as shown in FIG. 5B) of at least about 0.6 millimeters (mm), 0.8 mm, 1.0 mm, 1.1 mm, 1.2 mm, 1.3 mm, 1.4 mm, 1.5 mm, 1.6 mm, 1.8 mm, 2.0 mm, 2.2 mm, 2.6 mm, 5.0 mm, 10 mm, 20 mm, 50 mm, or 100 mm. Thickness of the rigid portion may be in a range between any of the aforementioned values (e.g., from about 1.0 mm to about 100 mm, from about 0.6 mm to about 2.6 mm, from about 0.8 mm to about 2.0 mm, from about 1 mm, to about 1.8 mm, from about 1.2 mm to about 1.6 mm, from about 1.2 mm to about 5.0 mm, from about 5.0 mm to about 20 mm, or from about 20 mm to about 100 mm).

In some cases, the 3D object (e.g., once an object is removed from printer) comprises one or more characteristics that indicate the orientation of the object during printing. These characteristic(s) may be used to determine (e.g., infer) the location of overhangs of the object during its printing. For example, the object may comprise support marks, as described herein, that may indicate a "bottom" of the object during printing. In some cases, the object may include features (e.g., transition lines, surface steps, melt pools, grain boundaries, and/or layer markings) that indicate the orientation of one or more layers of the object during printing. In some instances, the "top" and "bottom" surfaces of the object, as oriented in the printer, will have different surface qualities (e.g., roughness). In some cases, the orientation of the object during printing can be determined (e.g., inferred) by hatch patterns indicative of changes in a direction of the energy beam(s) path(s). In some instances, the object includes lines corresponding to borders between tessellations, which may indicate the orientation of portions of the object. Some techniques for determining an orientation of an object are described in international patent application number PCT/US18/20406, filed Mar. 1, 2018, titled "THREE-DIMENSIONAL PRINTING OF THREE DIMENSIONAL OBJECTS," which is entirely incorporated herein by reference.

Figure 7A:
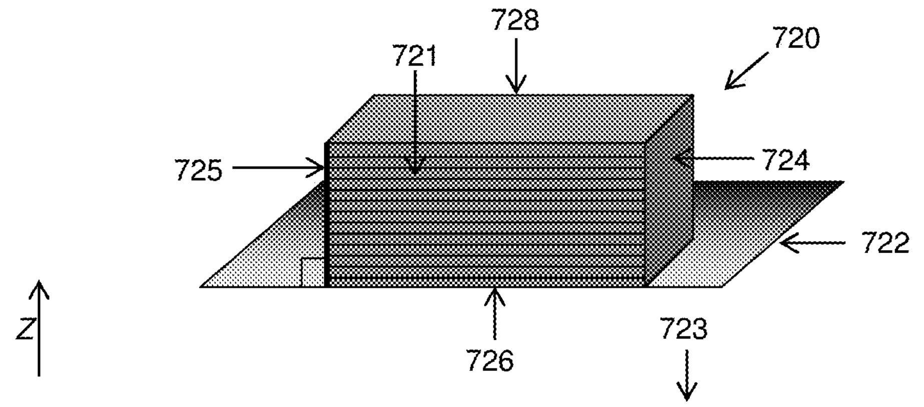
FIGS. 7A and 7B show perspective views of 3D objects.
Figure 7B:
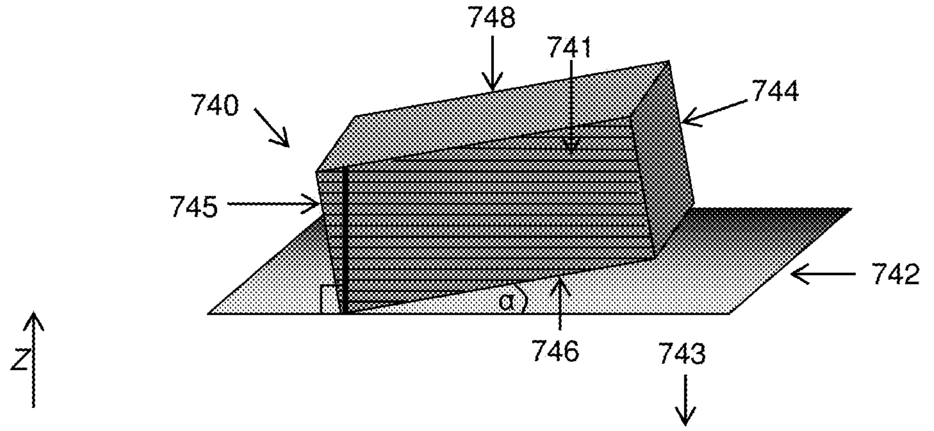

In some cases, characteristics of an object can be used to determine one or more layering planes. An average layering plane may correspond to a layer of transformed material that is deposited as part of the layerwise deposition process to print the 3D object. A layering plane can correspond to a (e.g., imaginary) plane that is (e.g., substantially) parallel to a layer of the 3D objects. A 3D object can have multiple layering planes. In some embodiments, a layering plane is (e.g., substantially) parallel to the support surface of the platform. The layering plane may be at an angle with respect to a surface of the 3D object. The angle may reveal the angle at which the object (or a portion of the object) was oriented with respect to the surface of the build platform and/or gravitational field vector. FIG. 7A shows an example 3D object 720 that is formed (e.g., substantially) horizontally on a support surface 722 of a platform. The layers of hardened material can be (e.g., substantially) parallel with respect to each other. Adjacent layers of hardened material may be integrally coupled with (e.g., chemically (e.g., metallically) bonded) with each other during the transformation (e.g., melting and/or sintering) process. A layering plane of the 3D object can be (e.g., substantially) parallel to one of the layers of hardened material (e.g., FIG. 7A, 721) of the 3D object. The one or more layering planes can be (e.g., substantially) parallel with the platform support surface (e.g., FIG. 7A, 722) and/or (e.g., substantially) orthogonal with respect to the gravity vector (e.g., FIG. 7A, 723). In some cases, a layering plane is (e.g., substantially) parallel with respect to a bottom surface (e.g., FIG. 7A, 726) and/or a top surface (e.g., FIG. 7A, 728) of the 3D object. A layering plane may be oriented (e.g., substantially) orthogonal with respect to a side surface (e.g., 724 or 725) of the 3D object. FIG. 7B shows an example of a 3D object 740 having layers of hardened material 741 formed at an angle alpha (α) relative to the surface of a platform 742 and/or an angle of 90 degrees plus alpha (α) with respect to the gravity vector 743. A layering plane may be at the angle alpha (e.g., FIG. 7B, α) with respect to the platform support surface (e.g., FIG. 7B, 742) and/or (e.g., substantially) orthogonal with respect to the gravity vector (e.g., FIG. 7B, 743). In some cases, a layering plane is non-parallel with respect to a bottom surface (e.g., FIG. 7B, 746) and/or a top surface (e.g., FIG. 7B, 748) of the 3D object.

Figure 7C:
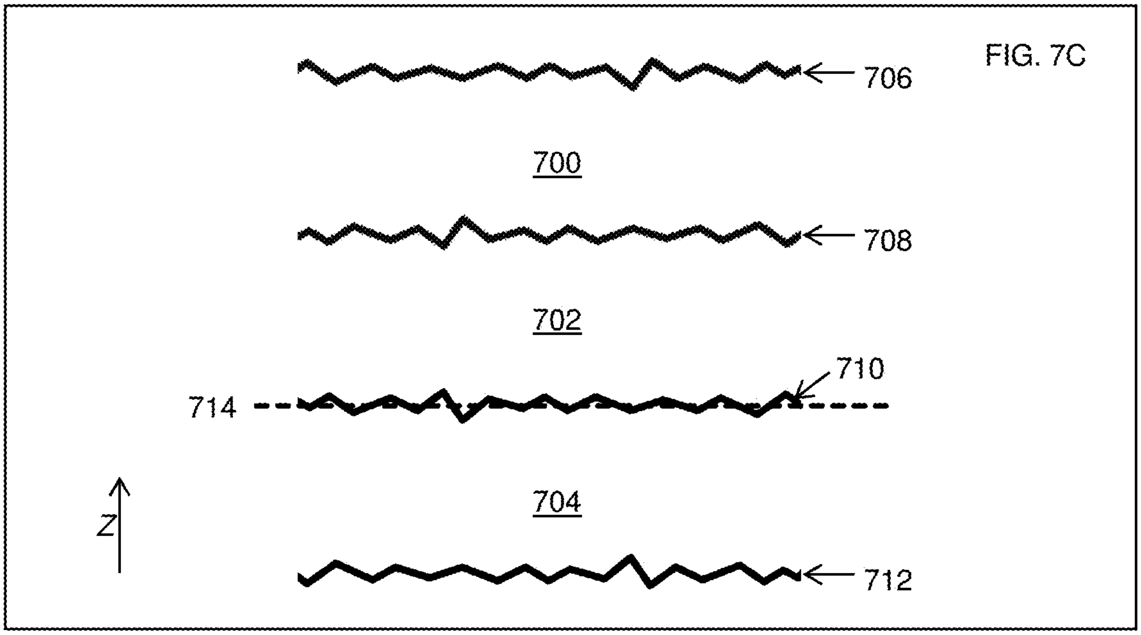
FIG. 7C schematically illustrates a cross section in various layering planes.

In some cases, a layering plane corresponds to an average layering plane. The aver FIG. 76C shows an example schematic vertical cross section of a portion of a 3D object having layers of hardened material 700, 702, and 704 sequentially formed during the 3D printing process. Boundaries (e.g., FIG. 7C, 706, 708, 710 and 712) between the layers may be visible (e.g., by human eye or by microscopy). The boundaries between the layers may be evident by a microstructure of the 3D object. The boundaries between the layers may be (e.g., substantially) planar. The boundaries between the layers may have some irregularity (e.g., roughness) due to the transformation (e.g., melting and or sintering) process (e.g., and formation of melt pools). An average layering plane (e.g., FIG. 7C, 714) may correspond to a (e.g., imaginary) plane that is estimated or calculated average. A calculated average may correspond to an arithmetic mean of (e.g., of number of point locations on a boundary between layers). A calculated average may be calculated using, for example, a linear regression analysis. In some cases, the average layering plane consider deviations from a nominal planar shape.

Figure 8A:
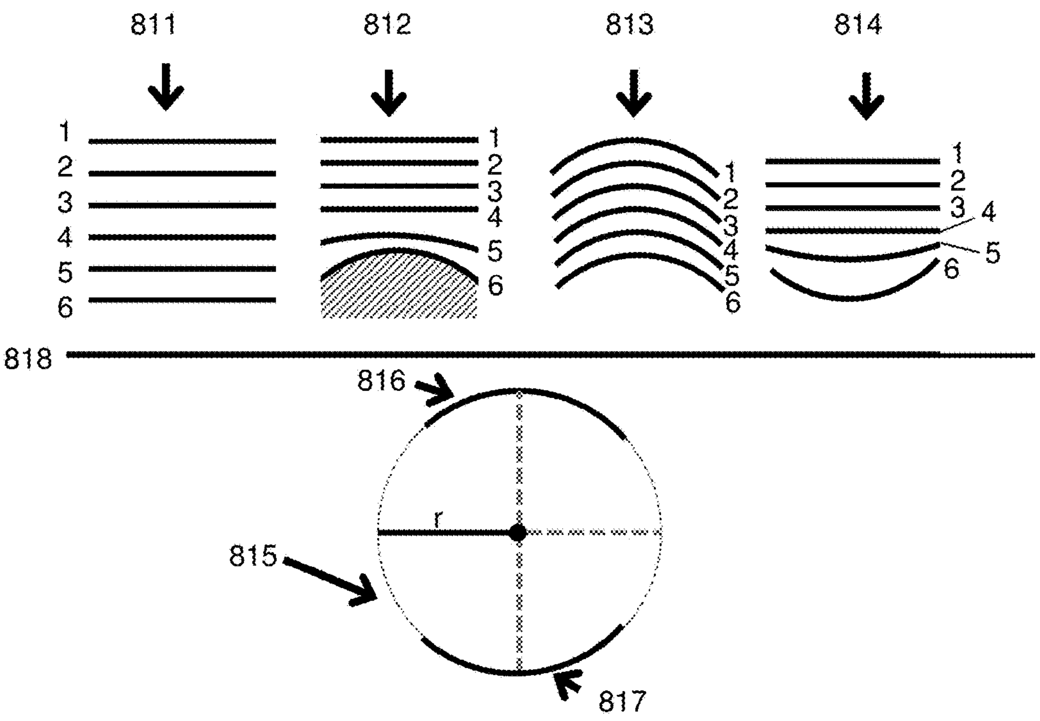
FIG. 8A schematically illustrates various vertical cross-sectional views of various 3D objects.

In some instances, a (e.g., average) layering plane determination considers a curvature of the one or more layers of hardened material. FIG. 8A shows example schematic vertical cross sections of 3D objects 811, 812, 813 and 814, each having multiple layers 1-6 relative to a platform surface 818. The 3D object may comprise (e.g., substantially) planar layers (e.g., FIG. 8A, 811 (layers 1-6), 812 (layers 1-4) or 814 (layers 1-3)). The 3D object may comprise (e.g., substantially) non-planar layers (e.g., FIG. 8A, 812 (layers 5-6), 813 (layers 1-6) or 814 (layers 4-6) (e.g., each having a radius of curvature). An average layering plane of layers that are non-planar may correspond to a plane that is calculated (e.g., by linear regression analysis) of the non-planar layer. FIG. 8A shows example super-positions 816 and 817 of a curved layer on a circle 815 having a radius of curvature "r." The one or more layers may have a radius of curvature equal to the radius of curvature of the layer surface. The radius of curvature may equal infinity (e.g., when the layer is (e.g., substantially) planar). The radius of curvature of at least one the layer of the 3D object (e.g., all the layers of the 3D object, the bottom skin layer, and/or the overhang) may have a value of at least about 0.1 centimeter (cm), 0.2 cm, 0.3 cm, 0.4 cm, 0.5 cm, 0.6 cm, 0.7 cm, 0.8 cm, 0.9 cm, 1 cm, 3 cm, 5 cm, 10 cm, 20 cm, 30 cm, 40 cm, 50 cm, 60 cm, 70 cm, 80 cm, 90 cm, 1 meter (m), 1.5 m, 2 m, 2.5 m, 3 m, 3.5 m, 4 m, 4.5 m, 5 m, 10 m, 15 m, 20 m, 25 m, 30 m, 50 m, or 100 m. The radius of curvature of at least one layer of the 3D object (e.g., all the layers of the 3D object) may have any value between any of the afore-mentioned values of the radius of curvature (e.g., from about 10 cm to about 90 m, from about 50 cm to about 10 m, from about 5 cm to about 1 m, from about 50 cm to about 5 m, from about 5 cm to infinity, or from about 40 cm to about 50 m). In some embodiments, a layer with an infinite radius of curvature is a layer that is planar. In some examples, the one or more layers may be included in a planar section of the 3D object, or may be a planar 3D object (e.g., a flat plane, or 3D plane). In some instances, part of at least one layer within the 3D object may have any of the radii of curvature mentioned herein, which will designate the radius of curvature of that layer portion.

Figure 8B:
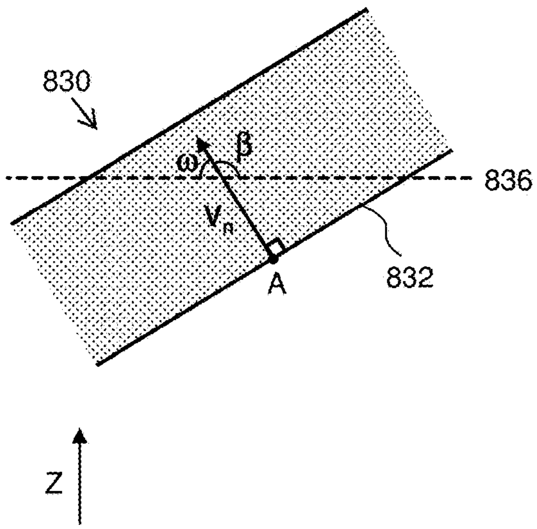
FIGS. 8B and 8C schematically illustrate overhang portions of 3D objects.
Figure 8C:
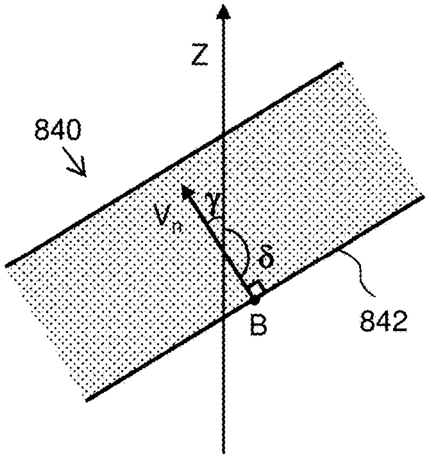

In some cases, an overhang of a 3D object is at least partially defined with respect to a layering plane and/or a stacking vector (also referred to herein as a "build direction") of the 3D object. A stacking vector (which may be indicated by directional vector "Z"), can indicate a direction in which the layers of the 3D object were bonded together (e.g., sequentially printed). When indicated with a vector "Z", the direction of the vector may correspond to the (e.g., temporal) sequential bonding of the layers. In some embodiments, the stacking vector is opposite of a gravitational field vector. FIG. 8B shows an example of a section view of an overhang portion 830 of a 3D object. The bottom surface of an overhang can have an exterior surface (e.g., FIG. 8B, 832), where a vector normal (e.g., FIG. 8B, $V_n$) to the exterior surface at a point (A) that is (i) directed into the object and (ii) has a positive projection onto the stacking vector (e.g., FIG. 8B, "Z"), is at an acute angle (e.g., omega (ω)) and/or an obtuse angle (beta (β)) with respect to a layering plane (or an average layering plane) (e.g., FIG. 8B, 836). The acute angle (e.g., FIG. 8B, omega (ω)) and the obtuse angle (e.g., FIG. 8B, beta (β)) may be supplementary angles. The acute angle (e.g., FIG. 8B, omega (ω)) can be at least about 45 degrees (°), 50°, 55°, 60°, 70°, 80°, 85° or 89°. The acute angle (e.g., FIG. 8B, omega (ω)) can range between any of the aforementioned angles (e.g., from about 45° to about 89°, from about 45° to about 60°, from about 60° to about 89°, or from about 70° to about 89°). The acute angle (e.g., FIG. 8B, omega (ω)) can be at most about 90 degrees. FIG. 8C shows an example of a section view of an overhang portion 840 of a 3D object. In some embodiments, a bottom surface of an overhang can have an exterior surface (e.g., FIG. 8C, 842), where a vector normal (e.g., FIG. 8C, $V_n$) to the exterior surface at a point (B) that is (i) directed into the object and (ii) has a positive projection onto the stacking vector (e.g., FIG. 8C, "Z") that is at an acute angle (e.g., FIG. 8C, gamma (γ)) and/or an obtuse angle (e.g., FIG. 8C, delta (δ)) with respect to the stacking vector. The acute angle (e.g., FIG. 8C, gamma (γ)) and the obtuse angle (e.g., FIG. 8C, delta (δ)) may be supplementary angles. The acute angle (e.g., FIG. 8C, gamma (γ)) can be at most about 45°, 40°, 35°, 30°, 25°, 20°, 15°, 10°, 5°, 1° or 0°. The acute angle (e.g., FIG. 8C, gamma (γ)) can range between any of the afore-mentioned angles (e.g., from about 0° to 45°, from about 30° to about 45°, from about 0° to about 30°, or from about 0° to about 40°). The acute angle (e.g., FIG. 8C, gamma (γ)) can be at most about 90 degrees.

At times, the printing of a (e.g., complex) 3D object involves using a combination of methodologies (e.g., having respective process parameters). In some cases, different methodologies may be used to transform different portions of the object. For example, a first type of energy beam may be used to transform a first portion of the object, and a second type of energy beam may be used to transform a second portion of the object. The "type" of an energy beam can refer to one or more characteristics of the energy beam. The characteristic may relate to the energy beam, such as the power density (e.g., at the target surface), wavelength, focus, a FLS of a cross-section of the energy beam (e.g., beam cross-section or waist), intensity and/or charge. The characteristic may relate to how the energy beam impinges upon a target surface (e.g., material bed (e.g., pre-transformed and/or transformed material)), such as the power density, speed, dwell time, intermission time, and/or an irradiation spot (e.g., spot size or shape) of the energy beam at the target surface. In some embodiments, the energy beam is a type-1 (sometimes referred to herein "hatching") energy beam. In some embodiments, the energy beam is a type-2 (sometimes referred to herein "tiling") energy beam. In some embodiments, a type-2 energy beam has a larger cross-section than a type-1 energy beam. In some embodiments, a type-2 energy beam having a lower power density than a type-1 energy beam. In some embodiments, a type-1 energy source is more focused than the type-2 energy beam. In some embodiments, a type-2 energy beam travels along a path-of-tile trajectory, and a type-1 energy beam travels along a hatching trajectory. Various apparatuses (e.g., controllers), systems (e.g., 3D printers), software, methods related to types of energy beam and formation of 3D objects (e.g., generated using type-2 (tiling) and/or type-1 (hatching)), as well as various control schemes are described in U.S. patent application Ser. No. 15/435,128; international patent application number PCT/US17/18191; European patent application number EP17156707.6; and international patent application number PCT/US18/20406, each of which is entirely incorporated herein by reference.

Figure 9A:
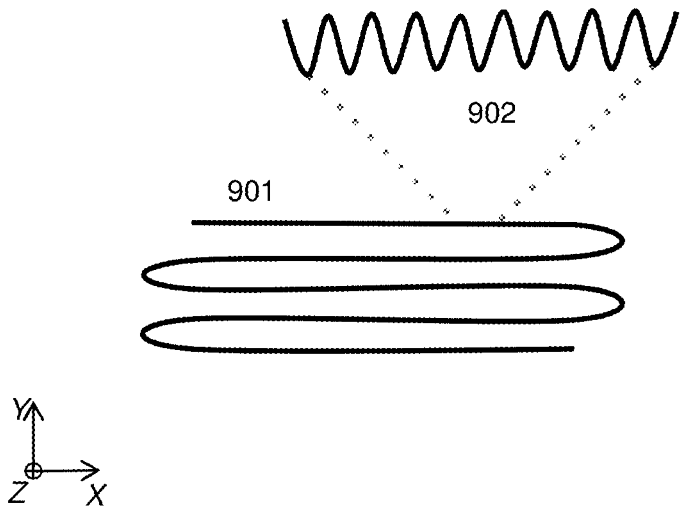
FIG. 9A schematically illustrates a path.
Figure 9B:
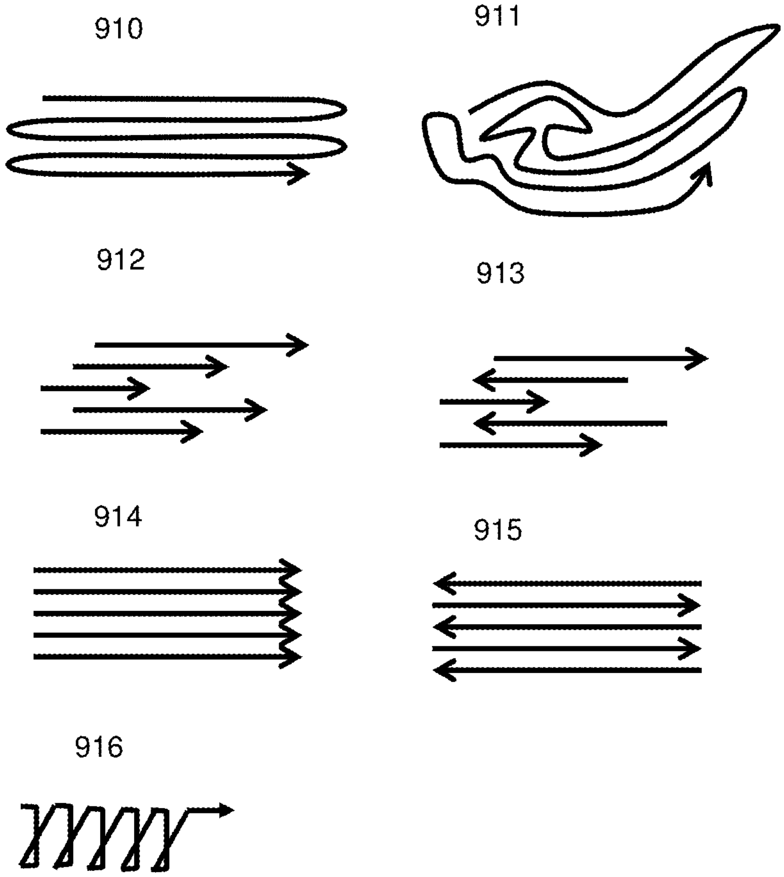
FIG. 9B schematically illustrates various paths.

In some cases, a characteristic of the energy beam relates to the path of the energy beam. The path can correspond to a route in which the energy beam travels along the target surface (e.g., material bed). FIG. 9A shows an example of an aerial view of a path 901. The path may resemble sawing stitch (e.g., straight, lock, zigzag, overcasting, blind, shell fluck, or darning stitch). The zigzag stitch may comprise a single point zigzag or a multiple point (e.g., 2, or 3) point zigzag stitch. In cases, the path can be separated into sub-paths. FIG. 9A shows an example sub-path 902, which is a magnification of a portion of the path 901. The sub-path can have deviations (e.g., oscillations) with respect to the path. The path can have any shape. FIG. 9B shows example aerial views of various paths. The path may be continuous (e.g., FIG. 9B: 910, 911 or 916) or discontinuous (e.g., FIG. 9B: 912, 913, 914, or 915). A continuous path may form a path of transformed material in the material bed. A discontinuous path may comprise intervals at which the energy beam is (e.g., substantially) stationary. A (e.g., substantially) stationary energy beam may form a tile of transformed material in the material bed.

Figures 10A, 10B, 10C, 10D, 10E:
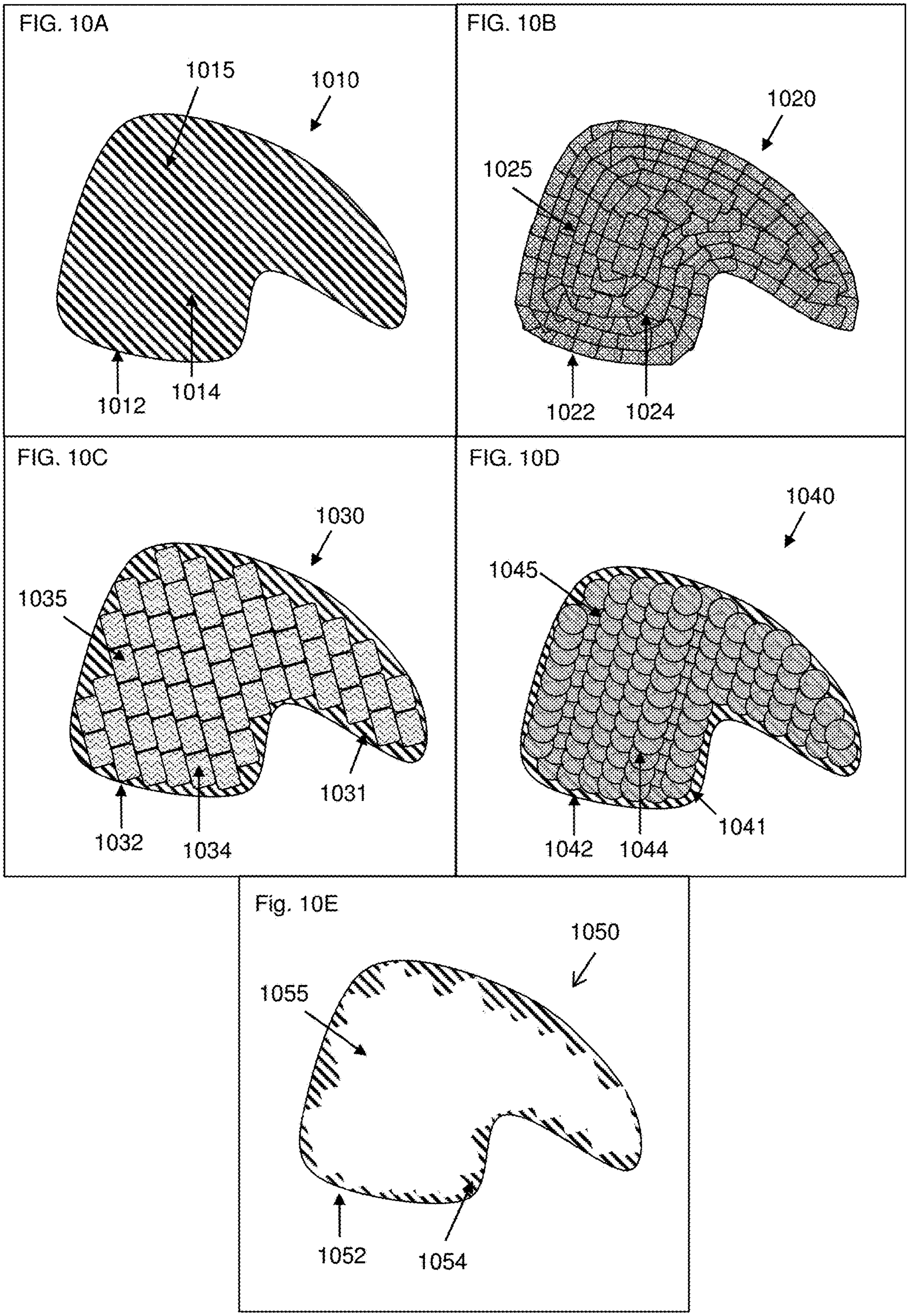
FIGS. 10A-10E show schematic top views of various 3D objects.

In some embodiments, an object has hatches and/or tiles. FIGS. 10A-10E show examples of aerial views of various layers of hardened material. Each of layers in the examples of FIGS. 10A-10E can correspond to one of a number of stacked layers of one or more 3D objects. Each layer may have an exterior portion (which can correspond to a portion of a skin of the 3D object) that surrounds an interior portion (also referred to as "core" or "internal portion") of the layer. The exterior portion may be a skin or a portion of the skin. The exterior and interior portion may be generated using the same type of energy beam, or different types of energy beams. In some embodiments, the exterior portion (or parts of the exterior portion) is formed prior to forming the interior portion. In some embodiments, the interior portion (or parts of the interior portion) is formed prior to forming the exterior portion. In some embodiments, the exterior and interior portion are formed (e.g., substantially) simultaneously. The exterior portion and/or the interior portion can comprise hatches and/or tiles. FIG. 10A shows an example of a layer 1010 having an exterior portion 1012 and an interior portion 1014 comprising hatches 1015 (e.g., formed using a hatching energy beam). FIG. 10B shows an example of a layer 1020 having an exterior portion 1022 and interior portion 1024 comprising tiles 1025 (e.g., formed using a tiling energy beam). FIG. 100 shows an example of a layer 1030 having an exterior portion 1032 comprising hatches 1031 (e.g., formed using a hatching energy beam) and an interior portion 1034 comprising tiles 1035 (e.g., formed using a tiling energy beam). FIG. 10D shows an example of a layer 1040 having an exterior portion 1042 comprising hatches 1041 (e.g., formed using a hatching energy beam), and an interior portion 1044 comprising tiles 1045 (e.g., formed using a tiling energy beam). FIG. 10E shows an example of a layer 1050 having a rim 1052 comprising hatches 1054 (e.g., formed using a hatching energy beam) and an interior portion 1055 that is free of hardened material. For example, the tiles may have elliptical (e.g., round) cross-sections (e.g., FIG. 10D, 1044). For example, the tiles may be rectangular (e.g., square) cross-sections (e.g., FIG.

10B, 1025; or FIG. 100, 1035). In some cases, the tiles appear as crescent-shaped or scallop-shaped, as described herein. In some embodiments, at least two sequential tiles overlap with each other at least in part. The overlapped area may be at least about 10%, 20%, 30%, 40%, 50%, 60%, 70%, 80% or 90% of the average or mean tile area. The overlapped area may be at most about 10%, 20%, 30%, 40%, 50%, 60%, 70%, 80% or 90% of the average or mean tile area. The overlapped area may between any of the aforementioned values (e.g., from about 10% to about 90%, from about 10% to about 50%, or from about 40% to about 90%) of the average or mean tile area. The percentage of overlapped area may be (e.g., substantially) identical along the path of the energy beam forming the tiles.

Figure 11A:
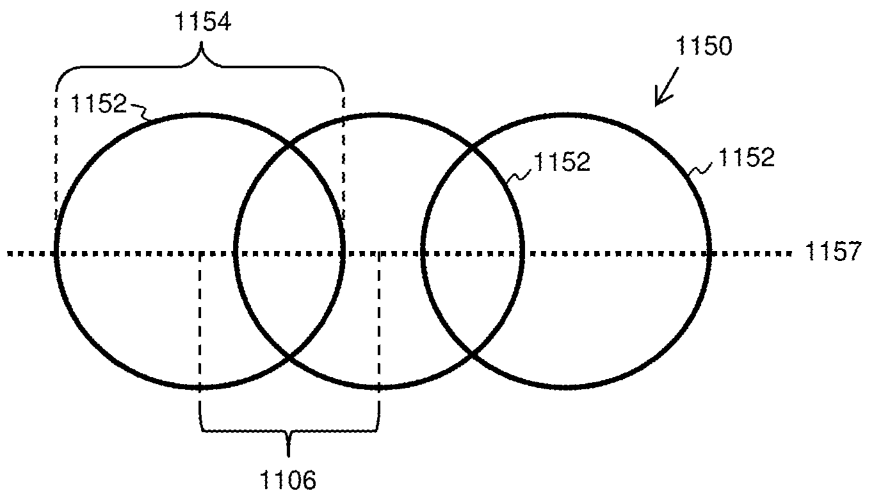
FIGS. 11A and 11B schematically illustrate cross section views of irradiated portions of various 3D objects.
Figure 11B:
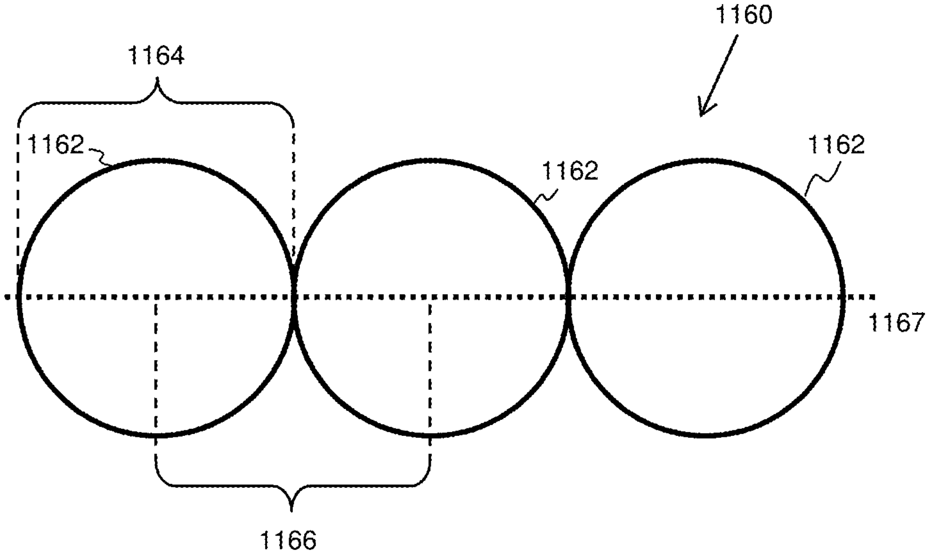

In some embodiments, the size of a tile corresponds with a size of a melt pool forming the tile. FIGS. 11A and 11B show example schematic cross-section views of overlapping tiles and non-overlapping tiles. FIG. 11A shows an example of a horizontal cross-sectional view of a portion of a plurality of overlapping tiles (e.g., 1152) disposed along a path 1157 that collectively form a path-of-tiles 1150. The tiles along the path-of-tiles may have (e.g., substantially) the same FLS (e.g., same cross section or footprint (e.g., FIG. 11A, 1154)) on the target surface. The overlapping tiles may be spaced apart from each other by a (e.g., substantially) uniform distance (e.g., FIG. 11A, 1106) (e.g., as measured from centers of directly adjacent tiles, e.g., successive tiles). The overlapping tiles may be spaced apart from each other by a non-uniform distance (as measured from centers of directly adjacent tiles). The overlapping tiles may be spaced apart by distance that is less than a FLS (e.g., diameter (e.g., FIG. 11A, 1154)) of the tiles. In some embodiments, a distance between the tile centers of overlapping tiles is at least about 0.99, 0.9, 0.75, 0.6, 0.5, 0.25, or 0.01 times a FLS (e.g., diameter) of a horizontal cross section of the exposed surface of the tiles. In some embodiments, the distance between the tile centers of overlapping tiles ranges between any suitable ranges described above (e.g., from about 0.5 to about 0.75, from about 0.25 to about 0.75, or from about 0.5 to about 0.6 times a FLS (e.g., diameter) of a horizontal cross section of the exposed surface of the tiles). FIG. 11B shows an example of a horizontal cross-sectional view of a portion of tile collection 1160 comprising non-overlapping tiles (e.g., 1162) that are arranged along a path of tiles 1167. The non-overlapping tiles may be spaced apart from each other by a (e.g., substantially) uniform distance (e.g., FIG. 11B, 1166) (e.g., as measured from centers of directly adjacent tiles). The non-overlapping tiles may be spaced apart from each other by a non-uniform distance (as measured from centers of directly adjacent tiles). The non-overlapping tiles may be spaced apart by distance that is greater than a FLS (e.g., diameter (e.g., FIG. 11B, 1164)) of the tiles. In some embodiments, a distance between the tile centers of non-overlapping tiles is at least about 1.1, 1.25, 1.5, 1.75, 2 or 5 times a FLS (e.g., diameter) of a horizontal cross section of the exposed surface of the tiles. In some embodiments, the distance between the tile centers of non-overlapping tiles ranges between any suitable ranges described above (e.g., from about 1.1 to about 5, from about 1.1 to about 1.5, or from about 1.5 to about 5 times a FLS (e.g., diameter) of a horizontal cross section of the exposed surface of the tiles). In some embodiments, a distance between tile centers of at least two of successive (overlapping or non-overlapping) tiles is at least about 10 micrometers (μm), 15 μm, 20 μm, 25 μm, 30 μm, or 35 μm, 50 μm, 70 μm, 80 μm, 100 μm, 200 μm, 250 μm, 300 μm, 350 μm, 400 μm, 450 μm or 500 μm. In some embodiments, the distance between the tile centers is at most about 50 millimeters (mm), 100 mm, 150 mm, 200 mm, 300 mm, 400 mm or 500 mm. In some embodiments, the distance between the tile centers at least two of successive (overlapping or non-overlapping) tiles ranges between any of the aforementioned values (e.g., from about 10 μm to about 500 mm, from about 10 μm to about 500 μm, from about 500 μm to about 500 mm, or from about 15 μm to about 30 μm).

Figure 12:
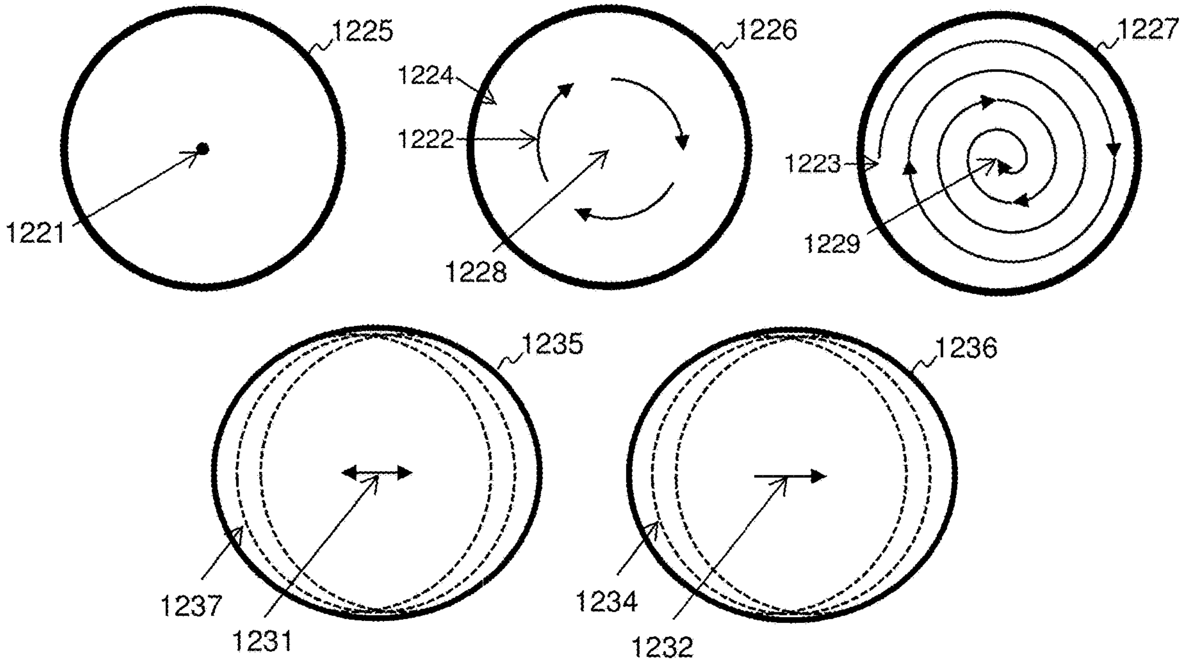
FIG. 12 schematically shows top views of various irradiated portions of a target surface.

In some embodiments, a melt pool (e.g., tile) is formed by irradiating a target surface. A melt pool (e.g., tile) may be formed using a (e.g., substantially) stationary energy beam. FIG. 12 shows an example of a melt pool (e.g., tile) having a circumference 1225 formed by an energy beam irradiation spot (also referred to herein as "footprint") that is centered at position 1221 during formation of the melt pool (e.g., tile). In some embodiments, the irradiation spot (e.g., forming a melt pool, e.g., forming a tile) is formed at the exposed surface of a material bed. Substantially stationary may be relative to the speed and/or propagation direction of the energy beam along the path. For example, a substantially stationary energy beam may move slightly (e.g., move in a direction (e.g., back, forth, or a combination thereof), oscillate, move back and forth (e.g., like a pendulum movement about a point), and/or dither). The movement may be a directional movement (e.g., move backwards, move forward, or move at any combination thereof). The directional movement may be with respect to a path of successive melt pools and/or tiles. The movement can be with respect to (e.g., around) a point. The point may correspond to a center of the tile formed at the target surface. A length of the movement may be less than a FLS of the irradiation spot on the target surface. A length of the movement may be less than a FLS of the melt pool and/or tile (e.g., a horizontal cross section of the melt pool and/or tile, e.g., at the target surface). The movement may not include a spatial (e.g., lateral) movement greater than a FLS of the energy beam (e.g., cross section and/or irradiation spot on the target surface). The movement may not include a spatial (e.g., lateral) movement greater than a FLS of the melt pool and/or tile generated by the energy beam. FIG. 12 shows an example of a shape resembling oval 1235. The oval shape may be a tile, a melt pool, and/or a footprint of the energy beam on the target surface. The energy beam irradiation spot may center on a linear path (e.g., FIG. 12, 1231) and move in a back and forth movement along the path (e.g., FIG. 12, 1231) during formation of the tile. The path may be part of the path-of-tiles. The back and forth movement of the energy beam may cause the tile to have a FLS (e.g., FIG. 12, FLS of 1235) that is larger than a circumference (e.g., FIG. 12, 1237) of the irradiation spot of the energy beam at the target surface. The manner of tile formation may cause different temperature gradient profile at least along the horizontal cross section of the tile (e.g., also along the vertical direction and/or any combination of the horizontal and vertical direction). For example, when a melt pool (e.g., tile) is formed by one irradiation spot using a gaussian beam, the center of the melt pool (e.g., tile) may be hotter than its edges. A melt pool (e.g., tile) may be formed using an energy beam that propagates along a circling or spiraling path, to form a tile having a (e.g., substantially) circular cross section. FIG. 12 shows an example of a melt pool (e.g., tile) having circumference 1226 formed by an energy beam that irradiates a portion of a target surface, which energy beam irradiation spot centers on an internal circular path having an arch 1222 and moves along the circular path during formation of the melt pool (e.g., tile). During its formation, the center of the melt pool (e.g., tile) (e.g., FIG. 12, 1226) may be hotter than an area close to a circumference (e.g., FIG. 12, 1224) of the melt pool (e.g., tile). FIG. 12 shows an example of a melt pool (e.g., tile) having a circumference 1227 formed by an energy beam that irradiates a portion of a target surface, which irradiation spot centers on a spiraling path that begins in position 1223 and ends in position 1229, and moves along the spiraling path during formation of the melt pool (e.g., tile) (e.g., an inward spiraling path). The center (e.g., FIG. 12, 1229) of the melt pool (e.g., tile) (e.g., FIG. 12, 1227) may be hotter than an area close to the circumference (e.g., FIG. 12, 1227) of the tile during its formation. The path may be an outward spiraling path. A melt pool (e.g., tile) may be formed using a slow-moving energy beam (e.g., moving in slow speed, e.g., 1232), for example, to form a melt pool (e.g., tile) having a horizontally elongated cross section (e.g., that is different from a horizontally circular cross-sectional tile). At times, the energy beam moves during tile formation along the path-of-tiles at a slow speed. The slow speed may be of at most about 5000 micrometers per second (μm/s), 1000 μm/s, 500 μm/s, 250 μm/s, 100 μm/s, 50 μm/s, 25 μm/s, 10 μm/s, or 5 μm/s. The slow speed may be of any value between the afore-mentioned values (e.g., from about 5000 μm/s to about 5 μm/s, from about 5000 μm/s to about 100 μm/s, or from about 500 μm/s to about 5 μm/s. FIG. 12 shows an example of a tile having a circumference resembling oval 1236 formed by an energy beam that irradiates a portion of a target surface, which irradiation spot centers on line 1232 and moves in a direction along line 1232 during formation of the melt pool (e.g., tile); circumference 1234 shows an example of the energy beam circumference at a point on the line 1231. The movement of the energy beam (e.g., along the circular, dithering, slow moving, and/or spiraling path) may be during a dwell time on the target surface (e.g., during a period of melt pool formation) to form the melt pool (e.g., tile).

Figure 13A:
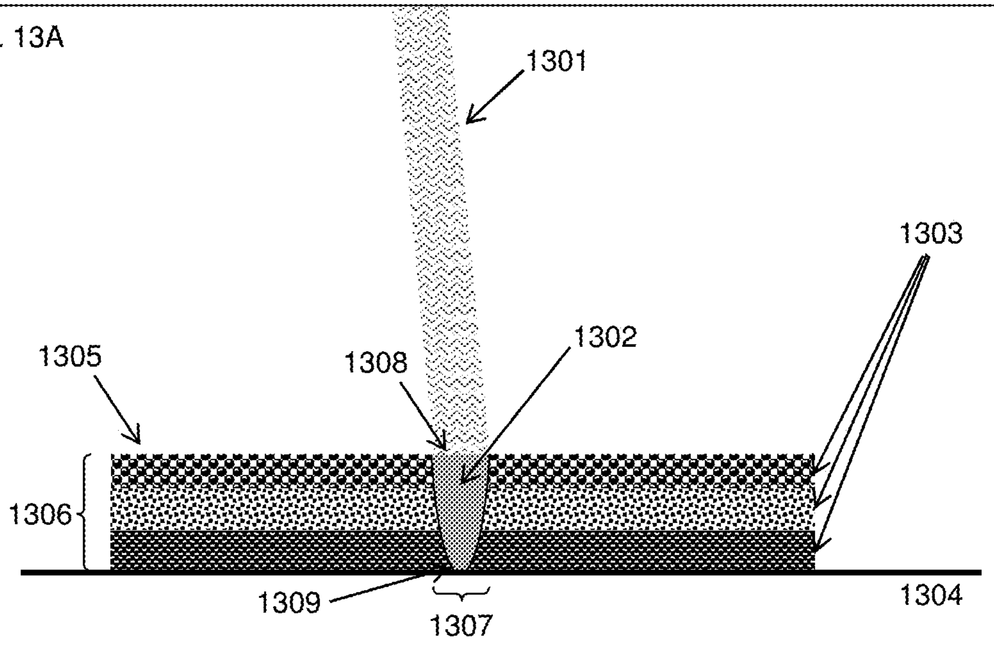
FIGS. 13A and 13B schematically illustrate operations in forming a 3D object.
Figure 13B:
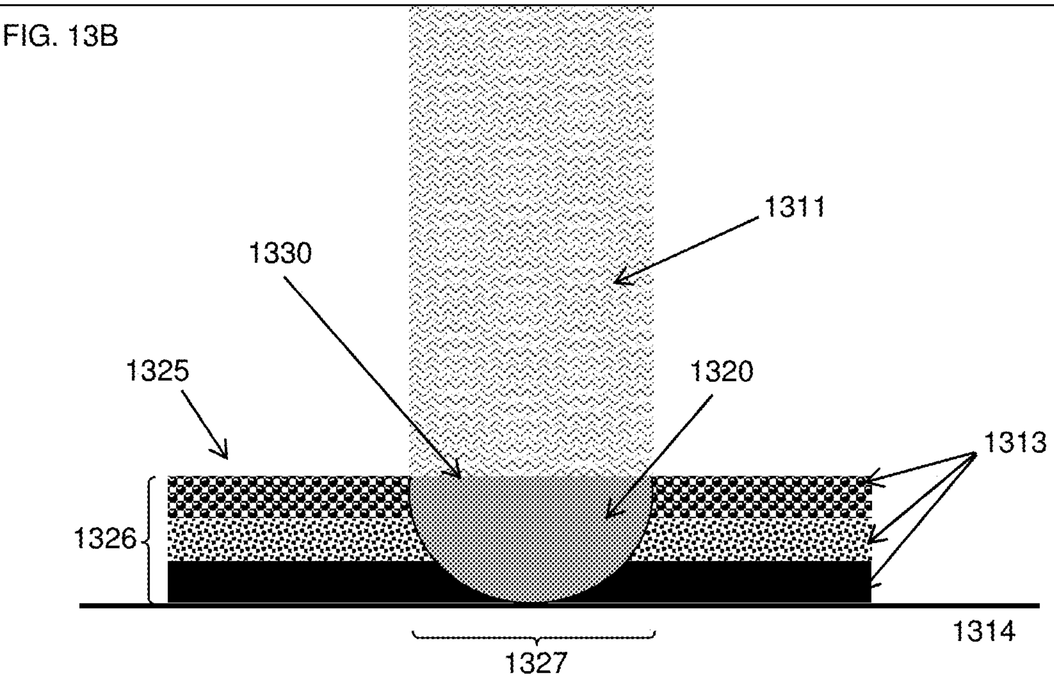

In some embodiments, the one or more energy beams used to form the 3D object forms melt pools. The melt pools can have any shape and size. FIGS. 13A-13B show examples of vertical cross sections of portions of materials bed having melt pools with different shapes. FIG. 13A shows an example of irradiating a pre-transformed material 1305 on a platform 1304 using an energy beam 1301 that forms a high aspect ratio melt pool 1302. Such energy beam may be referred to as a high aspect ratio melt pool (abbreviated as "HARMP") energy beam. The energy beam (e.g., FIG. 13A, 1301) may be a tiling or hatching energy beam. In some embodiments, the pre-transformed material (e.g., FIG. 13A, 1305) comprises multiple layers (e.g., FIG. 13A, 1303). The multiple layers may be comprised of the same material composition (e.g., metal composition), state (e.g., pre-transformed (e.g., powder) or transformed (e.g., melted then hardened) and/or a porosity. The multiple layers may be comprised of different material composition (e.g., metal composition), state (e.g., pre-transformed (e.g., powder) or transformed (e.g., melted then hardened) and/or a porosity. A high aspect ratio melt pool (e.g., FIG. 13A, 1302) can have a depth (e.g., FIG. 13A, 1306) (also referred as height) that is greater than its width (e.g., FIG. 13A, 1307). The depth of a melt pool may be measured from an exposed (e.g., top) surface (e.g., FIG. 13A, 1308) to its terminus (e.g., bottom) surface (e.g., FIG. 13A, 1309). The width of a melt pool may correspond to a horizontal cross section (e.g., diameter) of the exposed (e.g., top) surface (e.g., FIG. 13A, 1308) of the melt pool. In some embodiments, a high aspect ratio melt pool has a depth that is at least about 1.1, 1.3, 1.5, 1.7, 2.0, 2.2, 2.4, 2.5, 2.7, 3.0, 3.2, 3.5, 3.7, 4.0, 4.2, 4.5, 4.7, 5.0, 5.5, 6.0, 6.5, 7.0, 7.5, 8.0, 8.5, 9.0, 9.5, or 10.0 times its width. FIG. 13B shows an example of irradiating a pre-transformed material 1325 on a platform 1314 using an energy beam 1311 that forms a low aspect ratio melt pool 1302. The energy beam (e.g., FIG. 13B, 1311) may be a tiling or hatching energy beam. In some embodiments, the pre-transformed material (e.g., FIG. 13B, 1325) comprises multiple layers (e.g., FIG. 13B, 1313). The multiple layers may be comprised of the same material composition (e.g., metal composition), state (e.g., pre-transformed (e.g., powder) or transformed (e.g., melted then hardened) and/or a porosity. The multiple layers may be comprised of different material composition (e.g., metal composition), state (e.g., pre-transformed (e.g., powder) or transformed (e.g., melted then hardened) and/or a porosity. The low aspect ratio melt pool can have a depth (e.g., FIG. 13B, 1326) (also referred to as height) that is less than its width (e.g., FIG. 13B, 1327). In some embodiments, a low aspect ratio melt pool has a depth that is at most about 0.1, 0.2, 0.3, 0.4, 0.5, 0.6, 0.7, 0.8, or 0.9 times its width. A melt pool (e.g., high aspect ratio or low aspect ratio) may be referred to as "deep" or "shallow." A deep melt pool can refer to a melt pool that spans two or more layers of (e.g., of pre-transformed and/or transformed) material. For example, a deep melt pool may span a least about 2, 2¼, 2½, 2¾, 3, 4, 5, or 6 layers of pre-transformed and/or transformed material. A shallow melt pool can refer to a melt pool that spans less than two layers of (e.g., of pre-transformed and/or transformed) material. For example, a shallow melt pool may span a most about ¼, ½, ¾, 1, 1¼, 1½ or 1¾ layers of pre-transformed and/or transformed material.

Figures 14A, 14B, 14C, 14D, 14E:
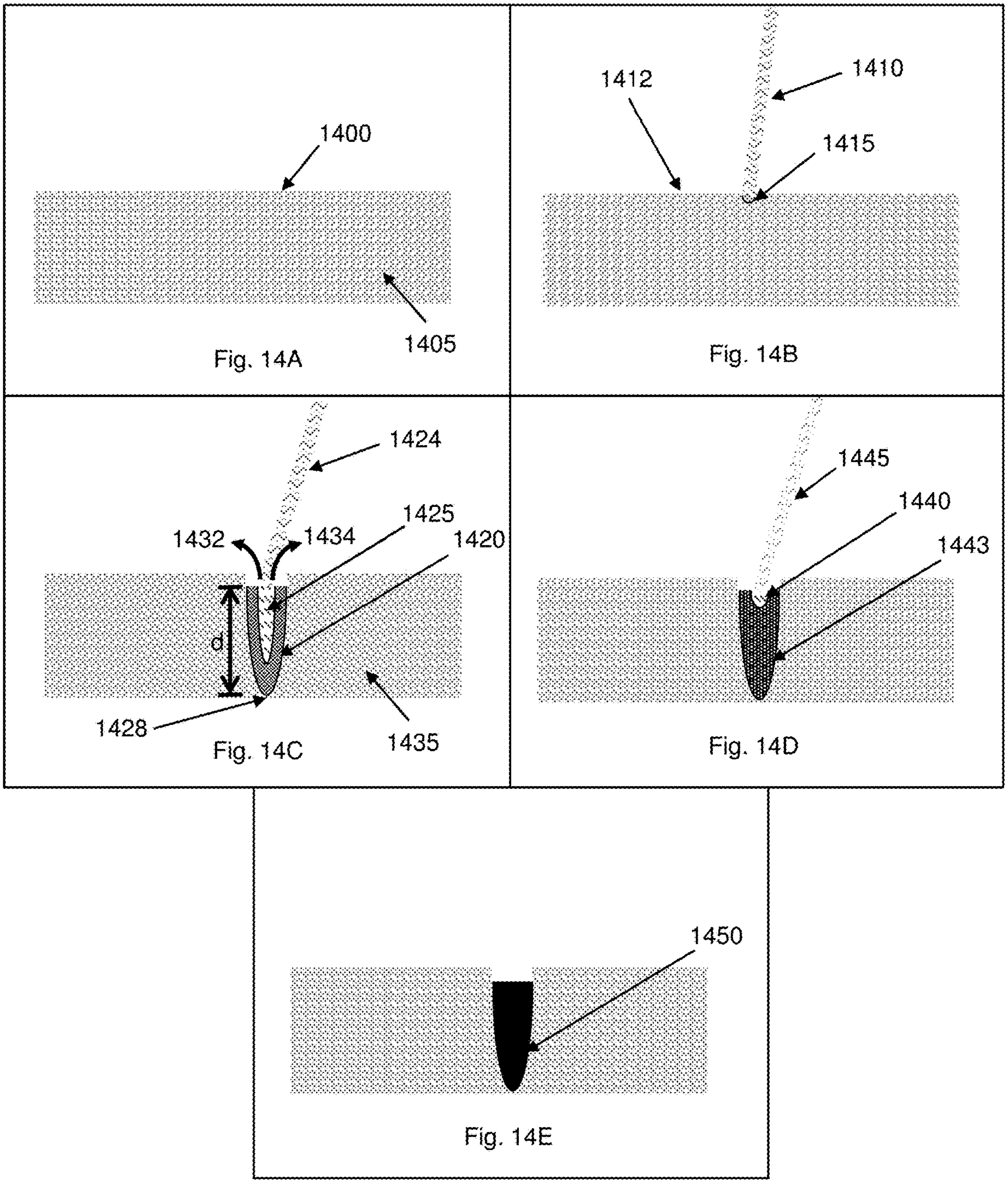
FIGS. 14A-14E schematically illustrate operations in forming a 3D object.

In some instances, a high aspect ratio melt pool (HARMP) energy beam is used to modify (e.g., densify) a transformed material. FIGS. 14A-14E show an example of a vertical cross section of a portion of a 3D object being modified using a HARMP energy beam. FIG. 14A shows an example of a target surface 1400 of one or more layers of material 1405 (e.g., a pre-transformed material (e.g., powder) or of a previously transformed. FIG. 14B shows an example of irradiating a portion of the target surface 1412 using an energy beam 1410. In some cases, the energy beam irradiates a position (e.g., e.g., FIG. 14B, 1415) on the target surface in a (e.g., substantially) stationary manner (e.g., tiling). FIG. 14C shows an example of forming a HARMP 1420 having a depth of "d." The HARMP may extend to a desired depth (e.g., FIG. 14C, up to a depth "d"). The desired depth may be to a bottom (e.g., FIG. 14C, 1428) of the one or more layers of material (e.g., FIG. 14C, 1435). The energy beam (e.g., FIG. 14C, 1424) may cause a portion (e.g., FIG. 14C, 1432 and/or 1434) of the one or more layers of material to exit the HARMP volume during its formation. The exiting material may comprise vapor, plasma, and/or other forms of sputtered (e.g., liquid (e.g., molten)) material. The exiting material may form a HARMP well (e.g., FIG. 14C, 1425), which can correspond to an open cavity. The HARMP well may be formed within at least a portion of the HARMP. At times, the energy beam (e.g., FIG. 14C, 1424) may be moved in a lateral direction to elongate the HARMP well in the lateral direction, for example, to increase an amount of transformed material in the lateral direction. In some cases, the opening of the HARMP well closes to form a pore (e.g., void) in the HARMP. The HARMP may comprise one or more pores. The position and/or number of pores may be controlled (e.g., in real time (e.g., using one or more controllers)). The controller(s) may control at least one characteristic of the energy beam and/or the energy source that generates it. In some instances, the HARMP comprises (e.g., on average) a low porosity percentage. In some instances, the HARMP comprises (e.g., substantially) no (e.g., detectable) pores. FIG. 14D shows an example of closing of a HARMP well 1440 to form the HARMP 1443. The closing may comprise reducing (e.g., gradually) an intensity of the energy beam (e.g., FIG. 14D, 1445). The intensity reduction may include reducing a power per unit area of the energy beam. Reducing the intensity of the energy beam may include adjusting one or more optical elements of an optical system (e.g., an astigmatism system). Reducing the intensity of the energy beam may include adjusting one or more characteristics of the energy beam comprising its power profile over time, or its pulsation scheme. Reducing the intensity of the energy beam may include adjusting one or more characteristics of the energy source (e.g., its power). At times, the gradual intensity reduction of the energy beam may alter (e.g., reduce) its degree of penetration into the HARMP. A reduction of the energy beam penetration into the HARMP may allow liquid material to settle at the bottom of the HARMP well and close the opening of the HARMP well. A reduction of the energy beam penetration into the HARMP may reduce the amount of material that exits the HARMP during the irradiation of the energy beam, and thus reduce the size of the HARMP well. FIG. 14E shows an example of the HARMP 1450 that has hardened (e.g., solidified). In some embodiments, the hardened HARMP comprises a lower (e.g., diminished) number of pores compared to the material before the HARMP is formed.

Characteristics of the 3D object (or any portion thereof) can be measured by any of the following measurement methodologies (e.g., also referred to herein as "detection methodologies"). For example, the FLS values (e.g., width), height uniformity, auxiliary support space, an/d or radius of curvature of the layer of the 3D object and any of its components (e.g., layer of hardened material) may be measured by any of the following measuring methodologies. The measurement methodologies may comprise a microscopy method (e.g., any microscopy method described herein). The measurement methodologies may comprise a coordinate measuring machine (CMM), measuring projector, vision measuring system, and/or a gauge. The gauge can be a gauge distometer (e.g., caliper). The gauge can be a go-no-go gauge. The measurement methodologies may comprise a caliper (e.g., vernier caliper), positive lens, interferometer, or laser (e.g., tracker). The measurement methodologies may comprise a contact or by a non-contact method. The measurement methodologies may comprise one or more sensors (e.g., optical sensors and/or metrological sensors). The measurement methodologies may comprise a metrological measurement device (e.g., using metrological sensor(s)). The measurements may comprise a motor encoder (e.g., rotary and/or linear). The measurement methodologies may comprise using an electromagnetic beam (e.g., visible or IR). The microscopy method may comprise ultrasound or nuclear magnetic resonance. The microscopy method may comprise optical microscopy. The microscopy method may comprise electromagnetic, electron, or proximal probe microscopy. The electron microscopy may comprise scanning, tunneling, X-ray photo-, or Auger electron microscopy. The electromagnetic microscopy may comprise confocal, stereoscope, or compound microscopy. The microscopy method may comprise an inverted and/or non-inverted microscope. The proximal probe microscopy may comprise atomic force, or scanning tunneling microscopy, or any other microscopy described herein. The microscopy measurements may comprise using an image analysis system. The measurements may be conducted at ambient temperatures (e.g., R.T.). For example, the microstructures (e.g., of melt pools) of the 3D object may be measured by a microscopy method (e.g., any microscopy method described herein). The microstructures may be measured by a contact or by a non-contact method. The microstructures may be measured by using an electromagnetic beam (e.g., visible or IR). The microstructure measurements may comprise evaluating the dendritic arm spacing and/or the secondary dendritic arm spacing (e.g., using microscopy). The microscopy measurements may comprise using an image analysis system. The measurements may be conducted at ambient temperatures (e.g., R.T.).

Various distances relating to the printer can be measured using any of the following measurement techniques. Various distances within the printer (e.g., the vertical displacement of the platform) can be measured using any of the following measurement techniques. The measurements techniques may comprise interferometry and/or confocal chromatic measurements. The measurements techniques may comprise at least one motor encoder (rotary, linear). The measurement techniques may comprise one or more sensors (e.g., optical sensors and/or metrological sensors). The measurement techniques may comprise at least one inductive sensor. The measurement techniques may include an electromagnetic beam (e.g., visible or IR). The measurements may be conducted at ambient temperature (e.g., R.T.).

Examples of various detection methodologies are described in international patent application serial number PCT/US15/65297, filed Dec. 11, 2015, titled "FEEDBACK CONTROL SYSTEMS FOR THREE-DIMENSIONAL PRINTING," which is entirely incorporated herein by reference.

The methods described herein can provide surface uniformity across the exposed surface of the material bed (e.g., top of a powder bed) such that portions of the exposed surface that comprises the dispensed material, which are separated from one another by a distance of from about 1 mm to about 10 mm, have a height deviation from about 100 micrometers to about 5 micrometers. The methods described herein may achieve a deviation from a planar uniformity of the layer of pre-transformed material (e.g., powder) in at least one plane (e.g., horizontal plane) of at most about 20%, 10%, 5%, 2%, 1% or 0.5%, as compared to the average plane (e.g., horizontal plane) created at the exposed surface of the material bed (e.g., top of a powder bed). The height deviation can be measured by using one or more sensors (e.g., optical sensors).

In some embodiments, techniques described herein are used to control a shape and/or material characteristic (e.g., wettability) of a material (e.g., metal) while in a malleable state. The malleable state may be relative to a less malleable (e.g., hardened (e.g., solidified)) state. The malleable state may be a liquid or partially liquid state. In some cases, controlling the material in the malleable state comprises controlling one or more aspects of the energy beam(s) used to transform a pre-transformed (e.g., powder) material and/or re-transform a previously transformed (e.g., hardened) material. In some cases, the energy beam(s) transforms a granulated (e.g., powder) material into a liquid (or partially liquid) material. The liquid or partially liquid material can harden, e.g., to a solid material (e.g., upon cooling (e.g., after the energy beam(s) is/are removed)). A transformed material (e.g., liquid, partially liquid, hardened (e.g., solid)) may have a greater thermal conductivity than a pre-transformed (e.g., granulated (e.g., powder)) material. In some cases, the liquid or partially liquid material is in the form of a globule (also referred to as a droplet). Without wishing to be bound to theory, the globule may tend to form a globular shape due to, for example, surface tension. The globular shape may be spherical, ellipsoid, egg-shaped, potato-shaped, lobe-shaped, pellet-shaped, or ball-shaped. The globular shape may comprise an exposed surface portion that is convex (e.g., protrudes out of the globule). In some cases, a globule is partially liquid. For example, in some cases, an interior of the globule may include some solid particle(s) and/or volume(s). The globule may be isolated (e.g., floating) in pre-transformed material, or may be in contact with a transformed material (e.g., another (e.g., liquid) droplet, a hardened material, or a previously transformed and re-melted material). If the globule is in contact with a previously transformed material, the globule may wet the surface of the previously transformed material. Without wishing to be bound to theory, wetting can be an attractive force that tends to maintain contact between the globule and previously transformed material. The wetting may be observed by a change in the shape of the globule. For example, the wetting may be observed by globule elongation, spreading out, and/or flattening.

At times, there are challenges associated with forming an overhang. In some cases, the printing process exhibits a sensitivity to how the energy beam(s) interacts with the material (e.g., pre-transformed (e.g., powder) or previously transformed (e.g., hardened or molten). For example, the ability to form an overhang having desired dimensions may be at least partially affected by the angle of incidence of the energy beam on the material and/or growth direction relative to the energy beam. For instance, a globule of transformed (e.g., hardened) material after a first transformation operation (e.g., using a first energy beam) may have an external surface with a convex curvature. The curvature may be due to, for example, surface tension when the material was liquified (or partially liquified) during the first transformation. The surface tension of the globule can depend, in part, on its chemical composition. For example, some materials such as elemental metals and/or metal alloys may exhibit relatively high surface tension in their liquified or partially liquified (e.g., molten) form. As another example, a metallic material may have some amount of oxide (e.g., on the surface of the globule). The oxides may be introduced by a surrounding atmosphere (e.g., oxygen and/or water). A second transformation (e.g., using a second energy beam) can be used to modify characteristics of the globule. The modification may differ depending, in part, on the angle of incidence of the second energy beam on the globule (e.g., with respect to a vector normal to the curved surface of the globule). For example, a first modification may result when the second energy beam is incident at an angle of about 45 degrees relative to the surface normal of the globule, and a second modification (different from the first modification) may result when the second energy beam is incident at an angle of about 90 degrees relative to the surface normal of the globule. In some cases, transforming using certain angles of incidence cause defects in the resulting transformed material (e.g., and subsequently in the object). Such defects may include high surface roughness (e.g., of the "bottom" skin) and/or distorted dimensions of the overhangs (e.g., relative to a requested geometry).

Figure 15A:
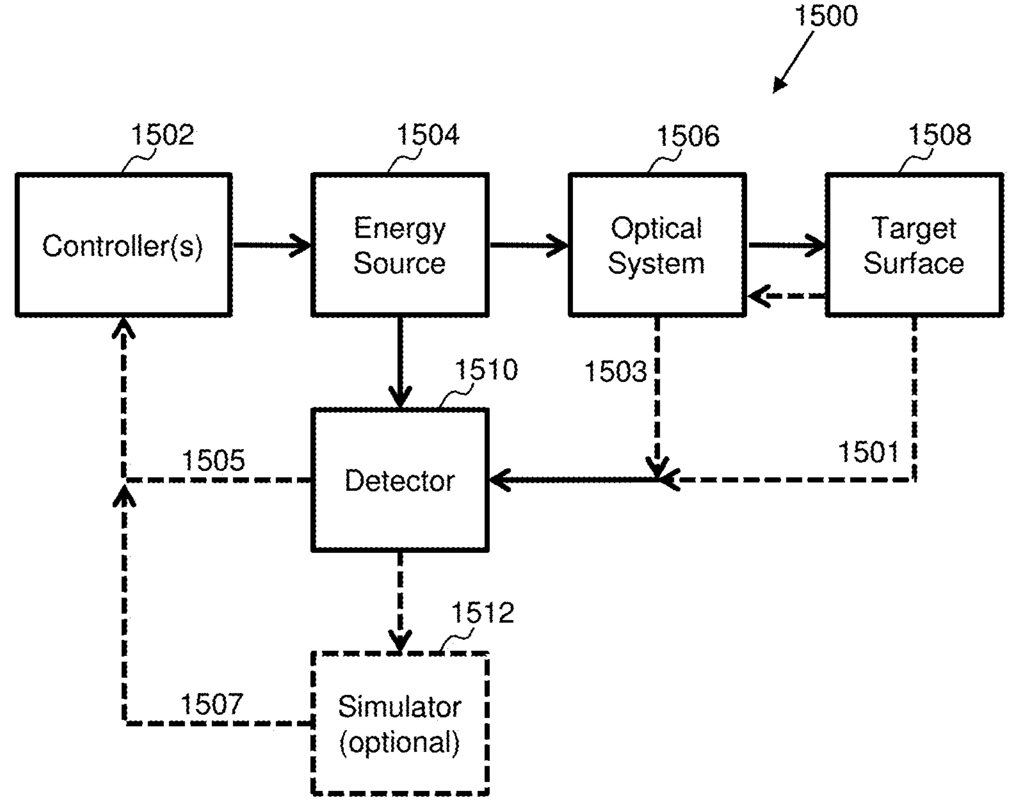
FIG. 15A schematically illustrates a control system.

According to some embodiments, aspects of a printing process can be monitored (e.g., in real time) using one or more control systems. FIG. 15A shows an example block diagram of a control system 1500 for a printer. One or more controllers (e.g., FIG. 15A, 1502) can send instructions to one or more energy sources (e.g., FIG. 15A, 1504) for controlling aspects of one or more energy beams. The controller(s) can include (e.g., electrical) circuitry that is configured to generate output (e.g., voltage signals) for directing controlling one or more aspects of the energy beams(s) generated by the energy source(s). The energy beam(s) may be directed by one or more optical systems (e.g., FIG. 15A, 1506) toward a target surface (e.g., FIG. 15A, 1508). The optical system(s) may include galvanometer(s) that guides the energy beam(s) on the target surface in accordance with one or more paths. In some embodiments, the printing system includes one or more detectors (e.g., FIG. 15A, 1510) that are configured to detect one or more signals during the printing. In some embodiments, the detector(s) includes a thermal detector that detects a thermal signal (e.g., infrared radiation) of the target surface. In some cases, the detector directly detects (e.g., FIG. 15A, 1501) a signal from the target surface. In some cases, the detector detects (e.g., FIG. 15A, 1503) a signal from the target surface via the optical system. For example, the optical system can be configured to receive and direct radiating energy (e.g., infrared radiation) from the target surface to the (e.g., thermal) detector. The optical system may be configured to direct radiation from a localized area of the target surface, such as an area proximate to and including the area at which the energy beam is directed (e.g., "bore sight" detection). In some embodiments, the detector is configured to detect a signal (e.g., thermal signal) within at least about six times (e.g., at least about 6, 5.5, 5, 4.5, 4, 3.5, 3, 2.5, 2, 1.5, 1 or 0.5 times) a FLS (e.g., diameter) of a melt pool formed on the target surface. The detector can be configured to detect a signal times a FLS of a melt pool that ranges between any of the afore-mentioned values (e.g., from about 6 to about 0.5 times, from about 6 to about 3 times, or from about 3 to about 0.5 times). Examples of printers having control systems are described in international patent application serial number PCT/US17/64474, filed Dec. 4, 2017, titled "OPTICS, DETECTORS, AND THREE-DIMENSIONAL PRINTING;" and international patent application serial number PCT/US18/12250, filed Jan. 3, 2018, titled "OPTICS IN THREE-DIMENSIONAL PRINTING;" U.S. provisional application Ser. No. 62/640,518, filed Mar. 8, 2018, titled "CALIBRATION IN THREE-DIMENSIONAL PRINTING," and international patent application serial number PCT/US15/65297, each of which is entirely incorporated herein by reference.

Figure 15B:
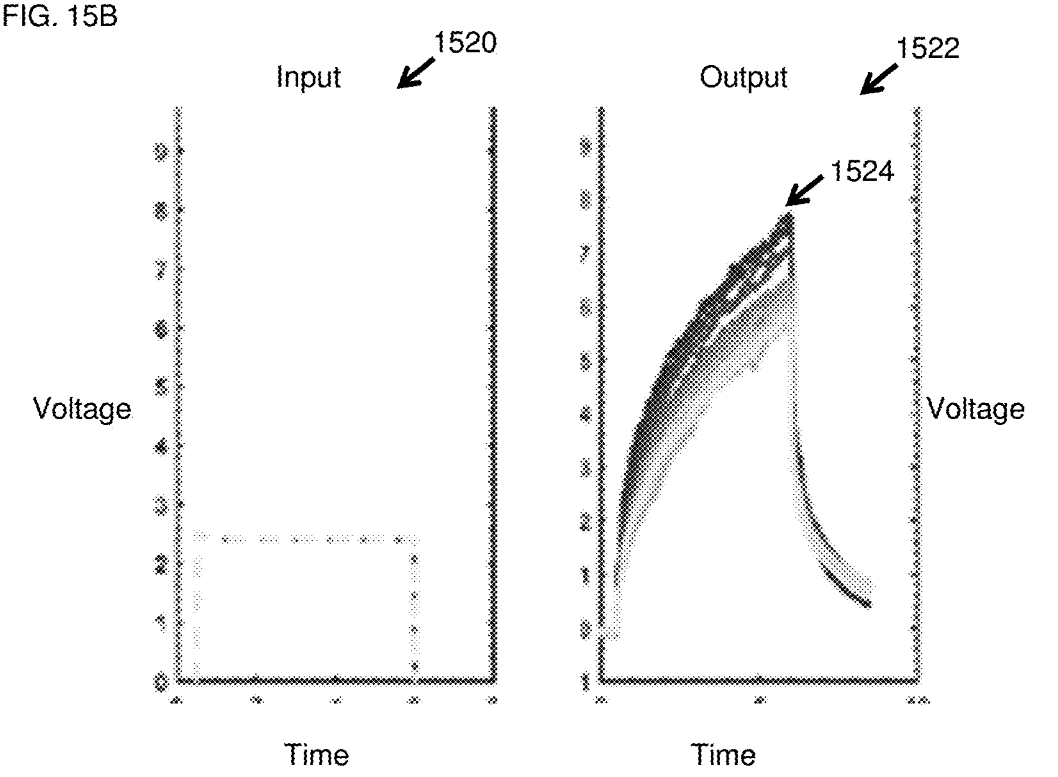
FIG. 15B schematically illustrates input and output graphs.

In some instances, the control system is used to (e.g., indirectly or directly) monitor a power density of an energy beam incident on a target surface. For example, a higher (e.g., thermal) signal may be associated with a higher effective power density of the energy beam at the target surface, and a lower (e.g., thermal) signal may be associated with a lower effective power density of the energy beam at the target surface. With regard to irradiating a globule of hardened material, a lower (e.g., thermal) signal (e.g., corresponding to a lower effective power density) may be indicative of the energy beam impinging on the globule at a grazing angle, and a higher (e.g., thermal) signal (e.g., corresponding to a higher effective power density) may be indicative of the energy beam impinging on the globule at a non-grazing angle. FIG. 15B shows example graphs indicating time-dependent input (e.g., FIG. 15B, 1520) and output (e.g., FIG. 15B, 1522) voltage signals of a detector during printing of several layers of material. The input voltage (e.g., FIG. 15B, 1520) can correspond to a voltage signal from the controller(s) related to the one or more process parameters. The process parameter can relate to the source(s) of the energy beam(s) (e.g., power). The process parameter can relate to the energy beam. The energy beam process parameter may comprise: power density (e.g., at the target surface), FLS of the cross section, speed (e.g., scan speed), intermission time(s), dwell time(s), FLS of irradiation spot, focal point position with respect to the target surface, and/or path (e.g., scan pattern). The process parameter may comprise gas flow speed, gas flow direction, gas flow intermission time(s) (if any), atmosphere pressure (e.g., within the processing chamber), gas composition (e.g., within the processing chamber), and/or atmosphere temperature (e.g., within the processing chamber). The process parameter may comprise a layer height (also referred to as thickness) (e.g., formed by the layer forming apparatus), layer re-planarizing (e.g., if non-uniform), and/or pre-transformed material removal rate (of the removal mechanism (e.g., FIG. 1, 118)). In some cases, the output voltage corresponds to a detectable signal. The output signal may relate to a detectable change during the printing. The output signal may be referred to as a sensed signal. The output signal may be detected inside or outside of the processing chamber. The output signal may relate to a consequence of the printing process. In some embodiments, the output signal relates to changes in the material being transformed. The output signal may relate to changes in a melt pool while in liquid or partially liquid form. The output signal may relate to thermal characteristics (e.g., temperature), reflectivity, specularity, color, and/or a presence of spatter. The output signal may relate to changes in the atmosphere (e.g., pressure, temperature, (e.g., chemical) composition, gas flow speed, and/or gas flow turbulence). The output signal may relate to in reflectance off component(s) (e.g., walls of the processing chamber) of the printer. The output signal may relate to changes in a temperature of component(s) (e.g., walls of the processing chamber) of the printer. The output signal may relate to the presence of a non-uniform layer and/or defects in the material bed. A (e.g., thermal) signal monitored over an irradiation period may have a signature shape. For example, the thermal signal may have a characteristic rise (e.g., steady and/or gradual rise) in voltage to a peak voltage (e.g., FIG. 15B, 1524), which may correspond to a peak temperature of the target surface over the irradiation time period. When the irradiation is removed from the target surface, the (e.g., thermal) signal may have a characteristic decrease (e.g., sharp drop). The characteristic rise, peak and decrease (e.g., magnitude and/or shape) can correspond to a (e.g., thermal) signature of the transformation (e.g., re-transformation) process. Regarding irradiating a globule of previously transformed material, the (e.g., thermal) signal (e.g., as indicated by the output voltage of FIG. 15B) may reduce when irradiating the globule at a grazing angle. In some cases, the (e.g., thermal) signal reduces after transformation of each layer (indicated by lines of the output voltage of FIG. 15B), which may be compounded with each successive layer that is transformed. The reduction of (e.g., thermal) signal may be associated with differing portions of the object having different characteristics. For example, a reduction of (e.g., thermal) signal during printing of a (e.g., bottom) skin of an overhang may be associated with a rougher surface than another (e.g., top) skin of the overhang.

In some embodiments, the one or more control systems (e.g., FIG. 15A, 1500) is used to address challenges of forming various portions of the 3D object, e.g., shallow overhangs. In some cases, the control system(s) is used to compensate for a reduction of power density (e.g., as indicated in FIG. 15B). The control system may include a closed loop (comprising feedback or feed-forward) control scheme. For example, a (e.g., thermal) signal detected by a detector (e.g., FIG. 15A, 1510) (e.g., in real time) can be compared to a target (e.g., thermal) signal. The target signal can correspond to a signal that is associated with printing an object (or a portion of the object) having a desired characteristic (e.g., dimensions and/or surface roughness). The target signal may be empirically and/or theoretically determined. For example, the target signal may be obtained by collecting several signals during printing of objects (portions of objects) having the desired characteristics. In some embodiments, the target signal has a threshold value (e.g., peak voltage (e.g., FIG. 15B, 1524)). In some embodiments, the target signal has a signature shape (e.g., predetermined rise to peak and fall from peak). If it is determined that the (e.g., real time) signal is sufficiently different than the target signal, print instructions of the controller(s) can be modified via a feedback loop (e.g., FIG. 15A, 1505). For example, a voltage input signal (e.g., FIG. 15B, 1520) from the controller(s) can be modified. The modification can be in accordance with (e.g., a magnitude of) the difference between the measured (e.g., real time) signal and the target signal. For example, the controller(s) may direct the energy source(s) to modify (e.g., attenuate or amplify) a power density of the energy beam(s) (e.g., as measured at the target surface) The controller(s) may direct a change in the optical system to change the FLS of the energy beam (e.g., beam diameter and/or spot size at the target surface) to modify the power density of the energy beams (e.g., as measured at the target surface). The modification of power density can be in order to compensate for a change (e.g., increase or decrease) in power density at the target surface. Such energy beam control can improve a quality of the 3D object (e.g., lower surface roughness). In some cases, the control system adjusts the input (e.g., energy beam power) to a point that even a maximum input (e.g., maximum energy beam power) does not achieve an acceptable output (e.g., thermal signal). When this occurs, the output (e.g., thermal signal) may not be controllable by the feedback loop control. Such situation may cause defects (e.g., undesired geometry and/or surface roughness) to develop in the object.

According to some embodiments, LPM (and M 3) techniques described herein involve manipulation of the material while in a relatively malleable state. The malleable state may be more malleable than a solid state. In some case, the manipulation is done while the material is in a liquid or partially liquid state. In some cases, the manipulation takes into account a 3D geometry of the object. In some cases, the manipulation takes into account a material of the object. The manipulation may take into account the effects of the energy beam incident on the material while in malleable (e.g., liquid or partially liquid) state. For example, the energy beam may locally energize and/or disturb a gas (e.g., inert gas (e.g., argon and/or nitrogen)) near the site of impingement of the energy beam on the target surface. In some cases, the manipulation takes into account thermo-mechanical, gas flow dynamics, and/or liquid phase dynamics. The manipulation may take into account the interface between the different phases (e.g., solid and liquid interface, and/or liquid and gas interface). In some cases, a previously-transformed material (e.g., a globule of hardened material) is manipulated when in liquid or partially liquid state. The manipulation may include modifying a shape and/or location (e.g., center of mass) of the previously transformed material. In some cases, the manipulation occurs without (e.g., substantially) entraining (e.g., transforming) pre-transformed material (e.g., powder). In some cases, the manipulation occurs without (e.g., substantially) changing a mass of the previously transformed material. The manipulation can include LPM techniques described herein. The LPM techniques can be used to control a location, a shape, a size and/or a microstructure of a liquified or partially liquified material during printing (e.g., using at least in part liquid phase control). Controlling the material while in a liquified or partially liquified state can determine, at least in part, on how the material will harden (e.g., solidify (e.g., upon cooling)). In some embodiments, the control is dynamic (e.g., in real time). For example, controlling may comprise controlling movement of the material while in liquid or partially liquid state. LPM techniques can be used to address challenges 3D object (e.g., or a part thereof, e.g., overhangs) formation, e.g., described herein. For example, LPM may be used to reduce (e.g., effectively eliminate) effects of differing energy beam angles of incidence relative the target surface, e.g., as described herein. In some embodiments, LPM is used without usage of feedback and/or feed-forward control schemes. In some embodiments, LPM is used in conjunction with feedback and/or feed-forward control schemes. LPM techniques may be used in the formation of any part of a 3D object. For example, LPM techniques may be used to form an interior portion (also referred to herein as "core"), an exterior portion (also referred to herein as "skin"), an overhang and/or a non-overhang portion of a 3D object. The LPM technique may be used to manipulate a melt pool (while in a partially or fully liquid state) that is disposed on a pre-transformed material and/or a hard material.

Figure 16A:
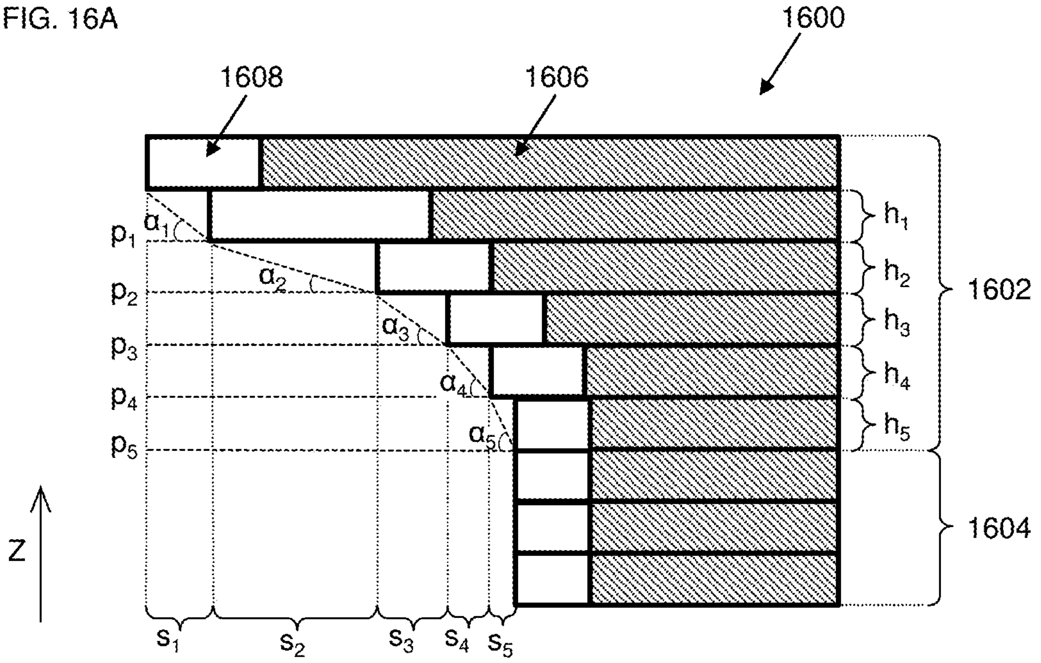
FIG. 16A schematically illustrates a vertical cross section view of a portion of a 3D object; 16B schematically illustrates an angle and length relationship.

In some embodiments, LPM is used to form an overhang or a portion of an overhang. FIG. 16A shows an example schematic vertical cross section view of a model object 1600 indicating a layerwise process for forming an overhang. A layerwise printing of an overhang (e.g., FIG. 16A, 1602) can comprise sequentially stacking multiple layers of hardened material in accordance with a stacking vector (e.g., FIG. 16A, "Z"). The overhang can be formed layerwise from an edge of a rigid portion (e.g., FIG. 16A, 1604) of the object. The overhang can be formed in segments, with each segment formed from one or more layers of pre-transformed material. An overhang segment having a step height (e.g., FIG. 16A: $h_1$, $h_2$, $h_3$, $h_4$ and $h_5$). The step height (h) of a layer can correspond to a (e.g., average) height of a layer of hardened material. Each layer can include a layer interior portion (e.g., FIG. 16A, 1606) and a layer exterior portion (e.g., FIG. 16A, 1608). The layer interior portions of the overhang (e.g., FIG. 16A, 1602) can together form a skin (e.g., bottom skin) of the overhang. Each layer of the overhang can be (e.g., substantially) parallel to a corresponding (e.g., average) layering plane (e.g., FIG. 16A: $p_1$, $p_2$, $p_3$, $p_4$ and $p_5$). Each (e.g., average) layering plane may be (e.g., substantially) parallel with respect to each other and/or orthogonal with respect to the stacking vector. Each layer of the overhang can extend from a previously formed (e.g., underlying) layer by a step length (e.g., FIG. 16A: $s_1$, $s_2$, $s_3$, $s_4$ and $s_5$). An exposed surface (e.g., bottom surface) of each layer of the overhang can be at a step angle (e.g., FIG. 16A: $a_1$, $a_2$, $a_3$, $a_4$ and $a_5$) from a corresponding layering plane. An overhang layer step length (s) may be associated with the overhang layer step height (h) and step angle (a) by the following Equation 1:

$$s=h/\tan(\alpha) \qquad \text{(Equation 1)}$$

Figure 16B:
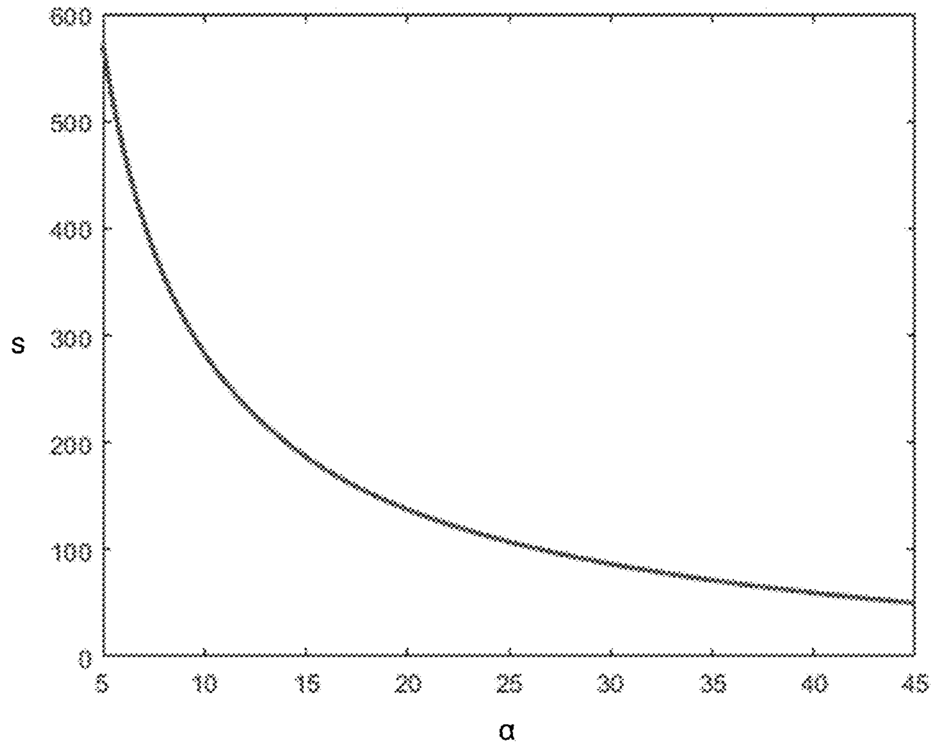

FIG. 16B shows an example graph indicating the tangential relationship between an overhang step length (s) and step angle (α). An overhang step length (s) can rise tangentially with decreasing step angle (α). This relationship indicates that longer step lengths (s) are associated with lower (shallower) step angles (a). In some cases, overhang layers having lower step angles (a) are more difficult to print (e.g., without defect) compared to higher (steeper) step angles (a). In some examples, a lower (shallow) step angle (α) is at most about 45 degrees (°), 40°, 30°, 20°, 10°, 5°, 3°, 2°, 1° or 0.5°. A lower (shallow) step angle may have a value ranging between any of the afore-mentioned values (e.g., from about 45° to about 0.5°, from about 45° to about 20°, or from about 20° to about 0.5°). In some embodiments, a higher (steep) step angle is at least about 45°, 50°, 55°, 60°, 65°, 70°, 75°, 80°, 85° or 90°. A higher (steep) step angle may have a value ranging between any of the afore-mentioned values (e.g., from about 45° to about 90°, from about 45° to about 70°, or from about 70° to about 90°). In some cases, overhang step angle (α) an overhang layer step length (s) or step height (h) is varied to accommodate the step angle (α). For example, the step length (s) and/or the step height (h) may be decreased to accommodate a low (shallow) step angle (α).

Figures 17A, 17B, 17C, 17D:
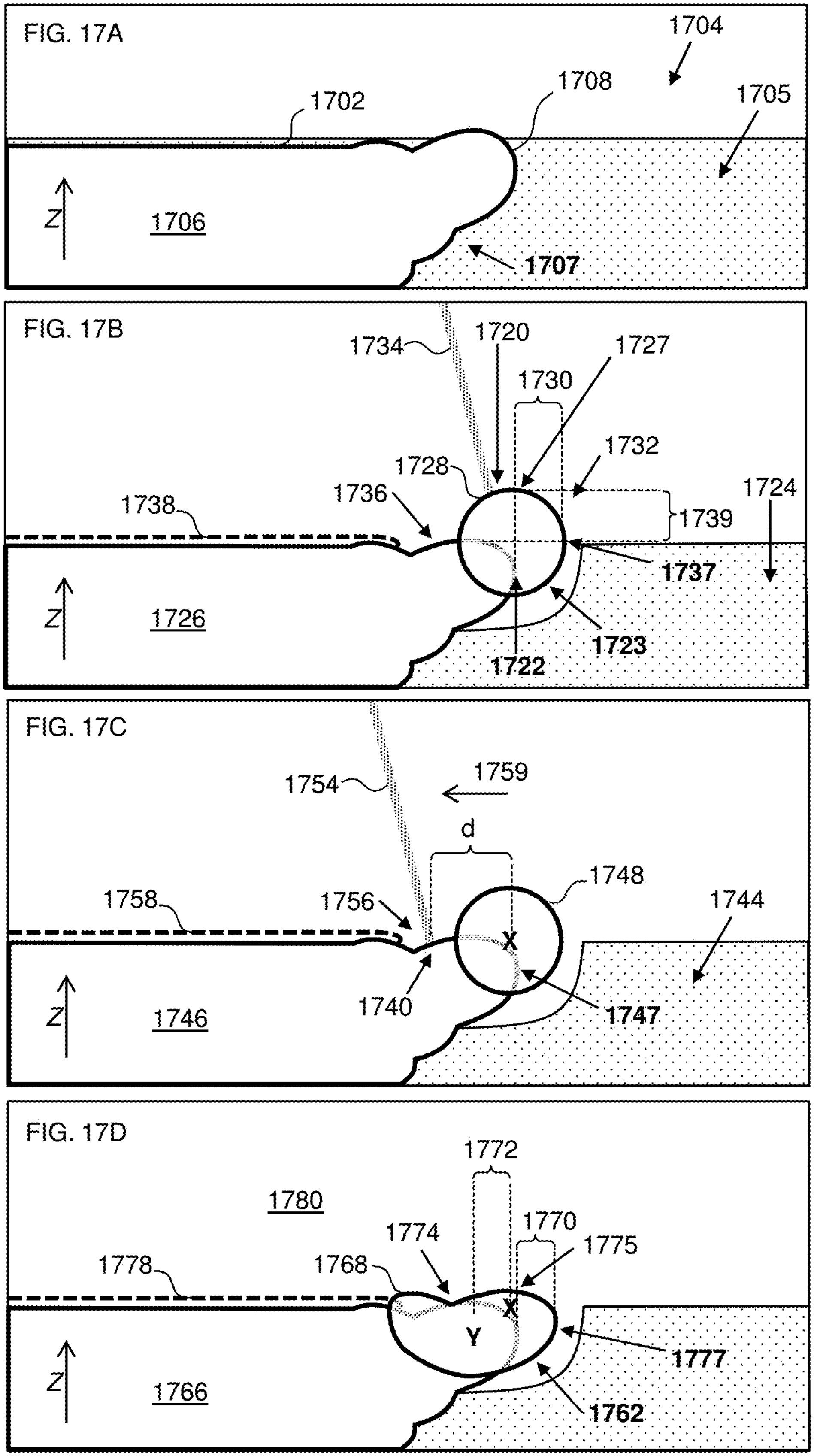
FIGS. 17A-17D schematically illustrate operations in forming a 3D object.

According to some embodiments, the LPM techniques can be used in forming one or more of the layers of an overhang. In some embodiments, LPM is used as one or more operations of a multiple transformation operation (also referred to herein as an "MTO"). FIGS. 17A-17D show example vertical cross section views of an overhang segment being forming using LPM. FIG. 17A shows an example an exposed surface of a material bed 1704, which material bed comprises pre-transformed material and a previously hardened portion 1706 (also referred to herein as a "hard portion," "hardened material," or "hard material") of a 3D object that includes an edge 1708. One or more layers of pre-transformed material (e.g., FIG. 17A, 1705) (e.g., powder) may cover a (e.g., top) surface of the previously hardened portion (e.g., FIG. 17A, 1706), such as after a layer forming operation. In some embodiments, at least a fraction of the previously hardened portion (e.g., FIG. 17A, 1706) protrudes above a top surface (e.g., FIG. 17A, 1702) of the pre-transformed material. In some cases, the edge (e.g., FIG. 17A, 1708) of the previously hardened portion protrudes above the top surface of the pre-transformed material. In some embodiments, at least a fraction of a surface of the previously hardened portion is (e.g., substantially) flush with the top surface of the pre-transformed material. In some embodiments, the pre-transformed material (e.g., completely) covers surfaces of the previously hardened portion (e.g., FIG. 17A, 1706). An exterior surface (e.g., of a (e.g., bottom) skin) (e.g., FIG. 17A, 1707) of the previously transformed portion may have a (e.g., scalloped) microtexture from, for example, previously formed melt pools. FIG. 17B shows an example of a first LPM operation where the one or more layers of pre-transformed material 1724 of material bed is/are transformed to an exterior layer portion 1728 that extends beyond the hard portion (e.g., towards the pre-transformed material 1724). The exterior layer portion (e.g., FIG. 17B, 1728) may be referred to as an overhang segment. The interior layer portion may correspond to a layer of an internal portion (also referred to herein as a "core") of the 3D object. The exterior layer portion may correspond at least in part to a portion of the (e.g., bottom) skin of the overhang of the 3D object. The exterior layer portion (e.g., and at times also the interior layer portion) may be formed using a first energy beam (e.g., FIG. 17B, 1734). The first energy beam may be directed at a first location (e.g., FIG. 17B, 1720) of the material bed. In some embodiments, the same energy beam is used to form the interior layer portion and the exterior layer portion. In some embodiments, different energy beams are used to form the interior layer portion and the exterior layer portion. The different energy beams may differ in at least one energy beam characteristic. It should be noted that the interior layer portion may be formed before, during and/or after the exterior layer portion is formed. For example, in some embodiments, a skin that includes multiple exterior layer portions may be formed around the edge of the previously transformed portion (FIG. 17A, 1706) prior to forming the interior portion (e.g., to reduce (e.g., prevent) deformation of object). In some embodiments, the interior layer portion is formed prior to the exterior layer portion. In some embodiments, the exterior layer portion is formed prior to the interior layer portion. In some cases, one or both of the interior layer portion and the exterior layer portion are formed using a tiling energy beam or a hatching energy beam. The exterior layer portion may be formed such that a leading surface (e.g., FIG. 17B, 1737) of the exterior layer portion (e.g., laterally) extends from the edge of the previously hardened portion (e.g., FIG. 17B, 1726) by a (e.g., pre-determined) overhang distance (e.g., FIG. 17B, 1730). The leading surface (e.g., FIG. 17B, 1737) can be referred to as a lateral surface. The leading surface can define a (e.g., first) terminal point of the exterior layer portion. The (e.g., first) terminal point may correspond to a point on the lateral surface that extends the most laterally from the edge (e.g., FIG. 17B, 1722) of the hard portion (e.g., FIG. 17B, 1726). The overhang distance (e.g., FIG. 17B, 1730) may correspond to a distance from the edge (e.g., FIG. 17B, 1722) of the hard portion (e.g., FIG. 17B, 1726) to the (e.g., first) terminal point of the leading surface (e.g., FIG. 17B, 1737). The overhang distance (e.g., FIG. 17B, 1730) may be associated with the overhang step length (e.g., FIG. 16A: $s_1$, $s_2$, $s_3$, $s_4$ or $s_5$). The distance that the exterior layer portion extends from the edge may (e.g., substantially) correspond to a (e.g., calculated) step length (e.g., FIG. 16A: $s_1$, $s_2$, $s_3$, $s_4$ or $s_5$) of an overhang layer. In some embodiments, an interior layer portion (e.g., FIG. 17B, 1738) is formed. In some cases, the distance (e.g., FIG. 17B, 1730) is (e.g., substantially) the same as the overhang step length (e.g., FIG. 16A: $s_1$, $s_2$, $s_3$, $s_4$ or $s_5$). The exterior layer portion can include a (e.g., top) surface (e.g., FIG. 17B, 1727). The (e.g., top) surface (e.g., FIG. 17B, 1727) can extend vertically from the (e.g., top) surface of the edge (e.g., FIG. 17B, 1722) of the hard portion (e.g., FIG. 17B, 1726) by a height (e.g., FIG. 17B, 1739). The (e.g., top) surface (e.g., FIG. 17B, 1727) can define a (e.g., second) terminal point of the exterior layer portion. The (e.g., second) terminal point may correspond to a point on the (e.g. top) surface that extends the most vertically from the edge (e.g., FIG. 17B, 1722) of the hard portion (e.g., FIG. 17B, 1726). The height (e.g., FIG. 17B, 1739) of the exterior layer portion may correspond to a distance from the edge (e.g., FIG. 17B, 1722) of the hard portion (e.g., FIG. 17B, 1726) to the (e.g., second) terminal point of the (e.g., top) surface (e.g., FIG. 17B, 1727). The exterior layer portion may be separated by the interior layer portion by a first gap (e.g., FIG. 17B, 1736). The first gap may be provided to reduce chances of (e.g., prevent) the exterior layer portion from contacting (e.g., wetting) binding to, and/or co-mingling with the interior layer portion. In some cases, the first energy beam causes the exterior layer portion to form a globular shape that may be referred to herein as a "globule." For example, the location of incidence (e.g., first location 1720) of the first energy beam and characteristics (e.g., power density at the target surface) of the first energy beam can cause the exterior layer portion to take on a globular shape. Without wishing to be bound by theory, the globular shape may result from creation of a sufficiently high surface tension gradient to overcome a capillary instability (also referred to as Rayleigh instability) force. The capillary instability force can refer to a force that causes a fluid (e.g., the liquified or partially liquified exterior layer portion) to detach (e.g., splatter) as small droplets. Formation of the exterior layer portion may form a second gap (e.g., FIG. 17B, 1732) between the exterior layer portion and the pre-transformed material (e.g., FIG. 17B, 1724), e.g., due to consumption of the pre-transformed material (e.g., powder) from formation of the globule. A center of mass of the exterior layer portion may be at a first position (e.g., FIG. 2B, "X") (e.g., with respect to the edge of the previously hardened portion (e.g., FIG. 17B, 1726)). In some cases, the exterior layer portion (e.g., globule) has a curved (e.g., bottom) surface (e.g., FIG. 17B, 1723).

FIG. 17C shows an example of a second LPM operation using a second energy beam 1754. In some embodiments, the second LPM operation comprises a transformation operation (e.g., re-transforming a hardened (e.g., solid or partially sold) material) to a transformed (e.g., liquid (or partially liquid) material). The second LPM operation may (e.g., also) cause at least the exterior layer portion (e.g., FIG. 17C, 1748) to remain or become at least partially liquified (e.g., fully liquified). In some embodiments, the exterior layer portion is at least partially hardened (e.g., solidified) prior to the second LPM operation. At least partially hardened comprises completely hardened. The second LPM operation may cause a center of mass of the exterior layer portion to move from a first position to a second location, while in the at least partially liquified state (e.g., completely liquified state). The exterior layer portion may be formed above a hard material. The hard material may be a portion of a 3D object (e.g., formed by layer wise deposition), or a different hard material (e.g., formed by another methodology). The hard material may be formed in a material bed. The hard material may be created in a different methodology and may be inserted into a material bed. The hard material may be deposited above a platform. The exterior layer portion may be formed in a 3D printing methodology that excludes usage of a material bed. For example, the exterior portion may be formed by extrusion, by depositing a liquified material, and/or by depositing a particulate material that becomes liquified on deposition (e.g., by direct material deposition). The second LPM operation may cause a center of mass of the exterior layer portion to move (e.g., FIG. 17C, 1759) from a first position (e.g., FIG. 2C, "X") while in the at least partially liquified state (e.g., completely liquified state). The movement may be in a direction away from the edge (e.g., FIG. 17C, 1747) of the previously hardened portion (e.g., FIG. 17C, 1746). The movement may be toward an interior of the object. In some embodiments, the movement of the center of mass entails a (e.g., respective) movement of the energy beam. In some embodiments, the movement of the center of mass excludes a (e.g., respective) movement of the energy beam. The second LPM operation may cause the exterior layer portion to change shape while in the liquified or partially liquified state. The second energy beam may be directed at a second location (e.g., FIG. 17C, 1740) on the target surface (e.g., in relation to the previously hardened portion (e.g., FIG. 17C, 1746). The second location (e.g., FIG. 17C, 1740) of the second energy beam may be a distance (e.g., FIG. 17C, d) from the first location (e.g., FIG. 17B, 1720) of the first energy beam on the material bed. The second energy beam may be directed at one or more of the previously hardened portions (e.g., FIG. 17C, 1746), the interior layer portion (e.g., FIG. 17C, 1758) and exterior layer portion (e.g., FIG. 17C, 1748). In some embodiments, the second energy beam is directed within the gap (e.g., FIG.

17C, 1756) and at the previously hardened portion (e.g., FIG. 17C, 1746). The energy beam (e.g., FIG. 17C, 1754) may heat a position on the exposed surface of the hard material disposed adjacent to the exterior layer portion (e.g., globule). The second energy beam may cause the hard material, the interior layer portion, and/or the exterior layer portion, to re-transform (e.g., melt and/or sinter). In some embodiments, the second energy beam is not (e.g., substantially) directed at the pre-transformed material (e.g., FIG. 17C, 1744) of the exposed surface of the material bed. In some embodiments, the second LPM operation may exclude (e.g., substantially) transforming a pre-transformed material. The second LPM operation may (e.g., substantially) exclude entraining a pre-transformed material into the 3D object. The second LPM operation may (e.g., substantially) exclude entraining a pre-transformed material into the exterior layer portion, the previously hardened portion (e.g., FIG. 17C, 1746) and/or the interior layer portion (e.g., FIG. 17C, 1758). The second LPM operation may not (e.g., substantially) increase the mass of the 3D object. The second LPM operation may not (e.g., substantially) increase the mass of the exterior layer portion, the previously hardened portion and/or the interior layer portion. The second LPM operation may increase the mass of the 3D object (e.g., the mass of the exterior layer portion, the previously hardened portion and/or the interior layer portion) by no more than about 0.5%, 1%, 1.5%, 2%, 3%, 4%, 5%, 10%, 15%, or 20% (e.g., by weight). The second LPM operation may increase the mass of the 3D object (e.g., the mass of the exterior layer portion, the previously hardened portion and/or the interior layer portion) by a value ranging between any of the aforementioned values (e.g., from about 0.5% to about 20%, from about 0.5% to about 10%, from about 10% to about 20%, or from about 0.5% to about 5%). The exterior layer portion may (e.g., substantially) maintain its mass as a result of the second LPM operation. The exterior layer portion may not (e.g., substantially) gain mass as a result of the transformation operation. FIG. 17D shows an example of the exterior layer portion 1768 that is hardened (e.g., solidified) (e.g., after the second LPM operation). The second LPM operation may cause a center of mass of the exterior layer portion (e.g., FIG. 17D, 1768) to move from the first position (e.g., FIG. 17D, "X") to a second position (e.g., FIG. 17D, "Y") (e.g., in relation to the previously hardened portion (e.g., FIG. 17D, 1766)). The center of mass may change by a distance (e.g., FIG. 17D, 1772). The second LPM operation may cause movement of the (e.g., first) terminal point on the lateral surface (e.g., FIG. 17D, 1777) to move in a direction toward an interior of the object (e.g., toward interior layer portion 1778). The second LPM operation may cause (e.g., substantially) no movement of the (e.g., first) terminal point on the lateral surface (e.g., FIG. 17D, 1777). The second LPM operation may cause movement of the (e.g., second) terminal point on the (e.g., top) surface (e.g., FIG. 17D, 1775) to move in a direction toward an interior of the object (e.g., toward interior layer portion 1778). The second LPM operation may cause movement of the (e.g., second) terminal point on the (e.g., top) surface (e.g., FIG. 17D, 1775) to move in a direction (e.g., substantially) parallel to the gravitational vector (e.g., opposite of stacking vector "Z"). In some embodiments, the second LPM operation may change a shape of the exterior layer portion. The exterior layer portion may become flatter (e.g., compared to its previous globular shape). The second LPM operation may change (e.g., reduce) a radius of curvature of an exposed (e.g., "top") surface of the exterior layer portion. The exterior layer portion may have a reduced thickness (e.g., compared to before the second transformation operation). In some cases, second LPM operation does not (e.g., substantially) change the overhang distance (e.g., FIG. 17D, 1770) compared to its position before the second LPM operation. The second LPM operation can cause the exterior layer portion to contact the interior layer portion (e.g., FIG. 17D, 1778). The second LPM operation can cause the exterior layer portion to wet the interior layer portion. A relationship of the surface tension gradient on the at least partially liquified exterior layer portion and temperature can be expressed by the following Equation 2.

$$\frac{\partial\sigma}{\partial r}=\left(\frac{\partial\sigma}{\partial T}\right)\left(\frac{\partial T}{\partial r}\right) \qquad \text{(Equation 2)}$$

In Equation 2, $$\frac{\partial\sigma}{\partial r}$$

corresponds to the surface tension gradient (e.g., at an interface between the at least partially liquified exterior layer portion and a surrounding gas), $$\frac{\partial\sigma}{\partial T}$$

corresponds to a material property (e.g., of the at least partially liquified exterior layer portion), and $$\frac{\partial T}{\partial r}$$

corresponds to a temperature gradient (e.g., of the at least partially liquified exterior layer portion). Equation 2 indicates that the surface tension gradient is proportional to the temperature gradient. The temperature gradient is proportional to the power density (e.g., of the energy beam at the target surface). For example, a higher power density can be associated with a higher surface tension gradient, and a lower power density can be associated with a lower surface tension gradient. In some embodiments, the power density of the energy beam at the target surface (e.g., at the second position (e.g., FIG. 17C, 1740)) is sufficiently high to create a surface tension gradient at an interface between the at least partially liquified exterior layer portion and a surrounding gas (e.g., FIG. 17D, 1780) to apply a flattening force on (e.g., top surface of) the at least partially liquified exterior layer portion.

In some embodiments, when an interior layer portion (e.g., 1766) exists, the flattening process (e.g., of the second LPM operation) can cause the at least partially liquified exterior layer portion to span the gap (e.g., FIG. 17C, 1756) between the exterior layer portion 1748 and the interior layer portion 1758, and contact (e.g., wet) a surface of the interior layer portion. In some embodiments, the exterior layer portion comprises a divot (e.g., FIG. 17D, 1774) (also referred to herein as a "dent," "depression," "pit," or "cleft"). A location of the divot may correspond to a location at which the second energy beam impinges on the target surface (e.g., at second location (e.g., FIG. 17C, 1740). Without wishing to be bound by theory, the divot may be caused by formation and/or expulsion of a localized heated gas during the second LPM operation. The exterior layer portion may maintain a curved (e.g., bottom) surface (e.g., FIG. 17D, 1762). The curved (e.g., bottom) surface may correspond to a (e.g., overlapping) scale, or crescent-shaped feature on a (e.g., bottom) skin of the overhang.

In some embodiments, the first LPM operation comprises translating the first energy beam with respect to the target surface. In some embodiments, the second LPM operation comprises translating the second energy beam with respect to the target surface. In some embodiments, one or both of the first and second LPM operations comprises using a (e.g., substantially) stationary first energy beam and/or second energy beam. FIGS. 18A-18I show example schematic aerial views of an overhang segment showing various first and second LPM operations to form two globules at two (e.g., successive) locations at the target surface. Each of the globules may be a melt pool.

Figures 18A, 18B, 18C, 18D, 18E, 18F, 18G, 18H, 18I:
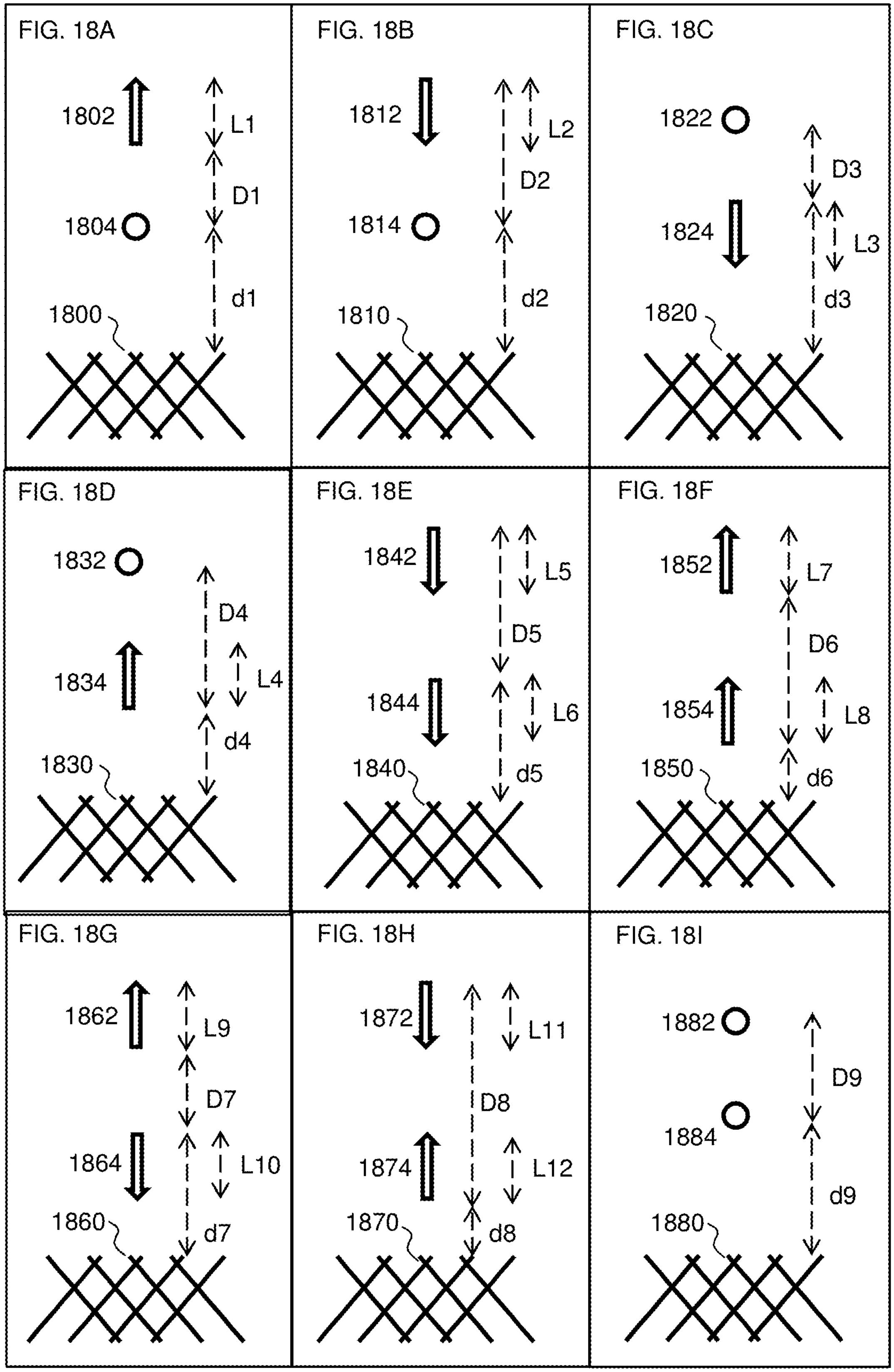
FIGS. 18A-18I schematically illustrate operations in forming 3D objects.

FIG. 18A shows an example second energy beam irradiation location 1804, which irradiation is to modify the exterior layer portion while in liquid or partially liquid state. To form the exterior portion, the first energy beam may form at least one melt pool, at least one tile, at least one path (e.g., in a direction 1802), or any combination thereof. For example, a tile followed by a hatch, or a hatch followed by a tile. The first energy beam can be translated along the target surface (e.g., hatching energy beam) in accordance with a first energy beam path (e.g., FIG. 18A, 1802) having a translation length (e.g., FIG. 18A, L1). The target surface may be an exposed surface of a material bed. The target surface may be an exposed surface of a hard material (e.g., a platform, or a partial object). The translation can be in a direction away from a location (e.g., FIG. 18A, 1800). The location may be an interior of the hard material. The location may be the interior layer portion. The second energy beam irradiation location at the target surface (e.g., FIG. 18A, 1804) can correspond to a location of a (e.g., substantially) stationary second energy (e.g., a tiling energy beam). The first and second energy beams may be the same energy beam, or different energy beams. FIG. 18B shows an example first energy beam translation path 1812 having a translation length L2 to form an exterior layer portion (e.g., globule). To form the exterior portion, the first energy beam may translate along a path, e.g., in a direction 1812. The direction (e.g., FIG. 18B, 1812) can be toward a location (e.g., FIG. 18B, 1810). The location (e.g., FIG. 18B, 1810) can be an interior of the hard material. The location may be of the interior layer portion (e.g., core). FIG. 18B shows an example of a second energy beam location 1814 to modify the exterior layer portion while in liquid or partially liquid state. The second energy beam (e.g., FIG. 18B, 1814) can be of a (e.g., substantially) stationary second energy beam. FIG. 18C shows an example first energy beam location 1822 for a (e.g., substantially) stationary first energy beam. The (e.g., substantially) stationary first energy can form an exterior layer portion (e.g., globule). A second energy beam can translate along the target surface in accordance with a second energy beam translation path in a direction (e.g., FIG. 18C, 1824) by a distance (e.g., FIG. 18C, L3). The second beam translated in the direction (e.g., FIG. 18C, 1824) can modify the exterior layer portion. The translation can be toward a location (e.g., FIG. 18C, 1820). The location may be an interior of the hard material. The location may be of the interior layer portion (e.g., FIG. 18C, 1820). FIG. 18D shows an example first energy beam location 1832 for a (e.g., substantially) stationary first energy beam. The (e.g., substantially) stationary first energy beam can form an exterior layer portion (e.g., globule). A second energy beam can translate along the target surface in accordance with a second energy beam translation path in a direction (e.g., FIG. 18D, 1834) by a distance (e.g., FIG. 18D, L4). The second beam translated in the direction (e.g., FIG. 18C, 1824) can modify the exterior layer portion. The translation can be in a direction away from the location (e.g., FIG. 18D, 1830). FIG. 18E shows an example first energy beam translation path 1842 having a translation length L5 to form an exterior layer portion (e.g., globule). The translation can be in a direction (e.g., FIG. 18E, 1842) toward a location (e.g., FIG. 18E, 1840). A second energy beam can translate along the target surface in accordance with a second energy beam translation path (e.g., FIG. 18E, 1844). The second energy beam can modify the exterior layer portion. The translation can be toward a location (e.g., FIG. 18E, 1840). FIG. 18F shows an example first energy beam translation path in a direction 1852 having a translation length L7 to form an exterior layer portion (e.g., globule). The translation can be away from a location (e.g., FIG. 18F, 1850). A second energy beam can translate along the target surface in accordance with a second energy beam translation path (e.g., FIG. 18F, 1854) to modify the exterior layer portion. The translation of the second energy beam may be away from a location (e.g., FIG. 18F, 1850). FIG. 18G shows an example first energy beam translation path in a direction 1862 having a translation length L9 to form an exterior layer portion (e.g., globule). The translation can be toward a location (e.g., FIG. 18G, 1860). A second energy beam can translate along the target surface in accordance with a second energy beam translation path (e.g., FIG. 18G, 1864). The second energy beam can modify the exterior layer portion. The translation of the second energy beam can be toward a location (e.g., FIG. 18G, 1860). FIG. 18H shows an example first energy beam translation path in a direction 1862 having a translation length L11 to form an exterior layer portion (e.g., globule). The translation can be toward a location (e.g., FIG. 18G, 1860). A second energy beam can translate along the target surface in accordance with a second energy beam translation path (e.g., FIG. 18G, 1864). The second energy beam can modify the exterior layer portion. The translation can be away from a location (e.g., FIG. 18G, 1860). FIG. 18I shows an example first energy beam location 1882 for a (e.g., substantially) stationary first energy to form an exterior layer portion (e.g., globule). A second energy beam location (e.g., FIG. 18I, 1884) can be used to modify the exterior layer portion. The second energy beam can be of a (e.g., substantially) stationary second energy beam. Examples of energy beam paths for forming 3D objects are described in international patent application number PCT/US16/34454, filed May 26, 2016, titled "THREE-DIMENSIONAL OBJECTS FORMED BY THREE-DIMENSIONAL PRINTING, which is entirely incorporated herein by reference.

In some embodiments, the first and/or second energy beams is a hatching energy beam, and the translation length (e.g., FIGS. 18A-18I, L1-L12) may be referred to as a hatch length. In some embodiments, the translation length (e.g., FIGS. 18A-18I, L1-L12) is greater than an FLS (e.g., diameter) of an irradiation spot of the first or second energy beam on the target surface. In some embodiments, the translation length (e.g., FIGS. 18A-18I, L1-L12) is less than a FLS (e.g., diameter) of an irradiation spot of the first or second energy beam on the target surface. In some embodiments, the first energy beam is translated (e.g., FIG. 18A, 18B, 18E, 18F, 18G or 18H) to lengthen the overhang step length (e.g., FIG. 16A: $s_1$, $s_2$, $s_3$, $s_4$ and $s_5$) of the overhang segment. The translation length may depend, in part, on the relationship between the overhang step length and the overhang step angle (e.g., FIG. 16A: $a_1$, $a_2$, $a_3$, $a_4$ and $a_5$) according to Equation 1. In some cases, the translation length of the first energy beam is (e.g., substantially) the same as the overhang step length (s). In some cases, the translation length of the first energy beam is less than or greater than the overhang step length. An amount less than or greater than the overhang step length (s) may depend on the magnitude of the overhang step angle (α). For example, at intermediate overhang step angles (a), the translation length of the first energy beam may be (e.g., substantially) zero. An intermediate overhang step angle (α) may be at most about 45 degrees (°), 40°, 35°, 30°, 20°, 10°, 5°, 3°, 2°, 1°, or 0.5°. An intermediate overhang step angle may be a value between any of the afore-mentioned values (e.g., from about 45° to about 0.5°, from about 30° to about 0.5°, or from about 10° to about 0.5°). In some embodiments, at shallow overhang step angles (a), the translation length of the first energy beam is relatively high in order to make a sufficiently long overhang step length (s). A shallow overhang step angle (α) may be at most about 35°, 30°, 25°, 20°, 15°, 10°, 5°, 2°, 1°, or 0.5°. A shallow overhang angle may comprise a planar overhang, where the angle overhang step angle is (e.g., substantially) zero.

In some embodiments, the translation length (e.g., FIGS. 18A-18I, L1-L12) is at least about 1 micrometer (µm), 5 µm, 10 µm, 50 µm, 100 µm, 200 µm, 300 µm, 400 µm, 500 µm, 600 µm, 700 µm, 800 µm, 900 µm or 1000 µm. The translation length can range between any of the afore-mentioned values (e.g., from about 1 µm to about 1000 µm, from about 1 µm to about 500 µm, from about 500 µm to about 1000 µm, or from about 10 µm to about 800 µm). In some embodiments, a distance (e.g., FIGS. 18A-18I, D1-D9) between the (e.g., initial) location of incidence of the first energy beam and the (e.g., initial) location of incidence the second energy beam (e.g., forming the first globule and the second globule) is at least about −500 µm, −400 µm, −300 µm, −200 µm, −100 µm, −50 µm, 0 µm, 50 µm, 100 µm, 200 µm, 300 µm, 400 µm, or 500 µm, where a negative distance refers to a (e.g., initial) location of incidence of the second energy beam is beyond the (e.g., initial) location of incidence of the first energy beam. The distance between the (e.g., initial) location of incidence of the first energy beam and the (e.g., initial) location of incidence of the second energy beam can range between any of the aforementioned values (e.g., from about −500 µm to about 500 µm, from about −500 µm to about 0 µm, from about 0 µm to about 500 µm, or from 0 µm to about 200 µm). In some embodiments, a distance (e.g., FIGS. 18A-18I, d1-d9) between the (e.g., initial) location of incidence of the second energy beam and the location (e.g., leading edge) of the interior portion is at least about 0 µm, 10 µm, 20 µm, 50 µm, 100 µm, 150 µm, 200 µm, 250 µm, 300 µm, 350 µm, 400 µm, 450 µm, 500 µm, 700 µm or 1000 µm. The distance between the (e.g., initial) location of incidence of the second energy beam and the location (e.g., leading edge) of the interior portion can range between any of the aforementioned values (e.g., from about 0 µm to about 1000 µm, from about 0 µm to about 300 µm, from about 300 µm to about 1000 µm, or from about 0 µm to about 500 µm).

In some embodiments, a speed of the first or second beam energy beam along the translation length (e.g., FIG. 18A, L1; FIG. 18B, L2; FIG. 18C, L3; FIG. 18D, 1832; FIG. 18E, 1842 or 1844; FIG. 18F, 1852 or 1854; FIG. 18G, 1862 or 1864; or FIG. 18H, 1872 or 1874) is at most about 1 millimeters per second (mm/sec), 5 mm/s, 10 mm/s, 20 mm/s, 30 mm/s, 40 mm/s, 50 mm/s, 60 mm/s, 70 mm/s, 80 mm/s, 90 mm/s, 100 mm/s, 150 mm/s, or 200 mm/s. The speed of the first or second beam energy beam along the translation length can have a value between any of the afore-mentioned values (e.g., from about 1 mm/s to about 200 mm/s, from about 1 mm/s to about 100 mm/s, from about 100 mm/s to about 200 mm/s, or from about 5 mm/s to about 60 mm/s). In some embodiments, the speed of the first and/or second beam energy beam is varied along the translation length. In some embodiments, the speed of the first and/or second beam energy beam is (e.g., substantially) constant along the translation length.

In some embodiments, a dwell time (e.g., irradiation time) of the first and/or second energy varies. In some cases, the overhang segment length (e.g., FIG. 17D, 1770), which can correspond to the overhang step length (s), is (e.g., substantially) independent of a dwell time of the first energy beam during the first LPM operation. In some cases, a dwell time of the first and/or second energy beam is at least about 1 microsecond (msec), 5 msecs, 10 msecs, 20 msecs, 30 msecs, 40 msecs, 50 msecs, 100 msecs, 200 msecs, 300 msecs, 400 msecs, 500 msecs or 1000 msecs. The dwell time of a (e.g., substantially) stationary first and/or second energy beam (e.g., tiling energy beam) can range between any of the aforementioned values (e.g., from about 1 msec to about 1000 msecs, from about 1 msec to about 100 msecs, from about 100 msecs to about 1000 msecs, or from about 5 msecs to about 50 msecs). In some embodiments, the power of the first energy beam is different than the power of the second energy beam. In some embodiments, the power of the first energy beam (e.g., substantially) the same as the power of the second energy beam. In some cases, the power of the first and/or second energy beam is at least about 10 Watts (W), 50 W, 100 W, 200 W, 300 W, 400 W, 500 W, 600 W, 700 W, 800 W, 900 W or 1000 W. The power of the first and/or second energy beam can range between any of the afore-mentioned values (e.g., from about 10 W to about 1000 W, from about 10 W to about 500 W, from about 500 W to about 1000 W, or from about 100 W to about 300 W).

In some embodiments, the irradiation spot size of the first energy beam at the target surface is different than the irradiation spot size of the second energy beam at the target surface. In some embodiments, the irradiation spot size of the first energy beam at the target surface is (e.g., substantially) the same as the irradiation spot size of the second energy beam at the target surface. In some cases, the FLS of the irradiation spot size of the first and/or second energy beam is at least about 1 µm, 50 µm, 100 µm, 200 µm, 300 µm, 400 µm, 500 µm, 600 µm, 700 µm, 800 µm, 900 µm, 1000 µm, 1500 µm or 2000 m. The FLS of the irradiation spot size of the first and/or second energy beam can range between any of the aforementioned values (e.g., from about 1 µm to about 2000 µm, from about 1 µm to about 1000 µm, from about 1000 µm to about 2000 µm, or from about 50 µm to about 100 µm).

In some cases, the power density of the first and/or second energy beam at the target surface may vary depending, in part, on the overhang segment angle (α) (e.g., and overhang segment length (s) and layer height (h)), type of material (e.g., chemical composition), and/or a scan speed of the energy beam(s) (e.g., if the energy beam(s) is translated). In some embodiments, the power density of the first energy beam at the target surface is different than the power density of the second energy beam at the target surface. In some embodiments, the power density of the first energy beam at the target surface is (e.g., substantially) the same as the power density of the second energy beam at the target surface. In some cases, the power density of the first and/or second energy beam at the target surface is at least about 5 kilowatts per square millimeter (kW/$mm^2$), 10 kW/$mm^2$, 50 kW/$mm^2$, 100 kW/$mm^2$, 200 kW/$mm^2$, 300 kW/$mm^2$, 400 kW/mm 2 or 500 kW/$mm^2$. The power density of the first and/or second energy beam at the target surface can range between any of the aforementioned values (e.g., from about 5 kW/$mm^2$ to about 500 kW/$mm^2$, from about 5 kW/$mm^2$ to about 200 kW/$mm^2$, from about 200 kW/$mm^2$ to about 500 kW/$mm^2$, or from about 10 kW/$mm^2$ to about 200 kW/$mm^2$).

In some cases, one or more processing parameters of the first LPM operation is associated with forming an overhang segment having a (e.g., pre-determined) overhang segment length (e.g., FIG. 16A: $s_1$, $s_2$, $s_3$, $s_4$ and $s_5$). In some embodiments, a translation length (e.g., FIG. 18A, L1; FIG. 18B, L2; FIG. 18E, 2242; FIG. 18F, 2252; FIG. 18G, 2262; or FIG. 18H, 2272) of the first energy beam is associated with a corresponding overhang segment length. For example, the translation length of the first LPM operation may be (e.g., substantially) the same as the corresponding overhang segment length. In some embodiments, the hatch length of the first LPM operation is at most about 0.5, 0.6, 0.7, 0.8, 0.9, 1, 1.1, 1.2, 1.3, 1.4, 1.5, 1.6, 2, or 3 times the corresponding overhang segment length. The hatch length of the first LPM operation can vary from the corresponding overhang segment length by a value between any of the afore-mentioned values (e.g., from about 1.5 to about 30, from about 1.5 to about 10, from about 10 to about 30, or from about 5 to about 20) times greater. In some cases, the hatch length of the first LPM operation is (e.g., substantially) constant. In some cases, the hatch length of the first LPM operation varies. The hatch length of the first LPM operation may vary during formation of a layer of hardened material. The hatch length of the first LPM operation may vary during formation of multiple layers of hardened material.

In some embodiments, the first LPM operation and/or second LPM operation uses a different processing condition than used in a transformation operation for forming an interior layer portion (e.g., a portion of the core) (e.g., FIG. 17D, 1778) of the object. In some cases, the first and or second LPM operation comprises using a different energy beam scan speed than used for forming the interior layer portion. In some instances, the first or second LPM operation comprises using an energy beam scan speed that is greater than a scan speed used for forming the interior layer portion. Greater than can be at least about 1.5, 2, 2.5, 3, 4, 5, 6, 7, 8, 9, 10, 15, 20, 25 or 30 times greater. The scan speed used in the first or second LPM operation can be greater than the scan speed used for forming the interior layer portion by a value between any of the afore-mentioned values (e.g., from about 1.5 to about 30, from about 1.5 to about 10, from about 10 to about 30, or from about 5 to about 20) times greater. In some instances, the first or second LPM operation comprises using an energy beam hatch length that is greater than an energy beam hatch length used for forming the interior layer portion. Greater than can be at least about 1.5, 2, 2.5, 3, 4, 5, 6, 7, 8, 9, 10, 15, 20, 25 or 30 times greater. The hatch length used in the first or second LPM operation can be greater than the scan speed used for forming the interior layer portion by a value between any of the afore-mentioned values (e.g., from about 1.5 to about 30, from about 1.5 to about 10, from about 10 to about 30, or from about 1.5 to about 6) times greater. In some instances, the first or second LPM operation comprises using an energy source power that is less than an energy source power used for forming the interior layer portion. Less than can be at least about 1.5, 2, 2.5, 3, 4, 5, 6, 7, 8, 9, 10, 15, 20, 25 or 30 times less. The energy source power used in the first or second LPM operation can be less than the energy source power used for forming the interior layer portion by a value between any of the afore-mentioned values (e.g., from about 1.5 to about 30, from about 1.5 to about 10, from about 10 to about 30, or from about 1.5 to about 10) times less. In some instances, the first or second LPM operation comprises using an energy beam power density at the target surface that is less than an energy beam power density at the target surface used for forming the interior layer portion. Less than can be at least about 1.5, 2, 2.5, 3, 4, 5, 6, 7, 8, 9, 10, 15, 20, 25 or 30 times less. The energy beam power density at the target surface used in the first or second LPM operation can be less than the energy beam power density at the target surface used for forming the interior layer portion by a value between any of the afore-mentioned values (e.g., from about 1.5 to about 30, from about 1.5 to about 10, from about 10 to about 30, or from about 1.5 to about 10) times less.

In some embodiments, an LPM operation comprises directing an energy (e.g., laser, electron, or ion) beam at a target surface. The target surface may be a material bed. The material bed can include an exposed surface of a pre-transformed material (e.g., powder) and/or an exposed surface of a hardened (e.g., solid or partially solid) material. The hardened material may comprise a previously transformed material (e.g., by an energy beam). In some embodiments, the energy beam and the pre-transformed material (e.g., powder) are directed at the target surface (e.g., some LENS techniques). For example, a deposition head may supply the pre-transformed material on a hardened material (e.g., previously transformed material) at a site where the energy beam is directed. In some embodiments, the deposition head supplies both the energy beam and the pre-transformed material at the site (e.g., coaxially).

In some instances, the power (e.g., power density at the target surface) of the first and/or second energy beam varies during the first and/or second LPM operation. In some instances, the power density (e.g., at the target surface) of the first and/or second energy beam is (e.g., substantially) constant during the first and/or second LPM operation. In some instances, the first and/or second energy beam is a pulsed energy beam. In some instances, the first and/or second energy beam is a non-pulsed (e.g., continuous) energy beam. FIGS. 19A-19C show example energy beam powers and/or power densities as a function of time. The first and/or second energy beam power (e.g., density) as a function of time may have any shape. FIG. 19A shows an example of a (e.g., substantially) steady pulse power (e.g., density) over time of a first or second energy beam that comprises a power (e.g., density) ramp up (e.g., 1911), a power (e.g., density) plateau (e.g., 1912), a power (e.g., density) ramp down (e.g., 1913), and an intermission (e.g., 1914); wherein the ramp-down profile is linear. FIG. 19B shows an example of a power (e.g., density) pulse profile over time of a first or second energy beam in which the plateau and ramp down segments are altered as compared to the steady pulse. In the example shown in FIG. 19B, the plateau region (e.g., 1922) is shorter, and the ramp down time (e.g., 1923) is longer and has a non-linear descend. FIG. 19C shows an example of a power (e.g., density) pulse profile over time of the first or second energy beam in which the ramp up, plateau, and ramp down segments are altered as compared to the steady pulse. In the example shown in FIG. 19C, the ramp-up power (e.g., density) profile spikes to a higher power (e.g., density) value, the plateau region is eliminated, and the ramp down time is longer and includes a fast linear descend (e.g., 1932) followed by a loner (e.g., gradual) non-linear descent (e.g., 1935). The example graphs shown in FIGS. 19A-19C may also represent the power of an energy source that generates the first or second energy beam, when the power of the energy source is represented as a function of time. The intermission may be referred to as a delay. Any one of the plurality of segments may be controlled (e.g., modulated). At least two of the plurality of segments may be controlled (e.g., varied) collectively (e.g., in real time, e.g., by a controller). At least two of the plurality of segments may be controlled (e.g., varied) separately (e.g., in real time, e.g., by a controller). For example, a pulse profile may comprise a ramp up with a spike, followed by a plateau, and ending the pulse by a (e.g., gradual) power ramping down.

In some cases, the first and/or second energy beam is a focused at the target surface. In some cases, the first and/or second energy beam is a defocused at the target surface (e.g., its focal point is above or below the target surface). In some embodiments, the first energy beam is more focused at the target surface than the second energy beam. In some embodiments, the second energy beam is more focused at the target surface than the first energy beam. The first energy beam may have a higher power density at the target surface than the second energy beam. The second energy beam may have a higher power density at the target surface than the first energy beam. In some cases, higher energy beam powers (and/or higher power density at the target surface) are used to print overhang segments having shallow angles (a) compared to printing overhang segments having less shallow (e.g., intermediate) angles (a). In some cases, a more defocused energy beam is used to print overhang segments having shallow angles (a) compared to printing overhang segments having less shallow (e.g., intermediate) angles (a). In some embodiments, the second energy beam is less focused, has a lower power density, and/or has a larger irradiation spot at the target surface than the first energy beam.

Figure 20A:
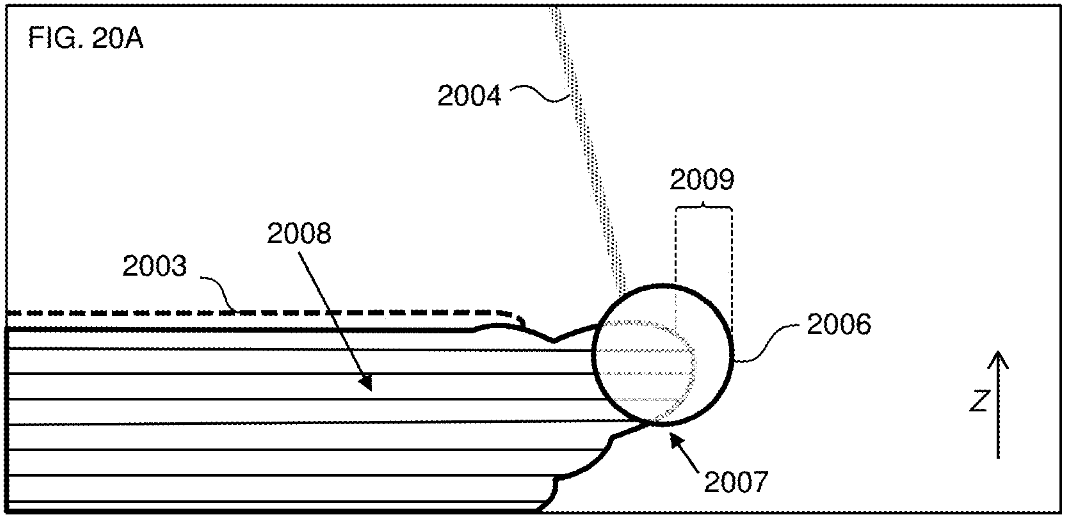
FIGS. 20A and 20B schematically illustrate operations in forming a 3D object.
Figure 20B:
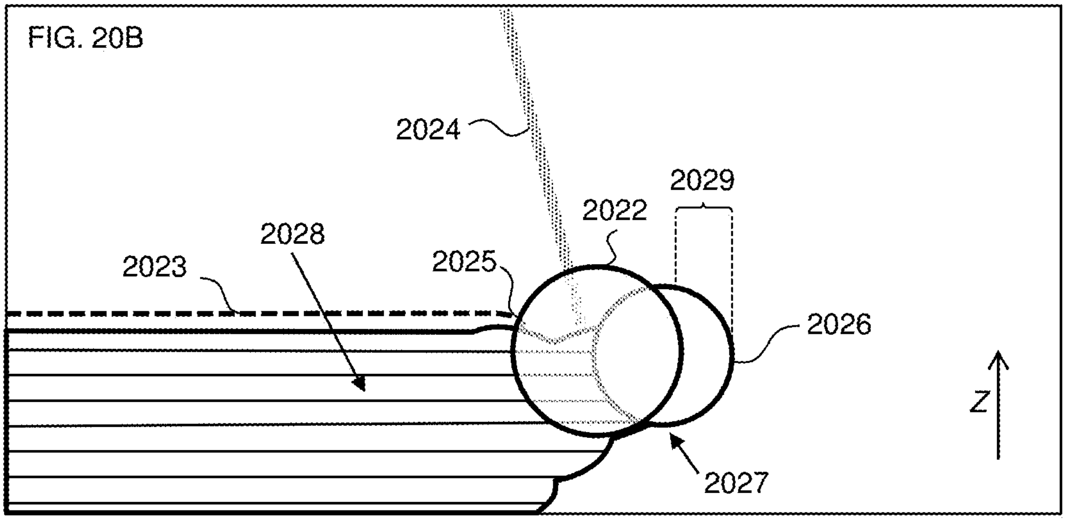

In some embodiments, the first and/or second energy beam generates a melt pool that spans (e.g., has a depth of) two or more layers of material (e.g., pre-transformed and/or previously transformed material). A melt pool that spans two or more layers can be referred to as a "deep melt pool." In some embodiments, a deep melt pool spans more than one (e.g., at least about 1, 1.5, 2, 2.5, 3, 3.5, 4, 4.5, or 5) layers of pre-transformed and/or previously transformed material. FIGS. 20A and 20B show example schematic vertical cross-section views of an overhang being formed using an LPM process using deep melt pools. FIG. 20A shows an example first LPM operation where a first energy beam 2004 forms a first melt pool 2406. At least a portion of the first melt pool (e.g., FIG. 20A, 2006) can correspond to an exterior layer portion (e.g., FIG. 17B, 1728) (e.g., globule) of an overhang segment. The object can have multiple layers (e.g., FIG. 20A, 2008) that can correspond to a previously-transformed portion of the object (e.g., another portion of the overhang or a non-overhang portion (e.g., "rigid portion")). The first melt pool (e.g., FIG. 20A, 2006) can span more than one of the multiple layers (e.g., FIG. 20A, 2008), and can be referred to as a deep melt pool. The deep melt pool may reduce (e.g., prevent) deformation (e.g., warpage) of the overhang (e.g., overhang segment) during the first LPM operation. In some cases, the deep melt pool is deep enough to provide plastic yielding at a bottom surface (e.g., FIG. 20A, 2007) of the overhang (e.g., overhang segment) to compensate for a tendency of the overhang (e.g., overhang segment) to warp (e.g., upward). In some embodiments, a deep melt pool is accomplished using a higher power density (e.g., using long dwell times and/or high energy beam power). The deep melt pool (e.g., FIG. 20A, 2006) may expand toward the interior layer portion (e.g., FIG. 20A, 2003) and/or deeper (e.g., FIG. 20A, a direction opposite "Z") more than expanding the overhang segment length (e.g., FIG. 20A, 2009). FIG. 20B shows an example second LPM operation where a second energy beam 2024 forms a second melt pool 2022. The second transformation operation can be used to modify the exterior layer portion (e.g., FIG. 20B, 2006) (e.g., globule) and/or the interior layer portion (e.g., FIG. 20A, 2023). For example, the second LPM operation can cause the exterior layer portion to contact (e.g., wet) a leading edge (e.g., FIG. 20A, 2025) of the interior layer portion. The second melt pool (e.g., FIG. 20A, 2022) can span a depth covering more than one of the multiple layers (e.g., FIG. 20B, 2028), for example, to reduce (e.g., prevent) deformation (e.g., warpage) of the overhang (e.g., overhang segment) during the second transformation operation. In some embodiments, the second melt pool (e.g., FIG. 20B, 2022) is larger (e.g., has a larger FLS (e.g., diameter)) than the first melt pool (e.g., FIG. 20A, 2006). In some embodiments, the FLS (e.g., diameter) of the second melt pool is at least about 1.5 times (*), 2*, 2.5*, 3*, 4*, 5*, 6*, 7*, 8*, 9* or 10* greater than the FLS (e.g., diameter) of the first melt pool. The FLS (e.g., diameter) of the second melt pool be larger than the FLS (e.g., diameter) of the first melt pool by a value ranging between any of the aforementioned values (e.g., from about 1.5* to about 10*, from about 1.5* to about 3*, from about 3* to about 10*, or from about 3* to about 5* larger). In some embodiments, the second melt pool (e.g., FIG. 20B, 2022) is smaller (e.g., has a smaller FLS (e.g., diameter)) than the first melt pool (e.g., FIG. 20A, 2006). In some embodiments, the FLS (e.g., diameter) of the first melt pool is at least about 1.5*, 2*, 2.5*, 3*, 4*, 5*, 6*, 7*, 8*, 9* or 10* greater than the FLS (e.g., diameter) of the second melt pool. The FLS (e.g., diameter) of the first melt pool be larger than the FLS (e.g., diameter) of the second melt pool by a value ranging between any of the aforementioned values (e.g., from about 1.5 to about 10, from about 1.5 to about 3, from about 3 to about 10, or from about 3 to about 5 times larger). In some embodiments, the second melt pool (e.g., FIG. 20B, 2022) is (e.g., substantially) the same size (e.g., the same FLS (e.g., diameter)) as the first melt pool (e.g., FIG. 20A, 2006). In some cases, the second transformation operation changes (e.g., dimensions of) an exposed (e.g., bottom) surface (e.g., FIG. 20B, 2027) of the exterior layer portion (e.g., FIG. 20B, 2006) (e.g., globule). In some cases, the second transformation operation does not (e.g., substantially) change (e.g., dimensions of) the exposed (e.g., bottom) surface (e.g., FIG. 20B, 2027) of the exterior layer portion (e.g., globule). In some cases, the second transformation operation changes (e.g., dimensions of) the overhang segment length (e.g., FIG. 20A, 2009) of the exterior layer portion (e.g., globule). In some cases, the second transformation operation does not (e.g., substantially) change (e.g., dimensions of) the overhang segment length (e.g., FIG. 20A, 2009) of the exterior layer portion (e.g., globule).

Figure 21A:
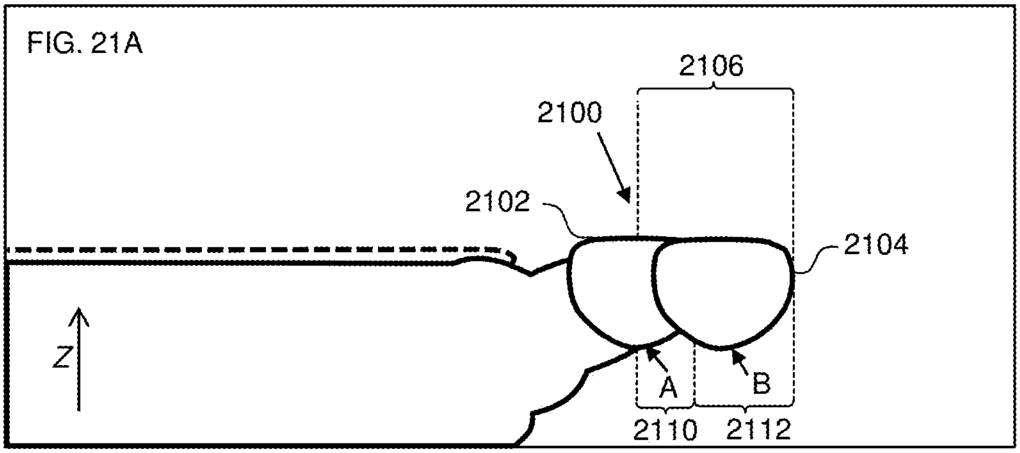
FIGS. 21A and 21B schematically illustrate various 3D objects.
Figure 21B:
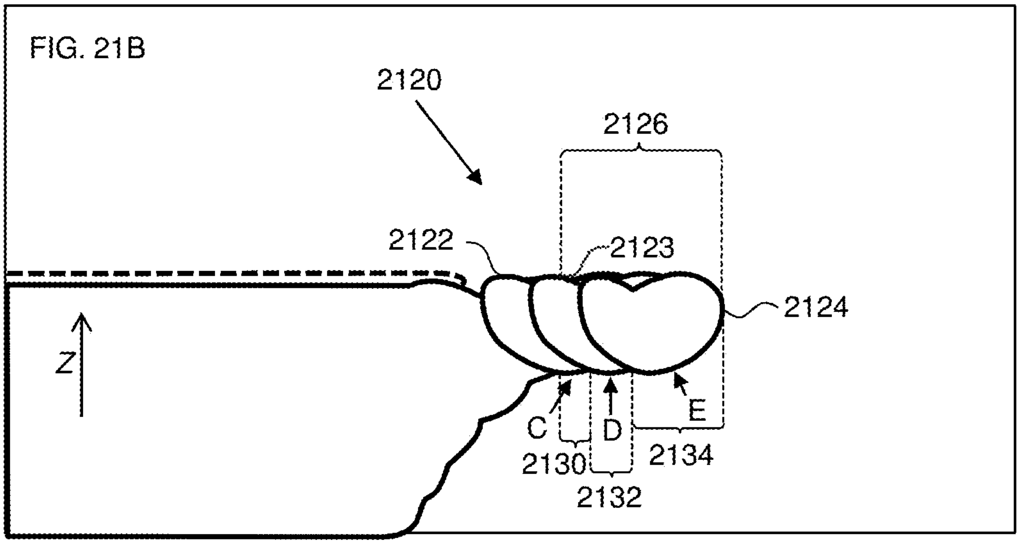

In some embodiments, LPM techniques involve the use of more than two (e.g., at least 3, 4, 5, 6, or 7) LPM operations. The LPM operation(s) may be used to alter a microstructure (e.g., porosity, material phase, grain type, crystal structure, and/or metallurgical microstructure) of the 3D object. For example, a HARMP operation (e.g., FIGS. 14A-14E) may be performed in addition to the first and second LPM operations to reduce a porosity of the material. The LPM operation(s) may be used to change (e.g., increase or decrease) a dimension (e.g., length) of the overhang segment. For example, the LPM operation(s) may be used to lengthen the overhang segment having very shallow angles (a) with respect to the layering plane. The LPM operations may be used to create multiple (e.g., smaller or larger) sections (e.g., melt pools). In some cases, the multiple sections (e.g., 2, 3, 4, 5, 6, 7 or 8) of an overhang segment provide a lower surface roughness to the (e.g., bottom) exposed surface of the overhang. FIGS. 21A and 21B show example schematic vertical cross-section views of overhang segments having multiple sections. FIG. 21A shows an example overhang segment 2100 having two sections 2102 and 2104. At least one (e.g., each) section of the overhang segment can include a curved (e.g., bottom) exposed surface (e.g., FIG. 21A, reference letters A and B, respectively). FIG. 21B shows an example overhang segment 2120 having three sections 2122, 2123 and 2124, each having a corresponding curved (e.g., bottom) exposed surfaces having reference letters C, D and E, respectively. In some embodiments, the multiple sections are used to form an overhang segment having a greater overhang segment length (e.g., FIG. 21A, 2106; or FIG. 21B, 2126) as compared to an overhang segment having one section (e.g., one melt pool). For example, multiple sections may be used to form an overhang segment having a relatively long overhang segment length (s) and correspondingly shallow overhang segment angle ($\alpha$) with respect to the layering plane. In some embodiments, multiple sections (e.g., melt pools) are used to form an overhang segment having a lower or higher surface (e.g., bottom surface) roughness compared to an overhang segment having one section. For example, multiple smaller sections that extend smaller distances (e.g., FIG. 21A, 2110 and 2112; or FIG. 21B, 2130, 2132 and 2134) compared to, for example, a single larger overhang segment can be used to achieve the same overhang segment length (e.g., FIG. 21A, 2106; or FIG. 21B, 2126). The multiple segments (e.g., melt pools) may have distinct shapes (e.g., as they stack together, they may appear as a plurality of stacked crescent-shapes, e.g., FIG. 23B) on the (e.g., bottom) surface of the overhang.

In some examples, LPM techniques allows for better control of the printing process, thereby providing a larger processing window. For example, LPM techniques may allow for printing operations that are less sensitive to irradiation spot size fluctuations. For instance, the LPM operations may be less susceptible to an irradiation spot size drifts (e.g., enlargement) during a single printing operation or over multiple printing operations. The better control can provide more flexibility in tuning processing conditions (e.g., energy beam power, speed, type (e.g., tiling or hatching), path) for improving one or more aspects (e.g., porosity, geometry and/or surface roughness) of the printed object.

Figure 22:
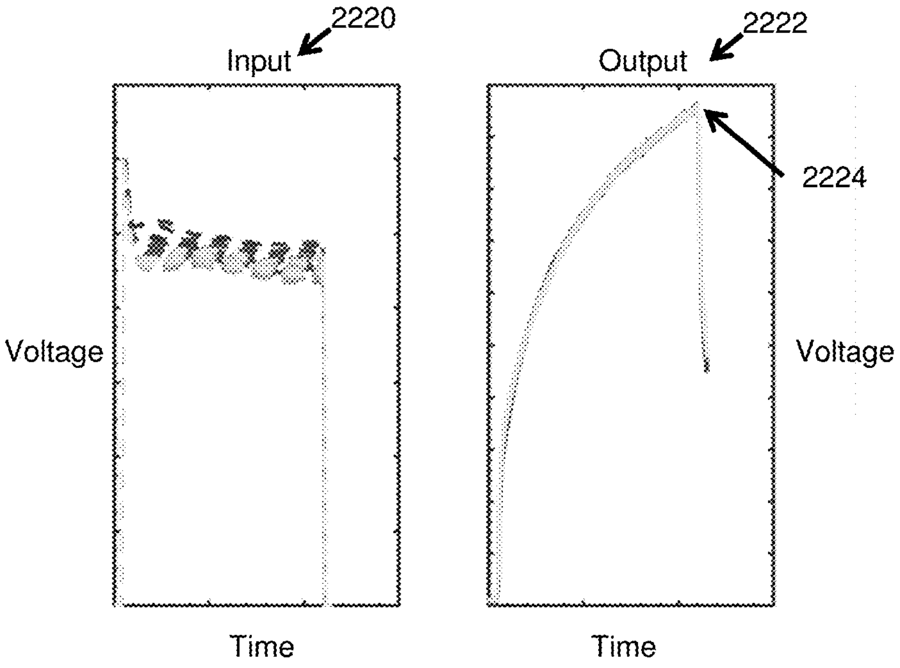
FIG. 22 schematically illustrates input and output graphs.

At times, LPM techniques are combined with closed loop control schemes (e.g., feedback control and/or feed forward control) to provide more control of the LPM operations. Monitoring one or more output signals (e.g., before, during and/or after the operation of the transforming energy beam) can be used as data to inform the feedback and/or feed forward control. For example, an output (e.g., thermal) can be monitored during printing and compared to a target output (e.g., thermal) signal. Monitoring of output signals can be used to indirectly detect attributes of the liquid or partially liquified material (e.g., formed by irradiation during the printing). Monitoring of output signals can be used to indirectly detect attributes of the gas or partially gaseous material (e.g., generated by irradiation during the printing). For example, an output (e.g., thermal) signal below a target output (e.g., thermal) signal may indicate insufficient transformation for forming an exterior layer portion (e.g., globule) during the first LPM operation, and/or insufficient correction (e.g., location or reshaping) of the exterior layer portion (e.g., globule) during the second LPM operation. As another example, an output signal may indicate what material (e.g., pre-transformed material (e.g., powder) or previously transformed (e.g., hardened) material) is being transformed. The output signal may indicate the extend of the transformation (e.g., solid to partially liquid, to fully liquid, to at least partially gaseous, or to at least partially plasma). In some cases, transforming of a pre-transformed material (e.g., powder) results in a different thermal signal than transforming (re-transforming) of a previously transformed material. The signal may be thermal. The signal may comprise a spectroscopic signal. The signal may be an atomic absorption signal. The signal may comprise reflectivity or specularity of the surface (e.g., at the transformed location and/or adjacent thereto). In some cases, the output signal can provide information regarding a temperature and/or a rate of growth of a melt pool (e.g., depending on the type of material (e.g., type of metal)). FIG. 22 shows an example graph indicating time-dependent input and output voltage signals for a detector during printing of a number of layers of material using LPM techniques. The output signals can be referred to as sensed signals. FIG. 22 shows input and output signals during a second LPM operation. The input voltage (e.g., FIG. 22, 2222) can correspond to a voltage signal from the controller(s) related to the energy source. The input voltage can correspond to a process parameter (e.g., power) of the energy source generating the energy beam. The output voltage (e.g., FIG. 22, 2222) can corresponds to any output process parameter (e.g., during printing), such as a signal (e.g., as disclosed herein). The signal may be detected at, or originate from, the target surface. The signal may comprise a thermal signal (e.g., temperature) detected at the target surface. A (e.g., thermal) signal monitored over an irradiation time period may have a signature shape. For example, the output (e.g., thermal) signal may have a characteristic rise (e.g., steady and/or gradual rise) in voltage to a peak voltage (e.g., FIG. 22, 2224), which can (e.g., sharply) decrease when the irradiation is removed from the target surface. The characteristic rise, peak and decrease (e.g., magnitude and/or shape) can correspond to a thermal signature of the LPM (e.g., re-transformation) process. In some embodiments, the output (e.g., thermal) signal is compared to a target output (e.g., thermal) signal. In some cases, the target output (e.g., thermal) signal corresponds to one target value (e.g., a peak voltage (e.g., FIG. 22, 2224)). In some instances, the sensed (e.g., thermal) signal of the first LPM operation has a different shape (signature) than the sensed (e.g., thermal) signal of the second LPM operation (e.g., FIG. 22, 2222). In some instances, the sensed (e.g., thermal) signal of the first LPM operation has (e.g., substantially) the same shape (signature) as the sensed (e.g., thermal) signal of the second LPM operation. In some cases, the target output (e.g., thermal) signal corresponds to multiple values (e.g., output signal changes over time). The input signal can be adjusted to compensate for a (e.g., undesired) change in output (e.g., thermal) signal. The input signal adjustment scheme that is at least partially based on the output signal, can comprise a feedback loop scheme (e.g., FIG. 15A, 1505). FIG. 22 shows that combining an LPM process at least with a feedback loop can result in highly consistent output signal over printing multiple (e.g., at least about 2 layers, 5 layers, 10 layers, 50 layers, 100 layers, 500 layers, 1000 layers, 5000 layers, 10000 layers, 50000 layers or 100000 layers) layers. Combining an LPM process with a feedback loop can result in highly consistent output signal over printing a number of cycles between any of the aforementioned values (e.g., from about 2 layers to about 100000 layers, from about 2 layers to about 5000 layers, or from about 5000 layers to about 100000 layers). Combining an LPM process at least with feedback loop control can result in more consistent output signal (e.g., FIG. 22, 2222) as compared to an output signal (e.g., FIG. 15B, 1522) of a non-LPM process (e.g., including or excluding feedback loop control). It should be noted that LPM processes may require less input signal (e.g., power) correction (e.g., about 10%-30%) by feedback control loop as compared to a non-LPM process (about 200% or more). In some cases, an LPM process is combined at least with a feed forward control loop (e.g., with or without a feedback control loop). For example, printing large and/or complex objects may comprise printing widely varying geometries at different portions of the object, which may cause gas flow fluctuations around the object during printing. For example, an object may include enclosed or partially enclosed cavity. A gas flow that is in the processing chamber may be locally modified with such enclosed or partially enclosed cavity of the object. For example, the gas flow may be locally turbulent within an enclosed or partially enclosed cavity of the object. A feed forward loop can be used to adjust an input signal at least in part based on such fluctuations during printing.

Figure 23A:
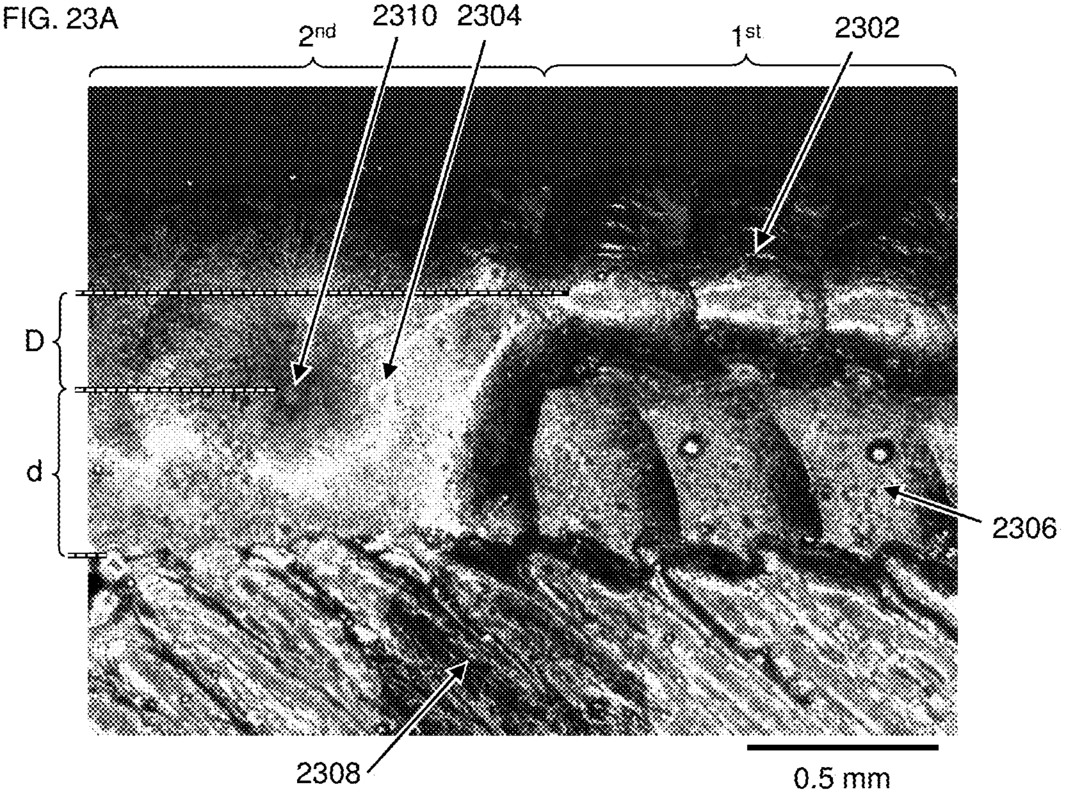
FIGS. 23A and 23B show various views of a 3D object.
Figure 23B:
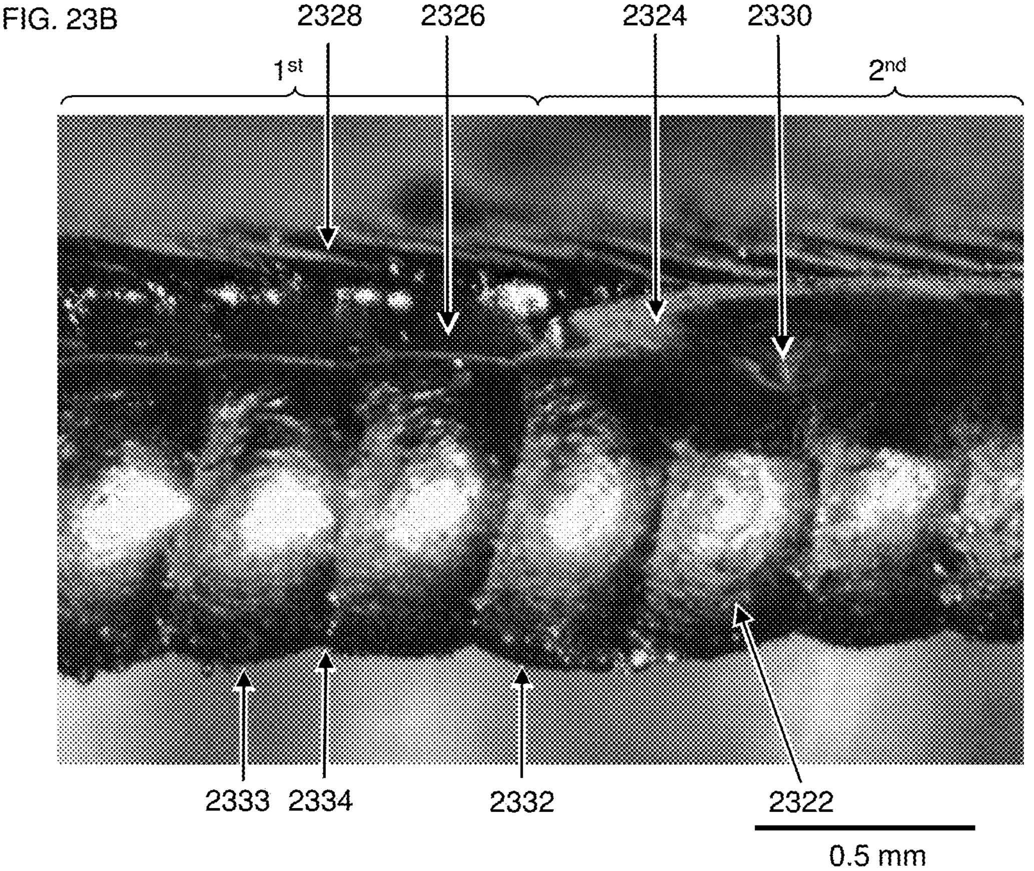

In some cases, an object that is formed using one or more LPM operations has features indicative of the one or more LPM operations. FIG. 23A shows an example aerial view of a portion of an overhang formed using a first and second LPM operations. FIG. 23B shows an example side view of the overhang of FIG. 23A. The example overhang portions of FIGS. 23A and 23B include a first section (marked as "$1^{st}$") formed after a first LPM operation, and a second section (marked as "$2^{nd}$") formed after a first LPM operation and a second LPM operation. The overhang portions of FIGS. 23A and 23B show an exterior layer portions (e.g., FIG. 23A, 2302; and FIG. 23B, 2322) formed in the first LPM operation (and prior to the second LPM operation). The first LPM operation can form one or more globular-shaped exterior layer portions having top surfaces that comprise a curvature. The exterior layer portions (e.g., FIG. 23A, 2302; and FIG. 23B, 2322) can be separated from an interior layer portion (e.g., FIG. 23A, 2308 and FIG. 23B, 2328) by a gap (e.g., FIG. 23A, 2306; and FIG. 23B, 2326). The second LPM operation can modify (e.g., FIG. 23A, 2304; and FIG. 23B, 2324) of the exterior layer portions. The modification can be of a shape and/or a center of mass location. The second LPM operation may flatten a top surface of the exterior layer portions. In some cases, the second LPM operation forms a divot (e.g., FIG. 23A, 2310; and FIG. 23B, 2330). Without wishing to be bound by theory, the divot may be formed by ejecting material (e.g., in the form of gases and/or spatter) outward from the center of the divot, e.g., during irradiation. A center of the divot may correspond to a location of incidence of the second energy beam. The center of the divot may be spaced a distance (e.g., FIG. 23A, reference letter d) from the interior layer portion (e.g., FIG. 23A, 2308). The center of the divot may be spaced a distance (e.g., FIG. 23A, reference letter D) from an initial location of incidence of the first energy beam. The exterior layer portions (e.g., FIG. 23A, 2302; and FIG. 23B, 2322) can be at a first distance (e.g., FIG. 23A, reference letter d) from an interior layer portion (e.g., FIG. 23A, 2708; and FIG. 23B, 2328). The exterior layer portions (e.g., FIG. 23A, 2302; and FIG. 23B, 2322) can be at a second distance (e.g., FIG. 23A, D) from an initial location of incidence of the first energy beam. An exposed (e.g., bottom) surface (e.g., FIG. 23B, 2332) of the overhang can have a texture (e.g., microtexture). The texture can result from (e.g., overlapping) segments (e.g., melt pools) generated by the first and/or second LPM operations. In some cases, the second LPM operation does not (e.g., substantially) change the texture of the e.g., bottom) surface created by the first LPM operation. The texture can be characterized as having one or more peaks (e.g., FIG. 23B, 2333) and valleys (e.g., FIG. 23B, 2334).

Figure 24A:
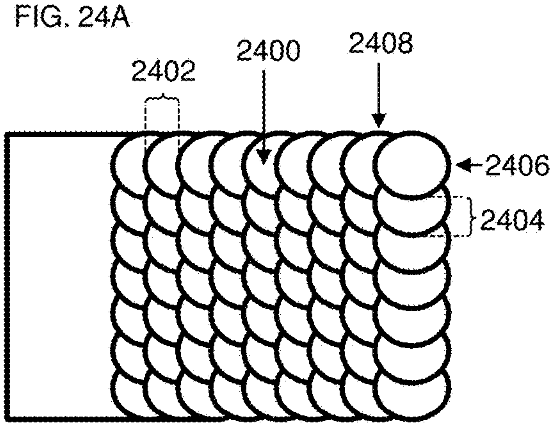
FIGS. 24A-24D schematically illustrate various 3D objects.
Figure 24B:
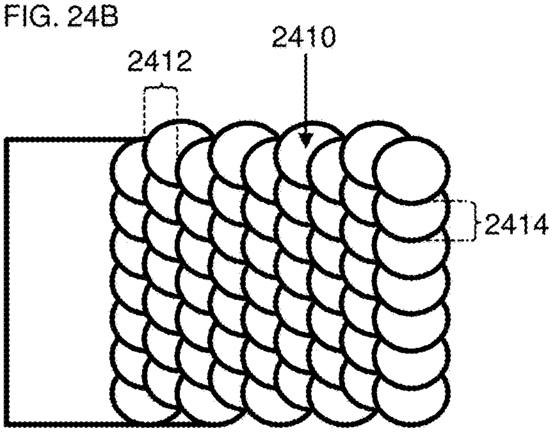
Figure 24C:
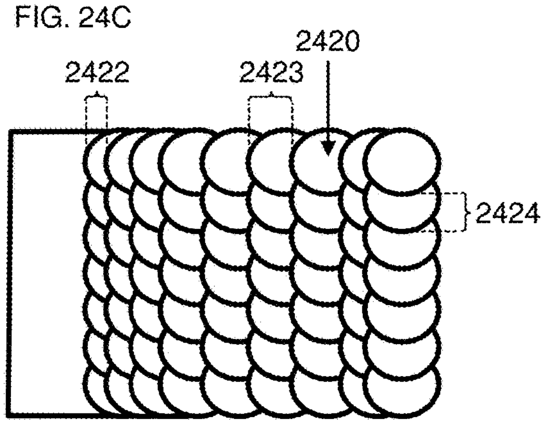
Figure 24D:
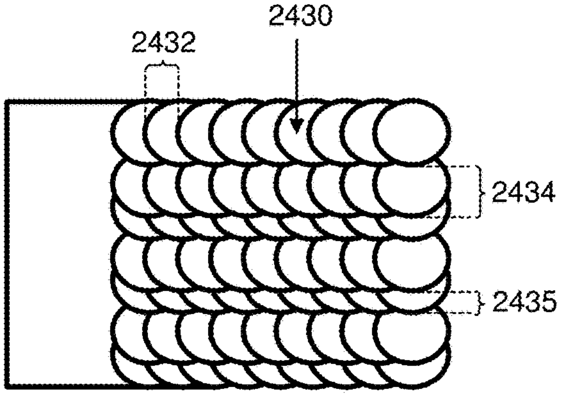
Figure 24E:
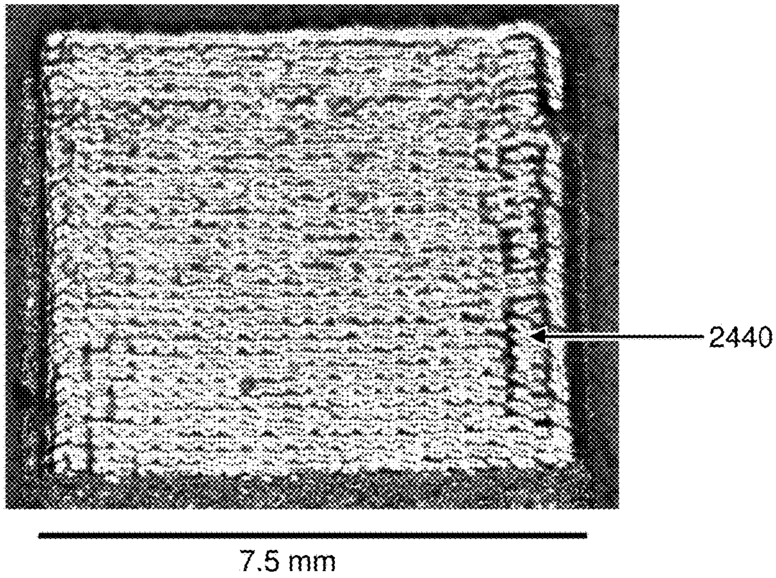
FIG. 24E shows a bottom view of a 3D object.

In some instances, an exposed (e.g., bottom) surface (e.g., bottom skin) of the overhang has a texture (e.g., microtexture). The texture may be characterized as having a weave pattern created by (e.g., overlapping) overhang segments (e.g., tiles and/or hatches). FIGS. 24A-24E show example aerial views of (e.g., bottom) surfaces of various overhangs. FIGS. 24A-24D show examples schematic views of (e.g., bottom) surfaces of overhangs. FIG. 24E shows an example view of (e.g., bottom) surface of a ledge24E. The exposed (e.g., bottom) surface of the overhang can have multiple curved features (e.g., FIG. 24A, 2400; FIG. 24B, 2410; FIG. 24C, 2420; FIG. 24D, 2430; and FIG. 24E, 2440). The curved features may correspond to (e.g., overlapping) stacked overhang segments (e.g., melt pools). The curved features may be crescent, semicircular or bow shaped. The multiple curved features may appear as a weave or (e.g., fish-like) scale pattern. In some embodiments, the curved features are arranged in rows (e.g., FIG. 24A, 2404) and/or columns (e.g., FIG. 24A, 2408). In some embodiments, at least some of the rows (or columns) of the curved features are offset with respect to each other (e.g., FIG. 24B). In some embodiments, at least some of the rows (or columns) of the curved features are (e.g., substantially) aligned with respect to each other (e.g., FIG. 24A, FIG. 24C or FIG. 24D). In some embodiments, some adjacent rows (or columns) of the curved features are offset with respect to each other, and some adjacent rows (or columns) of the curved features are (e.g., substantially) aligned with respect to each other. An amount of offset and alignment may at least partially depend on the geometry of the overhang (e.g., step angles (e.g., FIG. 20A: $a_1$, $a_2$, $a_3$, $a_4$ and $a_5$)). Distances between the curved features (e.g., between edges of the curved features) may vary. A distance between the curved features may of adjacent columns (e.g., FIG. 24A, 2402; FIG. 24B, 2412; FIG. 24C, 2422 or 2423; or FIG. 24D, 2432) may be in an order of magnitude (e.g., (substantially) the same as) of an overhang step length (s) of the corresponding overhang segment. As described herein, the overhang step length (s) can at least partially depend on the overhang step angle ($\alpha$) and overhang step height (h). A distance between the curved features of adjacent rows (e.g., FIG. 24A, 2404; FIG. 24B, 2414; FIG. 24C, 2424; or FIG. 24D, 2434 or 2435) may correspond to distances between (e.g., overlapping) overhang segments (e.g., melt pools) within a layer. In some embodiments, distances (e.g., FIG. 24A, 2404; FIG. 24B, 2414; or FIG. 24C, 2424) between curved features of adjacent rows are (e.g., substantially) the same. In some embodiments, distances (e.g., FIG. 24D, 2434 and 2435) between curved features of adjacent rows vary. In some embodiments, distances (e.g., FIG. 24A, 2402; FIG. 24B, 2412; or FIG. 24D, 2432) between curved features of adjacent columns are (e.g., substantially) the same. In some embodiments, distances (e.g., FIG. 24C, 2422 and 2423) between curved features of adjacent rows vary. In some embodiments, distances between curved features of adjacent columns and greater than distances between adjacent rows. In some embodiments, distances between curved features of adjacent rows and greater than distances between adjacent columns (e.g., FIG. 24E). In some embodiments, distances between curved features of adjacent columns and adjacent rows are (e.g., substantially) the same. In some embodiments, a (e.g., average) distance between at least a portion of the columns and/or rows of curved features is at least about 0.1 micrometers (μm), 0.5 μm, 1 μm, 5 μm, 10 μm 50 μm, 100 μm, 200 μm, 300 μm, 400 μm, 500 μm, 600 μm, 700 μm, 800 μm, 900 μm, 1000 μm, 1500 μm, 2000 μm, 2500 μm, 3000 μm, 3500 μm, 4000 μm, 4500 μm or 5000 μm. The (e.g., average) distance between at least a portion of the columns and/or rows of curved features may be any value between the afore-mentioned values (e.g., from about 0.1 μm to about 5000 μm, from about 0.1 μm to about 1000 μm, from about 1000 μm to about 5000 μm, from about 5 μm to about 1500 μm, or from about 10 μm to about 600 μm). In some embodiments, a surface roughness (e.g., measured as Ra or Sa) of the exposed (e.g., bottom) surface (e.g., bottom skin) of the overhang is at most about 1 μm, 5 μm, 10 μm, 20 μm 30 μm, 40 μm, 50 μm, 75 nm, or 100 μm (where Ra is the arithmetic average of a roughness profile, and Sa is the arithmetic average of a 3D roughness). A surface roughness (e.g., Ra or Sa) of the exposed (e.g., bottom) surface (e.g., bottom skin) of the overhang can range between any of the aforementioned values (e.g., from about 1 μm to about 100 μm, from about 1 μm to about 50 μm, from about 50 μm to about 100 μm, or from about 1 μm to about 20 μm). In some cases, distances between curved features (e.g., of adjacent columns and/or adjacent rows) are used to determine (e.g., calculate or estimate) dimensional accuracy of (e.g., overhang of) the 3D object. For example, actual distances between curved features of an object can be compared to a requested (e.g., nominal) overhang segment length (s) (e.g., 16A: $s_1$, $s_2$, $s_3$, $s_4$ or $s_5$). In some cases, actual distances between curved features of an object are compared to a requested geometry (e.g., virtual model (e.g., a computer-generated model)).

An "initial portion," as disclosed herein, may comprise: (i) a portion of a requested ledge (e.g., that is extended), (ii) a rigid portion (e.g., a core), or (iii) a portion of a cavity (e.g., a ceiling of a cavity). The initial portion may comprise a portion of a skin (e.g., a bottom skin). For example, the initial portion may be portion of the requested ledge (e.g., that is extended). For example, the initial portion may be a core. The initial portion may be generated by the same 3D printing methodology by which the ledge (and/or an extension of the ledge) is generated, or by a different methodology. For example, the initial portion may be formed, at least in part, by hatching. For example, the initial portion may be formed, at least in part, by tiling. During formation, the initial portion, ledge, and/or the extended portion of the ledge, may be form an angle with a reference plane. The angle may be at most at most about 45 degrees (°), 40°, 35°, 30°, 25°, 20°, 15°, 10°, 5°, 3°, 2°, 1°, or 0.5°, with respect to the reference plane. The angle may be zero, or substantially zero, with respect to the reference plane. The angle may be between any of the aforementioned angles (e.g., from 45° to 0°, from 30° to 0°, from 20° to 0°, from 15° to 0°, from 10° to 0°, or from 5° to 0°) with respect to the reference plane. During formation, the initial portion, ledge, and/or the extended portion of the ledge, may be devoid of auxiliary support. During formation, the initial portion, ledge, and/or the extended portion of the ledge, may be suspended anchorlessly in the material bed.

In some embodiments, the LPM method comprises: (i) in a material bed that includes pre-transformed material and an initial portion, forming tiles in a first direction and along a rim of the initial portion to form a width (e.g., FIG. 5B) of a requested ledge by generating a first row of tiles that extends (a) beyond the rigid portion and (b) toward a length (e.g., FIG. 5B) of the requested ledge (e.g., 522) extending in a second direction; (ii) optionally altering a position of a platform that supports the material bed; (iii) depositing additional pre-transformed material in the material bed, e.g., to fill any voids in the material bed (e.g., generated due to formation of the tiles); (iv) forming a second row of tiles that contacts (and is connected to) the first row of tiles and extends beyond the first row of tiles towards the second direction; (v) repeating operations (ii)-(iv) until a skin of the requested ledge is formed; and/or (vi) optionally forming another rigid portion above the skin to form the requested ledge. The tiles may be formed by transforming a portion of the pre-transformed material to a transformed material, e.g., as disclosed herein. For example, by partially or fully melting the pre-transformed material. The position of the platform may remain stationary (a) during formation of the first row of tiles, (b) during formation of the second row of tiles, and/or (c) during formation of the first row of tiles and the second row of tiles. The material bed may be replenished with pre-transformed material (a) during formation of the first row of tiles, (b) during formation of the second row of tiles, and/or (c) during formation of the first row of tiles and the second row of tiles. The replenishment may be by depositing pre-transformed material (e.g., to form a material bed having a planar exposed surface). At least two of the tiles formed along the first direction may contact each other. The contacting tiles may overlap each other. The overlapped area may be at least about 10%, 20%, 30%, 40%, 50%, 60%, 70%, 80% or 90% of the average or mean tile area. The overlapped area may be at most about 10%, 20%, 30%, 40%, 50%, 60%, 70%, 80% or 90% of the average or mean tile area. The overlapped area may between any of the aforementioned values (e.g., from about 10% to about 90%, from about 10% to about 50%, or from about 40% to about 90%) of the average or mean tile area. The first direction may differ from the second direction. The first direction may be (e.g., substantially) perpendicular to the second direction. For example, the first direction may be an X direction and the second direction may be a Y direction, wherein X and Y are Cartesian coordinates. The ledge may part of a 3D object. The 3D object may be formed layerwise. The 3D object may comprise a plurality of layers. At least two of the plurality of layers (e.g., the majority of the plurality of layers) may have a standard layer height. At least two of the plurality of layers (e.g., the majority of the plurality of layers) may each be generated by (a) depositing a layer of pre-transformed material having a standard height, and (b) transforming the pre-transformed material of at least a portion of that layer to a transformed material to form a layer of transformed material as part of the 3D object. For example, the rigid portion may be formed using sequential deposition of pre-transformed material having a standard layer height. The material bed may be supported by a platform. The platform may or may not alter its vertical position (e.g., in operation (ii)), e.g., prior to deposition of the additional pre-transformed material between forming (a) the first row of tiles as part of the ledge and (b) the second row of tiles as part of the ledge. For example, the platform may remain stationary. For example, the platform may vertically translate by a distance that is smaller, equal to, or larger, than the standard layer height. The layer height may be of pre-transformed material (e.g., to form the material bed). The layer height may be of a transformed material (e.g., as part of the 3D object). The standard layer height may be at least about 10 micrometers (μm), 20 μm, 30 μm, 40 μm, 50 μm, 80 μm, 100 μm, 120 μm, 150 μm, 170 μm, or 200 μm. The standard layer height may have any value between the afore-mentioned values (e.g., from about 10 μm to about 200 μm, from about 10 μm to about 100 μm, or from about 50 μm to about 200 μm). Smaller than the layer height may be by at most 1%, 10%, 25%, 50%, 75%, or 90% of the standard layer height. Larger than the layer height may be by at least 110%, 150%, 200%, 250%, 300, 400%, or 500% of the standard layer height. Larger may be sufficient to facilitate contact between the first row of tiles and the second row of tiles. The increments by which the platform may vertically translate between formation of the first row of tiles and second row of tiles, may influence the angle of the forming/formed ledge, e.g., with respect to the platform. Vertical platform increments of less than a standard layer height may form low angle ledges (e.g., shallow ledges) with respect to the platform. Vertical platform increments of more than a standard layer height may form high angle ledges (e.g., steep ledges) with respect to the platform. Depositing the additional pre-transformed material may be using a material dispenser and/or a layer dispensing mechanism such as a recoater, e.g., as disclosed herein.

For example, the LPM method may comprise: (i) in a material bed that includes pre-transformed material and a rigid portion, forming tiles in a first direction and along a rim of the rigid portion (e.g., an anchoring structure, such as a core, e.g., 520) to form a width (e.g., FIG. 5B) of a requested ledge by generating a first row of tiles that extends (a) beyond the rigid portion and (b) toward a length (e.g., FIG. 5B) of the requested ledge (e.g., 522) extending in a second direction; (ii) optionally altering a position (e.g., vertical position) of a platform that supports the material bed; (iii) optionally depositing additional pre-transformed material in the material bed, e.g., to fill any voids in the material bed (e.g., generated due to formation of the tiles); (iv) forming a second row of tiles that contacts (and is connected to) the first row of tiles and extends beyond the first row of tiles towards the second direction; (v) optionally repeating operations (ii)-(iv) (e.g., as requested) until a skin of the requested ledge is formed; and/or (vi) optionally strengthening (e.g., by forming another rigid portion above) the skin to form the requested ledge.

For example, the LPM method may comprise: (i) in a material bed that includes pre-transformed material and a first portion of a ledge (e.g., a portion of a requested ledge, e.g., 522), forming tiles in a first direction and along a rim of the first portion of the ledge to form a width (e.g., FIG. 5B) of a second portion of the ledge by generating a first row of tiles that extends (a) beyond the first portion of the ledge and (b) toward a length (e.g., FIG. 5B) of the requested ledge (e.g., 522) extending in a second direction; (ii) optionally altering a (e.g., vertical position) position of a platform that supports the material bed; (iii) optionally depositing additional pre-transformed material in the material bed, e.g., to fill any voids in the material bed (e.g., generated due to formation of the tiles); (iv) forming a second row of tiles that contacts (and is connected to) the first row of tiles and extends beyond the first row of tiles towards the second direction; (v) optionally repeating operations (ii)-(iv) (e.g., as requested) until a skin of the requested ledge is formed; and/or (vi) optionally strengthening (e.g., by forming another rigid portion above) the skin to form the requested ledge (e.g., 522), that comprises the first portion of the ledge and the second portion of the ledge.

Figure 29A:
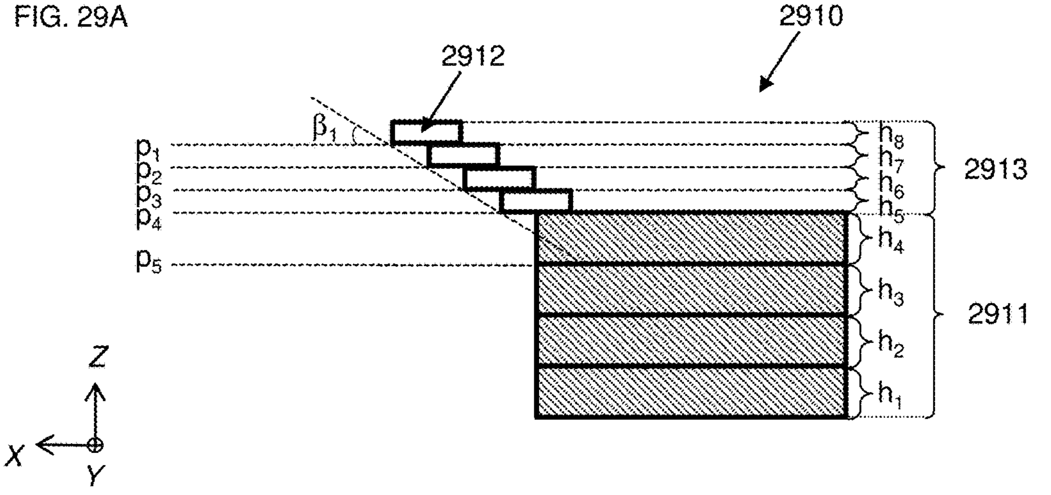
FIGS. 29A-29C schematically illustrate vertical cross sections in various 3D objects.
Figure 29B:
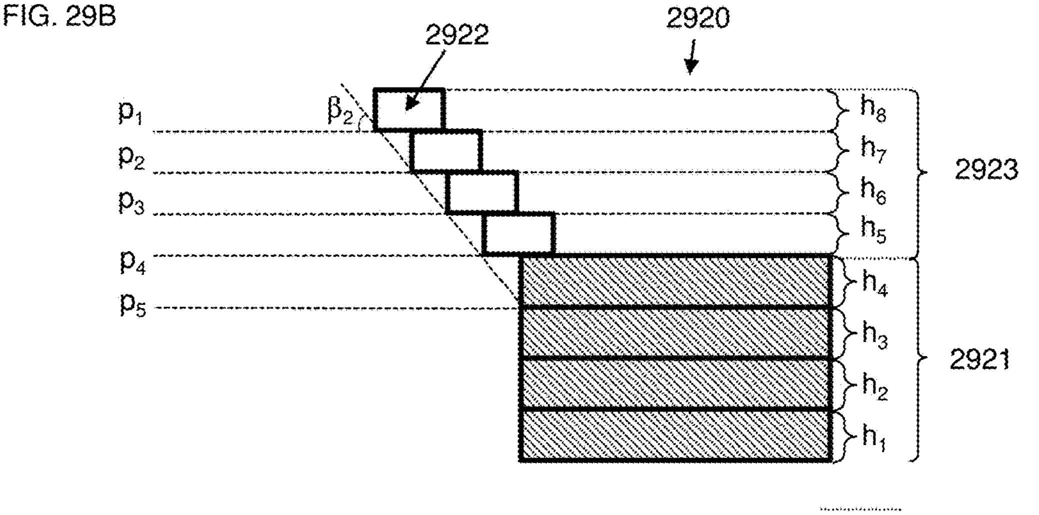
Figure 29C:
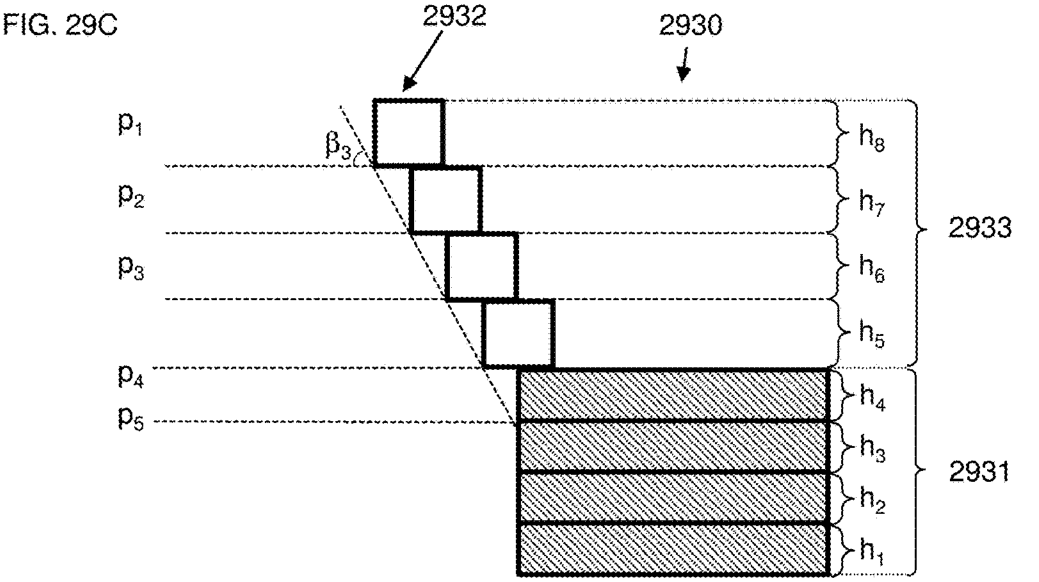

FIGS. 29A-C show schematic vertical cross-sectional examples of various 3D objects. FIG. 29A shows an example of a 3D object 2910 having a plurality of layers extending in the Z direction, which plurality of layer includes (a) a rigid portion 2911 that includes layers $h_1$-$h_4$ having a standard height and an average plane, e.g., $p_5$, and (b) a ledge 2913 comprising layers $h_5$-$h_8$ each having a layer height that is smaller than the standard height and an average plane $p_1$-$p_4$. The ledge forms an angle beta1 ($\beta_1$) with the average plane (e.g., $p_5$) that is smaller than 45 degrees. The ledge can be formed by one or more rows of tiles. A vertical cross section of the row of tiles is schematically represented by a rectangle (e.g., 2912). The row of tiles may include one or more tiles. In the example shown in FIG. 29A, the row of tiles may extend in the Y direction. FIG. 29B shows an example of a 3D object 2920 having (a) a rigid portion 2921 that includes layers $h_1$-$h_4$ having a standard height and an average plane, e.g., $p_5$, (b) a ledge 2923 comprising layers $h_5$-$h_8$ each having a layer height that is also the standard height and an average plane $p_1$-$p_4$. The ledge forms an angle beta2 ($\beta_2$) with the average plane (e.g., $p_5$) that is (e.g., about) 45 degrees. FIG. 29C shows an example of a 3D object 2930 having (a) a rigid portion 2931 that includes layers $h_1$-$h_4$ having a standard height and an average plane, e.g., $p_5$, (b) a ledge 2933 including layers $h_5$-$h_8$ each having a layer height that is higher than the standard height and an average plane $p_1$-$p_4$. The ledge forms an angle beta3 ($\beta_3$) with the average plane (e.g., $p_5$) that is greater than 45 degrees (and smaller than 90 degrees).

Figure 30A:
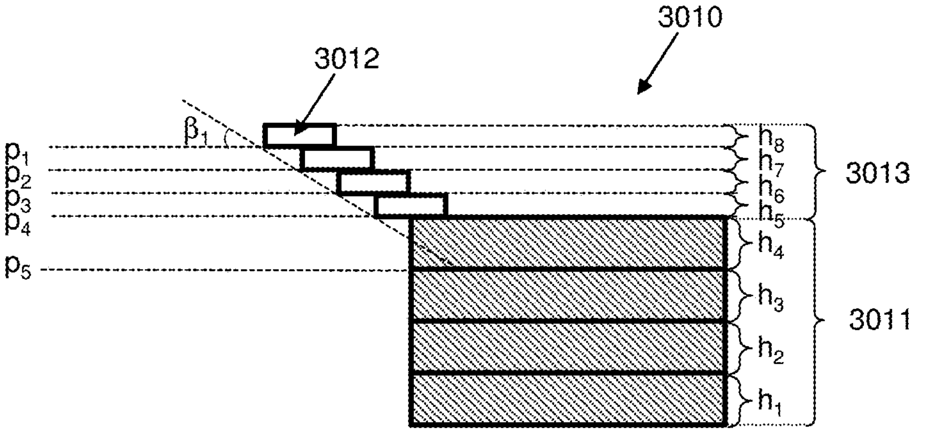
FIGS. 30A-30B schematically illustrate vertical cross sections in various 3D objects.
Figure 30B:
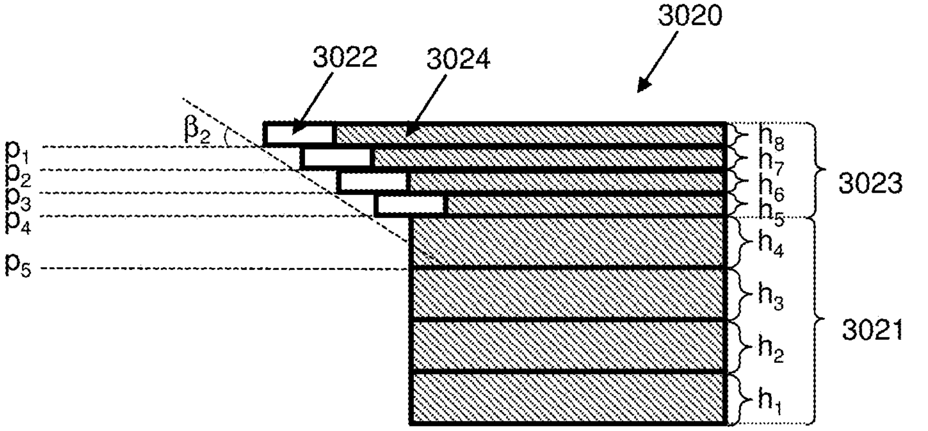

FIGS. 30A-B show schematic vertical cross-sectional examples of various 3D objects. FIG. 30A shows an example of a 3D object 3010 having a plurality of layers that comprises (a) a rigid portion 3011 that includes layers $h_1$-$h_4$ having an average layering plane, e.g., $p_5$, and (b) a ledge 3013 comprising layers $h_5$-$h_8$ having an average plane $p_1$-$p_4$, which ledge includes a bottom skin. The ledge forms an angle beta1 ($\beta_1$) with the average plane (e.g., $p_5$). The ledge can be formed by one or more rows of tiles. A vertical cross section of the row of tiles is schematically represented by a rectangle (e.g., 3012). FIG. 30B shows an example of a 3D object 3020 having a plurality of layers that comprises (a) a rigid portion 3021 that includes layers $h_1$-$h_4$ having an average layering plane, e.g., $p_5$, and (b) a ledge 3023 including layers $h_5$-$h_5$ having an average plane $p_1$-$p_4$, which ledge includes a bottom skin and a portion 3024 that thickens the bottom skin. The ledge forms an angle beta2 ($\beta_2$) with the average plane (e.g., $p_5$). The bottom skin thickening portion (e.g., 2024) may be formed by any methodology (or methodologies) suitable to form the 3D object, e.g., as disclosed herein.

Figure 31A:
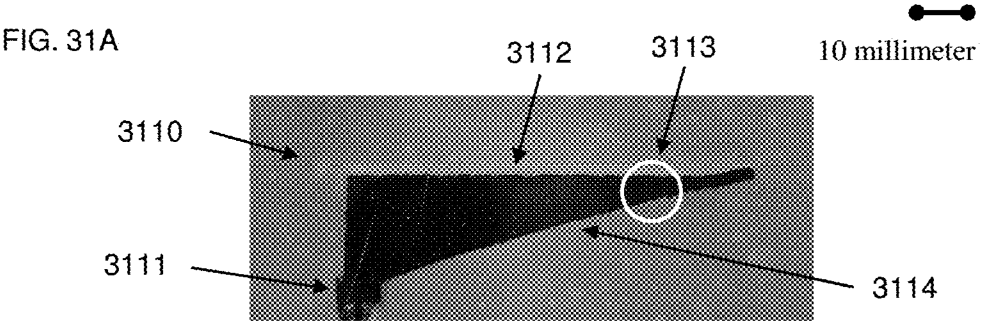
FIGS. 31A-31C illustrate vertical cross sections in a 3D object.
Figure 31B:
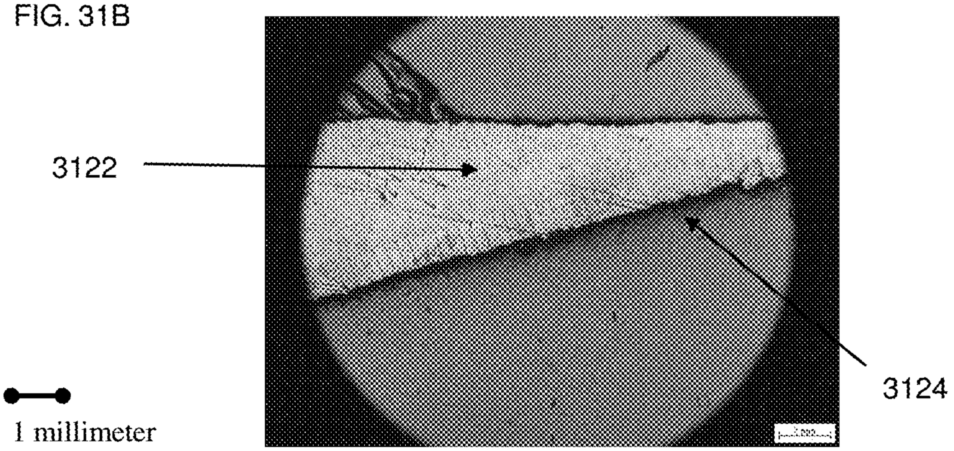
Figure 31C:
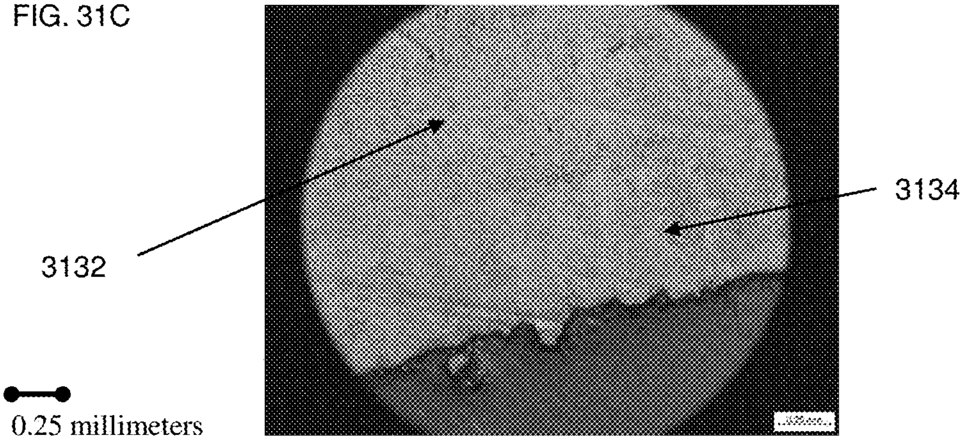

FIGS. 31A-31C show vertical cross section optical micrograph examples of a 3D object formed of $Ti_6Al_4V$ in various magnifications, which 3D objects were formed using a plurality of methods as disclosed herein. FIG. 31A shows a 3D object 3110 having a rigid portion 3111, and a ledge having (a) a bottom skin 3114 and (b) a thickening portion 3112 disposed above the bottom skin. FIG. 31B shows a magnified portion 3113 of the 3D object 3110 showing the ledge having (a) a bottom skin 3124 and (b) a thickening portion 3122 disposed above the bottom skin 2124 that includes plurality of tiles. In the examples shown in FIGS. 31A-31C, the thickening portion of 3D object 3110 is generated in one or more methodologies different from the methodology utilized to form the bottom skin portion 2124. FIG. 31C shows a magnified portion of the 3D object 3110

(in greater magnification as compared to FIG. 31B) showing the ledge having (a) a bottom skin 3134 and (b) a thickening portion 3132 disposed above the bottom skin 2134, which bottom skin portion includes a plurality of tiles and is formed in a methodology different than the methodology (ies) used to form the thickening portion.

Figures 32A, 32B, 32C, 32D, 32E:
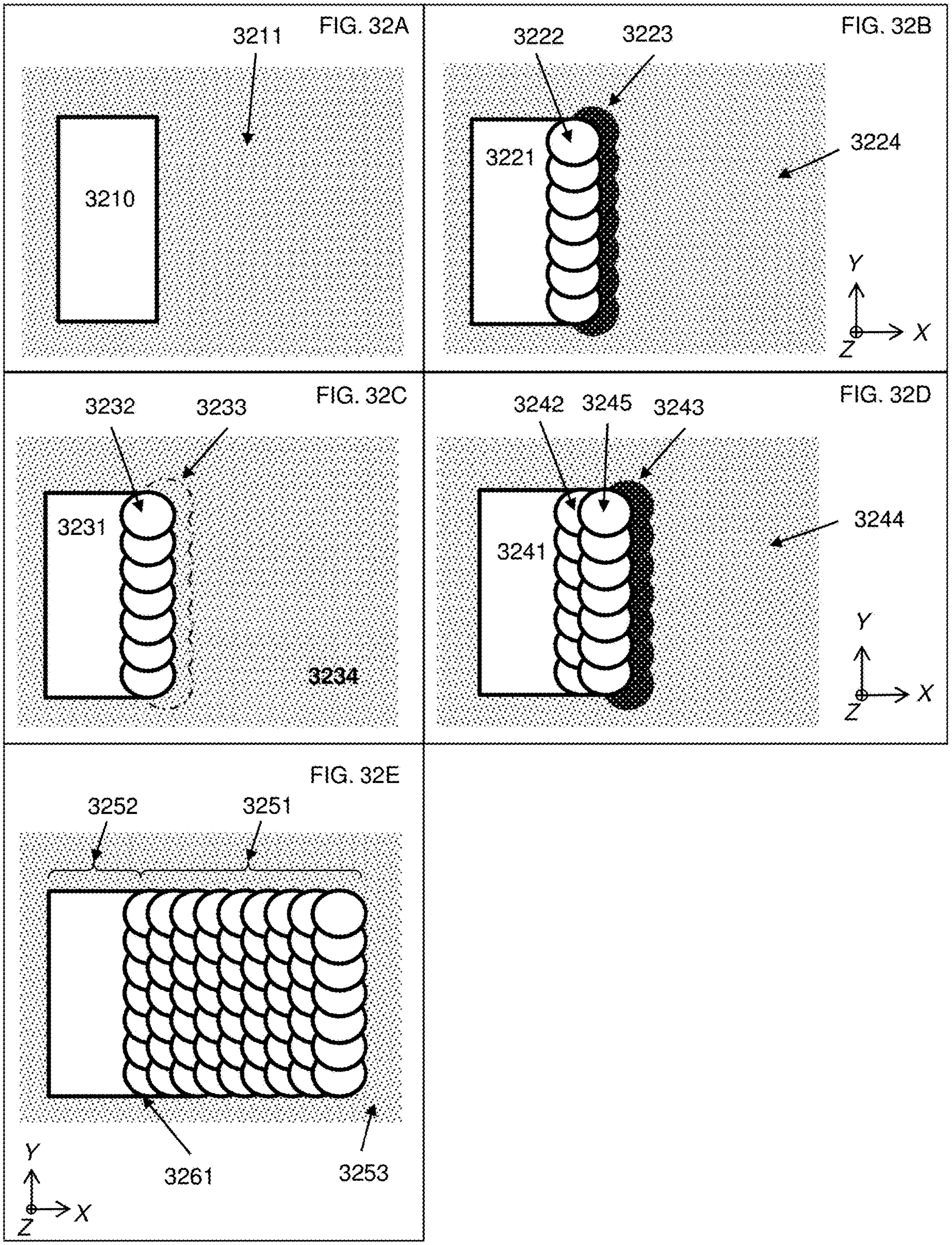
FIGS. 32A-32E schematically illustrate top views of various 3D objects in material beds.

FIGS. 32A-32E show top view examples of various stages in formation of a (e.g., requested) ledge 3251 that is connected to an initial portion 3252 in a material bed 3253. An initial portion may be a rigid portion (e.g., a core). FIG. 32A shows an example of an initial portion 3210 in a material 3211. FIG. 32B shows an example of a first row of tiles along the Y direction, which first row of tiles comprises contacting and overlapping tiles including tile 3222 arranged in a single file, which row of tiles contacts initial portion 3221 and extends beyond the initial portion in the X direction, to form a 3D object comprising a ledge in a material bed 3224 having an exposed surface, and a depression 3223 in the material bed that extends below the exposed surface. The depression (e.g., indentation) may be formed due to generation of the first row of tiles. The depression may be filled up with additional pre-transformed material, e.g., using a recoater, e.g., as part of a layer dispensing mechanism.

The material bed may be replenished between formation of rows of tiles. For example, a recoater and/or layer dispenser may replenish the material bed, e.g., without detectable alteration of a vertical position of the platform. The replenishment may result in a material bed having a planar exposed surface. Detectable alteration may be detected in the position of the platform and/or in the planarity of the formed ledge extension. For example, an absence of a detectible vertical difference between the first row and the second row in the ledge. For example, a plurality of rows (e.g., the first row and the second row) may appear to have been generated from the same pre-transformed material layer. FIG. 32C shows an example of a 3D object including a first row of tiles (that including tile 3232) that contacts an initial portion 3231, which 3D object is disposed in a material bed 3234 having an exposed surface without (or with a non-detectable) any depression in the material bed that extends below the exposed surface, wherein the area 3233 surrounded by dashes represents a previously present depression (e.g., as in FIG. 32B, 3223). FIG. 32D shows an example of: (a) a first row of tiles extending in the Y direction, which first row of tiles comprises contacting and overlapping tiles (including tile 3242) arranged in a single file, which row of tiles contacts initial portion 3241 and extends beyond the initial portion in the X direction, and (b) a second row of tiles along the Y direction, which second row of tiles comprises contacting and overlapping tiles (including tile 3245) arranged in a single file, which second row of tiles contacts the first row of tiles and extends in the X direction beyond the initial portion and beyond the first row of tiles to form a 3D object comprising a ledge, which 3D object is disposed in a material bed 3244 having an exposed surface and a depression 3243 that extends below the exposed surface. The ledge may be formed by one or more rows of tiles. The plurality of rows of tiles may be formed one at a time. The formation of two successive rows of tiles may be intervened by deposition of pre-transformed material, e.g., (i) to supplement pre-transformed material to any depression in the exposed surface of the material bed, (ii) to elevate the exposed surface of the material bed with respect to the platform and/or to the bottom of the initial portion, or (iii) any combination thereof. FIG. 32E shows an example of: a plurality of rows of tiles extending in the Y direction, wherein each row of tiles comprises contacting and overlapping tiles (including tile 3261) arranged in a single file, wherein the first row of tiles contacts initial portion 3252 and extends beyond the initial portion in the X direction, and (b) each successive row of tiles along the Y direction is similarly generated as a single file, wherein each row of tiles contacts a previously formed row of tiles and extends in the X direction beyond the initial portion and beyond the previously formed row of tiles, to form a 3D object comprising a ledge (e.g., FIG. 6B, a ledge having a bottom skin layer 676), which 3D object is disposed in a material bed 3253.

In some embodiments, the tiles in a row of tiles may be formed in a sequence. The sequence may be forming a single file of tiles (e.g., FIG. 32B, showing an example of tiles 3222 as part of a row of tiles along the Y direction). The sequence may comprise forming a first tile in a first position, forming a second tile in a second position, and forming a third tile in a third position. The first tile may contact the second tile. The second tile may contact the third tile. The third tile may or may not contact the first tile. The first tile may contact the second tile. The first tile and the second tile may be formed such that there is a gap between them. The tile may be a melt pool. The gap may have a FLS of a tile and/or a melt pool.

Figures 33A, 33B, 33C, 33D, 33E, 33F, 33G:
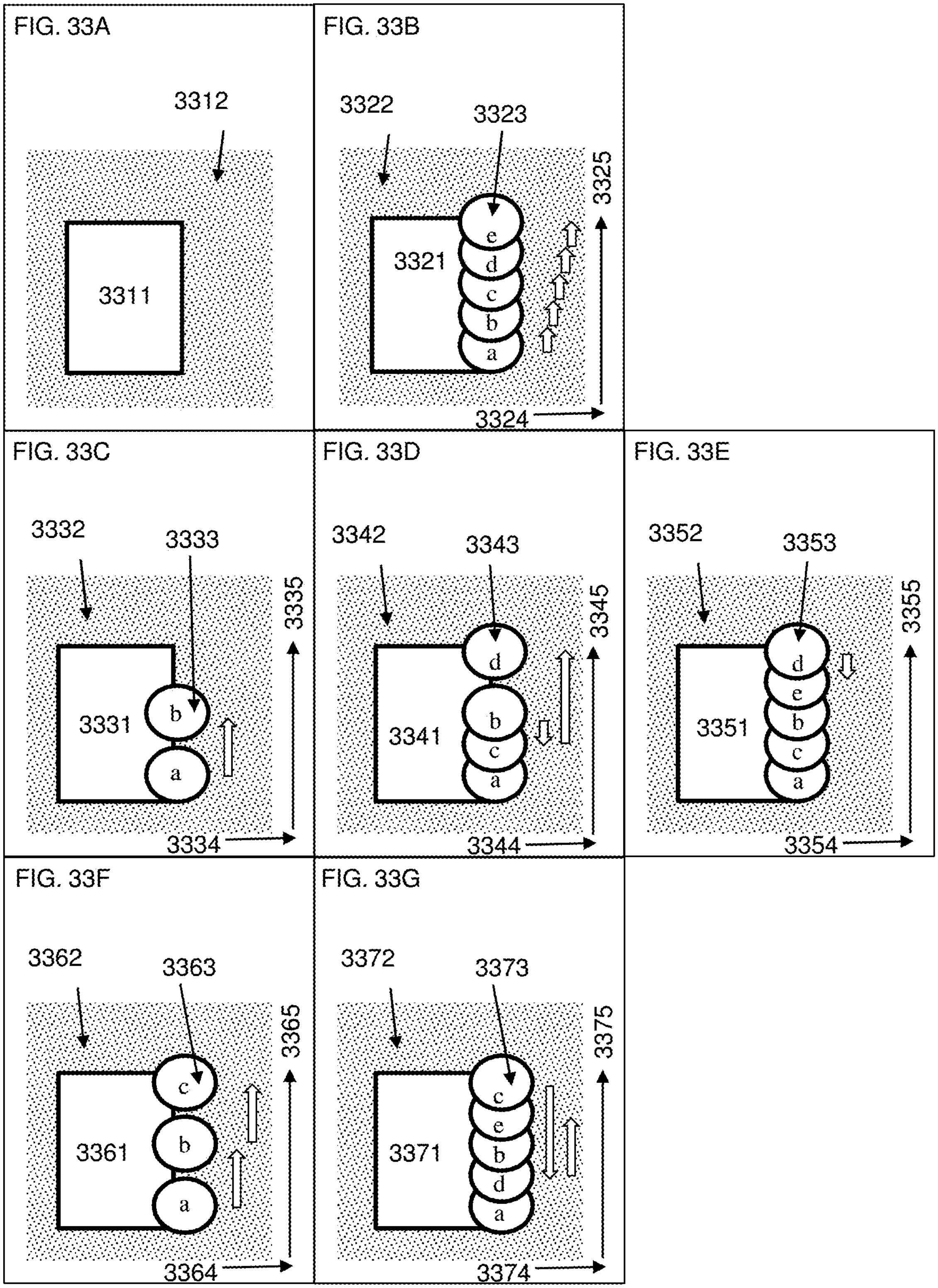
FIGS. 33A-33G schematically illustrate top views of various 3D objects in material beds.

FIGS. 33A-33G show schematic top view example of tiles formed adjacent to an initial portion. FIG. 33A shows an example of an initial portion 3311 disposed in a material bed 3312. FIG. 33B shows an example of an initial portion 3321 disposed in a material bed 3322 and a row of tiles arranged in a single file along an edge of the initial portion, that includes tile 3323; which row of tiles is formed of successively formed tiles according to an alphabetical order (from "a" to "e"). That is: initially tile "a" is formed, followed by formation of tile "b," followed by formation of tile "c," followed by formation of tile "d," ending by formation of tile "e" (also numbered as 3323). In the example shown in FIG. 33B, the tiles overlap each other. In the example shown in FIG. 33B, the energy beam that is utilized to generate the tiles, travels in sequence according to the thick white arrows, wherein 3324 designates time, and 3325 designates distance traveled along a path of tiles (e.g., and parallel to the rim of the initial portion) to form the row of tiles. FIGS. 33C-33E shows formation of a single file of tiles in a different progression, for example, a first example of back and forth progression. FIG. 33C shows an example of an initial portion 3341 disposed in a material bed 3342 and a row of tiles arranged in a single file along an edge of the initial portion, that includes tile 3343; which row of tiles is formed of successively formed tiles according to an alphabetical order (from "a" to "b"). That is: initially tile "a" is formed, followed by formation of tile "b" (also numbered as 3333). In the example shown in FIG. 33C, the tiles "a" and "b" are formed along a path of tiles with a gap between them. In the example shown in FIG. 33C, the energy beam that is utilized to generate the tiles, travels in sequence according to the thick white arrow, wherein 3334 designates time, and 3335 designates distance traveled along a path of tiles (e.g., and parallel to the rim of the initial portion) to form the row of tiles. The material bed may be replenished between formation of at least two the tiles in a row of tiles. The two tiles in the row of tiles may contact each other or not contact each other. The two tiles in the row of tiles may be directly adjacent or not directly adjacent to each other. For example, a recoater and/or layer dispenser may replenish the material bed, e.g., without detectable alteration of a vertical position of the platform. The replenishment may result in a material bed having a planar exposed surface.

Detectable alteration may be detected in the position of the platform and/or in the planarity of the formed row of tiles. FIG. 33D shows an example of an initial portion 3341 disposed in a material bed 3342 and a row of tiles arranged in a single file along an edge of the initial portion, that includes tile 3343; which row of tiles is formed of successively formed tiles according to an alphabetical order (from "a" to "d"). That is: initially tile "a" is formed, followed by formation of tile "b," followed by formation of tile "c" followed by formation of tile "d" (also numbered as 3343). In the example shown in FIG. 33D, the gap between "a" and "b" shown in FIG. 33C, is filled with a portion of tile "c," and the tile "d" is formed with a gap between "b" and "d." In the example shown in FIG. 33D, the energy beam that is utilized to generate tiles "c" and "d," travels in sequence according to the thick white arrows, wherein 3344 designates time, and 3345 designates distance traveled along a path of tiles (e.g., and parallel to the rim of the initial portion) to form the row of tiles. FIG. 33E shows an example of an initial portion 3351 disposed in a material bed 3352 and a row of tiles arranged in a single file along an edge of the initial portion, that includes tile 3353; which row of tiles is formed of successively formed tiles according to an alphabetical order (from "a" to "e"). That is: initially tile "a" is formed, followed by formation of tile "b," followed by formation of tile "c," followed by formation of tile "d," ending by formation of tile "e" (also numbered as 3353). In the example shown in FIG. 33E, the gap between "b" and "d" shown in FIG. 33D, is filled with a portion of tile "e." In the example shown in FIG. 33E, the energy beam that is utilized to generate tile "e," travels according to the thick white arrow, wherein 3354 designates time, and 3355 designates distance traveled along a path of tiles (e.g., and parallel to the rim of the initial portion) to form the row of tiles. FIGS. 33F-33G shows formation of a single file of tiles in yet a different progression, for example, a second example of back and forth progression. FIG. 33F shows an example of an initial portion 3361 disposed in a material bed 3362 and a row of tiles arranged in a single file along an edge of the initial portion, that includes tile 3363; which row of tiles is formed of successively formed tiles according to an alphabetical order (from "a" to "c"). That is: initially tile "a" is formed, followed by formation of tile "b," followed by formation of tile "c" (also numbered as 3363). In the example shown in FIG. 33F, a gap is formed between "a" and "b," and between "b" and "c," along the row of tiles. In the example shown in FIG. 33F, the energy beam that is utilized to generate tiles a-c, travels according to the thick white arrow, wherein 3364 designates time, and 3365 designates distance traveled along a path of tiles (e.g., and parallel to the rim of the initial portion) to form the row of tiles. FIG. 33G shows an example of an initial portion 3371 disposed in a material bed 3372 and a row of tiles arranged in a single file along an edge of the initial portion, that includes tile 3373; which row of tiles is formed of successively formed tiles according to an alphabetical order (from "a" to "e"). In the example shown in FIG. 33G, the gaps previously formed between "a" and "b," and between "b" and "c," along the row of tiles (e.g., shown in the example of FIG. 33F), are filled according to the alphabetical order. That is: following the formation of tiles "a-b" (as in the example of FIG. 33F), the tile "d" is formed, followed by formation of tile "e" (also numbered as 3373). In the example shown in FIG. 33F, the energy beam that is utilized to generate tiles "a-c," travels according to the thick white arrow, wherein 3374 designates time, and 3375 designates distance traveled along a path of tiles (e.g., and parallel to the rim of the initial portion) to form the row of tiles. The gaps between tiles "a" and "b," and "b" and "c" shown in the example of FIG. 33F, may be filled in a different order, e.g., first tile "e" is formed, followed by formation of tile "d."

In some embodiments, an energy beam may be utilized to transform a portion of the material bed to form the tile. For example, the energy beam may impinge on an exposed surface of the material bed to form the tile. For example, the energy beam may irradiate the pre-transformed material to form a transformed material (e.g., a melt pool) that generates the tile. When forming the tile, the energy beam may be stationary or substantially stationary. Substantially stationary may comprise movement of the energy beam along an exposed surface of the material bed. With respect to the path of tiles (e.g., a path along with the energy beam travels to form a row of tiles), the movement of the energy beam may comprise back and forth movement (e.g., pendulum movement), a directional movement (e.g., a forward, a backwards, or a side movement), or any combination thereof. The substantially stationary energy beam may move to an extent that is at most (a) a FLS (e.g., diameter) of the tile and/or (b) a FLS of a cross-section of the energy beam on an exposed surface of the material bed (e.g., energy beam spot size). The tile may have a horizontal cross section that is elliptical. For example, the tile may be globular (e.g., and have a circular horizontal cross section, e.g., 3413). The cross section may comprise an exposed surface of the tile. The ellipse may have an "a" and "b" axis. The ellipse may be elongated (e.g., its "b" axis is greater than it's "a" axis of the ellipse). A ratio between "a" and "b" (a:b) may be at least about 1:1.5, 1:2, 1:2.5, 1:3.5, or 1:4. In the ellipse having axis "a" and "b," if "a" is 1, "b" may be proportioned as at most about 1.5, 2, 2.5, 3, 3.5, or 4 relative to "a". An elongated tile may be elongated along a first direction. The energy beam may propagate along a second direction to form the row of tiles (e.g., 3414). The energy beam may propagate in a third direction to form a plurality rows of tile in order to elongate a ledge (e.g., 3424). The first direction may be different than the second direction and/or different than the third direction. For example, the first direction may be perpendicular to the second direction (e.g., as in tile 3453, wherein the second direction is along 3454). For example, the first direction may be perpendicular to the third direction (e.g., as in tile 3433, wherein the third direction is along 3444). The first direction may be parallel to the second direction and/or parallel to the third direction. For example, the first direction may be parallel to the second direction (e.g., as in tile 3433, wherein the second direction is along 3434). For example, the first direction may be parallel to the third direction (e.g., as in tile 3453, wherein the third direction is along 3464).

Figures 34A, 34B, 34C, 34D, 34E, 34F:
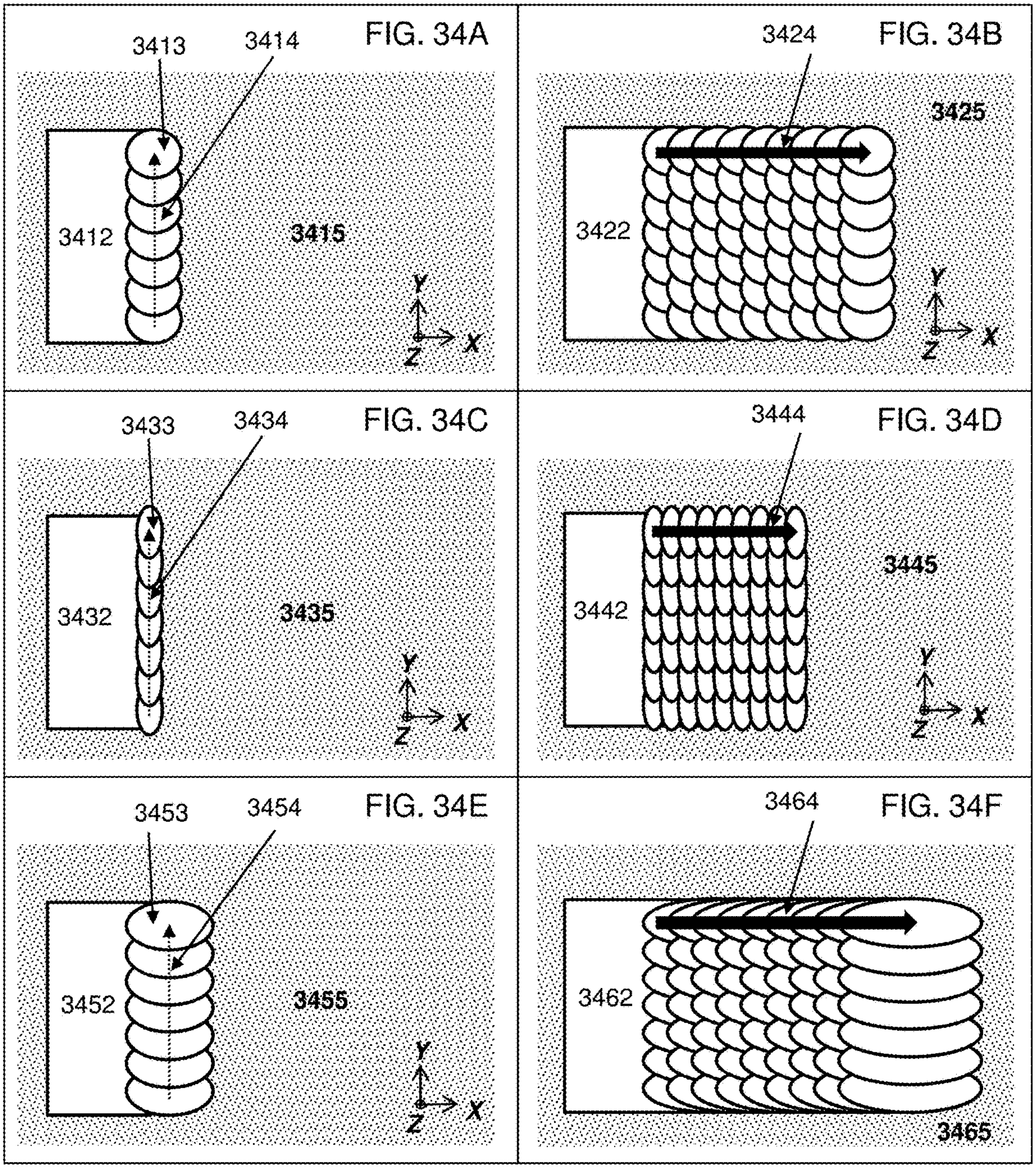
FIGS. 34A-34F schematically illustrate top views of various 3D objects in material beds.

FIGS. 34A-34F show schematic top views of various 3D objects. FIG. 34A shows a 3D object having an initial portion 3412 and a ledge formed by a row of tiles that includes tile 3413, which 3D object is disposed in a material bed 3415. The row of tiles shown in FIG. 34A are formed along the path of tiles designated by arrow 3414, e.g., according to any tile formation sequence disclosed herein. The row of tiles forms a ledge along the rim of the initial portion (and along the y direction) that extends beyond the initial portion in another direction (e.g., along the X direction). The tiles in the example of FIG. 34A have a globular horizontal cross section. FIG. 34B shows an example of an extension of the ledge shown in FIG. 34A. FIG. 34B shown an example of a 3D object having an initial portion 3422 and a ledge formed by multiple overlapping rows of tiles having globular horizontal cross section, which successive rows of tiles are formed sequentially along a direction by arrow 3424. The formed ledge in FIG. 34B extends beyond the initial portion 3422 in a direction (e.g., X direction) different from the direction along which a row of tiles is formed (e.g., along the Y direction). The 3D object in FIG. 34B is disposed in a material bed 3425. FIG. 34C shows a 3D object having an initial portion 3432 and a ledge formed by a row of tiles that includes tile 3433, which 3D object is disposed in a material bed 3435. The row of tiles shown in FIG. 34C are formed along the path of tiles designated by arrow 3434, e.g., according to any tile formation sequence disclosed herein. The row of tiles forms a ledge along the rim of the initial portion (and along the y direction) that extends beyond the initial portion in another direction (e.g., along the x direction). The tiles in the example of FIG. 34C have an elliptical horizontal cross section, wherein the long axis of the ellipse is along the path of tiles (e.g., along the direction 3434). The tiles having an elliptical horizontal cross section may be formed using a substantially stationary energy beam that travels in one or more directions (e.g., forward, backward, or forward and backward) along the path of tiles. During tile formation, the movement of the energy beam forming the tile may be smaller than (a) a FLS (e.g., diameter) of the melt pool and/or (b) a footprint of the energy beam on the exposed surface of the material bed (e.g., energy beam spot-size). FIG. 34D shows an example of an extension of the ledge shown in FIG. 34C. FIG. 34D shown an example of a 3D object having an initial portion 3442 and a ledge formed by multiple overlapping rows of tiles having an elliptical horizontal cross section, which successive rows of tiles are formed sequentially along a direction by arrow 3444, and the long axis of their ellipses are disposed along the path of tile (e.g., 3434). The formed ledge in FIG. 34D extends beyond the initial portion 3442 in a direction (e.g., X direction) different from the direction along which a row of tiles is formed (e.g., along the Y direction), and different from the direction along which the long elliptical axis is disposed. The 3D object in FIG. 34D is disposed in a material bed 3445. FIG. 34E shows a 3D object having an initial portion 3452 and a ledge formed by a row of tiles that includes tile 3453, which 3D object is disposed in a material bed 3455. The row of tiles shown in FIG. 34E are formed along the path of tiles designated by arrow 3454, e.g., according to any tile formation sequence disclosed herein. The row of tiles forms a ledge along the rim of the initial portion (and along the y direction) that extends beyond the initial portion in another direction (e.g., along the X direction). The tiles in the example of FIG. 34E have an elliptical horizontal cross section, wherein the long axis of the ellipse is not along the path of tiles (e.g., along a direction other than the direction 3454). The direction other than that of the path of tiles may be a direction of ledge extension (e.g., X direction). The tiles having an elliptical horizontal cross section may be formed using a substantially stationary energy beam that travels in one or more directions (e.g., forward, backward, or forward and backward) along the direction different than that of the path of tiles (e.g., along the ledge extension direction, e.g., along the X direction). FIG. 34F shows an example of an extension of the ledge shown in FIG. 34E. FIG. 34F shown an example of a 3D object having an initial portion 3462 and a ledge formed by multiple overlapping rows of tiles having an elliptical horizontal cross section, which successive rows of tiles are formed sequentially along a direction by arrow 3464, and the long axis of their ellipses are disposed along a direction different than that of path of tile (e.g., 3454). The formed ledge in FIG. 34F extends beyond the initial portion 3462 in a direction (e.g., X direction) different from the direction along which a row of tiles is formed (e.g., along the Y direction). The 3D object in FIG. 34F is disposed in a material bed 3465.

Figure 25:
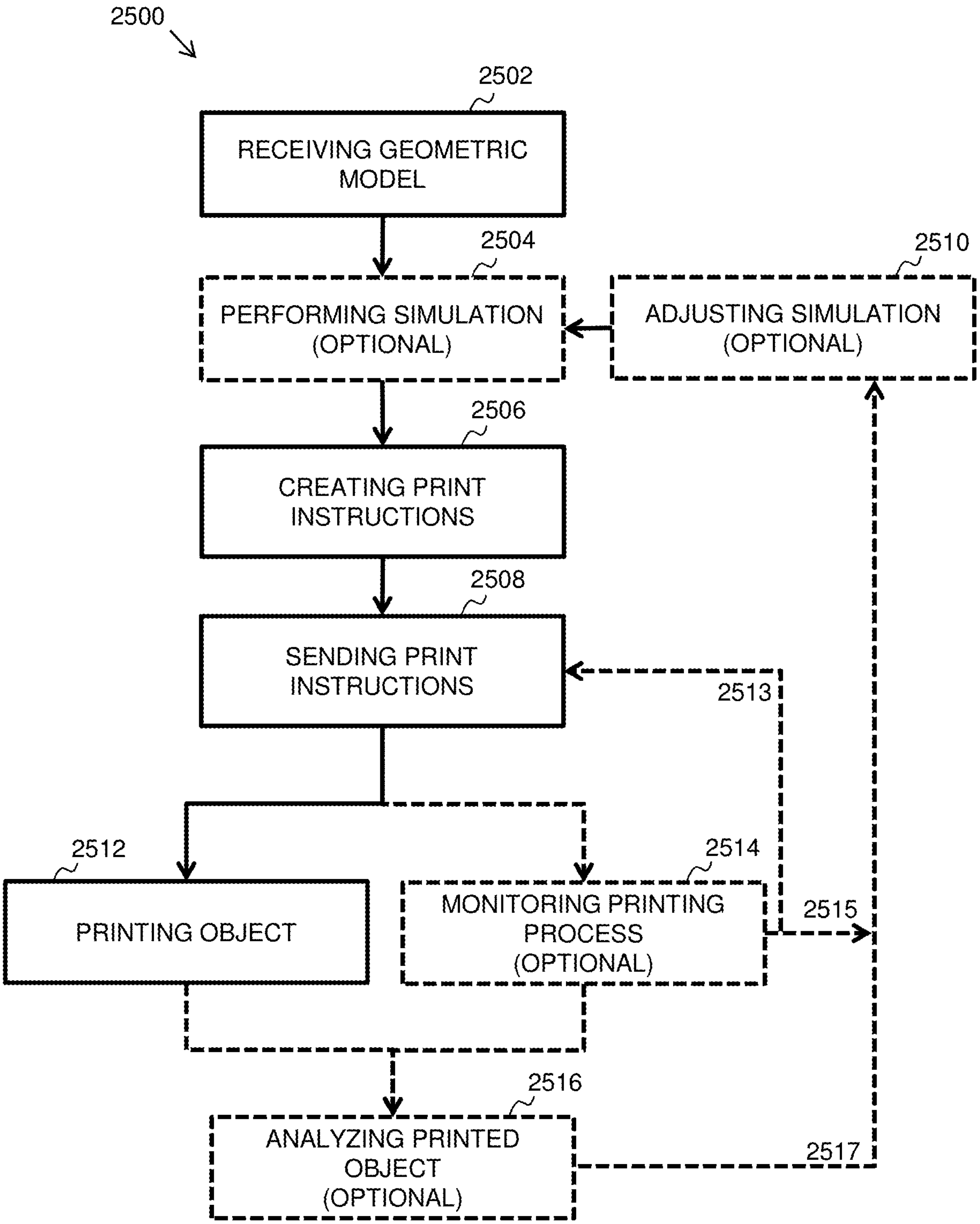
FIG. 25 illustrates a flowchart.

In some embodiments, one or more LPM operations is incorporated in a printing process. FIG. 25 shows an example flowchart 2500 indicating a printing process comprising at least one LPM operation. A geometric model of one or more objects can be received (e.g., FIG. 25, 2502). The geometric model may include a requested geometry. The geometry can include dimensions of the one or more objects. The requested geometry may comprise (e.g., predetermined) dimensions of the object (e.g., as requested by a customer). The geometric model may be a virtual model (e.g., a computer-generated model). The virtual model may reference any coordinate system (e.g., point cloud or computer-aided design ("CAD")). The virtual model may be in the form of a file (e.g., CAD or additive manufacturing file format ("AFM")). The geometric model may be a non-virtual (e.g., physical) model. The geometric model may optionally be used to perform one or more simulations (e.g., FIG. 25, 2504). The one or more simulations may be used to modify (e.g., optimize) the one or more LPM operations. The one or more simulations may consider physics-based models and/or equations, such as described herein. The simulation may comprise thermal, mechanical, liquid phase, or gas phase simulation of at least a portion of the printing process. The one or more simulations may optionally be used to modify the geometric model (e.g., considering the physics-based models). The geometric model (e.g., modified or unmodified) can be used to create print instructions (e.g., FIG. 25, 2506). The print instructions may include instructions for forming multiple layers of the one or more 3D objects. The instructions may comprise instructing: at least one characteristic of the energy beam, energy source, at least one component of the optical system, platform, layer dispensing mechanism, or gas flow. If one or more simulations is performed, the print instructions can incorporate aspects related to the one or more simulations. The print instructions can be sent to one or more printers (e.g., FIG. 25, 2508). In some cases, performing the simulation (e.g., FIG. 25, 2504), creating print instructions (e.g., FIG. 25, 2506), and/or sending the print instructions (e.g., FIG. 25, 2508) is/are performed during at least a portion of the printing. In some cases, performing the simulation (e.g., FIG. 25, 2504), creating print instructions (e.g., FIG. 25, 2506), and/or sending the print instructions (e.g., FIG. 25, 2508) is/are performed before, and/or during the printing. One or more objects can be printed (e.g., FIG. 25, 2512) using one or more printers. In some embodiments, the printing is optionally monitored (e.g., FIG. 25, 2514). The monitoring can comprise using one or more detectors that detect one or more outputs (e.g., thermal, optical, chemical and/or tactile). In some cases, the monitoring is done during printing. In some cases, the monitoring is done before, during and/or after printing. The monitoring can use historical measurements. The monitoring can optionally be used to (e.g., directly) modify the printing instructions (e.g., FIG. 25, 2513) and/or adjust the one or more simulations (e.g., FIG. 25, 2510). For example, one or more thermal detectors may gather real time thermal signals (e.g., real time thermal signature curve) at and/or in the vicinity of an irradiation spot on the target surface during printing of a 3D object. In the vicinity of the irradiation spot may include an area of at least about 1, 1.5, 2, 2.5, 3, 3.5, 4, 4.5, 5, 5.5, 6, 6.5, 7, 7.5, 8, 8.5, 9, 9.5, or 10 FLS (e.g., diameter) of a melt pool. The vicinity of the irradiation spot may include an area between any of the aforementioned values (e.g., from about 1 FLS to about 10

FLS, from about 1 FLS to about 5 FLS, from about 5 FLS to about 10 FLS, or from about 1 FLS to about 6 FLS) of melt pool. The thermal signals can be compared to a target thermal signal (e.g., target thermal signature curve) during the printing. One or more characteristics of the energy beam (e.g., power density at the target surface, wavelength, cross section, path, irradiation spot size, scan speed, dwell time, intermission time, and/or power of the energy source generating the energy beam) may be altered during the printing to adjust the real time thermal signal to (e.g., substantially) match the target thermal signature (e.g., within a (predetermined) tolerance). In some embodiments, a target thermal signal is obtained from one or more simulations (e.g., FIG. 25, 2504). The target signal may be a value, a set of values, or a function (e.g., a time dependent function). The one or more objects may optionally be analyzed (e.g., FIG. 25, 2516). In some embodiments, a target (e.g., thermal) signal is obtained from historical data of objects that have been analyzed. In some embodiments, the object(s) is analyzed using an inspection tool (e.g., optical camera, x-ray instrument and/or a microscope). The microscope may comprise an optical, or an electron microscope. The microscope may comprise a scanning tunneling, scanning electron, or a transmission electron microscope. The measurement may be conducted using a method comprising X-ray tomography, tensile tester, fatigue tester, stress system, or X-ray diffraction (XRD). The measurements may be conducted at ambient temperature. The roughness can be measured with a surface profilometer. In some cases, the analysis provides data concerning geometry of the object(s). In some cases, the analysis provides data concerning one or more material properties (e.g., porosity, surface roughness, grain structure, (e.g., internal) strain and/or chemical composition) of the object(s). In some embodiments, the analysis data is compared to requested data. For example, a geometry of the printed object(s) may be compared with the geometry of the requested object(s). In some embodiments, the analysis data is used (e.g., FIG. 25, 2517) to adjust the simulation (e.g., FIG. 25, 2510). The adjusted simulation may be used, for example, in printing of subsequent object(s). In some cases, the simulation is repeatedly adjusted (e.g., improved) considering one or more printed objects. The repeated adjustments scheme may be referred to a learning module. Examples of learning modules and related aspects are described in international patent application number PCT/US17/54043, filed Sep. 28, 2017, titled "THREE-DIMENSIONAL OBJECTS AND THEIR FORMATION;" and international patent application number PCT/US18/20406, filed Mar. 1, 2018, titled "THREE-DIMENSIONAL PRINTING OF THREE DIMENSIONAL OBJECTS," which is entirely incorporated herein by reference.

In some embodiments, real time comprises during at least a portion of the 3D printing, during printing of a layer of the 3D object, during printing of a hatch, during printing of a path of tiles, during printing of single digit number of tiles, or during printing of single digit number of melt pools, during printing of a tile, or during printing of a melt pool.

In some examples, the printing is monitored in real time (e.g., by collecting output signals from one or more detectors). The printing may be monitored in situ. In some cases, one or more input signals is adjusted while considering the output (e.g. thermal) signal (e.g., FIG. 26). The adjustment can utilize a (e.g., real time) feedback loop (e.g., FIG. 15A, 1505; or FIG. 25, 2513, 2515 or 2517) in the printing process. In some embodiments, the monitoring is used to (e.g., indirectly) detect defects in the objects(s). In some cases, detection of defects is done in real time and/or in situ. Defects may include geometric (e.g., dimensional) variance (e.g., from a target geometry), surface roughness (e.g., beyond a threshold roughness), and/or porosity (e.g., beyond a threshold porosity). The monitoring can be used to predict defects before they occur or as they occur in real time. The defect may comprise material quality defects. For example, the defect may comprise microstructural discontinuity, e.g., a crack or a fracture. For example, the defect may comprise chemical discontinuity, e.g., formation of an oxide when forming a metallic 3D object (e.g., comprising an elemental metal or a metal alloy). The input signal (e.g., for adjusting least one characteristic of the energy beam(s)) can be varied at to reduce (e.g., prevent) defects (or further defects) from occurring. The variation(s) (e.g., adjustment(s)) may be made in real time and/or in situ. The adjustment(s) may be made on a layer-by-layer basis (e.g., to print an entire layer). The adjustment(s) may be made on at most a singular digit number of melt pools basis (e.g., to generate at most a singular number of melt pools). In some instances, the monitoring can trigger pausing or stopping the printing. In some cases, the monitored data is stored so that it can be used to modify (e.g., improve) printing of subsequent objects with similar geometries or similar geometry portions. In some instances, the monitoring is used to detect (and/or predict) a destabilization of the (e.g., liquid or partially liquid) melt pool. For example, in some cases a destabilization at an exposed surface (e.g., bottom) of a melt pool can cause defects at the exposed (e.g., bottom) surface, referred to herein as "drill-through" defects. In some embodiments, the monitored data is used to create a (e.g., 3D) signal (e.g., thermal) map.

Figure 26A:
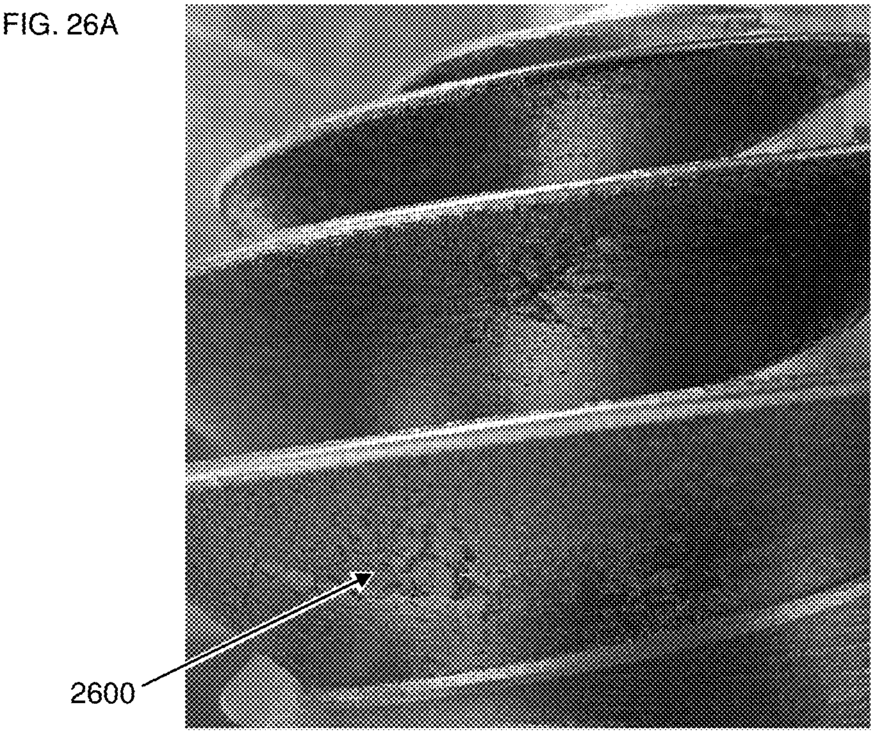
FIG. 26A shows a portion of a 3D object.
Figure 26B:
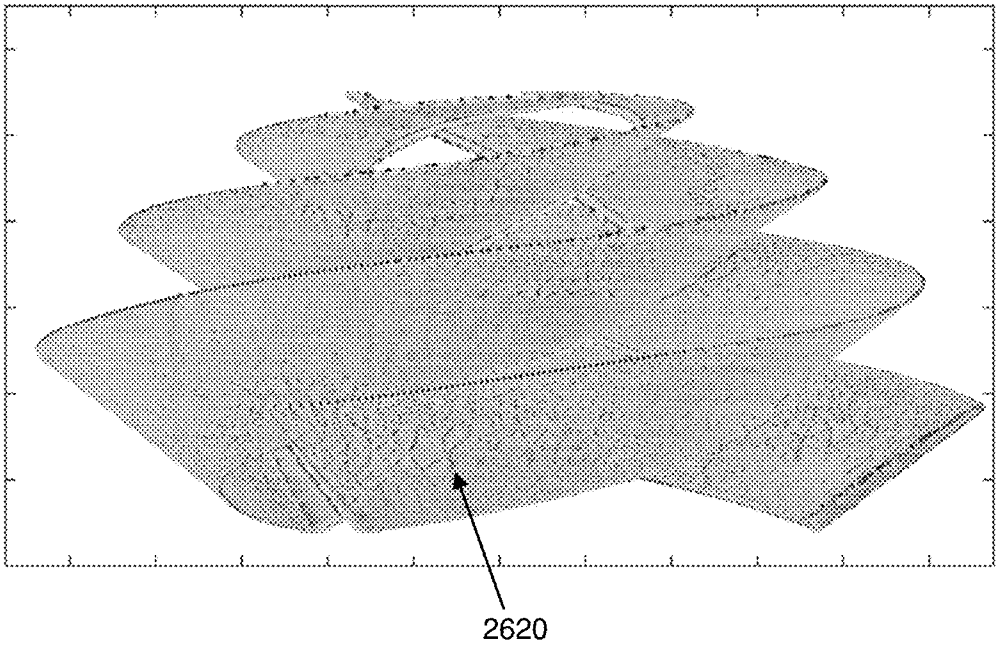
FIG. 26B shows a map of a 3D object.

FIGS. 26A and 26B show example perspective views of an impeller. FIG. 26A shows an example image of the impeller that was printed. FIG. 26B shows an example output thermal signal map of the example impeller of FIG. 26A created from data collected in real time during the impeller's printing. The output (e.g., thermal) signal map (e.g., FIG. 26B) shows (e.g., drill-through) defects (e.g., FIG. 26B, 2620) at locations that (e.g., substantially) correspond to locations of actual (e.g., drill-through) defects (e.g., FIG. 26A, 2600) of the object (e.g., FIG. 26A). The one or more controllers of the printer can be configured to form a signal map considering the real-time sensed signal. The one or more controllers can be configured to control formation of the three-dimensional object to compensate for a variation between the signal map versus a target signal map.

Figure 35A:
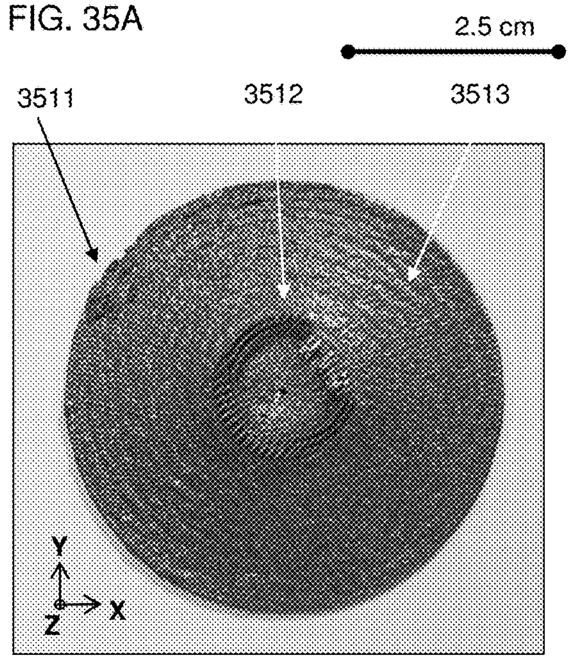
FIGS. 35A-35C show various views of a 3D object.
Figure 35D:
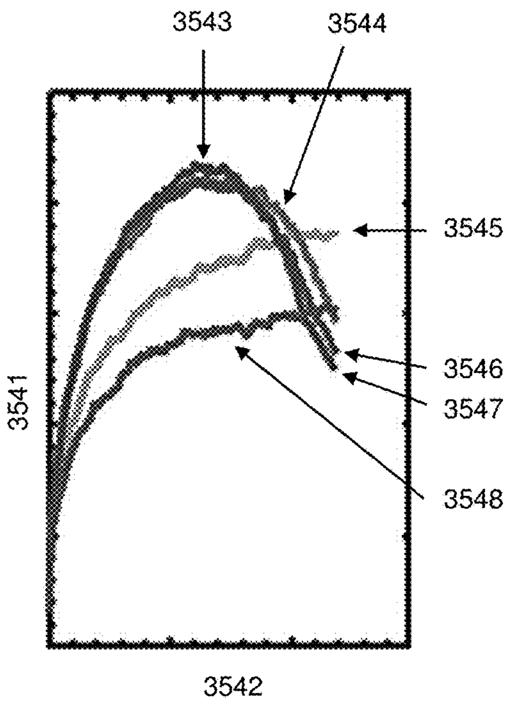
FIG. 35D shows a graph associated with 3D printing.
Figure 35B:
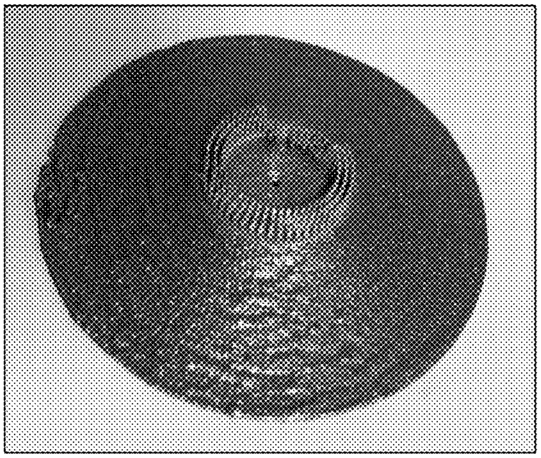
Figure 35C:
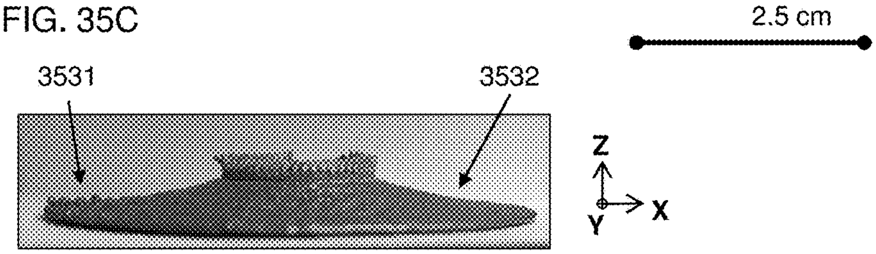

FIGS. 35A-35B show example views of a 3D object disposed upside-down, that is, disposed on its last formed layer contacting a platform. FIG. 35A shows a horizontal view of the 3D object depicting supports 3512, a region having an average surface roughness 3513, and a region having pronounced surface roughness and structural defects 3511. FIG. 35B shows the 3D object of FIG. 35A in a perspective view. FIG. 35C shows a side view of the object of FIG. 35A, depicting a region with an average roughness 3532 and a region with a pronounced roughness 3531. FIG. 35D shows example time 3542 dependent graphs as a function of a temperature 3541 related property of a plurality of melt pools. The temperature related property can be current, voltage, reflectance, radiation (e.g., wavelength and/or intensity), secularity, and/or color. The temperature related property may depend on the temperature detector utilized for the measurement, e.g., as disclosed herein. The time dependency may be collected in real-time and/or in situ. The time dependency may have at most a microsecond time scale. In the example shown in FIG. 35D, each of the graphs depicts formation of 46 successive melt pools generated as part of a layer of a 3D object (that is like the one depicted in FIGS. 35A-35C). A defect in formation of one or more melt pools may be detected as a deviation from an expected time dependent temperature graph (e.g., within an expected tolerance, e.g., within an expected threshold). For example, graphs 3546 and 3547 in FIG. 35D show examples of expected time dependent temperature graphs that are within a tolerance. Graph 3544 in FIG. 35D show an example of a time dependent temperature graphs that slightly deviates from expected. Graphs 3545 and 3548 in FIG. 35D show examples of a time dependent temperature graphs that deviates from expected in greater amount as compared to the slight deviation of graph 3544. A greater deviation of the time dependent temperature relation from the expected, is associated with an appearance of a larger defect. An example of defect may be an increase roughening of the surface. For example, melt pools formed in graphs 3545 and 3548 are associated with defects that appear similar those depicted in 3511 and 3531. For example, melt pools formed in graphs 3544 may contribute to a slight increase in surface roughness which may or may not be detectable (e.g., depending on the roughness profilometer utilized).

In some embodiments, the control system optionally includes one or more simulators (e.g., FIG. 15A, 1512). The simulator(s) may comprise to a non-transitory computer-readable medium in which program instructions are stored. The instructions may include receiving input (e.g., directly or indirectly) from one or more detectors (e.g., FIG. 15A, 1510). The instructions may include providing output for one or more controllers (e.g., FIG. 15A, 1507). The simulator(s) (e.g., FIG. 15A, 1512) and the controller(s) (e.g., FIG. 15A, 1507) may be part of the same or different computers. In some embodiments, the simulator(s) is configured to create and/or modify a model. The model may be a geometric model that considers dimensions of a requested object (or a portion of the requested object). In some embodiments, the simulator(s) creates a simulated target output signal (e.g., simulated target thermal signal). The simulated target output signal may be calculated by considering the one or more models. The model may predict changes in aspects of the object before, during and/or after printing. Examples of physical (e.g., physics-based) models and related aspects are described in U.S. patent application Ser. No. 15/435,128, filed on Feb. 16, 2017, titled "ACCURATE THREE-DIMENSIONAL PRINTING;" international patent application number PCT/US17/18191, filed on Feb. 16, 2017, titled "ACCURATE THREE-DIMENSIONAL PRINTING;" European patent application number EP17156707.6, filed on Feb. 17, 2017, titled "ACCURATE THREE-DIMENSIONAL PRINTING;" and international patent application number PCT/US17/54043, filed Sep. 28, 2017, titled "THREE-DIMENSIONAL OBJECTS AND THEIR FORMATION;" and international patent application number PCT/US18/20406, filed Mar. 1, 2018, titled "THREE-DIMENSIONAL PRINTING OF THREE DIMENSIONAL OBJECTS," each of which is entirely incorporated herein by reference. The model may be a physical (e.g., comprising thermo-mechanical, gas phase, or liquid phase) model. The model may be of the printing process. The model may consider material and/or geometric properties of the printed 3D object. The model may consider physics-based equations. The model may consider gas and/or fluid mechanics. The model may consider thermal conductivity of the material during the printing (e.g., of the material forming the 3D object and/or any material surrounding the printed 3D object during its printing). The model may consider thermal transport. The model may consider incompressible flow. The model may consider fluid mechanics, gas mechanics, and/or thermal transport on either side of an interface. The interface may include a solid-liquid interface. The interface may include a liquid-gas interface. The interface may include a solid-gas interface. In some embodiments, momentum and/or thermal transport equations at a liquid-gas interface are used to create or modify a (e.g., geometric) model. Equations 3-8 are example momentum equations.

$$p\left(\frac{\partial u}{\partial t}+u\cdot\nabla u\right)=-\nabla p+\mu\nabla\cdot\tau \qquad \text{(Equation 3)}$$

$$\nabla\cdot u=0 \qquad \text{(Equation 4)}$$

$$\tau=-pI+\mu\left[\nabla u+(\nabla u)^T\right] \qquad \text{(Equation 5)}$$

$$\hat{p}\left(\frac{\partial \hat{u}}{\partial t}+\hat{u}\cdot\nabla\hat{u}\right)=-\nabla\hat{p}+\hat{\mu}\nabla\cdot\hat{\tau} \qquad \text{(Equation 6)}$$

$$\nabla\cdot\hat{u}=0 \qquad \text{(Equation 7)}$$

$$\hat{\tau}=-\hat{p}I+\hat{\mu}\left[\nabla\hat{u}+(\nabla\hat{u})^T\right] \qquad \text{(Equation 8)}$$

Equations 9 and 10 are example thermal transport equations.

$$\rho c_p\frac{\partial T}{\partial t}+u\cdot\nabla T=k\nabla^2 T+Q \qquad \text{(Equation 9)}$$

$$\hat{\rho}\hat{c}_p\frac{\partial \hat{T}}{\partial t}+\hat{u}\cdot\nabla\hat{T}=\hat{k}\nabla^2\hat{T}+\hat{Q} \qquad \text{(Equation 10)}$$

In Equations 3-10, Q and $\hat{Q}$ represent an energy source; k and $\hat{k}$ represent heat conductivity; $c_p$ and $\hat{c}_p$ represent thermal heat capacity; ρ and $\hat{\rho}$ represent density; p and $\hat{p}$ represent pressure; τ and $\hat{\tau}$ represent fluid stress tensor; μ and $\hat{\mu}$ represent a dynamic viscosity coefficient; u and û represent fluid velocity vector field; and T and $\hat{T}$ represent a temperature field. In the Equations 3-10, values represented with a carrot symbol (^) correspond to liquid phase and values without a carrot symbol (^) correspond to gas phase. In some embodiments, the model considers stress boundary conditions with surface tension at a fluid interface. Equation 11 is an example equation considering stress boundary conditions with surface tension at a fluid interface.

$$\tau\cdot n-\hat{\tau}\cdot n=\sigma(\nabla\cdot n)n-\nabla_S\sigma \qquad \text{(Equation 11)}$$

In Equation 9, a represents surface tension; and $\nabla_S$ represents a tangential gradient within the interface, where surface tension is assumed to be a function of only temperature (i.e., α=α(T)) and is a property of the material, and where temperature is continuous across the boundary (i.e. $T=\hat{T}$ at S).

Figure 27A:
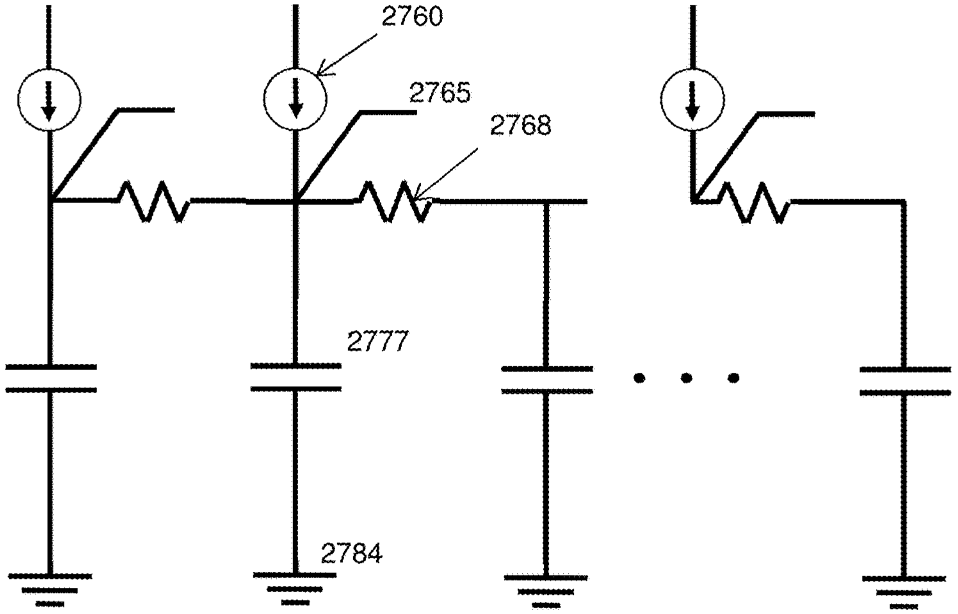
FIGS. 27A and 27B schematically illustrate examples an electrical model.
Figure 27B:
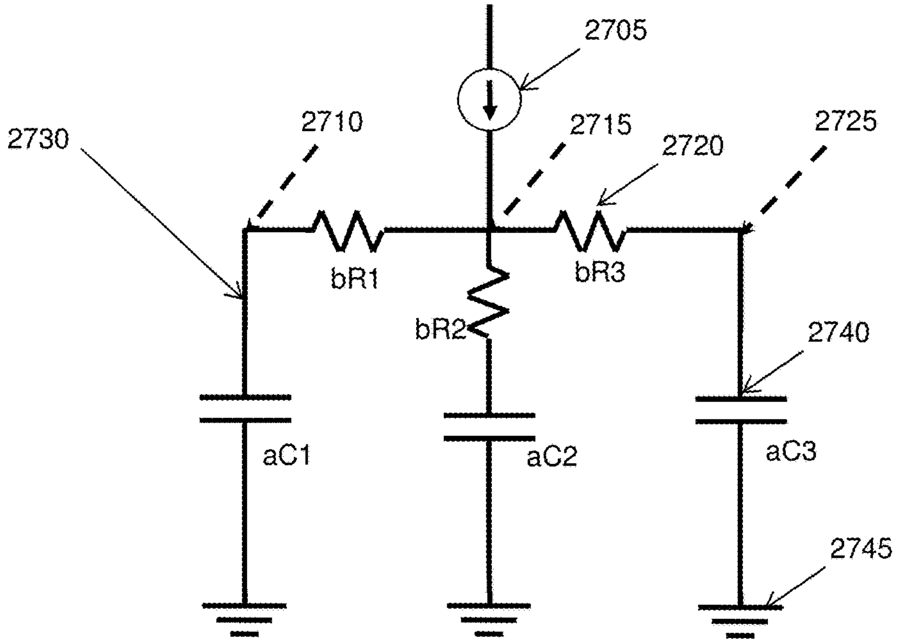

In some embodiments, a physical model is represented by an analogous model (e.g., an electrical model, an electronic model, and/or a mechanical model). FIGS. 27A-27B illustrate examples of an electrical analogous model. FIG. 27A illustrates an example of a simplified electrical analogous model (e.g., a first order of complexity model). The electrical model may include one or more basic elements, for example, a current source (e.g., FIG. 27A, 2760), a resistor (e.g., FIG. 27A, 2768), a capacitor (e.g., FIG. 27A, 2777), an inductor, and/or a ground component (e.g., FIG. 27A, 2784). The basic elements may represent one or more physical properties of building a 3D object. At times, the basic elements may represent one or more components of the 3D printer. For example, the energy beam may be represented by a current source. In some examples, the angle of at least a portion of the 3D object (e.g., an overhang thereof) may affect the capacitance and/or resistor values representing a point on the edge of that at least a portion of the 3D object (e.g., this overhang). For example, the larger the overhang angle with respect to the target (e.g., exposed) surface (e.g., the stepper the overhang), the smaller the resistor will be in the physical-model, and the larger the capacitance in the physical-model. The value of at least one resistor and/or capacitance may be related to (i) the discretization distance and/or (ii) the fundamental material properties forming the 3D object. The discretization distance may be the physical length of a unit element (e.g., electrical element) which is represented by the basic discrete elements. The fundamental material properties of the build material may comprise the thermal conductivity, the heat capacity, or the density of the build material (e.g., material forming the 3D object). In some examples, the measured voltage probe points (e.g., FIG. 27A, 2765) represent a measurement of the surface temperature (in the forming/formed 3D object). Feed forward and/or feedback control scheme may be modeled by a change of the current source as a response to a change in the measured voltage, at the probe point (e.g., FIG. 27A, 2765). The model can also predict the measured voltages (e.g., that can represent measured temperature). Measuring the temperature levels during the build and/or comparing them to the modeled voltage, may allow (i) a (e.g., systematic) study of the error in the physical-model, (ii) fine tuning of the model, (iii) finding a relationship between the physical process of 3D printing and the (e.g., simplified) physical-model representing it, or (iv) any combination thereof. The voltage may be measured at the intersection of the current source and the branch of a resistor and/or capacitor (e.g., FIG. 27A, 2765). The simplified (e.g., reduced) model may not be limited to simple and/or constant value components. As an example, the capacitors and/or resistors can depend on the voltage C(V) and/or R(V) respectively. Additional components that can be used are, for example, current multiplier. The value of the current multiplier can represent in the physical-model a change in the absorption efficiency of the energy beam by the material in the 3D printing. For example, as the value of the current multiplier can depend on the voltage (imitating the physical property of the absorption that can depend on the temperature). The voltage may be used to simulate a dependence (e.g., a temperature) of the capacitor and/or the resistor (e.g., C(V), and/or R(V)). The analogous model may include input from at least one sensor and/or detector. The sensor and/or detector may detect a physical property of at least one position on the target surface (e.g., temperature of a position at the target surface, power of the energy beam, and/or thermal map of the path of the energy beam). The sensor input may be fed into one or more branches of the physical model. FIG. 27B illustrates an example of a more complex electrical analogous model (e.g., a second order of complexity model) relative to the example in FIG. 27A. The more complex electrical analogous model may include one or more basic electrical elements (e.g., a current source 2705, a resistor 2720, a capacitor 2740, and/or a ground element 2745). The basic element may include a multiplier (e.g., a constant value represented in the example of FIG. 27B, as "a" for the capacitor or "b" for the resistor). The multiplier may be variable. The multiplier may be adjusted. Adjustment may be done before, after, or during build of the 3D object (e.g., in real-time). Adjustment may be done manually and/or automatically (e.g., by a controller). At times, the complex electrical analogous model may be (e.g., substantially) complete (e.g., include representation for all dimensions, and/or properties of a physical model of the 3D object). Substantially may be relative to the intended purpose of the 3D object. The complex (e.g., more complex) electrical analogous model may include input from one or more sensors and/or detectors. A sensor or detector may sense or detect (respectively) a physical property of at least one position on the target surface (e.g., temperature of the target surface (e.g., temperature distribution thereof), power density of the energy beam, thermal map of the path of the energy beam, thermal map of the forming 3D object, and/or thermal map of the material bed). The sensor/detector input may be fed (e.g., FIG. 27B, 2710, 2715, 2725) into one or more branches (e.g., FIG. 27B, 2730) of the analogous electrical model (for example, a single branch may receive input from a single sensor, a single branch may receive input from more than one sensor, or multiple branches may receive input from a single sensor). The one or more sensor inputs may provide an (e.g., substantially) accurate measurements of the process of building the 3D object. The sensor input may use a signal that is sensed using a thermal detector (e.g., comprising at least one optical fiber (e.g., an optical fiber bundle)).

Figure 28:
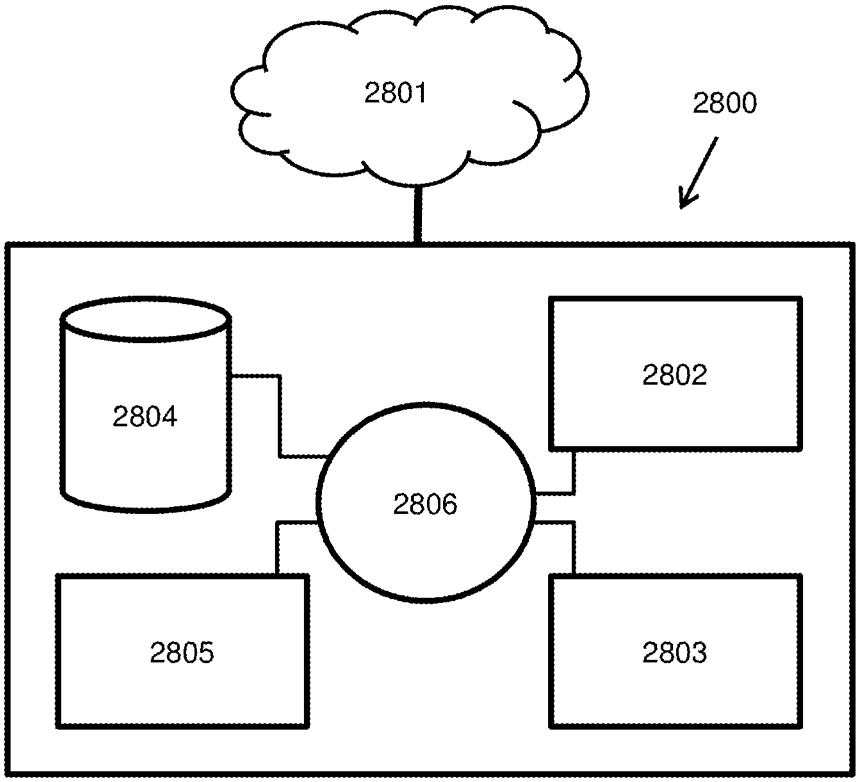
FIG. 28 schematically illustrates a computer system.

At times, the controller comprises a processing unit. The processing unit may be central. The processing unit may comprise a central processing unit (herein "CPU"). The controllers or control mechanisms (e.g., comprising a computer system) may be programmed to implement methods of the disclosure. The controller may control at least one component of the systems and/or apparatuses disclosed herein. FIG. 28 is an example schematic of a computer system 2800 that is programmed or otherwise configured to facilitate the formation of a 3D object according to the methods provided herein. The computer system 2800 can control (e.g., direct and/or regulate) various features of printing methods, apparatuses and systems of the present disclosure, such as, for example, controlling process parameters (e.g., chamber pressure), scanning rate (e.g., of the energy beam and/or the platform), scanning route of the energy source, position and/or temperature of the cooling member(s), application of the amount of energy emitted to a selected location, or any combination thereof. The computer system 2800 can be part of, or be in communication with, a printing system or apparatus, such as a 3D printing system or apparatus of the present disclosure. The computer may be coupled to one or more mechanisms disclosed herein, and/or any parts thereof. For example, the computer may be coupled to one or more sensors, valves, switches, motors, pumps, optical components, energy source, or any combination thereof.

In some embodiments, the computer system 2800 includes a processing unit 2806 (also "processor," "computer" and "computer processor" used herein). The computer system may include memory or memory location 2802 (e.g., random-access memory, read-only memory, flash memory), electronic storage unit 2804 (e.g., hard disk), communication interface 2803 (e.g., network adapter) for communicating with one or more other systems, and peripheral devices 2805, such as cache, other memory, data storage, and/or electronic display adapters. The memory 2802, storage unit 2804, interface 2803, and peripheral devices 2805 are in communication with the processing unit 2806 through a communication bus (solid lines), such as a motherboard. The storage unit can be a data storage unit (or data repository) for storing data. The computer system can be operatively coupled to a computer network ("network") 2801 with the aid of the communication interface. The network can be the Internet, an internet and/or extranet, or an intranet and/or extranet that is in communication with the Internet. In some cases, the network is a telecommunication and/or data network. The network can include one or more computer servers, which can enable distributed computing, such as cloud computing. The network, in some cases with the aid of the computer system, can implement a peer-to-peer network, which may enable devices coupled to the computer system to behave as a client or a server.

In some embodiments, the processing unit executes a sequence of machine-readable instructions, which can be embodied in a program or software. The instructions may be stored in a memory location, such as the memory 2802. The instructions can be directed to at least one processing unit, which can subsequently program or otherwise configure the processing unit to implement methods of the present disclosure. Examples of operations performed by the at least one processing unit can include fetch, decode, execute, and write back. The processing unit may interpret and/or execute instructions. The processor may include a microprocessor, a data processor, a central processing unit (CPU), a graphical processing unit (GPU), a system-on-chip (SOC), a co-processor, a network processor, an application specific integrated circuit (ASIC), an application specific instruction-set processor (ASIPs), a controller, a programmable logic device (PLD), a chipset, a field programmable gate array (FPGA), or any combination thereof. The processing unit can be part of a circuit, such as an integrated circuit. One or more other components of the system 2800 can be included in the circuit. The storage unit 2804 can store files, such as drivers, libraries and saved programs. The storage unit can store user data (e.g., user preferences and user programs). In some cases, the computer system can include one or more additional data storage units that are external to the computer system, such as located on a remote server that is in communication with the computer system through an intranet or the Internet. The computer system can communicate with one or more remote computer systems through the network. For instance, the computer system can communicate with a remote computer system of a user (e.g., operator). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system via the network.

In some cases, methods described herein are implemented by way of machine (e.g., computer processor) executable code stored on an electronic storage location of the computer system, such as, for example, on the memory 2802 or electronic storage unit 2804. The machine executable or machine-readable code can be provided in the form of software. During use, the processor 2806 can execute the code. In some cases, the code can be retrieved from the storage unit and stored on the memory for ready access by the processor. In some situations, the electronic storage unit can be precluded, and machine-executable instructions are stored on memory. The code can be pre-compiled and configured for use with a machine have a processer adapted to execute the code, or can be compiled during runtime (e.g., in real-time). The code can be supplied in a programming language that can be selected to enable the code to execute in a pre-compiled or as-compiled fashion.

At times, the processing unit includes one or more cores. The computer system may comprise a single core processor, multi core processor, or a plurality of processors for parallel processing. The processing unit may comprise one or more central processing units (CPU) and/or graphic processing units (GPU). The multiple cores may be disposed in a physical unit (e.g., Central Processing Unit, or Graphic Processing Unit). The processing unit may include one or more processing units. The physical unit may be a single physical unit. The physical unit may be a die. The physical unit may comprise cache coherency circuitry. The multiple cores may be disposed in close proximity. The physical unit may comprise an integrated circuit chip. The integrated circuit chip may comprise one or more transistors. The integrated circuit chip may comprise at least about 0.2 billion transistors (BT), 0.5 BT, 1 BT, 2 BT, 3 BT, 5 BT, 6 BT, 7 BT, 8 BT, 9 BT, 10 BT, 15 BT, 20 BT, 25 BT, 30 BT, 40 BT, or 50 BT. The integrated circuit chip may comprise at most about 7 BT, 8 BT, 9 BT, 10 BT, 15 BT, 20 BT, 25 BT, 30 BT, 40 BT, 50 BT, 70 BT, or 100 BT. The integrated circuit chip may comprise any number of transistors between the afore-mentioned numbers (e.g., from about 0.2 BT to about 100 BT, from about 1 BT to about 8 BT, from about 8 BT to about 40 BT, or from about 40 BT to about 100 BT). The integrated circuit chip may have an area of at least about 50 $mm^2$, 60 $mm^2$, 70 $mm^2$, 80 $mm^2$, 90 $mm^2$, 100 $mm^2$, 200 $mm^2$, 300 $mm^2$, 400 $mm^2$, 500 $mm^2$, 600 $mm^2$, 700 mm 2, or 800 $mm^2$. The integrated circuit chip may have an area of at most about 50 $mm^2$, 60 $mm^2$, 70 $mm^2$, 80 $mm^2$, 90 $mm^2$, 100 $mm^2$, 200 $mm^2$, 300 $mm^2$, 400 $mm^2$, 500 $mm^2$, 600 $mm^2$, 700 mm 2, or 800 $mm^2$. The integrated circuit chip may have an area of any value between the afore-mentioned values (e.g., from about 50 $mm^2$ to about 800 $mm^2$, from about 50 $mm^2$ to about 500 $mm^2$, or from about 500 $mm^2$ to about 800 $mm^2$). The close proximity may allow substantial preservation of communication signals that travel between the cores. The close proximity may diminish communication signal degradation. A core as understood herein is a computing component having independent central processing capabilities. The computing system may comprise a multiplicity of cores, which are disposed on a single computing component. The multiplicity of cores may include two or more independent central processing units. The independent central processing units may constitute a unit that read and execute program instructions. The independent central processing units may constitute parallel processing units. The parallel processing units may be cores and/or digital signal processing slices (DSP slices). The multiplicity of cores can be parallel cores. The multiplicity of DSP slices can be parallel DSP slices. The multiplicity of cores and/or DSP slices can function in parallel. The multiplicity of cores may include at least about 2, 10, 40, 100, 400, 1000, 2000, 3000, 4000, 5000, 6000, 7000, 8000, 9000, 10000, 11000, 12000, 13000, 14000 or 15000 cores. The multiplicity of cores may include at most about 1000, 2000, 3000, 4000, 5000, 6000, 7000, 8000, 9000, 10000, 11000, 12000, 13000, 14000, 15000, 20000, 30000, or 40000 cores. The multiplicity of cores may include cores of any number between the afore-mentioned numbers (e.g., from about 2 to about 40000, from about 2 to about 400, from about 400 to about 4000, from about 2000 to about 4000, from about 4000 to about 10000, from about 4000 to about 15000, or from about 15000 to about 40000 cores). In some processors (e.g., FPGA), the cores may be equivalent to multiple digital signal processor (DSP) slices (e.g., slices). The plurality of DSP slices may be equal to any of plurality core values mentioned herein. The processor may comprise low latency in data transfer (e.g., from one core to another). Latency may refer to the time delay between the cause and the effect of a physical change in the processor (e.g., a signal). Latency may refer to the time elapsed from the source (e.g., first core) sending a packet to the destination (e.g., second core) receiving it (also referred as two-point latency). One-point latency may refer to the time elapsed from the source (e.g., first core) sending a packet (e.g., signal) to the destination (e.g., second core) receiving it, and the designation sending a packet back to the source (e.g., the packet making a round trip). The latency may be sufficiently low to allow a high number of floating-point operations per second (FLOPS). The number of FLOPS may be at least about 1 Tera Flops (T-FLOPS), 2 T-FLOPS, 3 T-FLOPS, 5 T-FLOPS, 6 T-FLOPS, 7 T-FLOPS, 8 T-FLOPS, 9 T-FLOPS, or 10 T-FLOPS. The number of flops may be at most about 5 T-FLOPS, 6 T-FLOPS, 7 T-FLOPS, 8 T-FLOPS, 9 T-FLOPS, 10 T-FLOPS, 20 T-FLOPS, 30 T-FLOPS, 50 T-FLOPS, 100 T-FLOPS, 1 P-FLOPS, 2 P-FLOPS, 3 P-FLOPS, 4 P-FLOPS, 5 P-FLOPS, 10 P-FLOPS, 50 P-FLOPS, 100 P-FLOPS, 1 EXA-FLOP, 2 EXA-FLOPS, or 10 EXA-FLOPS. The number of FLOPS may be any value between the afore-mentioned values (e.g., from about 0.1 T-FLOP to about 10 EXA-FLOPS, from about 0.1 T-FLOPS to about 1 T-FLOPS, from about 1 T-FLOPS to about 4 T-FLOPS, from about 4 T-FLOPS to about 10 T-FLOPS, from about 1 T-FLOPS to about 10 T-FLOPS, or from about 10 T-FLOPS to about 30 T-FLOPS, from about 50 T-FLOPS to about 1 EXA-FLOP, or from about 0.1 T-FLOP to about 10 EXA-FLOPS). In some processors (e.g., FPGA), the operations per second may be measured as (e.g., Giga) multiply-accumulate operations per second (e.g., MACs or GMACs). The MACs value can be equal to any of the T-FLOPS values mentioned herein measured as Tera-MACs (T-MACs) instead of T-FLOPS respectively. The FLOPS can be measured according to a benchmark. The benchmark may be an HPC Challenge Benchmark. The benchmark may comprise mathematical operations (e.g., equation calculation such as linear equations), graphical operations (e.g., rendering), or encryption/decryption benchmark. The benchmark may comprise a High Performance LINPACK, matrix multiplication (e.g., DGEMM), sustained memory bandwidth to/from memory (e.g., STREAM), array transposing rate measurement (e.g., PTRANS), Random-access, rate of Fast Fourier Transform (e.g., on a large one-dimensional vector using the generalized Cooley-Tukey algorithm), or Communication Bandwidth and Latency (e.g., MPI-centric performance measurements based on the effective bandwidth/latency benchmark). LINPACK may refer to a software library for performing numerical linear algebra on a digital computer. DGEMM may refer to double precision general matrix multiplication. STREAM benchmark may refer to a synthetic benchmark designed to measure sustainable memory bandwidth (in MB/s) and a corresponding computation rate for four simple vector kernels (Copy, Scale, Add and Triad). PTRANS benchmark may refer to a rate measurement at which the system can transpose a large array (global). MPI refers to Message Passing Interface.

At times, the computer system includes hyper-threading technology. The computer system may include a chip processor with integrated transform, lighting, triangle setup, triangle clipping, rendering engine, or any combination thereof. The rendering engine may be capable of processing at least about 10 million polygons per second. The rendering engines may be capable of processing at least about 10 million calculations per second. As an example, the GPU may include a GPU by NVidia, ATI Technologies, S3 Graphics, Advanced Micro Devices (AMD), or Matrox. The processing unit may be able to process algorithms comprising a matrix or a vector. The core may comprise a complex instruction set computing core (CISC), or reduced instruction set computing (RISC).

At times, the computer system includes an electronic chip that is reprogrammable (e.g., field programmable gate array (FPGA)). For example, the FPGA may comprise Tabula, Altera, or Xilinx FPGA. The electronic chips may comprise one or more programmable logic blocks (e.g., an array). The logic blocks may compute combinational functions, logic gates, or any combination thereof. The computer system may include custom hardware. The custom hardware may comprise an algorithm.

At times, the computer system includes configurable computing, partially reconfigurable computing, reconfigurable computing, or any combination thereof. The computer system may include a FPGA. The computer system may include an integrated circuit that performs the algorithm. For example, the reconfigurable computing system may comprise FPGA, CPU, GPU, or multi-core microprocessors. The reconfigurable computing system may comprise a High-Performance Reconfigurable Computing architecture (HPRC). The partially reconfigurable computing may include module-based partial reconfiguration, or difference-based partial reconfiguration.

At times, the computing system includes an integrated circuit that performs the algorithm (e.g., control algorithm). The physical unit (e.g., the cache coherency circuitry within) may have a clock time of at least about 0.1 Gigabits per second (Gbit/s), 0.5 Gbit/s, 1 Gbit/s, 2 Gbit/s, 5 Gbit/s, 6 Gbit/s, 7 Gbit/s, 8 Gbit/s, 9 Gbit/s, 10 Gbit/s, or 50 Gbit/s. The physical unit may have a clock time of any value between the afore-mentioned values (e.g., from about 0.1 Gbit/s to about 50 Gbit/s, or from about 5 Gbit/s to about 10 Gbit/s). The physical unit may produce the algorithm output in at most about 0.1 microsecond (μs), 1 μs, 10 μs, 100 μs, or 1 millisecond (ms). The physical unit may produce the algorithm output in any time between the afore-mentioned times (e.g., from about 0.1 μs, to about 1 ms, from about 0.1 μs, to about 100 μs, or from about 0.1 μs to about 10μ).

In some instances, the controller uses calculations, real time measurements, or any combination thereof to regulate the energy beam(s). The sensor (e.g., temperature and/or positional sensor) may provide a signal (e.g., input for the controller and/or processor) at a rate of at least about 0.1 KHz, 1 KHz, 10 KHz, 100 KHz, 1000 KHz, or 10000 KHz). The sensor may provide a signal at a rate between any of the above-mentioned rates (e.g., from about 0.1 KHz to about 10000 KHz, from about 0.1 KHz to about 1000 KHz, or from about 1000 KHz to about 10000 KHz). The memory bandwidth of the processing unit may be at least about 1 gigabyte per second (Gbytes/s), 10 Gbytes/s, 100 Gbytes/s, 200 Gbytes/s, 300 Gbytes/s, 400 Gbytes/s, 500 Gbytes/s, 600 Gbytes/s, 700 Gbytes/s, 800 Gbytes/s, 900 Gbytes/s, or 1000 Gbytes/s. The memory bandwidth of the processing unit may be at most about 1 gigabyte per second (Gbytes/s), 10 Gbytes/s, 100 Gbytes/s, 200 Gbytes/s, 300 Gbytes/s, 400 Gbytes/s, 500 Gbytes/s, 600 Gbytes/s, 700 Gbytes/s, 800 Gbytes/s, 900 Gbytes/s, or 1000 Gbytes/s. The memory bandwidth of the processing unit may have any value between the afore-mentioned values (e.g., from about 1 Gbytes/s to about 1000 Gbytes/s, from about 100 Gbytes/s to about 500 Gbytes/s, from about 500 Gbytes/s to about 1000 Gbytes/s, or from about 200 Gbytes/s to about 400 Gbytes/s). The sensor measurements may be real-time measurements. The real-time measurements may be conducted during at least a portion of the 3D printing process. The real-time measurements may be in-situ measurements in the 3D printing system and/or apparatus. The real-time measurements may be during at least a portion of the formation of the 3D object. In some instances, the processing unit may use the signal obtained from the at least one sensor to provide a processing unit output, which output is provided by the processing system at a speed of at most about 100 min, 50 min, 25 min, 15 min, 10 min, 5 min, 1 min, 0.5 min (i.e., 30 sec), 15 sec, 10 sec, 5 sec, 1 sec, 0.5 sec, 0.25 sec, 0.2 sec, 0.1 sec, 80 milliseconds (msec), 50 msec, 10 msec, 5 msec, or 1 msec. In some instances, the processing unit may use the signal obtained from the at least one sensor to provide a processing unit output, which output is provided at a speed of any value between the aforementioned values (e.g., from about 100 min to about 1 msec, from about 100 min to about 10 min, from about 10 min to about 1 min, from about 5 min to about 0.5 min, from about 30 sec to about 0.1 sec, or from about 0.1 sec to about 1 msec). The processing unit output may comprise an evaluation of the temperature at a location, position at a location (e.g., vertical and/or horizontal), or a map of locations. The location may be on the target surface. The map may comprise a topological or temperature map.

At times, the processing unit uses the signal obtained from the at least one sensor in an algorithm that is used in controlling the energy beam. The algorithm may comprise the path of the energy beam. In some instances, the algorithm may be used to alter the path of the energy beam on the target surface. The path may deviate from a cross section of a model corresponding to the requested 3D object. The processing unit may use the output in an algorithm that is used in determining the manner in which a model of the requested 3D object may be sliced. The processing unit may use the signal obtained from the at least one sensor in an algorithm that is used to configure one or more parameters and/or apparatuses relating to the 3D printing process. The parameters may comprise a characteristic of the energy beam. The parameters may comprise movement of the platform and/or material bed. The parameters may include characteristics of the gas flow system. The parameters may include characteristics of the layer forming apparatus. The parameters may comprise relative movement of the energy beam and the material bed. In some instances, the energy beam, the platform (e.g., material bed disposed on the platform), or both may translate. Alternatively, or additionally, the controller may use historical data for the control. Alternatively, or additionally, the processing unit may use historical data in its one or more algorithms. The parameters may comprise the height of the layer of pre-transformed material disposed in the enclosure and/or the gap by which the cooling element (e.g., heat sink) is separated from the target surface. The target surface may be the exposed layer of the material bed.

In some cases, aspects of the systems, apparatuses, and/or methods provided herein, such as the computer system, are embodied in programming (e.g., using a software). Various aspects of the technology may be thought of as "product," "object," or "articles of manufacture" typically in the form of machine (or processor) executable code and/or associated data that is carried on or embodied in a type of machine-readable medium. Machine-executable code can be stored on an electronic storage unit, such memory (e.g., read-only memory, random-access memory, flash memory) or a hard disk. The storage may comprise non-volatile storage media. "Storage" type media can include any or all the tangible memory of the computers, processors or the like, or associated modules thereof, such as various semiconductor memories, tape drives, disk drives, external drives, and the like, which may provide non-transitory storage at any time for the software programming.

At times, the memory comprises a random-access memory (RAM), dynamic random access memory (DRAM), static random access memory (SRAM), synchronous dynamic random access memory (SDRAM), ferroelectric random access memory (FRAM), read only memory (ROM), programmable read only memory (PROM), erasable programmable read only memory (EPROM), electrically erasable programmable read only memory (EEPROM), a flash memory, or any combination thereof. The flash memory may comprise a negative-AND (NAND) or NOR logic gates. A NAND gate (negative-AND) may be a logic gate which produces an output which is false only if all its inputs are true. The output of the NAND gate may be complement to that of the AND gate. The storage may include a hard disk (e.g., a magnetic disk, an optical disk, a magneto-optic disk, a solid-state disk, etc.), a compact disc (CD), a digital versatile disc (DVD), a floppy disk, a cartridge, a magnetic tape, and/or another type of computer-readable medium, along with a corresponding drive.

At times, all or portions of the software are communicated through the internet or other telecommunication networks. Such communications, for example, may enable loading of the software from one computer or processor into another, for example, from a management server or host computer into the computer platform of an application server. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution. Hence, a machine-readable medium, such as computer-executable code, may take many forms, including but not limited to, a tangible storage medium, a carrier wave medium, or physical transmission medium. Non-volatile storage media include, for example, optical or magnetic disks, such as any of the storage devices in any computer(s) or the like, such as may be used to implement the databases. Volatile storage media can include dynamic memory, such as main memory of such a computer platform. Tangible transmission media can include coaxial cables, wire (e.g., copper wire), and/or fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, any other medium from which a computer may read programming code and/or data, or any combination thereof. The memory and/or storage may comprise a storing device external to and/or removable from device, such as a Universal Serial Bus (USB) memory stick, or/and a hard disk. Many of these forms of computer readable media may be involved in carrying one or more sequences of one or more instructions to a processor for execution.

At times, the computer system includes or is in communication with an electronic display that comprises a user interface (UI) for providing, for example, a model design or graphical representation of a 3D object to be printed. Examples of UI's include, without limitation, a graphical user interface (GUI) and web-based user interface. The computer system can monitor and/or control various aspects of the 3D printing system. The control may be manual and/or programmed. The control may comprise an open loop control or a closed loop control (e.g., including feed forward and/or feedback) control scheme. The closed loop control may utilize signal from the one or more sensors. The control may utilize historical data. The control scheme may be pre-programmed. The control scheme considers an input from one or more sensors (described herein) that are connected to the control unit (i.e., control system or control mechanism) and/or processing unit. The computer system (including the processing unit) may store historical data concerning various aspects of the operation of the 3D printing system. The historical data may be retrieved at predetermined times and/or at a whim. The historical data may be accessed by an operator and/or by a user. The historical, sensor, and/or operative data may be provided in an output unit such as a display unit. The output unit (e.g., monitor) may output various parameters of the 3D printing system (as described herein) in real time or in a delayed time. The output unit may output the current 3D printed object, the ordered 3D printed object, or both. The output unit may output the printing progress of the 3D printed object. The output unit may output at least one of the total times, time remaining, and time expanded on printing the 3D object. The output unit may output (e.g., display, voice, and/or print) the status of sensors, their reading, and/or time for their calibration or maintenance. The output unit may output the type of material(s) used and various characteristics of the material(s) such as temperature and flowability of the pre-transformed material. The output unit may output the amount of oxygen, water, gas flow, and pressure in the printing chamber (i.e., the chamber where the 3D object is being printed). The computer may generate a report comprising various parameters of the 3D printing system, method, and or objects at predetermined time(s), on a request (e.g., from an operator), and/or at a whim. The output unit may comprise a screen, printer, a light source (e.g., lamp), or speaker. The control system may provide a report. The report may comprise any items recited as optionally output by the output unit.

At times, the system and/or apparatus described herein (e.g., controller) and/or any of their components comprises an output and/or an input device. The input device may comprise a keyboard, touch pad, or microphone. The output device may be a sensory output device. The output device may include a visual, tactile, or audio device. The audio device may include a loudspeaker. The visual output device may include a light source, a screen and/or a printed hard copy (e.g., paper). The output device may include a printer. The input device may include a camera, a microphone, a keyboard, or a touch screen. The system and/or apparatus described herein (e.g., controller) and/or any of their components may comprise Bluetooth technology. The system and/or apparatus described herein (e.g., controller) and/or any of their components may comprise a communication port. The communication port may be a serial port or a parallel port. The communication port may be a Universal Serial Bus port (i.e., USB). The system and/or apparatus described herein (e.g., controller) and/or any of their components may comprise USB ports. The USB can be micro or mini USB. The USB port may relate to device classes comprising 00h, 01h, 02h, 03h, 05h, 06h, 07h, 08h, 09h, 0Ah, 0Bh, 0Dh, 0Eh, 0Fh, 10h, 11h, DCh, E0h, EFh, FEh, or FFh. The system and/or apparatus described herein (e.g., controller) and/or any of their components may comprise a plug and/or a socket (e.g., electrical, AC power, DC power). The system and/or apparatus described herein (e.g., controller) and/or any of their components may comprise an adapter (e.g., AC and/or DC power adapter). The system and/or apparatus described herein (e.g., controller) and/or any of their components may comprise a power connector. The power connector can be an electrical power connector. The power connector may comprise a magnetically coupled (e.g., attached) power connector. The power connector can be a dock connector. The connector can be a data and power connector. The connector may comprise pins. The connector may comprise at least 10, 15, 18, 20, 22, 24, 26, 28, 30, 40, 42, 45, 50, 55, 80, or 100 pins.

At times, the systems, methods, and/or apparatuses disclosed herein comprises receiving a request for a 3D object (e.g., from a customer). The request can include a model (e.g., CAD) of the requested 3D object. Alternatively, or additionally, a model of the requested 3D object may be generated. The model may be used to generate 3D printing instructions. The 3D printing instructions may exclude the 3D model. The 3D printing instructions may be based on the 3D model. The 3D printing instructions may take the 3D model into account. The 3D printing instructions may be alternatively or additionally based on simulations. The 3D printing instructions may use the 3D model. The 3D printing instructions may comprise using a calculation (e.g., embedded in a software) that considers the 3D model, simulations, historical data, sensor input, or any combination thereof. The processor may compute the calculation during the 3D printing process (e.g., in real-time), during the formation of the 3D object, prior to the 3D printing process, after the 3D printing process, or any combination thereof. The processor may compute the calculation in the interval between pulses of the energy beam, during the dwell time of the energy beam, before the energy beam translates to a new position, while the energy beam is not translating, while the energy beam does not irradiate the target surface, while the energy beam irradiates the target surface, or any combination thereof. For example, the processor may compute the calculation while the energy beam translates and does substantially not irradiate the exposed surface. For example, the processor may compute the calculation while the energy beam does not translate and irradiates the exposed surface. For example, the processor may compute the calculation while the energy beam does not substantially translate and does substantially not irradiate the exposed surface. For example, the processor may compute the calculation while the energy beam does translate and irradiates the exposed surface. The translation of the energy beam may be translation along an entire path or a portion thereof. The path may correspond to a cross section of the model of the 3D object. The translation of the energy beam may be translation along at least one path (e.g. FIG. 9A or 9B).

EXAMPLES

The following are illustrative and non-limiting examples of methods of the present disclosure.

Example 1

In a 320 mm diameter and 400 mm maximal high container at ambient temperature, Inconel 718 powder of average particle size 35 μm is deposited in a container to form a powder bed. The container is disposed in an enclosure to separate the powder bed from the ambient environment. The enclosure is purged with Argon gas. A 1000 W fiber laser beam was used to melt a portion of the powder bed and form an overhang of a 3D object at an angle with respect to the platform base. The overhang was formed by transforming layers of powder material having an average thickness of about 50 μm using an LPM process as described herein. Optical images of the overhang in FIGS. 23A and 23A were obtained using a Keyence VR-3200 manufactured by Keyence Corporation.

Example 2

Similar conditions and methodologies as the Example 1 are used to form a ledge overhang of a 3D object at an angle with respect to the platform base. The ledge overhang was formed by transforming layers of powder material having an average thickness of about 50 μm using an LPM process as described herein. Optical images of a (e.g., bottom) skin of the ledge overhang in FIG. 24E were obtained using the Keyence VR-3200.

Example 3

Similar conditions and methodologies as the Example 1 are used to form an impeller having overhangs (blades) at an angle with respect to the platform base. The impeller was formed by transforming layers of powder material having an average thickness of about 50 μm using an LPM process as described herein. FIG. 26 shows photographic images of the impeller.

While preferred embodiments of the present invention have been shown, and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. It shall be understood that all aspects of the invention are not limited to the specific depictions, configurations, or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

What is claimed is:

1. An apparatus for printing at least one three-dimensional object, the apparatus comprising at least one controller configured to:

(a) couple to a power source, and operatively couple to (I) an energy source, (II) a layer dispenser, and (III) an actuator;

(b) directing the energy source to generate an energy beam that transforms powder in a powder bed to generate a first portion of a ledge in the powder bed, the powder bed being supported by a platform;

(c) direct the layer dispenser to dispense a powder layer to supplement the powder bed, the powder layer having a first exposed surface that is substantially planar;

(d) directing extension of the first portion of the ledge in a plane that is parallel to a reference plane, to generate a second portion of the ledge that is parallel to the reference plane, the extension of the first portion of the ledge comprising:

(i) directing the energy source to generate the energy beam to transforms powder in the powder bed to generate melt pools along a first edge of the first portion of the ledge to generate a first single file of the melt pools that contacts the first edge and extends beyond the first portion of the ledge to generate the second portion of the ledge having a second edge;

(ii) direct the actuator to hold the platform stationary or substantially stationary, or not direct the actuator to perform a vertical movement; and (iii) direct the layer dispenser to dispense powder material in the powder bed to generate a second exposed surface of the powder bed, the second exposed surface being planar and having a vertical position identical, or substantially identical, to that of the first exposed surface; and (e) direct repeating (d) to extend the second portion of the ledge in a first plane parallel to the reference plane, to generate a third portion of the ledge that is parallel to the reference plane, the third portion of the ledge being at least a portion of the at least one three-dimensional object, wherein the reference plane (A) is parallel to the first exposed surface, (B) is parallel to the second exposed surface, (C) is parallel to a second plane perpendicular to a gravitational vector of an ambient environment, (D) is a horizontal plane and/or (E) is a surface of the platform facing the powder bed.

2. The apparatus of claim 1, wherein substantially stationary comprises a movement that is not detectable.

3. The apparatus of claim 2, wherein non-detectable is in the at least one three-dimensional object.

4. The apparatus of claim 1, wherein the first portion of the ledge and/or the second portion of the ledge, is devoid of an auxiliary support structure.

5. The apparatus of claim 1, wherein the at least one controller is configured to direct the energy source to generate the energy beam to generate the melt pools such that they comprise fully molten powder.

6. The apparatus of claim 1, wherein the powder comprises elemental metal, metal alloy, an allotrope of elemental carbon, a ceramic, a polymer, or a resin.

7. The apparatus of claim 1, wherein the powder comprises elemental metal, metal alloy, an allotrope of elemental carbon, or a ceramic.

8. The apparatus of claim 1, wherein the at least one controller is configured to direct the energy source to generate the energy beam to generate the first single file of the melt pools such that it (I) extends along the first edge in a first direction, and (II) extends beyond the first portion of the ledge in a second direction.

9. The apparatus of claim 1, wherein the at least one controller is configured to direct repeating (d) to extend the second portion to generate the third portion at least in part by being configured to direct the energy source to generate the energy beam to transform powder in the powder bed to generate the melt pools along the second edge of the second portion of the ledge to generate a second single file of the melt pools such that it contacts the second edge and extends beyond the second portion of the ledge to generate the third portion of the ledge.

10. The apparatus of claim 9, wherein the at least one controller is configured to direct the energy source to generate the energy beam to generate the first single file of the melt pools such that it contacts the second single file of the melt pools.

11. The apparatus of claim 9, wherein the at least one controller is configured to direct the energy source to generate the energy beam to generate the first single file of the melt pools such that it (I) extends along the first edge in a first direction, and (II) extends beyond the first portion of the ledge in a second direction.

12. The apparatus of claim 11, wherein the at least one controller is configured to direct the energy source to generate the energy beam to generate the second single file of the melt pools such that it (I) extends along the second edge in the first direction or in another direction opposite to the first direction, and (II) extends beyond the second portion of the ledge in the second direction.

13. The apparatus of claim 1, wherein the at least one controller is configured to direct the energy source to generate the energy beam to generate the melt pools in the first single file of the melt pools using the energy beam that is stationary, or substantially stationary, when generating a melt pool of the melt pools.

14. The apparatus of claim 13, wherein the melt pool is a first melt pool, and wherein substantially stationary comprises a movement that extends to at most (a) a fundamental length scale of a molten portion of a second melt pool of the melt pools and/or (b) a cross section of the energy beam on an exposed surface of the powder bed, the second melt pool being (i) the same as the first melt pool, or (ii) different from the first melt pool.

15. The apparatus of claim 1, wherein at least two of (b), (c), (i), (ii), (iii), (d), and (e), are directed by a same controller.

16. The apparatus of claim 1, wherein at least two of (b), (c), (i), (ii), (iii), (d), and (e), are directed by different controllers.

17. The apparatus of claim 1, wherein the at least one controller is operatively coupled to at least one sensor comprising a temperature sensor, an electronic sensor, or a positional sensor; and wherein the electronic sensor comprises an amplitude sensor, a current sensor, and/or a power sensor.

18. A method of printing the at least one three-dimensional object, the method comprising: providing the apparatus of claim 1, and using the apparatus to print the at least one three-dimensional object.

19. A system for printing the at least one three-dimensional object, the system comprising: the energy source operatively coupled to the apparatus of claim 1.

20. Non transitory computer readable program instructions, the program instructions, when read by one or more processors coupled to the apparatus of claim 1, cause the one or more processors to execute, or direct execution of, one or more operations associated with the apparatus to print the at least on three-dimensional object, the program instructions being inscribed on one or more media; and wherein the at least one controller comprises the one or more processors.

* * * * *